(12) United States Patent
Schmit et al.

(10) Patent No.: US 6,944,606 B2
(45) Date of Patent: Sep. 13, 2005

(54) MEASUREMENTS EXPERT SYSTEM AND METHOD FOR GENERATING HIGH-PERFORMANCE MEASUREMENTS SOFTWARE DRIVERS

(75) Inventors: Geoffrey Schmit, Georgetown, TX (US); Jonathan Brumley, Austin, TX (US); Brent Schwan, Austin, TX (US); Jack Levy, Austin, TX (US)

(73) Assignee: National Instruments Corporation, Austin, TX (US)

( * ) Notice: Subject to any disclaimer, the term of this patent is extended or adjusted under 35 U.S.C. 154(b) by 689 days.

(21) Appl. No.: 10/010,829

(22) Filed: Nov. 13, 2001

(65) Prior Publication Data

US 2003/0005180 A1 Jan. 2, 2003

Related U.S. Application Data

(60) Provisional application No. 60/301,785, filed on Jun. 29, 2001.

(51) Int. Cl.[7] ............................. G06F 17/00; G06F 9/44
(52) U.S. Cl. ......................................... 706/60; 717/101
(58) Field of Search ............................. 706/60; 717/101

(56) References Cited

U.S. PATENT DOCUMENTS

| | | | |
|---|---|---|---|
| 4,812,996 A | 3/1989 | Stubbs | 701/3 |
| 4,868,785 A | 9/1989 | Jordan et al. | 345/440 |
| 4,884,228 A | 11/1989 | Stanley et al. | 702/123 |
| 5,133,045 A | 7/1992 | Gaither et al. | 706/46 |
| 5,136,705 A | 8/1992 | Stubbs et al. | 714/27 |
| 5,155,836 A | 10/1992 | Jordan et al. | 703/23 |
| 5,394,549 A * | 2/1995 | Stringfellow et al. | 718/100 |
| 5,481,741 A | 1/1996 | McKaskle et al. | 345/522 |
| 5,630,164 A | 5/1997 | Williams et al. | 703/24 |
| 5,812,394 A | 9/1998 | Lewis et al. | 700/17 |
| 5,926,775 A | 7/1999 | Brumley et al. | 702/127 |
| 5,991,537 A | 11/1999 | McKeon et al. | 717/115 |
| 6,006,267 A * | 12/1999 | Nguyen et al. | 717/101 |
| 6,067,584 A | 5/2000 | Hayles et al. | 710/10 |
| 6,096,094 A | 8/2000 | Kay et al. | 717/168 |
| 6,098,028 A | 8/2000 | Zwan et al. | 702/120 |

OTHER PUBLICATIONS

Jose Luis Gordillo, "LE: A Hight Level Language for Specification Vision Verification Tasks", Proceedings of the 1991 IEEE International Conference on Robotics and Automation, Apr. 1991.*

* cited by examiner

*Primary Examiner*—George Davis
(74) *Attorney, Agent, or Firm*—Meyertons Hood Kivlin Kowert & Goetzel, P.C.; Jeffrey C. Hood; Mark S. Williams

(57) ABSTRACT

A measurements expert system and method for generating high-performance measurements software drivers. The measurements expert system is able to interpret a customer's measurement task specification (MTS) specifying a measurement task, explore possible solution paths, and generate a solution, e.g., a run-time specification (RTS), optimized for the customer's measurement system. The expert system includes programs for analyzing and validating a received MTS, and a plurality of measurements experts which are operable to analyze all or part of the MTS and populate complete or partial RTSs. The partial RTSs are iteratively populated by other experts to form complete RTSs. Competing RTSs may be assessed and a final RTS selected based upon user preferences. The final RTS is useable to configure one or more measurement devices according to the RTS, and to generate a run-time which is executable to perform the specified measurement task using the one or more measurement devices.

53 Claims, 70 Drawing Sheets

High-Level Architecture

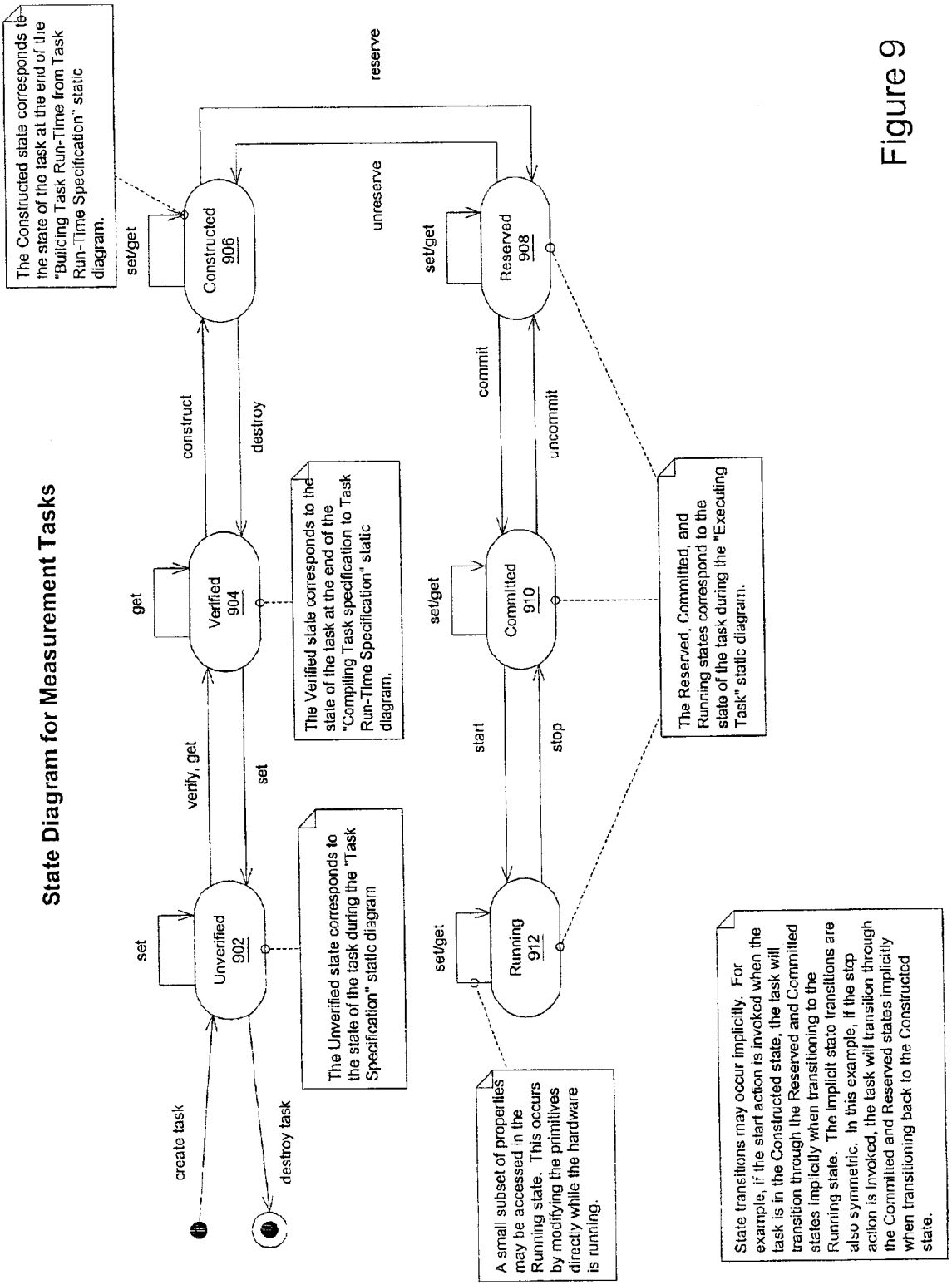

Voltage On Two Channels with Two SCXI Modules in Two SCXI Chassis Connected to an MIO DAQ Device

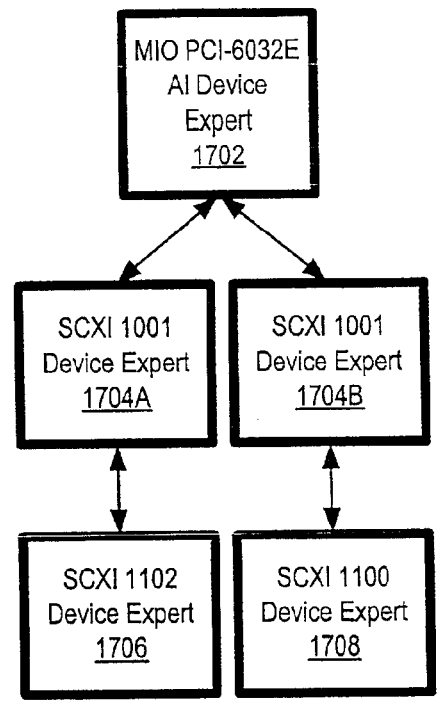
Create Device Expert Call Tree
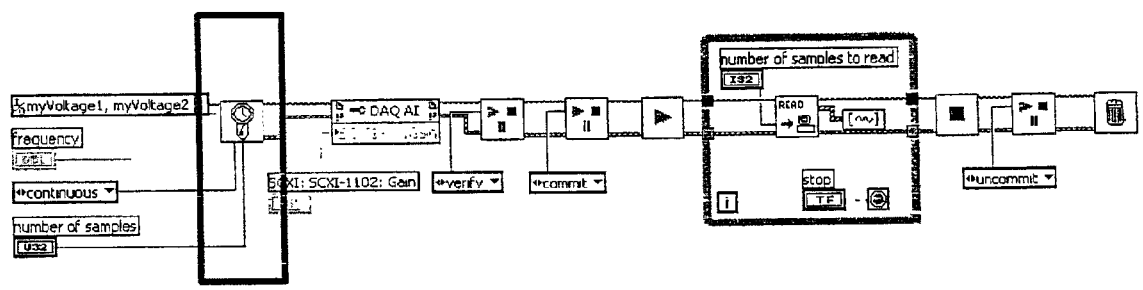
Figure 17

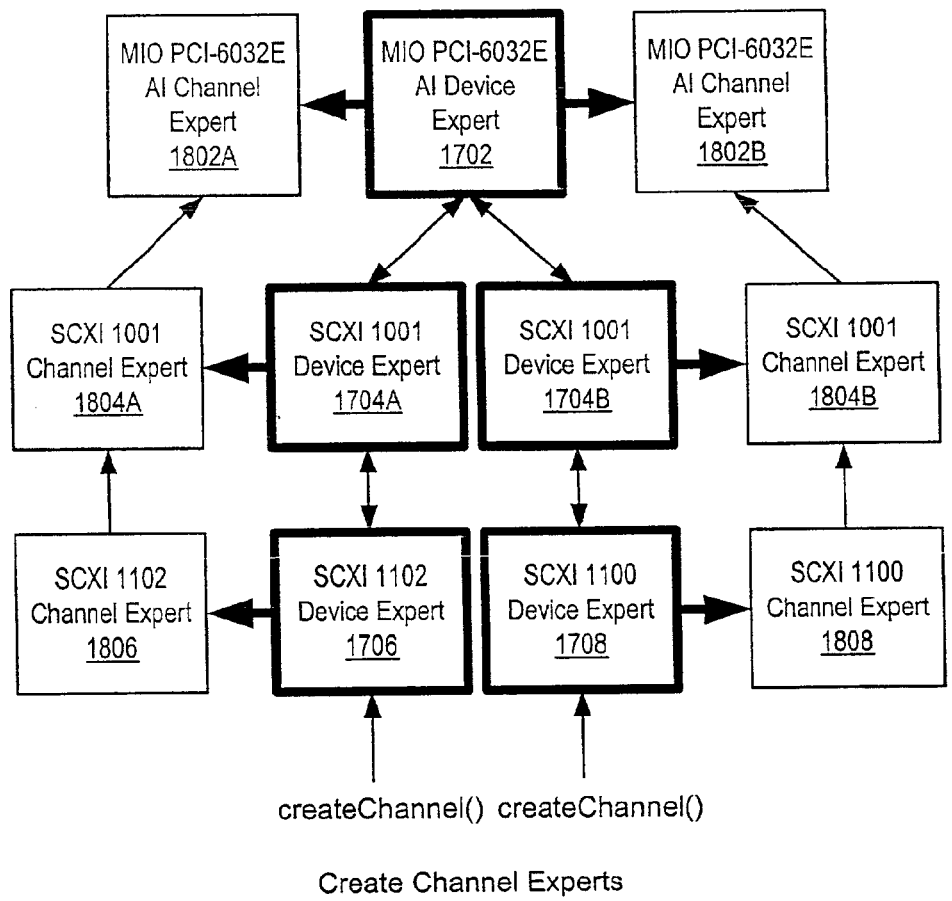
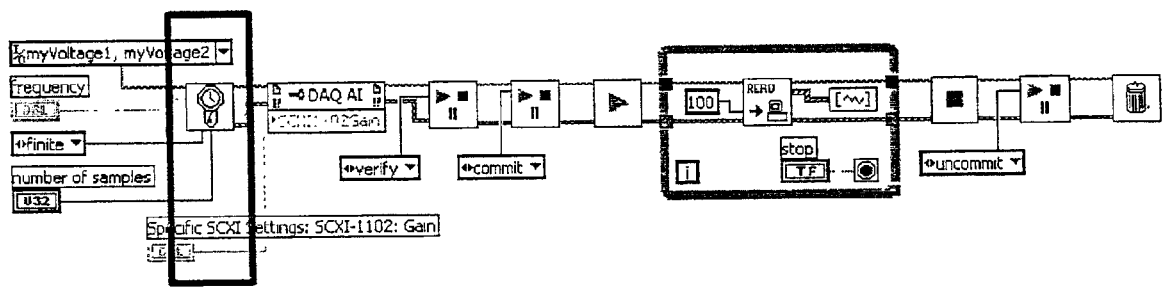
Figure 18

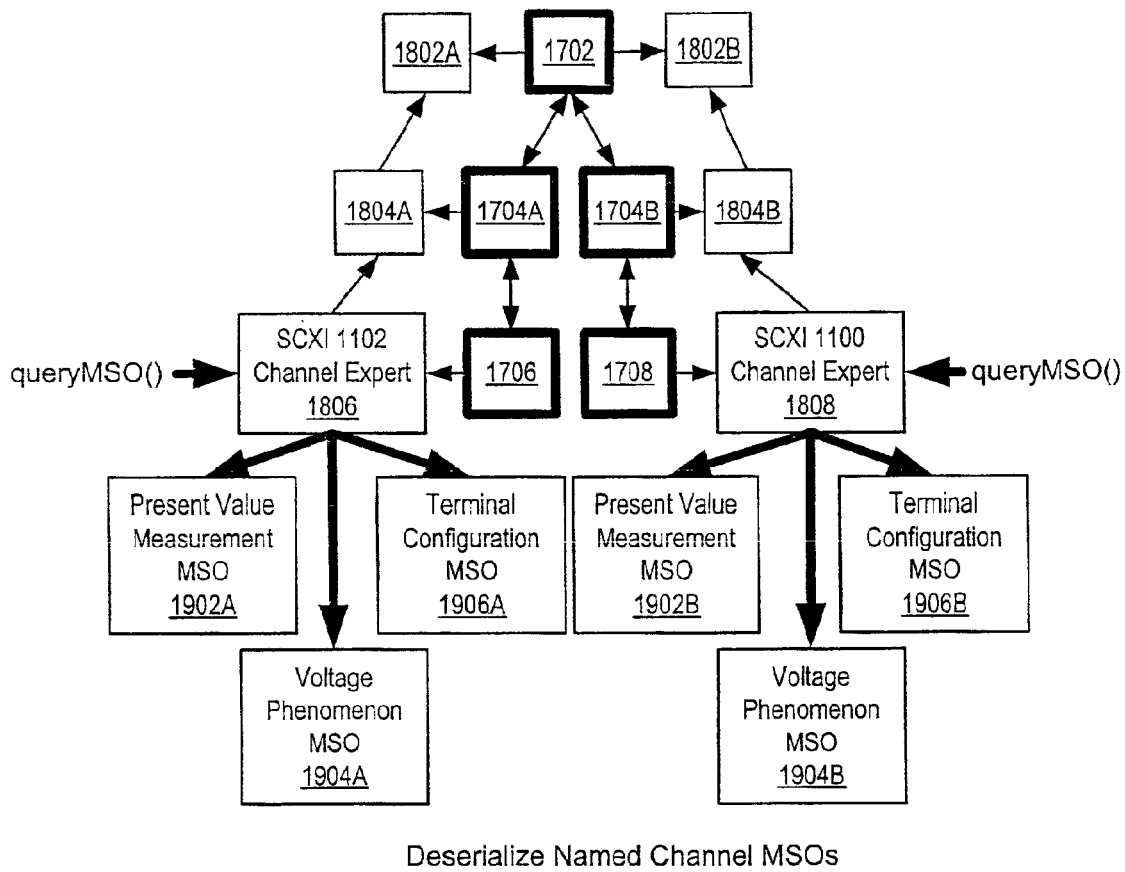
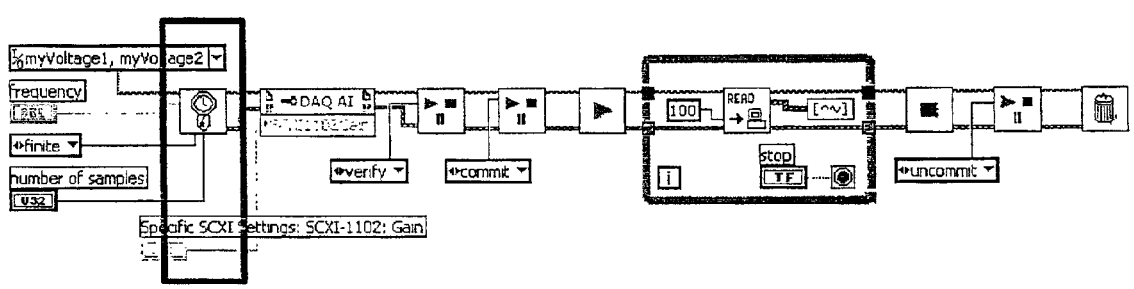
Figure 19

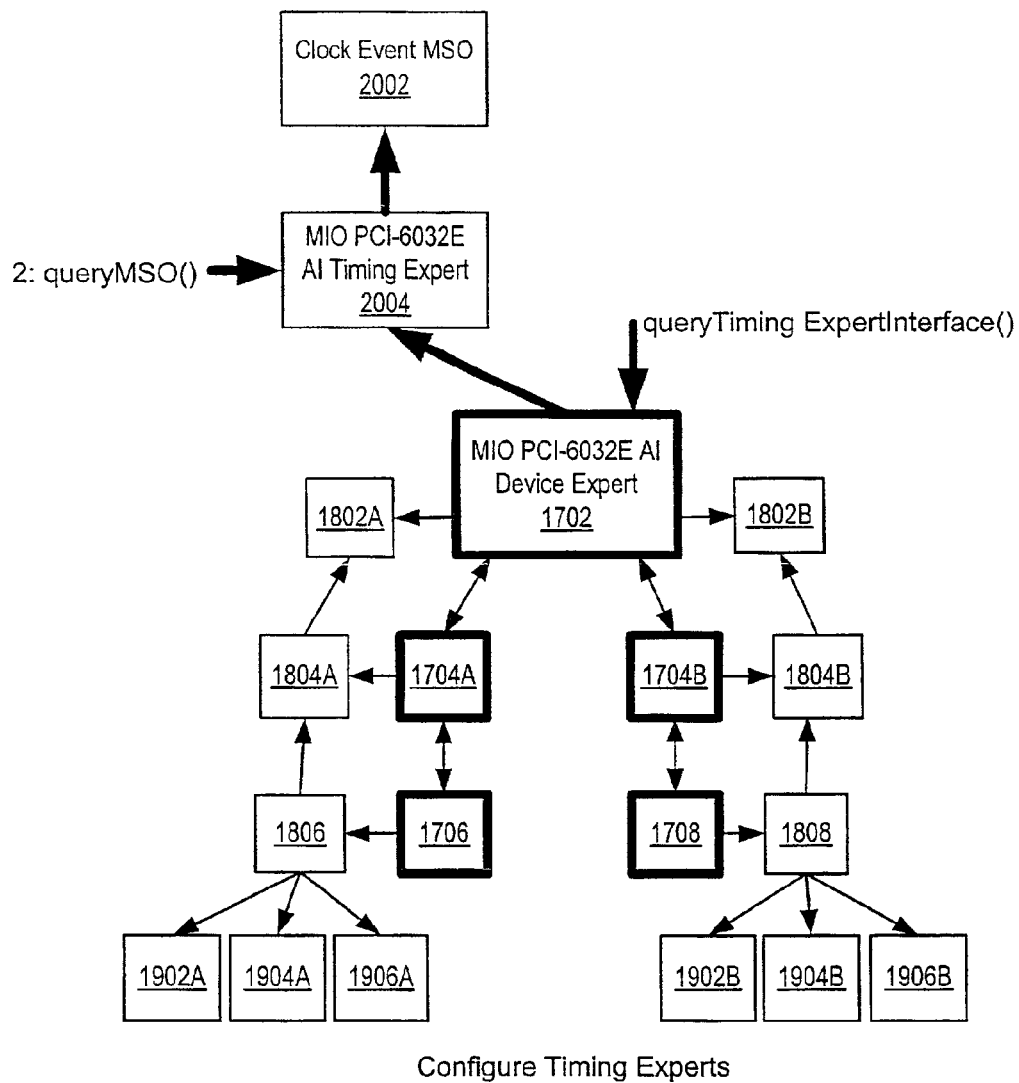
Configure Timing Experts
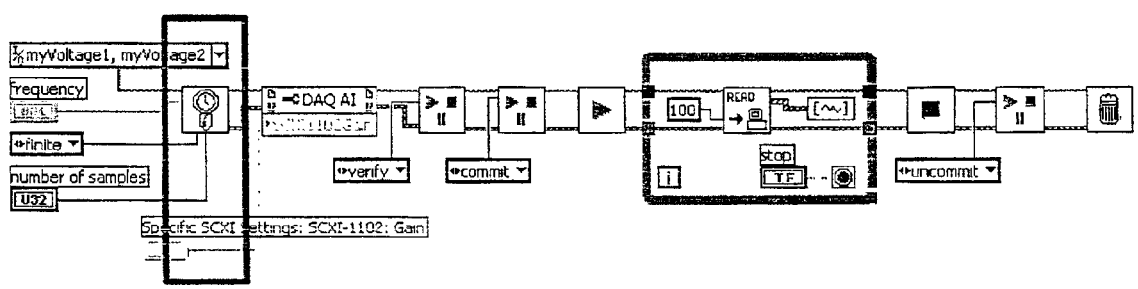
Figure 20

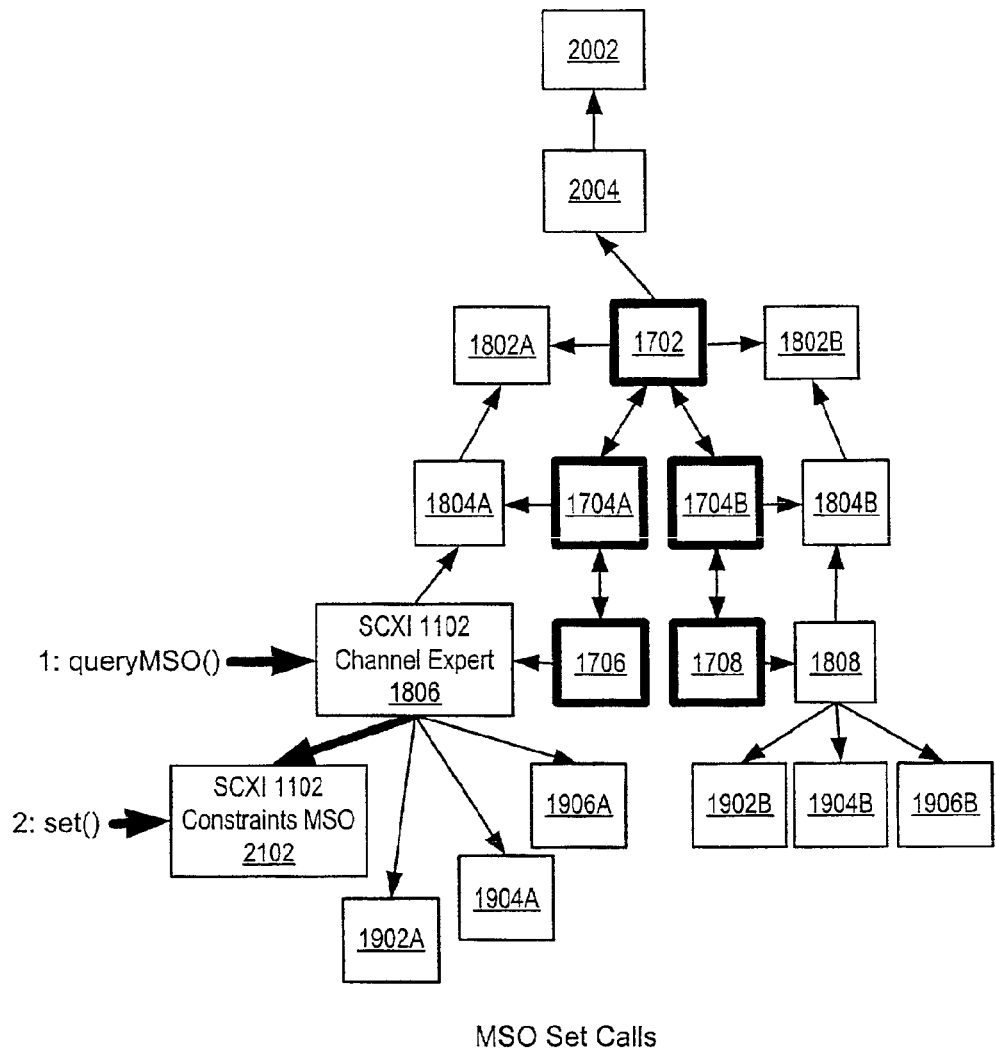
MSO Set Calls
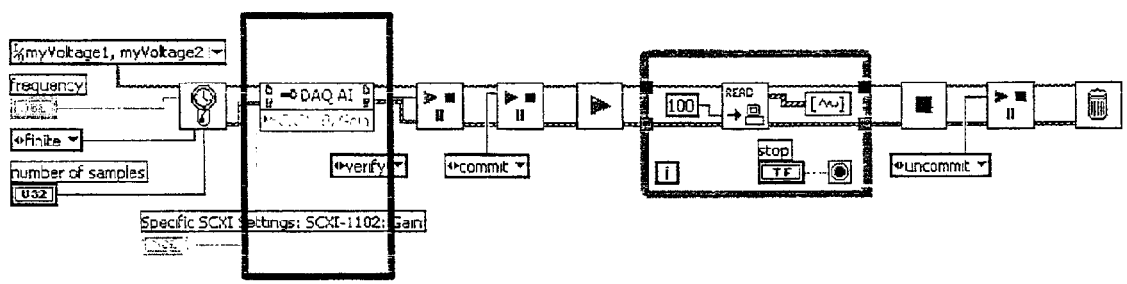
Figure 21

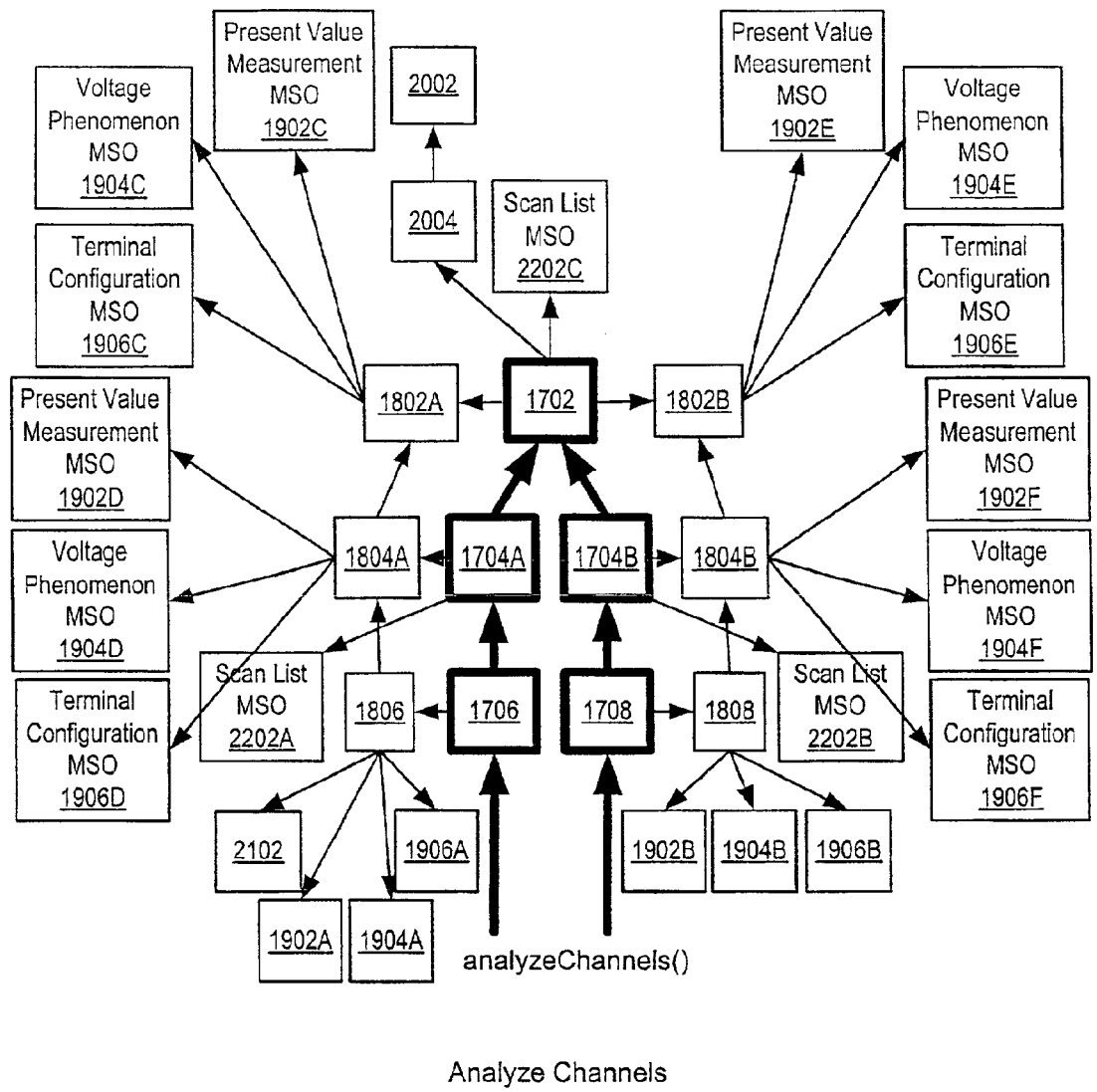
Analyze Channels
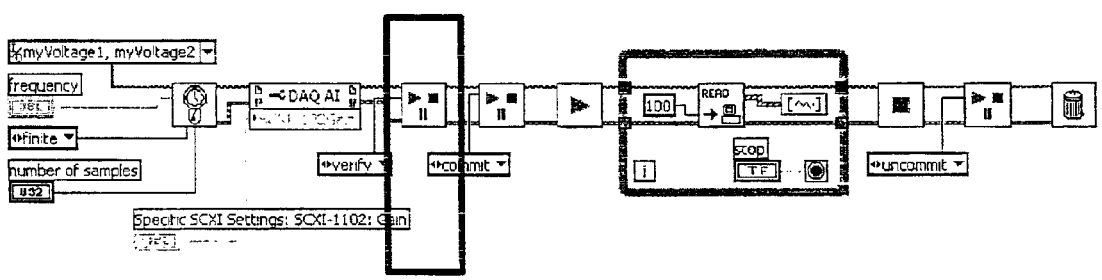
Figure 22

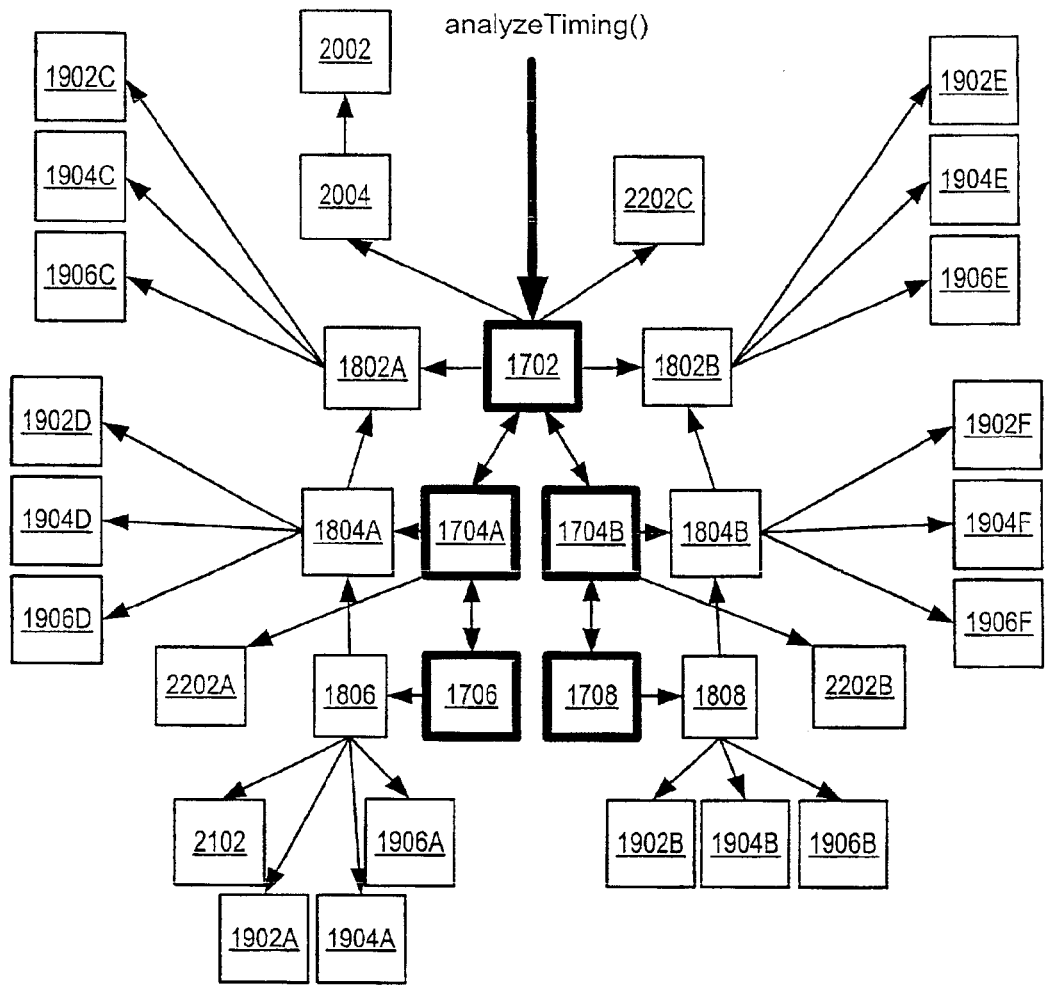
Analyze Timing
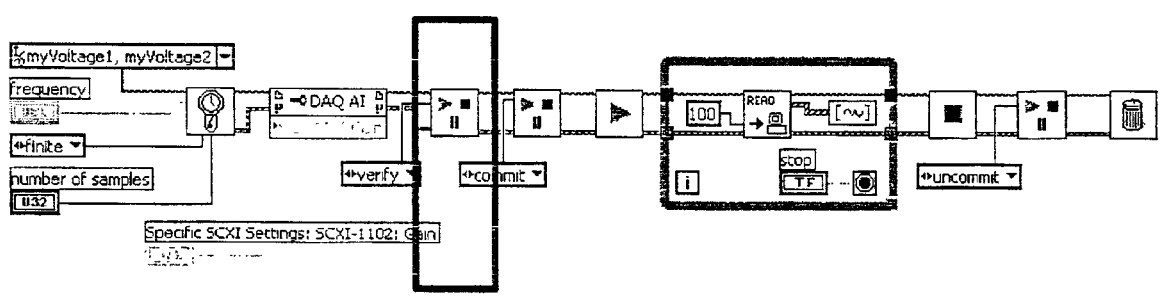
Figure 23

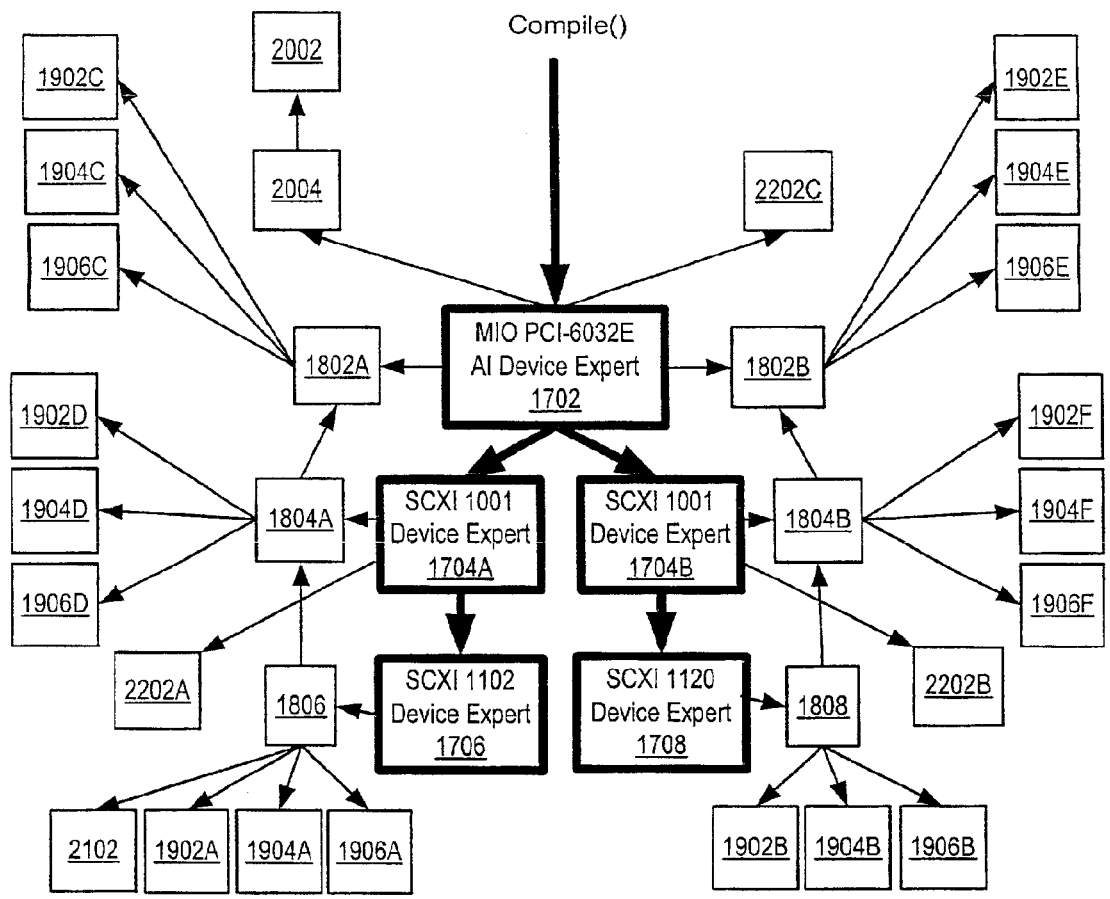
Compile
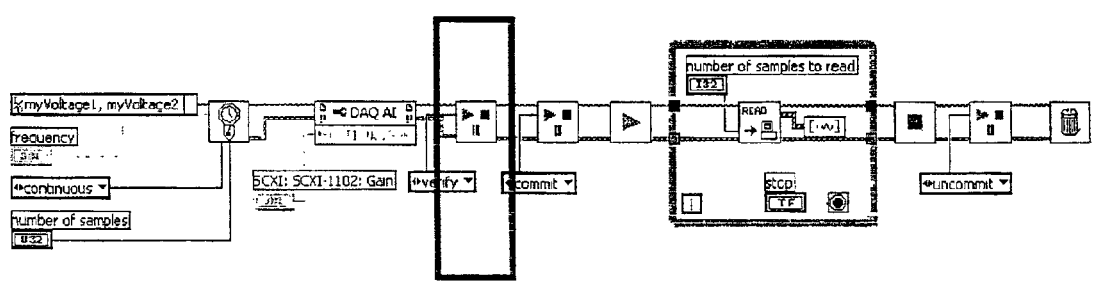
Figure 24A

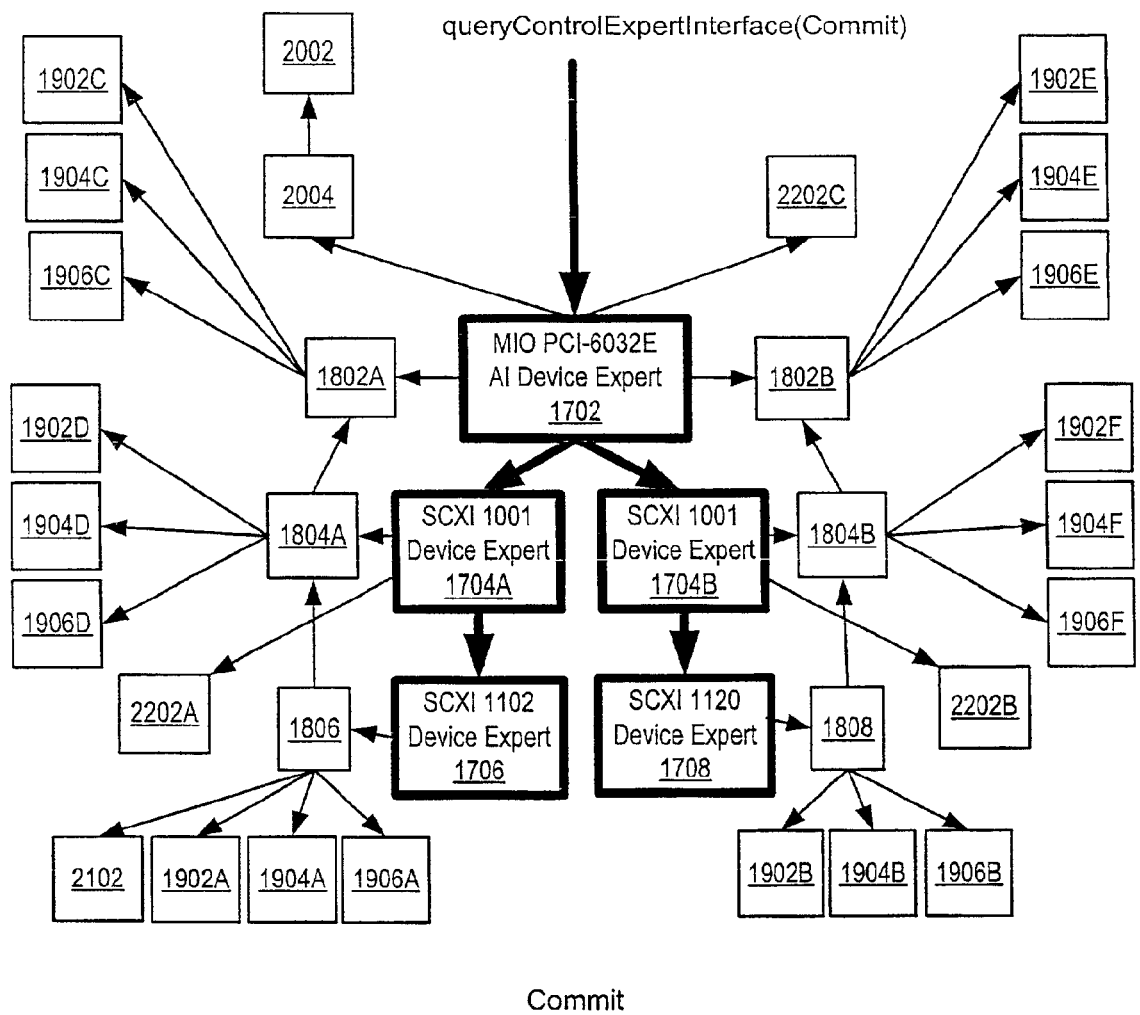
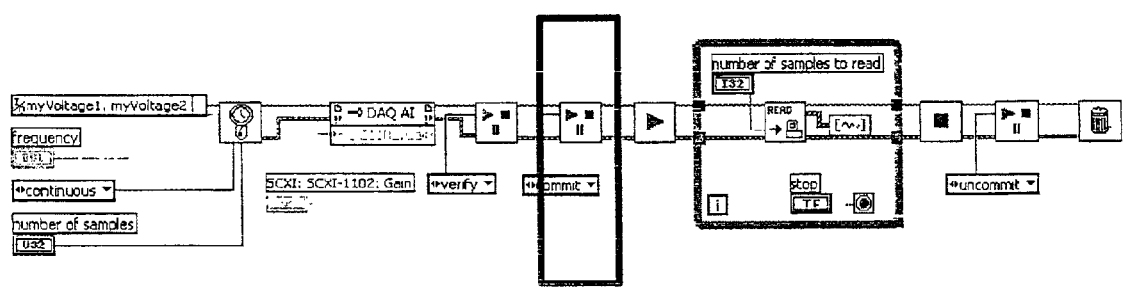
Figure 24B

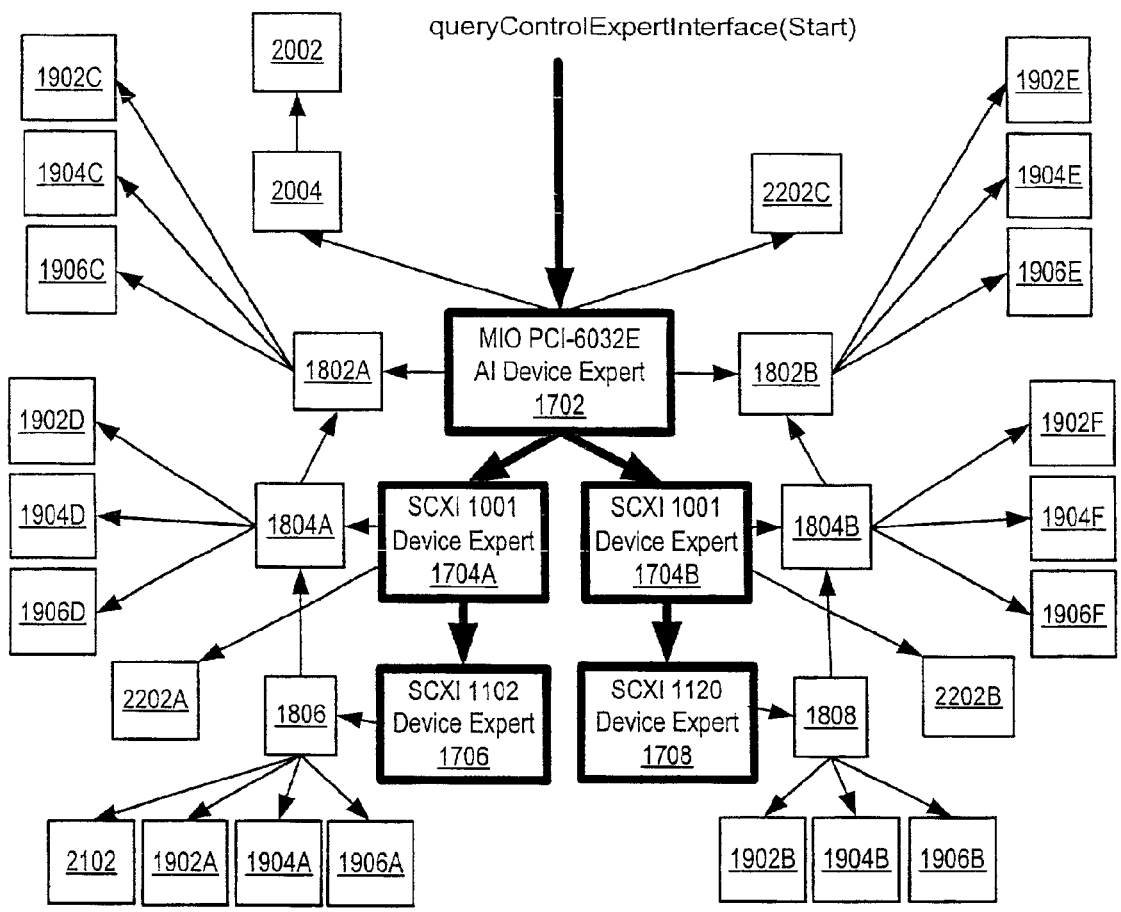
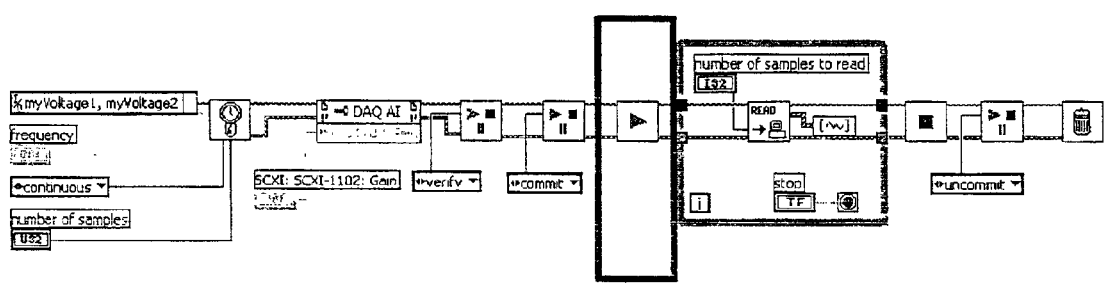
Figure 24C

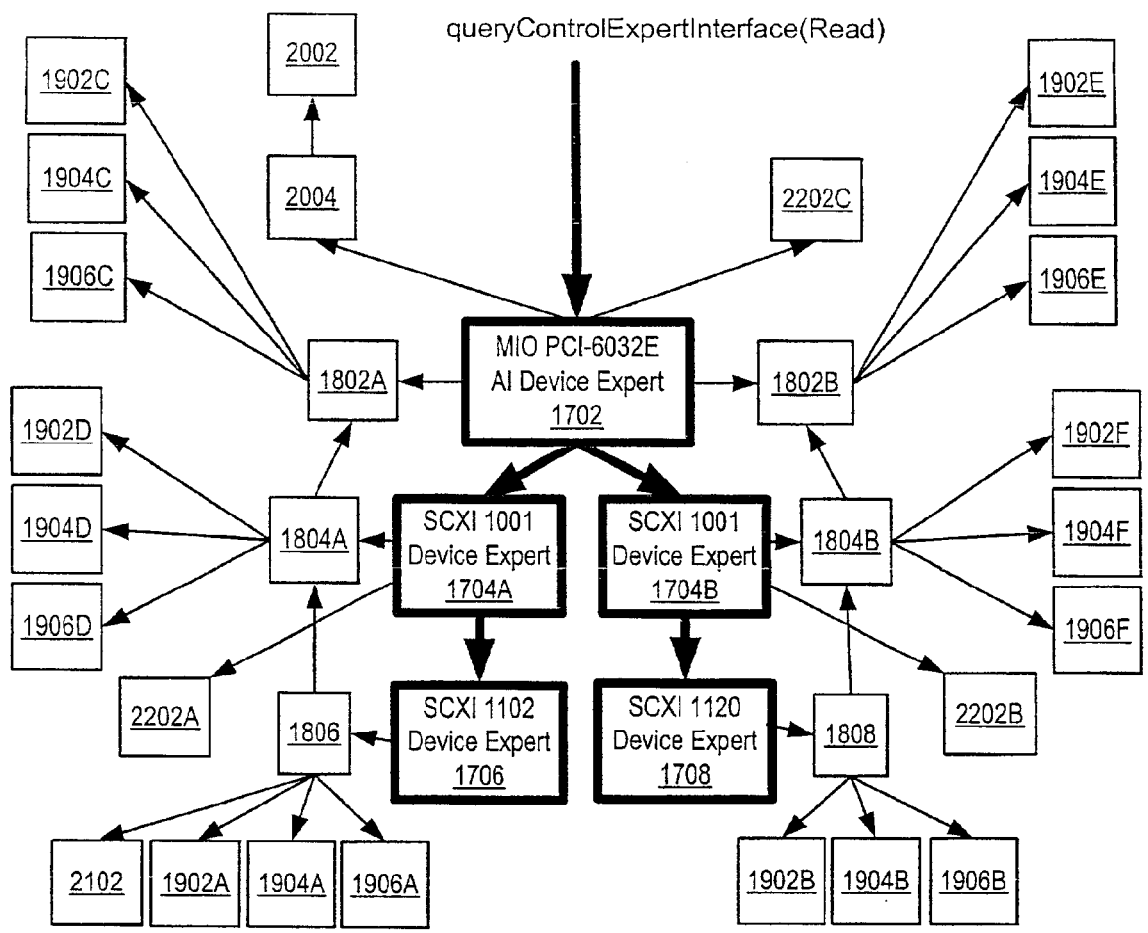
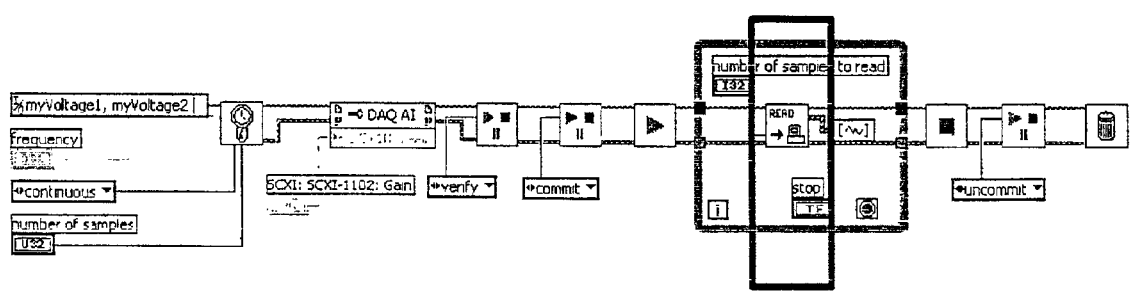
Figure 24D

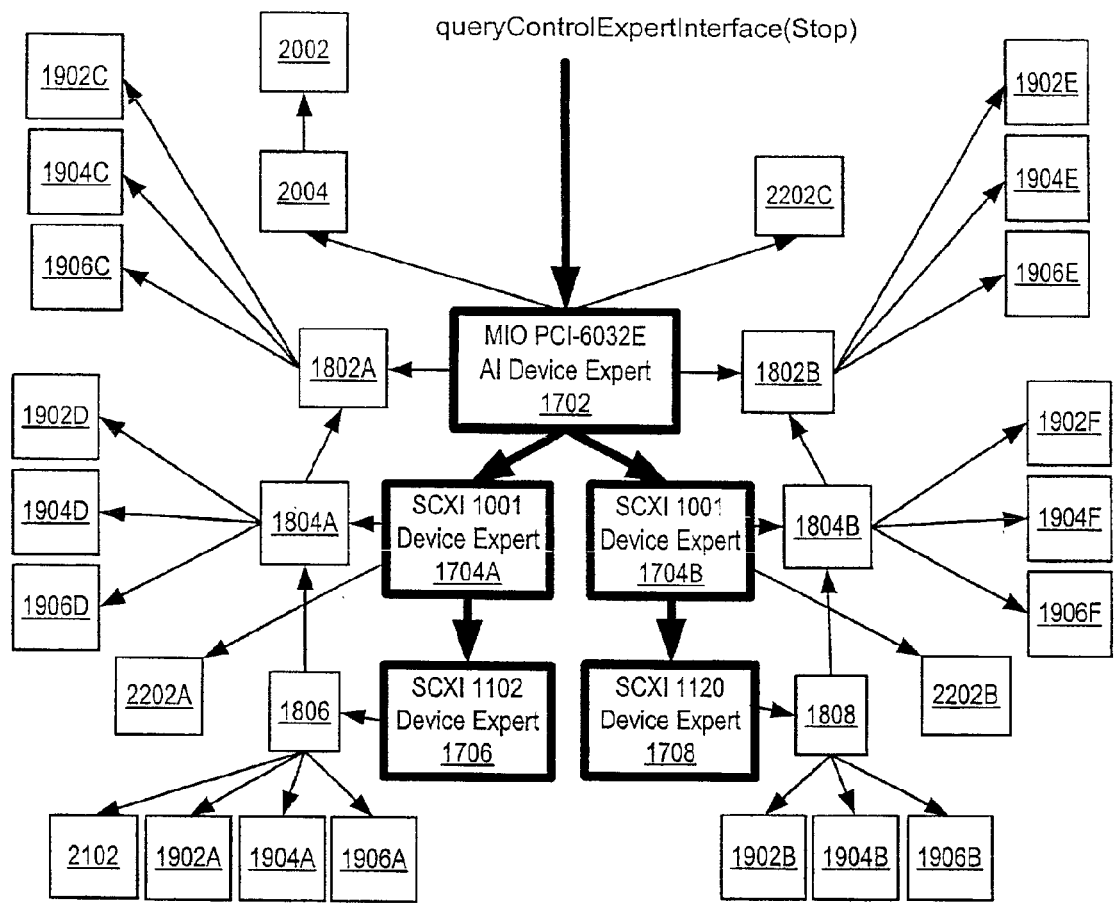
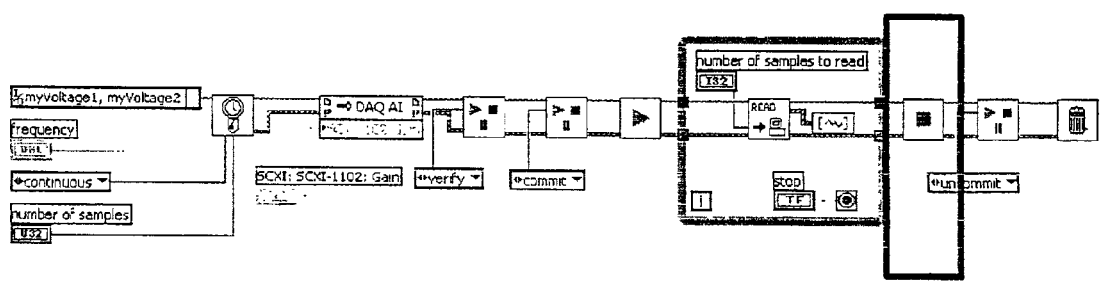
Figure 24E

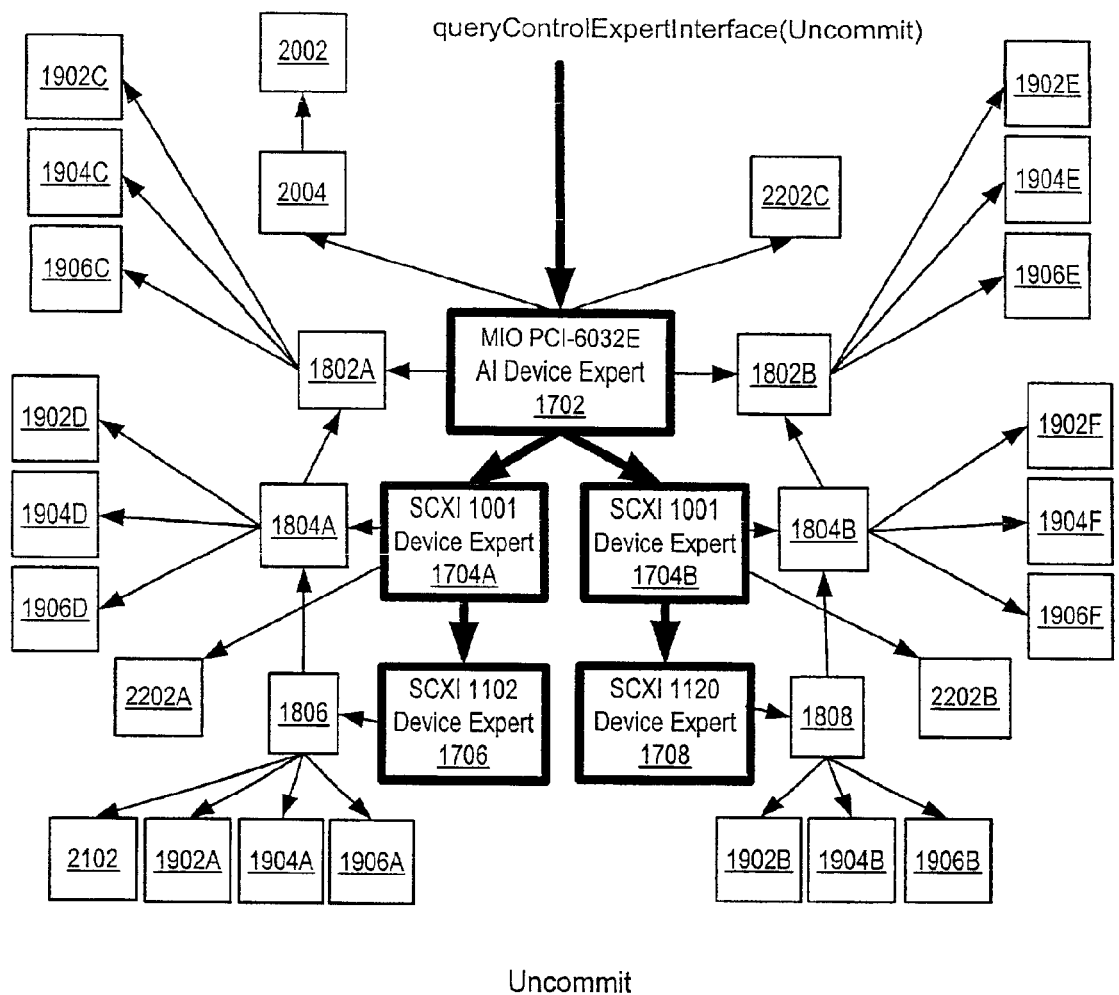
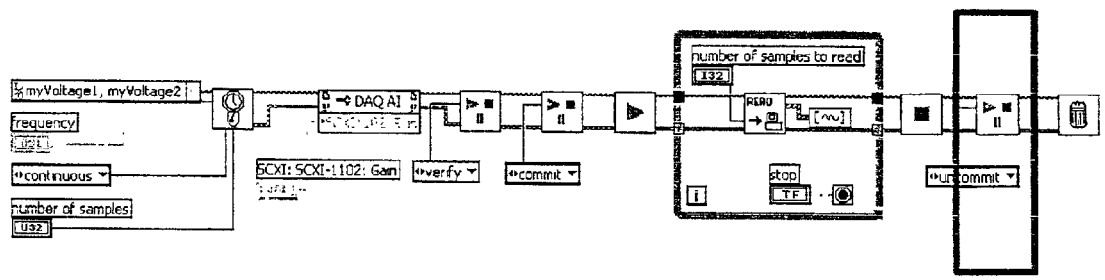
Figure 24F

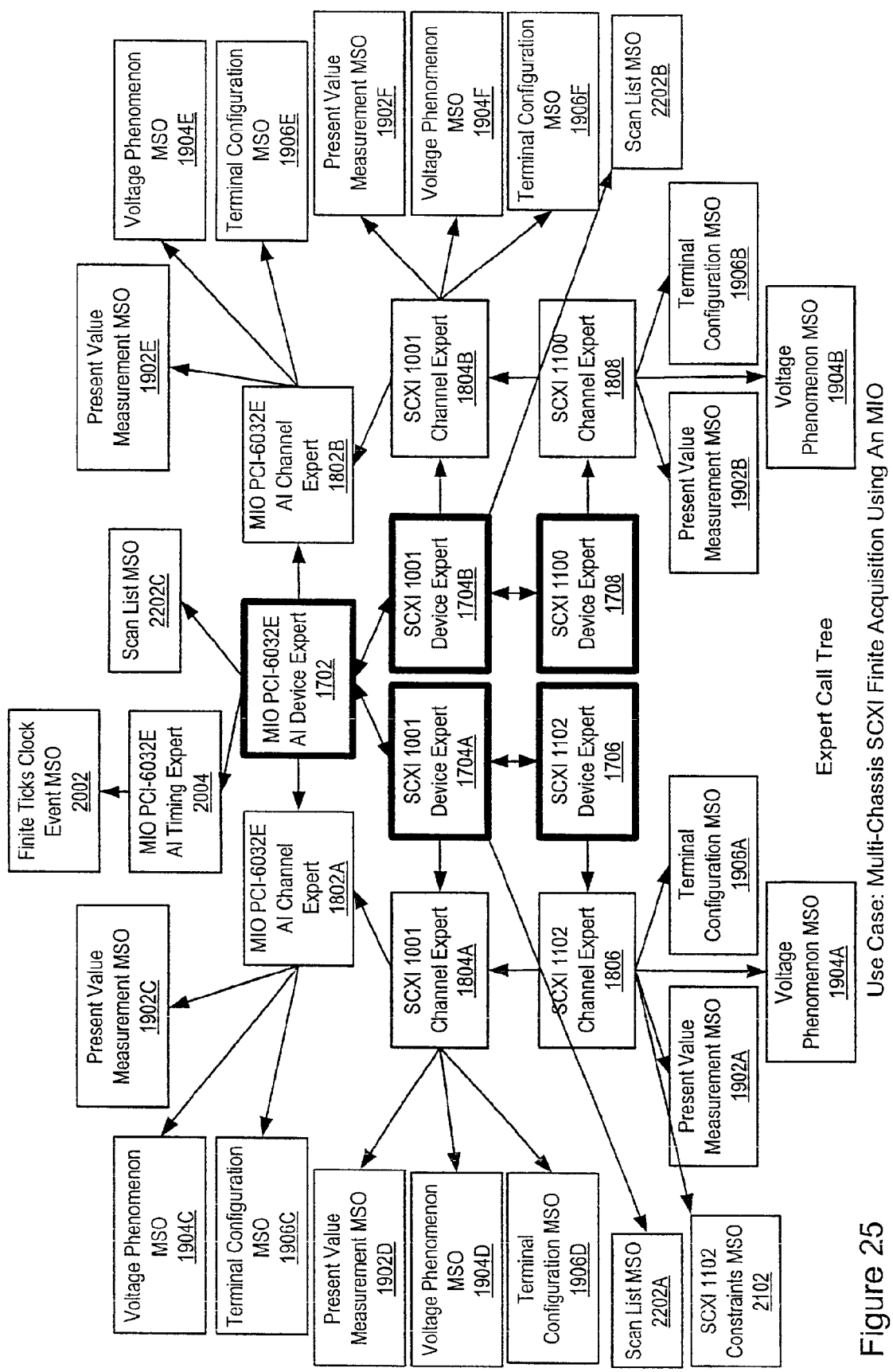
Figure 25  Use Case: Multi-Chassis SCXI Finite Acquisition Using An MIO Simultaneous Buffered Analog Input And Single Point Digital Output With Single-Threaded Driver (Prior Art)

Simultaneous Buffered Analog Input And Single Point Digital
Output With Multi-Threaded Driver Simultaneous Triggered Buffered AI/AO (Prior Art)

Simultaneous Triggered Buffered AI/AO

Sharing Scan Clock Across Two E-Series Devices (Prior Art)

Sharing Clock And Trigger, Buffered AI & DI

Acquire N Scans External Scan Clock Digital Trigger (Prior Art)

Acquire N Scans External Scan Clock Digital Trigger

Triggered Acquisition With E-Series Device

Triggered Acquisition With High Speed Digitizer

Triggered Acquisition With High Speed Digitizer With Filtering

Intermediate Layer (Prior Art)

Changes For Analog Window Triggering (Prior Art)

MEASUREMENTS EXPERT SYSTEM AND METHOD FOR GENERATING HIGH-PERFORMANCE MEASUREMENTS SOFTWARE DRIVERS

PRIORITY CLAIM

This application claims benefit of priority of U.S. provisional application Ser. No. 60/301,785 titled "Measurement System Software Architecture for Easily Creating High-Performance Measurement Applications" filed Jun. 29, 2001, whose inventors were Geoffrey Schmit, Brent Schwan, Jonathan Brumley, Tom Makowski and Chris Bartz.

FIELD OF THE INVENTION

The present invention relates to the field of measurement and automation systems, and more particularly to a software architecture for allowing a user to easily create measurement and automation tasks, verify functionality, and easily create application code to implement desired tasks.

DESCRIPTION OF THE RELATED ART

Scientists and engineers often use measurement or automation systems to perform a variety of functions, including measurement of a physical phenomena or unit under test (UUT), test and analysis of physical phenomena, simulation, hardware-in-the-loop testing, process monitoring and control, control of mechanical or electrical machinery, data logging, laboratory research, and analytical chemistry, to name a few examples.

A typical measurement system comprises a computer system with a measurement device or measurement hardware. The measurement device may be or include a computer-based instrument, a data acquisition device or board, a programmable logic device (PLD), a sensor, a smart sensor, an actuator, or other type of device for acquiring or generating data. The measurement device may be a card or board plugged into one of the I/O slots of the computer system, or a card or board plugged into a chassis, or an external device. For example, in a common measurement system configuration, the measurement hardware is coupled to the computer system via other means such as through a VXI (VME extensions for Instrumentation) bus, a PXI (PCI extensions for Instrumentation) bus, a GPIB (General Purpose Interface Bus), a serial port, or parallel port of the computer system. Optionally, the measurement system includes signal conditioning devices which receive the field signals and condition the signals to be acquired.

A measurement system may also typically include transducers, sensors, actuators or other detecting (or generating) means for providing "field" electrical signals representing a process, physical phenomena, equipment being monitored or measured, etc. The field signals are provided to the measurement hardware.

The measurement hardware is configured and controlled by measurement software executing on the computer system. The measurement software for configuring and controlling the measurement system typically comprises two portions: the device interface or driver-level software and the application software, or the application. The driver-level software serves to interface the measurement hardware to the application. The driver-level software may be supplied by the manufacturer of the measurement hardware or by some other third party software vendor. An example of measurement or DAQ driver-level software is NI-DAQ from National Instruments Corporation. The application or client is typically developed by the user of the measurement system and is tailored to the particular function which the user intends the measurement system to perform. The measurement hardware manufacturer or third party software vendor sometimes supplies the application software for certain applications which are common, generic or straightforward.

Some comprehensive and complex measurement system architectures, for example, National Instruments' NI-DAQ 6.9, have various drawbacks which limit the effectiveness and ease with which a measurement task may be specified, designed, and implemented. These include performance, ease of use, and engineering efficiencies issues. One performance related inadequacy of some current architectures is a lack of a state model for the system. The absence of a state model results in resources being reserved, programmed, and unreserved continuously, because no component or process is aware of what may have already been done. Ease-of-use issues may range from interface complexities to functionality inconsistencies. For example, some current architectures distinguish between different types of measurement devices, requiring different APIs (Application Programming Interfaces) for each. Thus, a user is required to learn multiple APIs. The use of multiple APIs often results in inconsistent support of key features across product lines, and greatly increases the effort and expense of software maintenance, feature extensions, and product additions.

Another drawback of some current measurement system architectures is that complex measurement tasks involving multiple devices require that each device be programmed separately, and that synchronization signals be explicitly routed. Users must typically specify and configure measurement tasks at an advanced level, which is time consuming, expensive, and prone to error.

Additionally, some current architectures generally do not allow more than one execution thread to be active at a time, which can substantially limit performance of the system.

Also, some current measurement system architectures are largely monolithic, resulting in large disk and run-time footprints, thereby limiting the types of devices suitable for storing and executing the measurement system. For example, large monolithic systems are not typically deployable in PDAs (personal digital assistants) or as embedded systems. Furthermore, monolithic systems often result in software being installed that a customer does not need.

Finally, many current measurement systems require that the user perform a significant amount of programming, either in a text-based programming language such as LabWindows or Visual Basic, or in a graphical programming language such as LabVIEW. It would be desirable for a user to be able to more easily create measurement solutions with reduced programming requirements.

Therefore, it would be desirable to provide new systems and methods for specifying and performing measurement tasks.

SUMMARY OF THE INVENTION

Various embodiments of a system and method for creating measurement applications are presented. The system may include a computer system and may also include one or more measurement devices. The one or more measurement devices may comprise a measurement hardware device, a virtual measurement device or other type of device. In one embodiment, the system may further include a device and resource configuration tool which may be operable to receive user input to set system configuration parameters for the one or more measurement devices.

The system may include a measurement task specifier which may be operable to generate a measurement task specification for a measurement task in response to user input. The system may also include an expert system which may be operable to analyze the generated measurement task specification, validate the measurement task specification, and generate a run-time specification for the measurement task. The system may further include a run-time builder that is operable to analyze the run-time specification, configure one or more measurement devices according to the run-time specification, and generate a run-time, wherein the run-time is executable to perform the measurement task. The system may store a plurality of measurement primitives. Each measurement primitive may comprise a software object and corresponding configuration settings, and each measurement primitive may be operable to implement at least a portion of a measurement task. The run-time builder may generate the run-time using one or more of the measurement primitives. The system may also include a memory medium or storage system which is operable to store one or more of the generated measurement task specification, the generated run-time specification, and configuration information for the one or more measurement devices.

In one embodiment, the measurement task specifier may comprise an Application Programming Interface (API) through which the user may make calls to generate the measurement task specification. The measurement task specifier may include, be implemented in, or accessed through, any of various application programming development environments, such as Visual Basic, Visual C++, Visual Studio .NET, LabWindows CVI or LabVIEW, among others. For example, the measurement task specifier may comprise a graphical program, such as a LabVIEW graphical program. The user may place nodes or icons in a graphical diagram and connect the nodes with virtual "wires" to specify a measurement task. The execution of this graphical diagram may generate the measurement task specification.

In another embodiment, the measurement task specifier may comprise a measurement task wizard, i.e., a software program which leads the user through a measurement task specification process, thereby generating the measurement task specification.

In yet another embodiment, the measurement task specifier may include a measurement task configuration tool. The measurement task configuration tool may be an interactive Graphical User Interface (GUI) program which enables the user to select various parameters of the measurement task, such as the type of measurement being performed using voltage, current, etc., and other measurement settings. The measurement task specifier may be operable 1) to be invoked from a text-based application development environment,
2) to be launched from an application development environment toolbar,
3) to be invoked from an application development environment menu,
4) to be presented as a properties page of an Active X control, and/or
5) to be invoked by double clicking an icon, among other methods of initiation.

The measurement task specifier may be operable to generate programming code for a measurement task in response to user input. The programming code for a measurement task may include one or more of C code, C++ code, Visual Basic code, C# code, Java code, graphical code (e.g., LabVIEW code) or any other programming code.

Expert System Embodiment #1

In one embodiment, the expert system may comprise a plurality of experts, where the expert system may be operable to create a device expert call tree of one or more experts from the plurality of experts according to a user-specified measurement task configuration, manage the configuration of the measurement task specification, and verify the measurement task specification and compile the measurement task specification into the run-time specification.

The plurality of experts may include device experts, channel experts, timing experts, reader/writer experts, control experts, and streaming experts. Each class of expert is responsible for managing different aspects of the measurement task specification.

The expert system may create the device expert call tree of associated experts according to the named channels that comprise the measurement task specification. Named channels may be specified by a user with a measurement task specifier or may be automatically specified by a system configuration tool based on the installed measurement devices. The configuration of these named channels may produce fully qualified channel paths and associated channel measurement specification object (MSO) mementos associated with these named channels.

In one embodiment, fully qualified channel paths comprise a series of expert configurations corresponding to the complete topography for the particular channel. Each expert configuration may specify a terminal configuration, the expert associated with that terminal configuration, and a reference to the capabilities of that expert.

In one embodiment, channel MSO mementos are serialized attributes of channel MSOs explicitly configured by a user through a measurement task specifier or by a system configuration tool based on the measurement devices installed in the system. Whenever a channel is added to a measurement task specification, the corresponding channel MSO mementos may be deserialized into the measurement task specification. This allows users to configure default attributes for named channels that span all measurement tasks.

In one embodiment, the first step in the creation of a collection of associated experts according to the user-specified configuration is the construction of the device expert call tree. The expert system may begin the creation of this device expert call tree when the user initializes a new measurement task by providing a list of named channels. A device expert call tree may contain all the experts that will be used to compile a given measurement task specification into a run-time specification. The structure of the tree may determine the order in which the experts are called, as well as the interactions between the experts. The construction of a device expert call tree may be based on the fully qualified channel paths for each channel in the measurement task. Note that additional device experts, associated with channels that were not originally added to the measurement task, may be added after the construction of the device expert call tree.

In the preferred embodiment, the expert call tree is constructed in an in-order, top-down approach. In one embodiment, the general algorithm includes walking (traversing) the series of expert configurations for all of the channels simultaneously. At each point, an expert instance may be created for each unique expert identifier at that level in the fully qualified channel path. Note that if the expert identifier associated with the root entry of the fully qualified channel path is not the same for all named channels in the measurement task, than an expert will be inserted at the root of the expert call tree. This expert may then handle the synchronization between multiple measurement devices or multiple sub-systems on a single measurement device.

After the device expert call tree is built, device experts for each node may be initialized. Initialization information may include the device expert's parent and children in the device expert call tree, a reference to an object that maintains the state of the measurement task, and the hardware capabilities of the device which may be stored in a memory medium, e.g., MXS.

Each device expert may understand or be associated with a specific set of channel experts designed for that device. Once device experts have been created and initialized, the expert system may create channel experts for each specified named channel. The expert system may create channel experts by passing a fully qualified channel path to the leaf (terminal node in the tree structure) device expert in the call tree corresponding to the specific channel. When a device expert's create channel method is invoked, the device expert may first request that its parent device expert create a channel expert as well. The parent channel expert may be created using a version of the fully qualified channel path with the most derived terminal configuration truncated. This sequence may continue up the device expert call tree until all channel experts for a particular fully qualified channel path have been created. Each channel expert may retain a reference to the corresponding parent channel expert for use when the measurement task is configured.

After the expert system creates channel experts for each channel, the corresponding channel MSO mementos may be deserialized from named channels which may be stored in MXS. The expert system may then query channel experts for channel MSOs, and apply the channel MSO mementos to them. This allows users to configure default attributes for named channels that span all tasks.

After the expert system creates the device expert call tree, the user may configure the measurement task specification through the use of a measurement task specifier. The measurement task specifier may rely upon the expert system to manage this configuration of the measurement task specification. The expert system may manage the configuration of the measurement task specification whenever attributes of the measurement task are specified or queried. The specification of the measurement task may occur in any order. The measurement task specification may be modified after the measurement task specification has been verified and compiled. When this occurs, the measurement task specification may be efficiently re-verified and recompiled. Also, the measurement task specification may be modified while the measurement task is executing. When this occurs, the expert system directly and immediately may modify the primitives in the run-time to reflect the modification to the measurement task specification. Configuration of the measurement task specification preferably entails setting various attributes of the MSOs in the measurement task specification.

Root device experts may contain objects implementing specific timing expert interfaces. The expert system may be able to query for these timing experts through an interface. In one embodiment, this query may be done only from the root of device expert tree, with device experts deferring requests to children experts if they are unable to satisfy them. Timing experts may be queried and configured whenever specific timing or triggering attributes are configured. Measurement task specifiers may be able to use specific timing interfaces to configure these attributes.

Channel experts may be configured whenever a measurement task specifier executes a set or get operation on a channel MSO. The first time a set or get is specified for a particular channel MSO, the measurement task specifier may query the appropriate leaf channel expert for that MSO. If a particular channel expert is unable to satisfy that query, the request may be deferred to the channel expert's parent. Sets and gets may then be performed directly on the MSO itself. The measurement task specifier may maintain a cache of any MSOs that have been queried or modified, and so subsequent sets and gets may not require querying the channel expert. The MSO cache may also maintain information about whether each MSO was modified or only queried. During the storage of a measurement task, the measurement task specifier may examine this cache and only store those MSOs actually modified by the customer. This strategy may enable a maximum amount of portability for tasks by not serializing MSO attributes which were only queried, i.e., which were not modified.

The expert system may also verify the measurement task specification and compile the measurement task specification into a run-time specification. The expert system may verify the measurement task specification when, implicitly or explicitly, a measurement task specifier invokes a verify operation for a measurement task. In one embodiment, the verification and compilation of the measurement task specification may consist of three ordered steps, described below.

In one embodiment, the analyze channels step is the first step of the verification and compilation of the measurement task specification. In a post-order (bottom-up) traversal of the device expert call tree, all device experts may be instructed to analyze the properties of all contained channels. During this step, device experts may query channel MSOs from channel experts, analyze their attributes, and produce attributes of channel MSOs for corresponding parent channel experts.

In one embodiment, the second step of the verification and compilation of the measurement task specification is the analysis of timing properties. In a pre-order (top-down) traversal of the device expert call tree, all device experts may be instructed to analyze the properties of all contained timing. During this step, device experts may query timing MSOs from timing experts, analyze their attributes, and produce attributes of timing MSOs for corresponding children timing experts.

The final step of the verification and compilation of the measurement task specification is the compilation into the run-time specification, according to one embodiment. In a pre-order (top-down) traversal of the device expert call tree, some or all of the device experts may be instructed to compile. During this step, device experts may create primitive settings and add them to the run-time specification. Channel MSO attributes or negotiated ranges may also be resolved during this step. Additionally, stream building and signal routing may be executed at this step.

The bottom-up and top-down traversals of the tree are performed to allow attributes to be propagated through all the experts. Channel attributes generally describe an individual measurement or generation at the bottom leaves of the tree which corresponds to where the user has connected his or her signal to the physical measurement system. Attributes, such as physical range, may be inspected and/or modified by each expert upwards along the channel data path so that each expert can be given derived settings. Timing attributes, on the other hand, generally describe timing for all the measurements in a single task. Attributes, such as rate, may be propagated downwards and derived into the specific settings of multiple devices. These direction generalizations are not strictly true, however. For instance, a scan list MSO can be involved in both the channel and timing analysis steps, acting as a bridge of sorts between the two expert classifications.

In one embodiment, the measurement system may use streaming experts to compile stream specifications in the task specification into stream primitive settings in the task run-time specification. The term "streaming" refers generally to data transport, e.g., reads and writes, but may also include data processing operations, such as filtering, splitting and combining of signals, and scaling, among others. Streaming experts may collaborate to transfer and process the data between its source(s) and destination(s). Examples of streaming experts may include an environment changer, format changer, linear scaler, splitter, polynomial scaling filter, pattern matching filter, buffer writer, kernel reader proxy and dispatcher, splitting writer, and combining reader, among others. Note that in one embodiment, the components of the class library may be operable to not only move data, but to analyze, transform, split, and/or combine data, as well.

In one embodiment, a user may modify the measurement task specification incrementally using the task specifier. The expert system may subsequently revalidate the task specification, making incremental changes to the run-time specification. In other words, the expert system may incrementally recompile the modified measurement task specification, thereby updating the run-time specification. Changes to the run-time specification may then be deployed incrementally to reconfigure the run-time. These changes may include adding new primitive settings, modifying existing primitive settings, and removing primitive settings, among others.

In one embodiment, the measurement system may be operable to reserve one or more resources according to the generated run-time specification. In one embodiment, the generated run-time specification may comprise a specification of the parameters of one or more measurement primitives corresponding to rudimentary measurement operations of the measurement task. The measurement system may then instantiate measurement primitives in the form of software objects which may be used to configure one or more measurement devices when the run-time is executed, according to the run-time specification. This may comprise setting the values of parameters or registers of the measurement devices (hardware and/or software) as appropriate to carry out the specified measurement task. The measurement system may thus generate the run-time by creating instances of the measurement primitives with the specified parameters. The run-time may then be executable to perform the specified measurement task.

In one embodiment, a language compiler, such as a C++, Java, or LabVIEW compiler, may be integrated into the measurement system. Integrating language compilation capabilities with the measurement task compilation capabilities of the expert system may provide "just in time" (JIT) functionality to the measurement system, thereby increasing the flexibility, as well as the portability of measurement solutions.

Expert System Embodiment #2

In another embodiment, the expert system may comprise a plurality of experts, where the expert system may be operable to analyze the generated measurement task specification, and select and invoke one or more experts to generate a solution suitable for the user's measurement system. The selected experts may each analyze the generated measurement task specification and populate a respective candidate run-time specification, thereby producing one or more further populated candidate run-time specifications, where each respective candidate run-time specification comprises a possible partial or complete solution for the measurement task. The expert system may then calculate one or more metrics for each of the populated candidate run-time specifications, and select one of the populated candidate run-time specifications based on the calculated metrics.

In one embodiment, if the analysis by a respective expert indicates that the expert cannot populate at least a portion of the respective candidate run-time specification, the respective expert indicates to the expert system that it did not populate the candidate run-time specification for the measurement task specification. If the analysis by a respective expert indicates that the expert is operable to populate the respective candidate run-time specification, the expert populates the respective candidate run-time specification, and communicates the respective candidate run-time specification to the expert system. If the analysis by a respective expert indicates that the expert is operable to populate only a first portion of the respective candidate run-time specification corresponding to a first portion of the generated measurement task specification, the expert populates the first portion of the respective candidate run-time specification, communicates the first portion of the respective candidate run-time specification to the expert system, and submits a second portion of the respective measurement task specification to the expert system as a new, second measurement task specification, for which a respective candidate run-time specification portion was not populated.

The expert system may thus be further operable to receive and analyze the second measurement task specification, in the manner described above. For example, the expert system may be further operable to select and invoke one or more other experts to analyze the second measurement task specification and populate the respective candidate run-time specification, thereby producing one or more further populated candidate run-time specifications, where each respective candidate run-time specification comprises a possible partial or complete solution for the measurement task. The expert system may then calculate one or more metrics for each of the candidate run-time specifications, and select one of the candidate run-time specifications based on the calculated metrics.

The expert system may be further operable to iteratively perform the above process on unsolved portions of the measurement task (or sub-tasks) until either the entire measurement task has been solved, or until the expert system determines that a solution may not be found subject to the current system resources. The expert system may then operate to select a run-time specification from the candidates based on user specified and/or system-specified metrics.

In one embodiment, the system may further include a storage system which is operable to store an expert registry. The expert registry may include information correlating each expert with aspects of one or more respective measurement tasks, and selection of the one or more experts may be performed based on the expert registry.

In one embodiment, the run-time builder may be operable to reserve one or more resources according to the selected run-time specification. In one embodiment, the generated run-time specification may comprise a specification of the parameters of one or more measurement primitives corresponding to rudimentary measurement operations of the measurement task. The run-time builder may then instantiate measurement primitives in the form of software objects which may be used to configure one or more measurement devices when the run-time is executed, according to the run-time specification. This may comprise setting the values of parameters or registers of the measurement devices (hardware and/or software) as appropriate to carry out the specified measurement task. The run-time builder may thus generate the run-time by creating instances of the measurement primitives with the specified parameters. The run-time may then be executable to perform the specified measurement task.

In one embodiment, the measurement task may comprise a plurality of measurement sub-tasks. In another embodiment, the measurement task may comprise a complex measurement operation using a plurality of measurement devices.

As noted above, the measurement task specifier may comprise an API or an application programming development environment. For example, the user may begin in a text-based application programming development environment such as Visual Basic, Visual C++, Visual Studio .NET, LabWindows CVI or LabVIEW, among others. The user may enter textual source code that forms the measurement task specification. For example, the user may input function calls that correspond to the measurement task specification being created. As another example, the user may begin in a graphical programming application development environment such as LabVIEW. The user may select and configure one or more graphical nodes or icons and interconnect the nodes to represent the measurement task specification. As another example, the user may begin by using an interactive prototyping environment. The user may select measurement functions in the prototyping environment, where the functions are stored in a script or prototype that represents the measurement task specification. At this point, the measurement task specification (the textual code, the graphical program, or the prototype created by the user) is not a working program.

The expert system may analyze the measurement task specification, created by executing the source code created by the user, validate the measurement task specification, and generate a run-time specification. The run-time specification may include a data structure comprising parameter specifications for one or more measurement primitives corresponding to rudimentary measurement operations of the measurement task. The run-time specification may then be interpreted by the run-time builder to generate a run-time which is executable to perform the specified measurement task.

Thus, in various embodiments, the present invention provides systems and method whereby a user may specify a measurement task and generate a corresponding measurement application which may be executed to implement the measurement task using available system resources.

BRIEF DESCRIPTION OF THE DRAWINGS

A better understanding of the present invention can be obtained when the following detailed description of the preferred embodiment is considered in conjunction with the following drawings, in which:

FIG. 9 is a state diagram for measurement tasks, according to one embodiment;

FIG. 17 is a block diagram of the creation of the device expert call tree, according to one embodiment;

FIG. 18 is a block diagram of the creation of the channel experts, according to one embodiment;

FIG. 19 is a block diagram of the deserialization of the channel measurement specification objects (MSOs), according to one embodiment;

FIG. 20 is a block diagram of the configuration of timing properties of the measurement task, according to one embodiment;

FIG. 21 is a block diagram of the configuration of channel properties of a channel in the measurement task, according to one embodiment;

FIG. 22 is a block diagram of the analysis of channel properties of the measurement task, according to one embodiment;

FIG. 23 is a block diagram of the analysis of timing properties of the measurement task, according to one embodiment;

FIG. 24A is a block diagram of the compilation of the measurement task specification into a run-time specification, according to one embodiment;

FIG. 24B is a block diagram of the commit step in the measurement task process, according to one embodiment;

FIG. 24C is a block diagram of the start step of the measurement task execution, according to one embodiment;

FIG. 24D is a block diagram of the read step of the measurement task execution, according to one embodiment;

FIG. 24E is a block diagram of the stop step of the measurement task execution, according to one embodiment;

FIG. 24F is a block diagram of the uncommits step of the measurement task, according to one embodiment;

FIG. 25 is a complete block diagram of the various phases of the expert system, according to one embodiment;

Figure 1A:
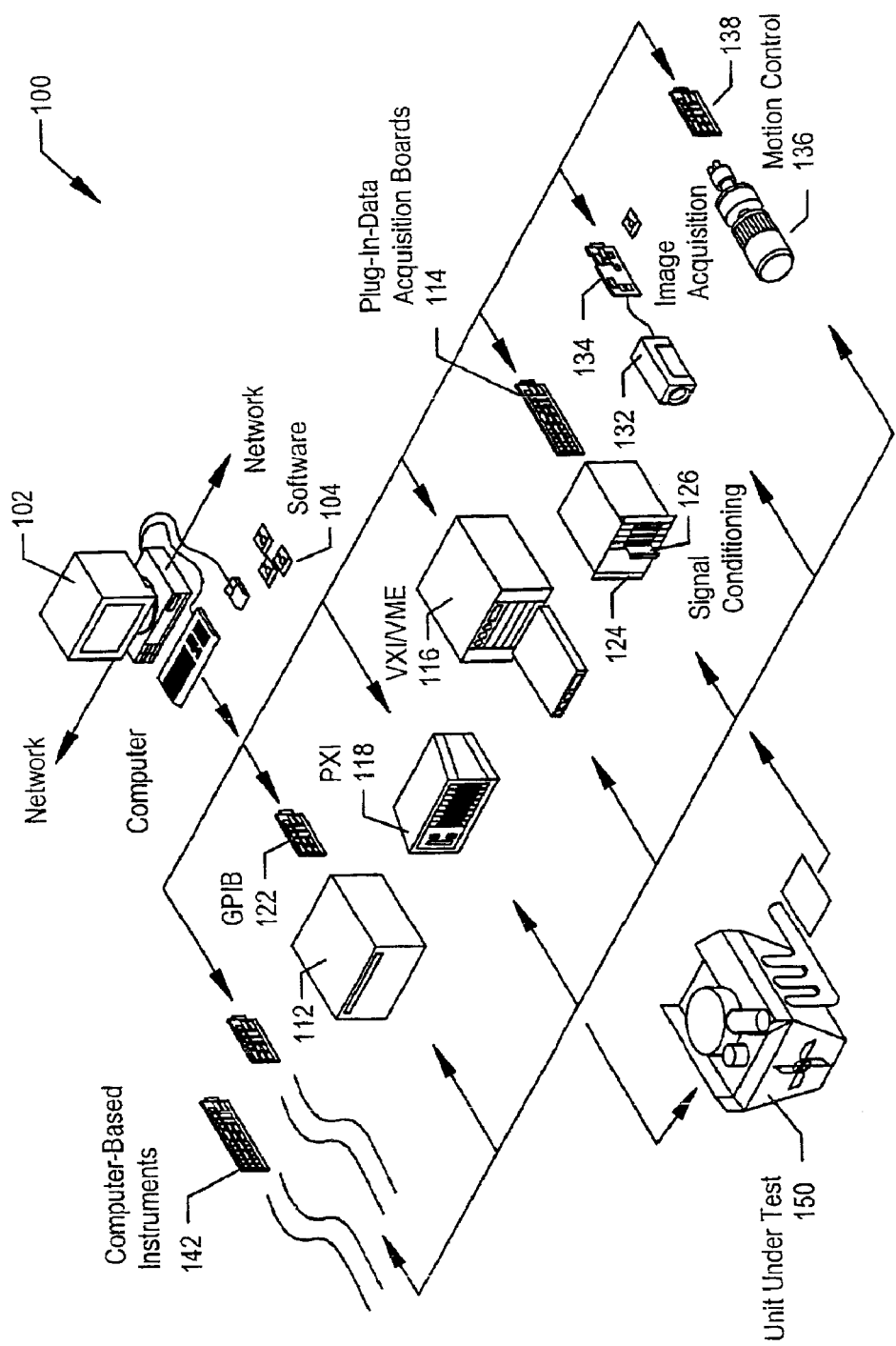
FIGS. 1A and 1B illustrate representative instrumentation and process control systems including various I/O interface options.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1B:
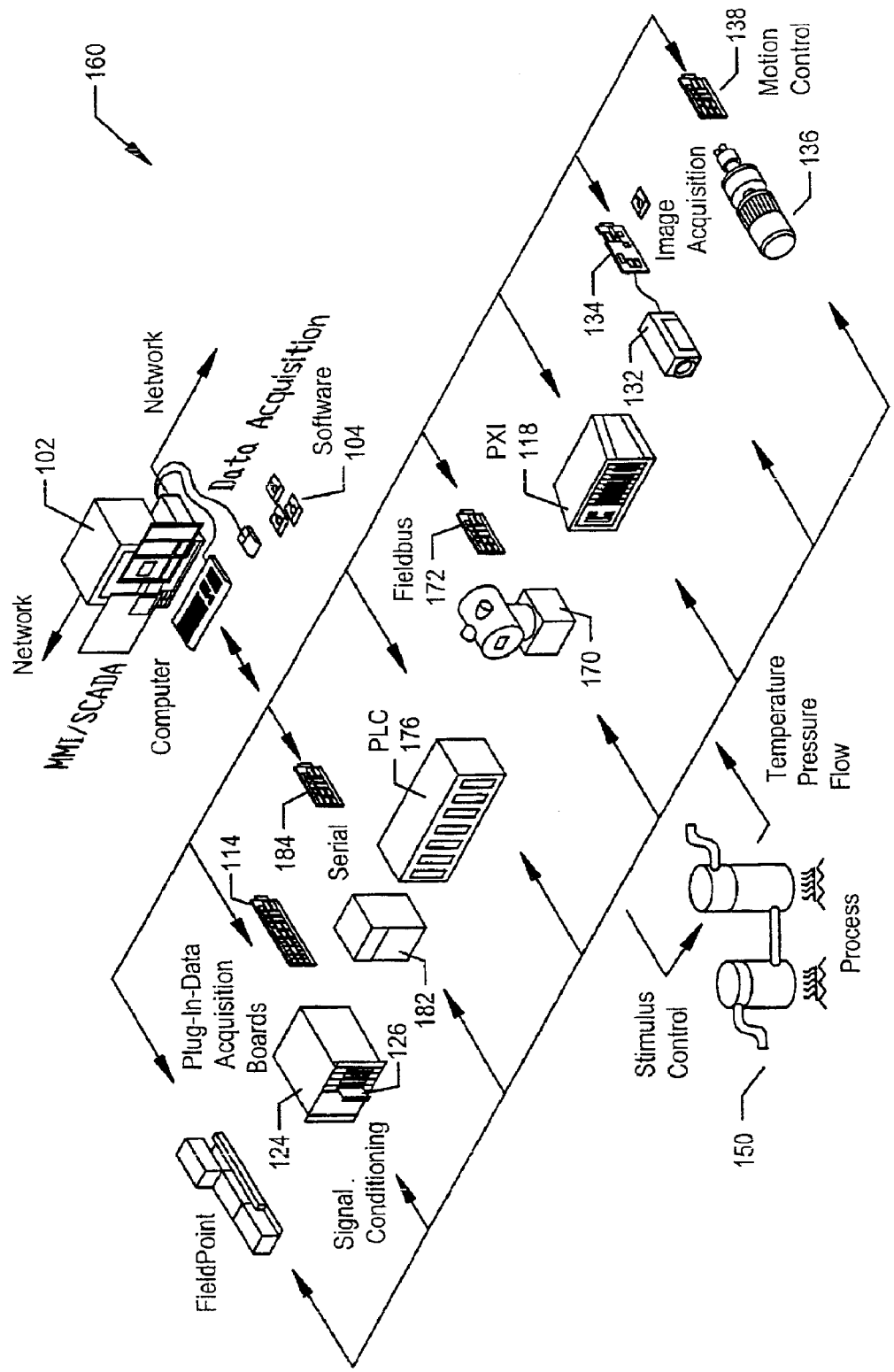

FIGS. 1A and 1B—Instrumentation and Industrial Automation Systems

FIGS. 1A and 1B illustrate exemplary measurement and automation systems. As used herein, the term "measurement system" is intended to include the types of measurement systems and automation systems shown in FIGS. 1A and 1B, as well as other types of systems. The measurement system shown in FIGS. 1A and 1B may include software programs according to one embodiment of the present invention. These programs may of course be stored in or used by other types of systems as desired. In accordance with one embodiment of the present invention, the present system and method includes a novel software architecture and novel software programs for allowing users to more easily create measurement and automation tasks (collectively referred to as "measurement tasks"), verify functionality, and easily create application code to implement desired tasks.

As used herein, the term "measurement system" is intended to include an instrumentation system such as that shown in FIG. 1A, an industrial automation system such as that shown in FIG. 1B, or a modeling or simulation system involved with the design, validation or testing of a product involving "real world I/O", i.e., the acquisition or generation of data to/from a model or simulation of a device or product being designed, validated or tested, such as hardware-in-the loop validation. The term "measurement" may include instrumentation measurement, data acquisitions, automation, control, and simulation.

FIG. 1A illustrates an exemplary instrumentation control system 100. The system 100 may comprise a host computer 102 which connects to one or more devices or instruments. The host computer 102 may comprise a CPU, a display, memory, and one or more input devices such as a mouse or keyboard, as shown. The host computer 102 connects through the one or more instruments to analyze, measure, or control a unit under test (UUT) or process 150.

The host computer 102 may execute a program which interacts with or controls the one or more instruments. The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition card 134, a motion control device 136 and associated motion control interface card 138, and/or one or more computer based instrument cards 142, among other types of devices. Note that the computer based instrument card 142 may be a board or card with one or more FPGAs, one or more CPUs and memory, or various combinations of the two.

The GPIB instrument 112 may be coupled to the computer 102 via the GPIB interface card 122 provided by the computer 102. In a similar manner, the video device 132 may be coupled to the computer 102 via the image acquisition card 134, and the motion control device 136 may be coupled to the computer 102 through the motion control interface card 138. The data acquisition board 114 may be coupled to the computer 102, and may interface through signal conditioning circuitry 124 to the UUT. The signal conditioning circuitry 124 may comprise an SCXI (Signal Conditioning extensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes. These cards 122, 134, 138, 114 may also connected to the computer 102 through a USB (Universal Serial Bus), IEEE 1394 or 1394.2 bus provided by the computer 102.

The VXI chassis or instrument 116 may be coupled to the computer 102 via a VXI bus, MXI bus, or other serial or parallel bus provided by the computer 102. The computer 102 may include VXI interface logic, such as a VXI, MXI or GPIB interface card (not shown), which interfaces to the VXI chassis 116. The PXI instrument may be coupled to the computer 102 through the computer's PXI bus. The PXI chassis may be coupled to the computer 102 via a MXI-3 bus.

A serial instrument (not shown) may also be coupled to the computer 102 through a serial port, such as an RS-232 port, USB (Universal Serial bus) or IEEE 1394 or 1394.2 bus, provided by the computer 102.

In typical instrumentation control systems an instrument of each interface type may not be present, and in fact many systems may only have one or more instruments of a single interface type, such as only GPIB instruments. The instruments are coupled to the unit under test (UUT) or process 150, or are coupled to receive field signals, typically generated by transducers. The system 100 may be used in a data acquisition and control application, in a test and measurement application, a process control application, a man-machine interface application, or a simulation application.

FIG. 1B illustrates an exemplary industrial automation system 160. The industrial automation system 160 may be similar to the instrumentation or test and measurement system 100 shown in FIG. 1A. Elements which are similar or identical to elements in FIG. 1A have the same reference numerals for convenience. The system 160 comprises a computer 102 which connects to one or more devices or instruments. The computer 102 comprises a CPU, a display screen, memory, and one or more input devices such as a mouse or keyboard as shown. The computer 102 connects through the one or more devices to a process or device 150 to perform an automation function, such as MMI (Man Machine Interface), SCADA (Supervisory Control and Data Acquisition), portable or distributed data acquisition, process control, advanced analysis, or other control. In FIG. 1B, the computer 102 may execute a program that is involved with the automation function performed by the automation system 160.

The one or more devices may include a data acquisition board 114 and associated signal conditioning circuitry 124, a PXI instrument 118, a video device 132 and associated image acquisition card 134, a motion control device 136 and associated motion control interface card 138, a FieldBus device 170 and associated FieldBus interface card 172, a PLC (Programmable Logic Controller) 176, a serial instrument 182 and associated serial interface card 184, or a distributed data acquisition system, such as the FieldPoint system available from National Instruments, among other types of devices.

The DAQ card 114, the PXI chassis 118, the video device 132 and image acquisition card 134, and the motion control device 136 and motion control interface card 138 may be coupled to the computer 102 as described above. The serial instrument 182 may be coupled to the computer 102 through a serial interface card 184, or through a serial port, such as an RS-232 port, provided by the computer 102. The PLC 176 may couple to the computer 102 through a serial port, Ethernet port, or a proprietary interface. The FieldBus interface card 172 may be comprised in the computer 102 and interfaces through a FieldBus network to one or more FieldBus devices. Each of the DAQ card 114, the serial card 184, the FieldBus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150.

Referring again to FIGS. 1A and 1B, the computer system 102 and/or one or more of the instruments or devices may include a memory medium (or memory mediums) on which software according to the present invention may be stored. The memory medium may store a measurement task specifier, an expert system, a plurality of experts, a run-time builder, and a plurality of measurement primitives. Additionally, the memory medium(s) may store various products produced by or with these software components, such as a measurement task specification, a run-time specification, and a run-time, all of which are described in more detail below. The memory medium(s) may also store configuration information for one or more of the above software programs.

The term "memory medium" is intended to include an installation medium, e.g., a CD-ROM, floppy disks 104, or tape device; a computer system memory or random access memory such as DRAM, SRAM, EDO RAM, RRAM, etc.; or a non-volatile memory such as a magnetic media, e.g., a hard drive, or optical storage. The memory medium may comprise other types of memory as well, or combinations thereof.

In addition, the memory medium may be located in a first computer in which the shared library is stored or executed, or may be located in a second different computer which connects to the first computer over a network, such as the Internet. In the latter instance, the second computer provides the program instructions to the first computer for execution.

Also, the computer system 102 may take various forms, including a personal computer system, mainframe computer system, workstation, network appliance, Internet appliance, personal digital assistant (PDA), television set-top box, instrument, or other device. In general, the term "computer system" can be broadly defined to encompass any device having at least one processor which executes instructions from a memory medium.

In one embodiment, the software programs and software architecture as described herein may be designed for measurement systems, including data acquisition/generation, analysis, and/or display; automation systems; simulation systems; systems for controlling, modeling, or simulating instrumentation or industrial automation hardware; and systems for controlling, modeling or simulating systems or devices being designed, prototyped, validated or tested. However, it is noted that the present invention can be used for a plethora of applications and is not limited to instrumentation or industrial automation applications. In other words, FIGS. 1A and 1B are exemplary only, and the software programs and software architecture may be used for any of various purposes and may be stored in and execute on any of various types of systems to perform any of various applications.

Figure 2:
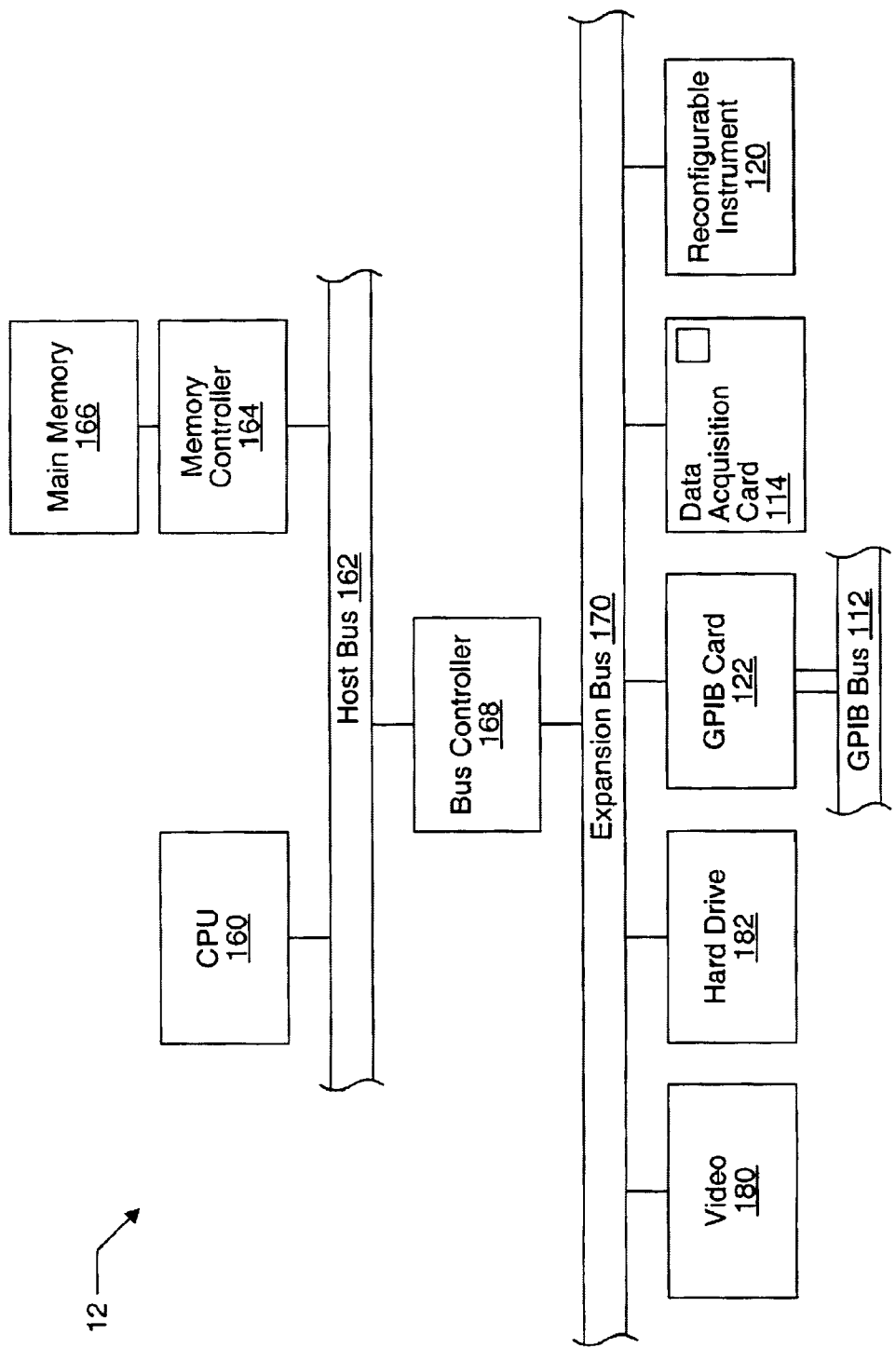
FIG. 2 is a block diagram of the computer system of FIGS. 1A and 1B.

FIG. 2—Computer System Block Diagram

FIG. 2 is an exemplary block diagram of the computer system illustrated in FIGS. 1A and 1B. It is noted that any type of computer system configuration or architecture can be used in conjunction with the system and method described herein, as desired, and FIG. 2 illustrates a representative PC embodiment. It is also noted that the computer system may be a general purpose computer system such as illustrated in FIGS. 1A and 1B, a computer implemented on a VXI card installed in a VXI chassis, a computer implemented on a PXI card installed in a PXI chassis, or other types of embodiments. The elements of a computer not necessary to understand the present invention have been omitted for simplicity.

The computer 102 includes at least one central processing unit or CPU 160 which is coupled to a processor or host bus 162. The CPU 160 may be any of various types, including a x86 processor, e.g., a Pentium class; a PowerPC processor; a CPU from the SPARC family of RISC processors; as well as others. Main memory 166 is coupled to the host bus 162 by means of memory controller 164. The main memory 166 may store one or more computer programs or libraries according to one embodiment of the present invention. The main memory 166 also stores operating system software as well as the software for operation of the computer system, as well known to those skilled in the art.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 1A), a GPIB interface card 122 which provides a GPIB bus interface to the GPIB instrument 112 (of FIG. 1A), and a reconfigurable instrument 120. Note that as used herein, the term "reconfigurable instrument" refers to an instrument with one or more of:

1) a processor and memory which is capable of being configured by a user or software program; and/or
2) reconfigurable logic, such as an FPGA (Field Programmable Gate Array).

For more information on a reconfigurable instrument which includes an embedded processor and embedded memory, please see U.S. Pat. No. 6,173,438 which is hereby incorporated by reference in its entirety as though fully and completely set forth herein. For more information on a reconfigurable instrument which includes reconfigurable hardware, e.g., an FPGA, please see U.S. Pat. No. 6,219,628 which is hereby incorporated by reference in its entirety as though fully and completely set forth herein. The computer 102 may further comprise a video display subsystem 180 and hard drive 182 coupled to the expansion bus 170.

Figure 3:
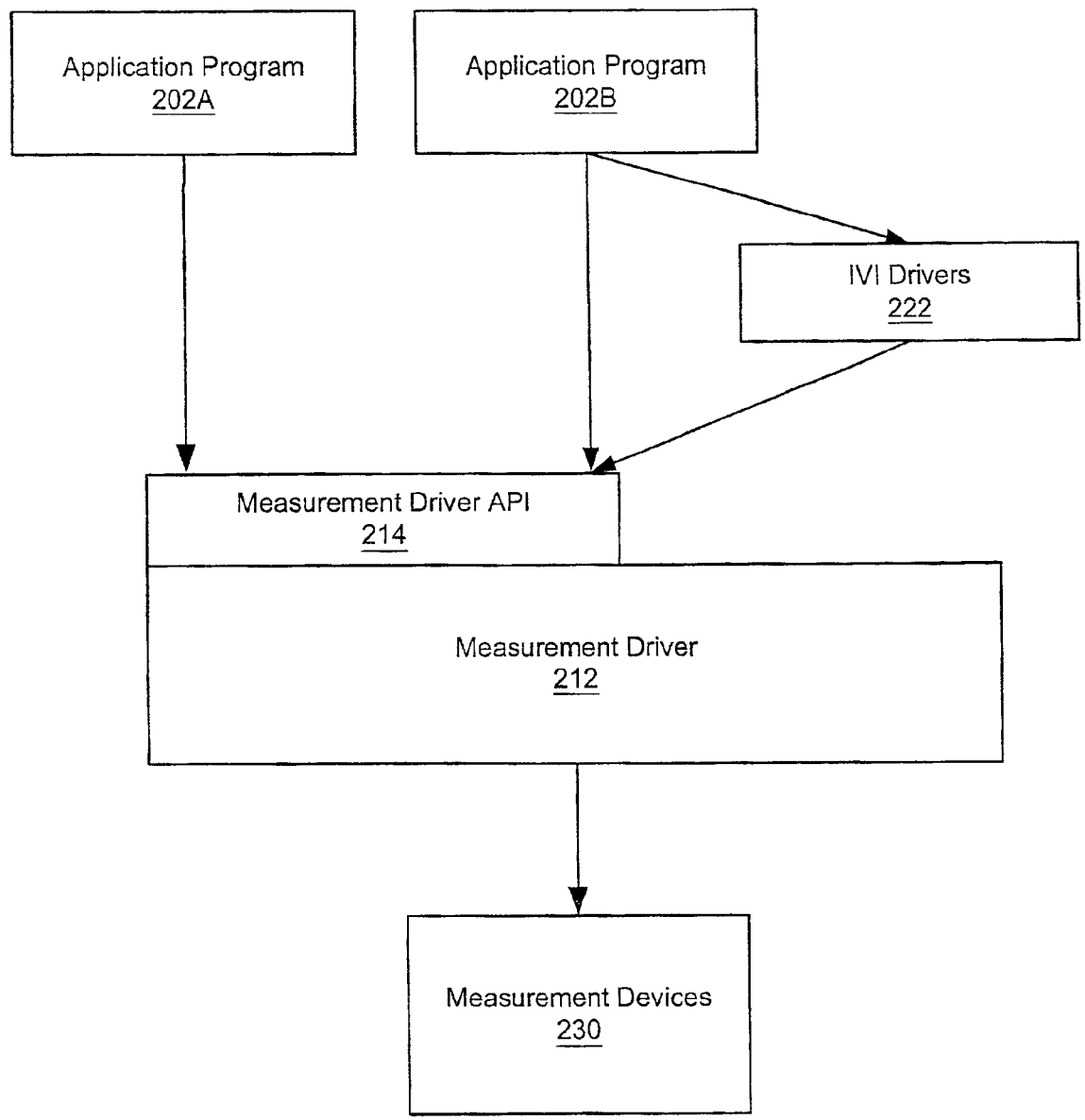
FIG. 3 illustrates one embodiment of a software architecture of a measurement system.

FIG. 3—Creating a Measurement Solution

FIG. 3 illustrates one embodiment of a software architecture for a system such as a measurement system. As shown, the system may include one or more application programs 202. The application programs are typically developed by a user to accomplish a certain task or achieve a certain result. Thus, the application program is typically a user created or developed program to solve a desired problem or accomplish a desired result for the user. The application program 202 may be developed in any of various development environments. For example, the application program may be an application developed in the LabVIEW graphical programming environment of National Instruments Corporation. The application program 202 may also be developed in other applications, such as National Instruments Measurement Studio, Visual Basic, Visual C++, Delphi, or other programming development environments. Thus, the application program may be developed in graphical programming environments such as LabVIEW, or a text-based programming environment such as Measurement Studio or Visual Basic. The application program 202 may thus comprise the customer's entire measurement system, and may include many more features and functions in addition to managing the particular measurement task specification and run-time generation, such as data analysis, report generation, or other higher-level functions of the measurement system.

As shown, the application 202 communicates with a measurement driver 212. The measurement driver 212 may include a measurement driver application programming interface (API) 214. As shown, the application program 202A or 202B interfaces with the measurement driver API 214 in order to access capabilities of the measurement driver 212. In this measurement example, the software architecture may also include interchangeable virtual instrument (IVI) drivers 222 wherein the application program 202B may interface through IVI drivers 222, which interface with the measurement driver API 214, to interface with the measurement driver 212.

The measurement driver 212 interfaces to the one or more various measurement devices 230 comprised in this system. The measurement devices 230 may comprise any of the various devices discussed above with respect to FIG. 1A or 1B and may comprise other devices not shown in FIGS. 1A and 1B as desired. In one embodiment, at least one of the one or more measurement devices comprises a hardware measurement device. In another embodiment, at least one of the one or more measurement devices comprises a virtual measurement device.

In one embodiment, the present invention provides an improved system and method for creating application programs, such as application programs 202A and 202B. The measurement driver 212 preferably includes various software that may allow creation of an application program 202A or 202B using a high-level interface and requiring reduced user effort and coding.

Figure 4:
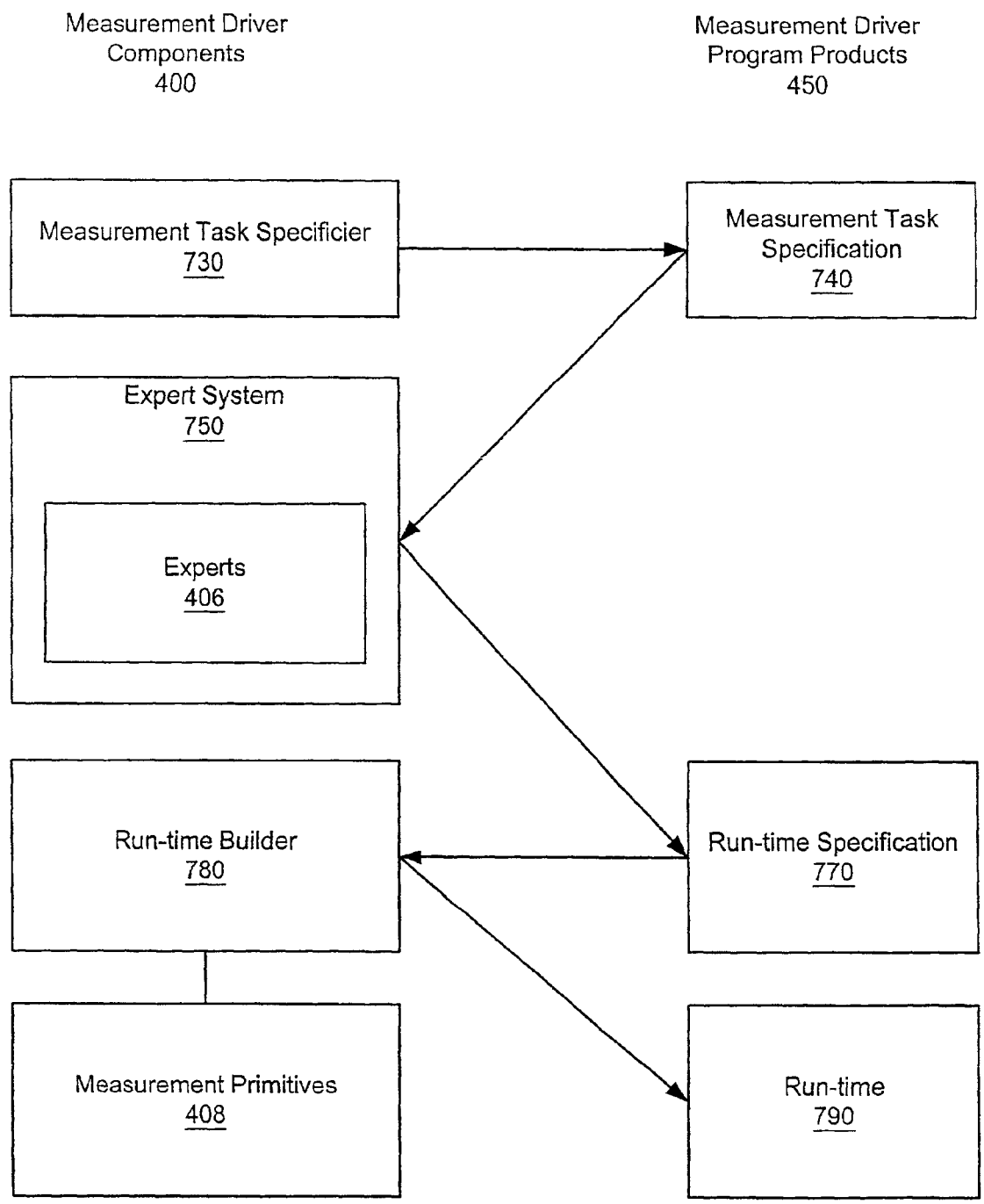
FIG. 4 illustrates measurement driver program components, according to one embodiment.

FIG. 4—Measurement Driver Program Components

FIG. 4 illustrates various software components or programs 400 comprised in the measurement driver program 212. As shown, the measurement driver program 212 may include a measurement task specifier 730, an expert system 750 with one or more experts 406, a run-time builder 780, and various measurement primitives 408. The measurement driver 212 may also include other software components as well.

As FIG. 4 also illustrates, various of the measurement driver components may be operable to generate respective products which may be useable by other measurement driver components, by other software programs or systems, or by a user. More specifically, as shown in FIG. 4, in one embodiment, the measurement task specifier 730 may be operable to generate a measurement task specification 740. In one embodiment, the measurement task specification 740 may comprise software objects or data structures, such as C++ objects, which may specify the measurement task. In one embodiment, the measurement task specifier 730 may be a measurement task wizard, i.e., a software program which leads the user through a measurement task specification process to create the measurement task specification 740. In another embodiment, the measurement task specifier 730 may take the form of a measurement task configuration tool, which is a software program invocable by the user under a development environment, such as the National Instruments LabVIEW environment or Measurement Studio programming development environment. In yet another embodiment, the measurement task specifier 730 may simply be an API through which the user makes calls to generate the task specification. Thus, in various embodiments, the measurement task specifier 730 may generate the measurement task specification 740 in response to user input.

As shown, the expert system 750 may use the measurement task specification 740 to generate a run-time specification 770. The expert system 750 may include a plurality of experts. The expert system 750 may include one or more experts for each of the measurement device types shown in FIGS. 1A and 1B, in addition to various other experts, including routing experts, streaming experts, and synchronization experts, among others In one embodiment, the run-time specification 770 may similarly comprise software objects or data structures, such as C++ objects, which may specify the run-time parameters for software and/or hardware used to implement the specified measurement task. The run-time specification 770 may comprise parameter specifications for one or more measurement primitives 408 which correspond to rudimentary measurement tasks or operations. Said another way, the run-time specification 770 may comprise a collection of primitive settings, each of which may comprise a detailed and unambiguous "recipe" for a primitive. For example, primitive settings for a digitizer, such as a National Instruments E-Series digitizer, may include: Dither (Yes, No), Polarity (Bi-polar, Uni-polar), Gain, Mode (Calibration, Differential, Non-Referenced Single-Ended, Referenced Single-Ended, Auxillary, Ghost), Generate Trigger (Yes, No), and Last Channel (Yes, No).

The run-time specification 770 may in turn be interpreted by the run-time builder 780 to generate a run-time 790, which may be executable to perform the specified measurement task. More details of the operation of the measurement driver program are presented below with reference to the description of FIG. 5.

Figure 5:
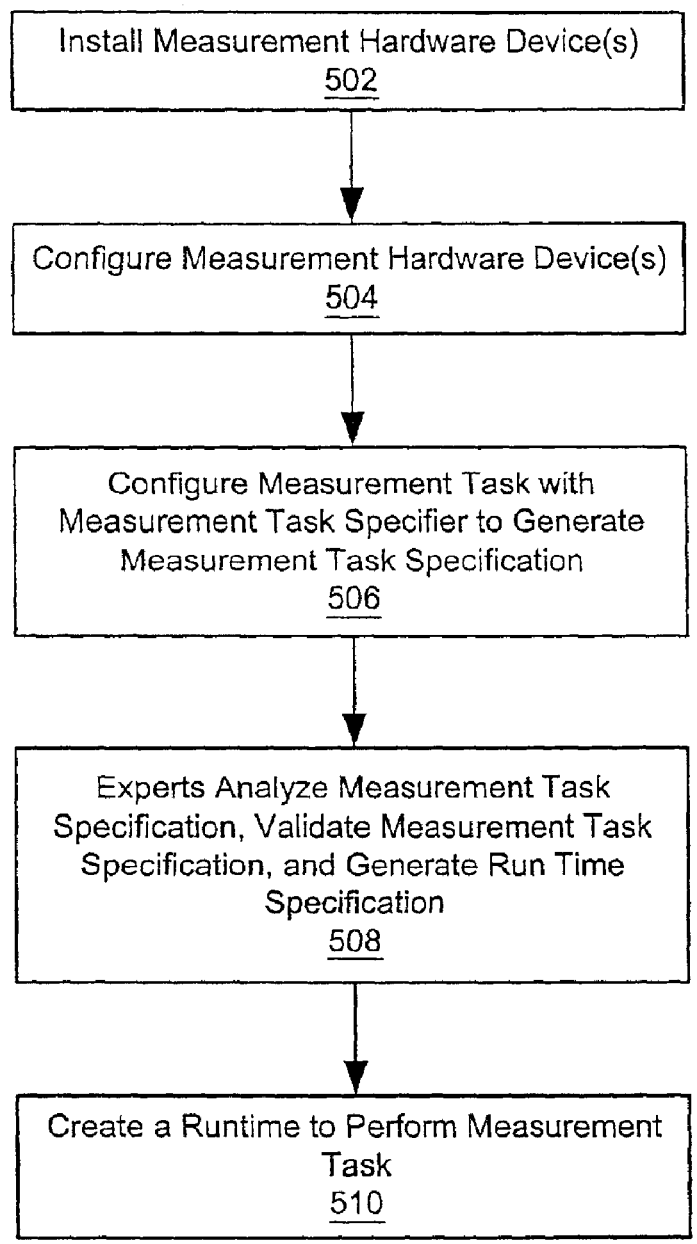
FIG. 5 flowcharts a measurement process, according to one embodiment.

FIG. 5—Method for Performing a Measurement Task

FIG. 5 is a flowchart diagram illustrating one embodiment of the operation of the measurement system, the method being used to configure installed measurement hardware devices and to specify and create a measurement task or application program to operate the measurement system. In one embodiment, the measurement task may comprise a plurality of measurement sub-tasks. In another embodiment, the measurement task may comprise a complex measurement operation using a plurality of measurement devices. It is noted that the flowchart of FIG. 5 is exemplary only. Further, various steps in the flowchart of FIG. 5 may occur concurrently or in different order than that shown, or may not be performed, as desired. Also, various steps may be added to FIG. 5 as desired.

As shown, in step 502 a user may optionally install measurement hardware within the system. This may comprise connecting a measurement device to the computer system or installing a measurement card or board within a slot of the computer system. This may further comprise installing a measurement card or board in a slot of a chassis, such as a PXI chassis, which itself is coupled to the computer system and/or which may contain a computer system comprised on a card within the chassis. In one embodiment, the measurement hardware may comprise a "reconfigurable measurement device" which may be operable to be reconfigured "on the fly" during a measurement task or operation. For example, the reconfigurable measurement device may include a processor and memory or an FPGA that may be reconfigured with different measurement programs or tasks.

In step 504 the computer system and/or the user may optionally configure the measurement hardware device(s). This may involve operation of standard Plug & Play software to recognize the measurement device and select setting or parameters for the device. It should be noted that in many instances, the user may not be required to perform 502 and/or 504 before generating the measurement task. In other words, the measurement hardware may already be installed and configured and the user may proceed with the configuration and specification of the measurement task in step 506.

In step 506 the user may invoke the measurement task specifier 730 to configure a desired task in the measurement driver 212, thereby producing a measurement task specification 740. In the preferred embodiment, the measurement task specifier 730 includes an interactive Graphical User Interface (GUI) configuration tool which enables the user to easily and simply configure a desired measurement task. This may involve selecting various parameters of the task such as the type of measurement being performed using voltage, current, etc., and other measurement settings. In the preferred embodiment, the measurement task specifier 730 also includes an Application Programming Interface (API) which also enables the user to configure a desired measurement task.

In one embodiment, once the task has been specified, the user may add specification objects, modules, or code, specifying start, read/write, and/or cleanup operations to the task specification. In one embodiment, once the task has been specified, the user may request the task specifier 730 to generate code. The task specifier may then programmatically generate code specifying start, read/write, and cleanup operations, among others. In various embodiments, this generated code may comprise icons in a LabVIEW graphical program (i.e., VIs), and/or function calls in a text-based program including one or more of C code, C++ code, C# code, Java code, Visual Basic code, or any other form of computer program code, which may specify support operations needed to implement the specified measurement task. In one embodiment, the generated code may comprise icons representing some or all of the specified measurement task operations, including clocking and trigger operations, among others. In one embodiment, the task specifier 730 may generate the icons and connect them together appropriately. In another embodiment, the task specifier 730 may generate the icons, but the user may be required to link the icons appropriately. Thus, in one embodiment, the method may include generating a measurement task diagram in response to user input specifying the measurement task. In one embodiment, the measurement task diagram may comprise a graphical program, such as a LabVIEW graphical program.

In another embodiment, the user may specify the task manually. For example, the user may use a graphical programming development environment such as LabVIEW to place one or more icons or nodes on the display and connect them in a desired way to accomplish the desired result. In one embodiment, the user may select a small number of function icons or nodes, such as a measurement read node or measurement write node, to accomplish the configured measurement task. As another example, the user may use the Measurement Studio programming development environment from National Instruments Corporation (e.g., LabWindows/CVI) to create a text-based program to accomplish the measurement task. This text-based program would typically comprise very few lines of code. Thus, complex measurement procedures may be encapsulated and represented by simple icons or function calls, allowing the user to rapidly and easily create measurement "programs" to implement or carry out complex measurement operations.

In one embodiment, the measurement task specifier 730 may comprise a measurement task wizard. In other words, the measurement task specifier 730 may be a software program which leads the user through a measurement task specification process, thereby generating the measurement task specification 740. In another embodiment, the measurement task specifier 730 may comprise a measurement task configuration tool. The measurement task configuration tool may be a software program invocable by the user within a development environment, such as National Instruments' LabVIEW environment, Measurement Studio programming development environment, or any other development environment. In yet another embodiment, the measurement task specifier 730 may be an API through which the user makes calls to generate the task specification. The measurement task specifier 730 may thus generate the measurement task specification 740 in response to user input.

For example, in the case that the measurement task specifier 730 is invoked by the user from the LabVIEW graphical development environment, the user may specify or configure a measurement task by placing or "dropping" nodes or icons on a graphical diagram and connecting the nodes via virtual "wires" to generate a graphical diagram or model of the measurement task. The graphical development environment program (e.g., LabVIEW) may generate software objects or data structures corresponding to the components of the graphical diagram which specify the measurement task. These data structures may comprise the measurement task specification 740. In one embodiment, at this stage the measurement task specification 740 is not executable per se, but provides information which may be used by other components of the system to generate a measurement application suitable to carry out the measurement task, i.e., to implement the specified measurement operation.

As another example, consider the case where the measurement task specifier 730 is an API in a text-based development environment, such as Microsoft Corporation's Visual C++ development environment. In this embodiment, the user may make API function calls in a C++ application program to specify the various attributes or aspects of the desired measurement task, such as measurement type (voltage, current, pressure, etc.), timing or sampling parameters, or other measurement task specification information. The executed functions may produce corresponding data structures which contain specification information for the measurement task. As mentioned above, the measurement task specification 740 may itself not be executable, but may provide information which may be used by other components of the system to generate a measurement application to implement the specified measurement task. Thus, when the application program 202 is executed, the API function calls may generate the measurement task specification 740, which may then be used later in the execution process to produce the run-time specification, as described below.

In step 508 an expert system comprised in the measurement driver may operate to receive the measurement task specification 740, then analyze the measurement task specification 740, validate the measurement task specification 740, and create a run-time specification based on the measurement task specification 740. The run-time specification preferably comprises parameter settings for one or more measurement devices and other hardware comprised within the system, and may also specify software components or software programs which are to be used during execution of the task. In one embodiment, the run-time specification may comprise a specification of the parameters of one or more measurement primitives, where each measurement primitive comprises a software object and corresponding configuration settings, and where each measurement primitive is operable to implement at least a portion of the measurement task. Thus, the run-time specification may be useable to configure one or more measurement devices to perform the measurement task, and may be further useable to generate a run-time which is executable to perform the measurement task using the configured one or more measurement devices. The measurement driver 212 may include expert system 750 comprising the plurality of experts 406 where one or more experts 406 are available for each of the various types of measurement tasks or sub-tasks. Thus, depending upon the type of measurement task configured by the user in step 506, one or more corresponding experts 406 may be invoked to create the run-time specification. In one embodiment, multiple experts may each produce a candidate run-time specification. Thus, the measurement task specification 740 may be used in step 508 to ensure that the measurement task can operate as configured by the user.

In one embodiment, one or more of the generated measurement task specification 740, the generated run-time specification, and configuration information for the one or more measurement devices may be stored, such as in a memory medium, e.g., a computer system's RAM or persistent storage medium.

In one embodiment, the run-time builder may analyze the selected run-time specification, and then reserve one or more resources, such as hardware and/or software, according to the selected run-time specification. The run-time builder may also unreserve resources if the analysis of the selected run-time specification indicates that previously reserved resources are no longer needed to implement the measurement task. In another embodiment, the run-time builder may handle abnormal process termination and/or unexpected device removal.

In step 510 a run-time may be created which embodies or implements the measurement task configured in step 506 based on the generated (and/or selected) run-time specification. In one embodiment, the run-time may comprise a collection of measurement operation primitives (or instances of measurement operation primitives) sequenced together which are executable to implement the measurement task.

When the user (or software program) enters input to execute or run the program, the measurement driver 212 may invoke the run-time builder program. The run-time builder program operates to access the run-time specification and use the parameters and data contained in the run-time specification to assist in creating the run-time at run time. In one embodiment, the run-time builder uses the run-time specification to instantiate instances of various objects or primitives comprised in the measurement driver 212. After the run-time builder instantiates various instances of objects, the run-time builder may apply various parameters from the run-time specification to these object instances. The run-time builder may also provide various parameters to hardware and/or software resources or devices comprised in the system to configure the hardware and/or software devices in the system according to the run-time specification to allow these devices to be used during execution of the run-time. In other words, the run-time builder may configure one or more measurement devices according to the run-time specification. After the run-time builder has completed creating the run-time, the run-time may then be executable to perform the task specified by the user.

After step 510 the user (or a software program) may execute the run-time to perform the measurement task. In other words, the run-time execution may invoke the various configured hardware and/or software components to perform the specified measurement task.

Examples of Measurement Problems

Below are listed several example problems suitable for solution by various embodiments of the present invention. It should be noted that these solutions are for example purposes only, and are not intended to limit the domains of application of the present invention.

1. Point of Sale Configuration: Given all the hardware and software in the National Instruments catalog and a single computer, determine a set of hardware, hardware connections, hardware settings, and software configuration that can maintain a level in a tank (whose simulated linear model is specified to be M) by monitoring the present value of the tank level and controlling a valve connected to the tank. The solution should display the tank level and valve position on an HMI. Constraints include cost<$10000 and standard deviation of the tank level<D. Preference is for the lowest cost solution.

2. Out of the Box Configuration: Given 2 thermocouples, a National Instruments SCXI 1102 module, a National Instruments SCXI-1000 chassis, a National Instruments PCI-MIO-XE-50, and a set of appropriate terminal blocks cabling, determine the hardware connections (in the form of a wiring diagram), hardware settings, and software configuration for monitoring the two temperature values at a rate of 10 Hz each, with an accuracy=A and precision=P for each temperature measurement.

3. Run-time Configuration: Given a high-frequency switch connected to three 2-channel scopes, determine the hardware settings and software configuration for measuring the waveform, overshoot, and rise time of a set of five simultaneous 10 MHz digital clock signals connected to the switch. The accuracy and precision of the measurements must meet certain requirements, and all 5 measurements should be synchronized to a start event which is triggered by a high level of the first digital clock. (The solution should take into account the signal delays from various routings through the switch).

In various embodiments, the present invention may include some or all of the following features:

1. Interactive design—the user may not have to specify a complete specification up front. Instead, the system may ask the user for more information as needed. For instance, while the system is building a solution, it may encounter one or more possibilities and may ask the user to specify new preferences at that point.

2. Graphical and visual display of system specifications and realizations (including text-based displays where appropriate)—The system may display realizations so that they can be edited directly.

3. Extensibility—ability to add new measurement methods/drivers to the system and use those methods in a derived realization as the system evolves over time to include more domains. The user is able to participate in this process by adding custom measurement methods. The system may be extended with new measurement methods/drivers in multiple independent efforts (i.e. with independent releases). Groups of extensions may be packaged with different products and installed separately.

4. Visibility—ability for the user to see solutions generated by the system and extend and modify those solutions.

5. Robustness—ability to detect and help correct invalid specifications and invalid realizations.

The features mentioned above may allow the user to specify and execute a measurement task in substantially less time and with substantially less effort than previous methods. In addition, the system described may prevent the user from implementing a measurement solution which is inappropriate for the available resources. Further details of the system design and architecture are described below with reference to FIGS. 6, 7A–D, and 8A–D.

Figure 6:
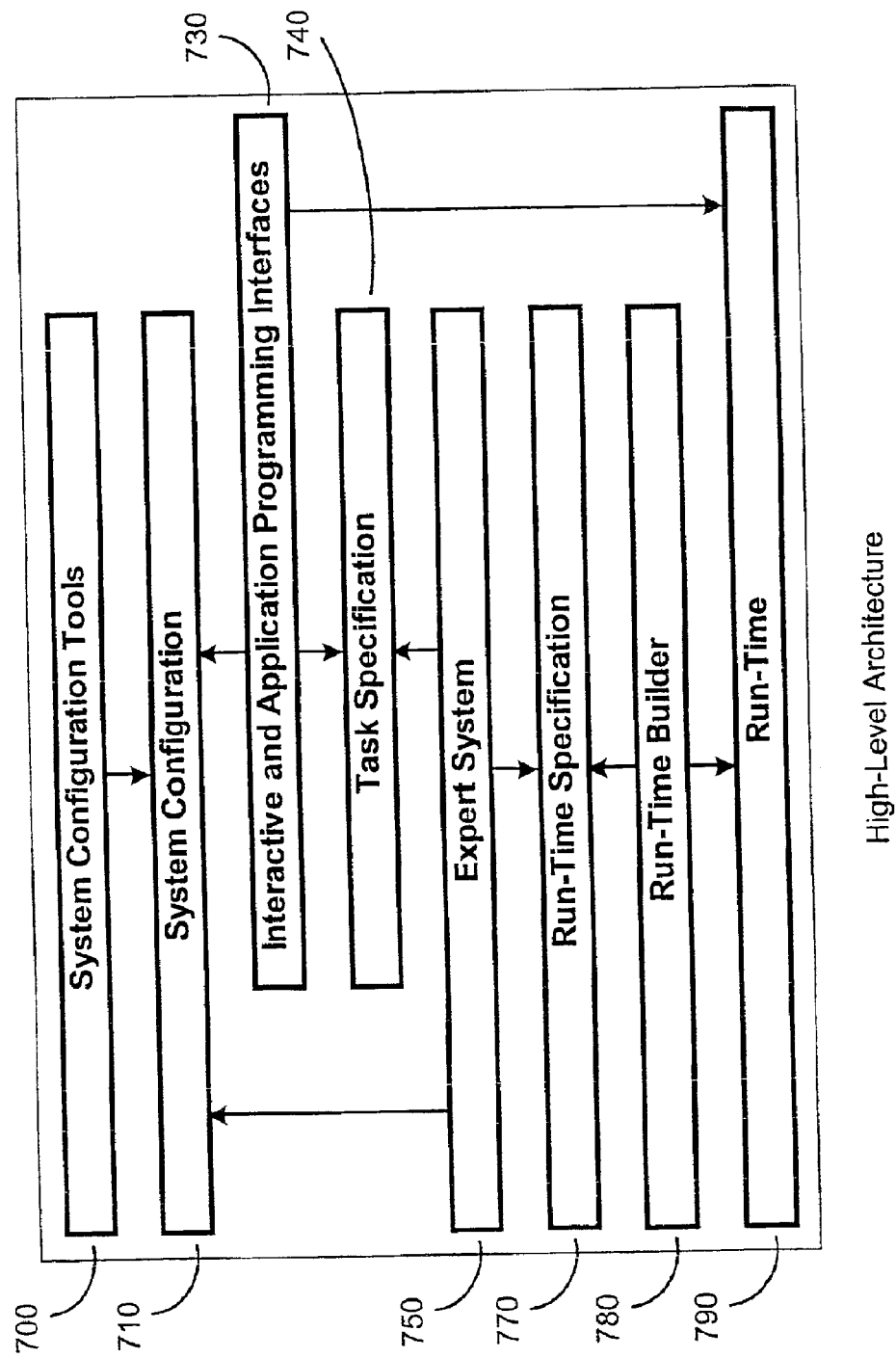
FIG. 6 illustrates a high level architecture of the system, according to one embodiment.

FIG. 6—High-Level Architecture

FIG. 6 is a block diagram of a high-level architecture of the present system, according to one embodiment. As FIG. 6 shows, the primary components of the system may comprise system configuration tools 700, system configuration 710, interactive and application programming interfaces 730 which comprise one or more measurement task specifiers 730, task specification 740, expert system 750, run-time specification 770, run-time builder 780, and the run-time 790. FIG. 6 also shows the communication between the various components. Further details of the architecture are presented below with reference to FIGS. 7A–D and 8A–D.

FIGS. 7A–D—Static Diagrams of the System

FIGS. 7A–D are static diagrams of the architecture and function of primary functional components or sub-systems used to implement measurement tasks according to one embodiment. FIGS. 7A–7D illustrate an embodiment of a measurement system architecture based on National Instruments measurement products. Each static diagram corresponds to a particular state of the measurement task, described below with reference to FIG. 9.

Figure 7A:
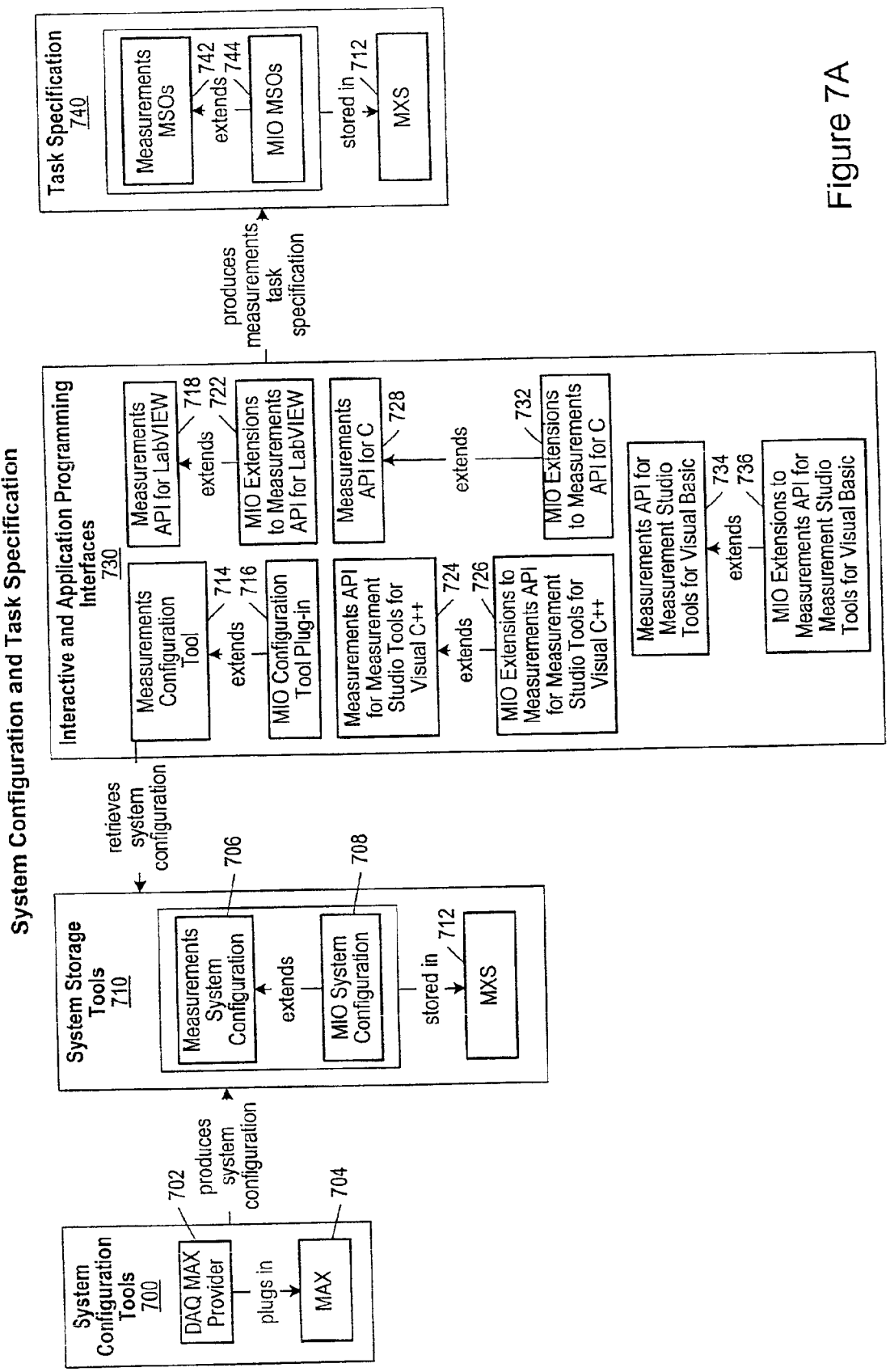
FIG. 7A is a block diagram of a system for system configuration and task specification, according to one embodiment.

FIG. 7A—System for System Configuration and Task Specification

FIG. 7A is a block diagram of one embodiment of system configuration and measurement task specification components of the present invention. As FIG. 7A shows, there are four main functional groups, comprising system configuration tools 700, system configuration storage 710, interactive and application programming interfaces 730, and task specification 740. In one embodiment, the system configuration tools 700 comprise a DAQ measurements and automation explorer (MAX) provider 702 which may plug in to MAX 704. In one embodiment, the system configuration tools 700 may facilitate system configuration specification by the user. In other words, the system configuration tools, e.g., MAX provider 702, may receive user input indicating system configuration parameters and set system configuration parameters for the one or more measurement devices in response to the user input.

As FIG. 7A also shows, once the user has specified a system configuration, the specified system configuration may be stored in system configuration storage 710. The system configuration storage 710 may be operable to store a measurements system configuration 706, as well as an MIO system configuration 708. In one embodiment, the MIO system configuration 708 may operate to extend the measurements system configuration 706. As may be seen, both the measurements system configuration 706 and the MIO system configuration 708 may be stored in MAX storage (MXS) 712.

In one embodiment, interactive and application programming interfaces (IAPIs) 730 may be used to access various objects and functions of the system. These interfaces may provide mechanisms through which the user, other system components, or other systems, may specify a measurement task. As FIG. 7A shows, the IAPIs 730 may include a measurements configuration tool 714 and MIO configuration tool plug-in 716, which may be operable to extend the measurements configuration tool 714. In one embodiment, the system configuration information stored in system configuration storage 710 may be retrieved via the measurements configuration tool 714.

The IAPIs may further include measurements APIs for various development environments or languages, such as a measurements API for LabVIEW 718 and MIO extensions to measurements API for LabVIEW 722, which may be operable to extend the measurements API for LabVIEW 718; a measurements API for C 728 and MIO extensions to measurements API for C 732, which may be operable to extend the measurements API for C 728; a measurements API for Measurement Studio Tools for Visual C++ 724 and MIO extensions to measurements API for Measurement Studio Tools for Visual C++ 726, which may be operable to extend the measurements API for Measurement Studio Tools for Visual C++ 724; and a measurements API for Measurement Studio Tools for Visual Basic 734 and MIO extensions to measurements API for Measurement Studio Tools for Visual Basic 736, which may be operable to extend the measurements API for Measurement Studio Tools for Visual Basic 734. It should be noted that in other embodiments, other interfaces or APIs may be included for other development environments and/or programming languages.

As FIG. 7A further shows, a task specification 740 may be generated via the IAPIs 730. The task specification 740 may include measurements-wide measurements specification objects (MSOs) 742 and MIO MSOs 744, which may be operable to extend the measurements MSOs 742. Note that both the measurements MSOs 742 and the MIO MSOs 744 may be stored in the MXS 712.

Thus, the system components described above may allow the user to configure the system, as well as to generate a measurement task specification 740. It should be noted that the system configuration tools 700, system configuration storage 710, interactive and application programming interfaces 730, and task specification 740 components correspond to a Unverified State 902 of the system, as described with reference to the state diagram of FIG. 9 below.

Figure 7B:
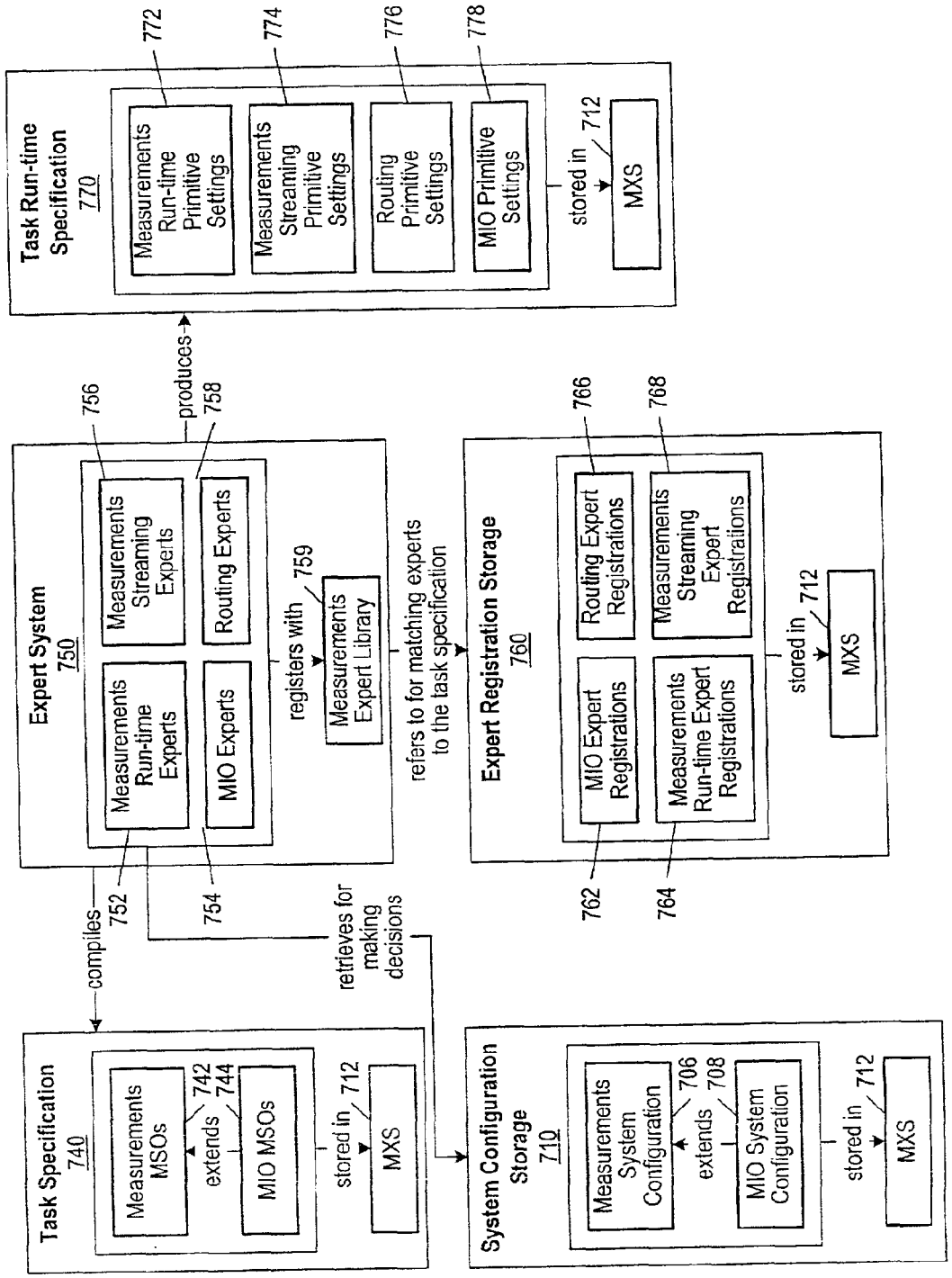
FIG. 7B is a block diagram of a system for compiling a task specification to a task run-time specification, according to one embodiment.

FIG. 7B—System for Compiling a Task Specification to a Task Run-Time Specification FIG. 7B is a block diagram of one embodiment of system components for compiling the task specification to a task run-time specification. As FIG. 7B shows, in one embodiment, the system components for compiling the task specification to a task run-time specification may include the task specification 740 and the system configuration storage 710, described above with reference to FIG. 7A, as well as an expert system 750, an expert registration storage 760, and a task run-time specification 770.

In one embodiment, the expert system 750 may be operable to retrieve system configuration information from the system configuration storage 710 to make decisions regarding the measurement task specification 740. The expert system 750 may be further operable to compile the task specification 740 to produce the task run-time specification 770, as shown. As FIG. 7B also shows, the expert system 750 may refer to the expert registration storage for matching experts to the task specification 740. In one embodiment, the expert system 750 may include measurements run-time experts 752, measurements streaming experts 756, MIO experts 754, routing experts 758, and a measurements expert library 759. Further examples of experts include sensor experts, smart sensor experts, scaling experts, and system calibration experts, among others. In general, an expert may be defined and used for any device or function. For example, a scaling expert may be operable to make changes to the run-time specification to specify or implement custom scaling operations for a measurement channel. In one embodiment, each of the experts may be operable to register with the measurements expert library 759 to indicate availability to the system. Further details of the expert system and its use are presented below with reference to FIGS. 14–25 and 26–38, below.

As FIG. 7B shows, the expert registration storage 760 may include registration components which correspond to each of the experts included in the expert system 750. For example, the expert registration storage 760 may include components for MIO expert registrations 762, measurements run-time expert registrations 764, routing expert registration 766, and measurements streaming expert registrations 768. It should be noted that the expert system 750 and the expert registration storage 760 may also respectively use and store other experts and other expert registrations as needed. As shown, each expert registration may be stored in MXS 712.

As mentioned above, the expert system 750 may produce the task run-time specification based on the task specification 740, the system configuration information stored in the system configuration storage 710, and the various experts comprised in the expert system 750. In one embodiment, the task run-time specification 770 may include various primitive settings specified by one or more of the above-mentioned experts. For example, the settings may include measurements run-time primitive settings 772, measurements streaming primitive settings 774, routing primitive settings 776, and MIO primitive settings 778. The primitive settings may each be stored in MXS 712, as shown.

Note that when the measurement task specification does not specify any product-specific properties, i.e., any properties or specifications particular to a given device or product, then the measurement task specification may be compiled to various different measurement systems without modification. In other words, to the extent that the measurement task specification is generic, it is also portable, and thus a single measurement task specification may be used or compiled for multiple measurement systems.

It should be noted that the task specification 740 and the system configuration storage 710, described above with reference to FIG. 7A, as well as the expert system 750, expert registration storage 760, and task run-time specification 770 correspond to a Verified State 904 in the state diagram of FIG. 9 below.

Figure 7C:
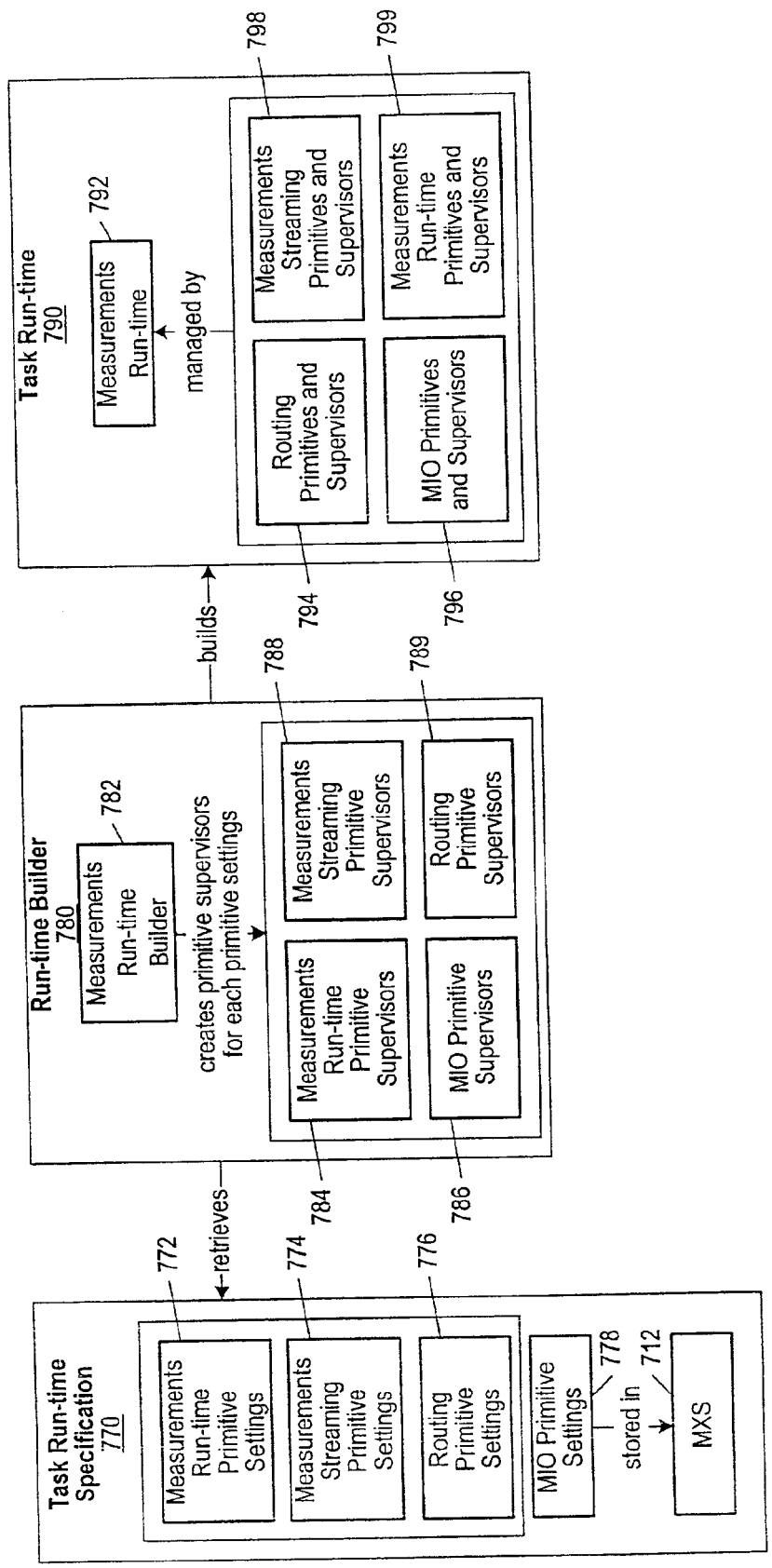
FIG. 7C is a block diagram of a system for building a task run-time from a task run-time specification, according to one embodiment.

FIG. 7C—System for Building a Task Run-Time from a Task Run-Time Specification FIG. 7C is a block diagram of system components for building a task run-time from a task run-time specification, according to one embodiment. As FIG. 7C shows, the system components for building a task run-time from a task run-time specification may include the task run-time specification 770, described above with reference to FIG. 7B, a run-time builder 780, and a task run-time 790. As shown, the run-time builder 780 may be operable to retrieve the task run-time specification (possibly from MXS 712) and build the task run-time 790.

In one embodiment, the run-time builder 780 may include a measurements run-time builder 782 which may be operable to create primitive supervisors for each primitive setting in the run-time specification 770, such as measurements run-time primitive supervisors 784, MIO primitive supervisors 786, measurements streaming primitive supervisors 788, and routing primitive supervisors 789. As FIG. 7C shows, these primitives and supervisors may be included in the task run-time 790, described below.

In one embodiment, the task run-time 790 may include a measurements run-time 792 which may manage routing primitives and supervisors 794, MIO primitives and supervisors 796, measurements streaming primitives and supervisors 798, and measurements run-time primitives and supervisors 799. The task run-time 790 may be operable to be executed by the system to implement the specified measurement task, as described below with reference to FIG. 7D.

It should be noted that the task run-time specification 770, described above with reference to FIG. 7B, the run-time builder 780, and task run-time 790 correspond to a Constructed State 906 of the system, as described with reference to the state diagram of FIG. 9 below.

Figure 7D:
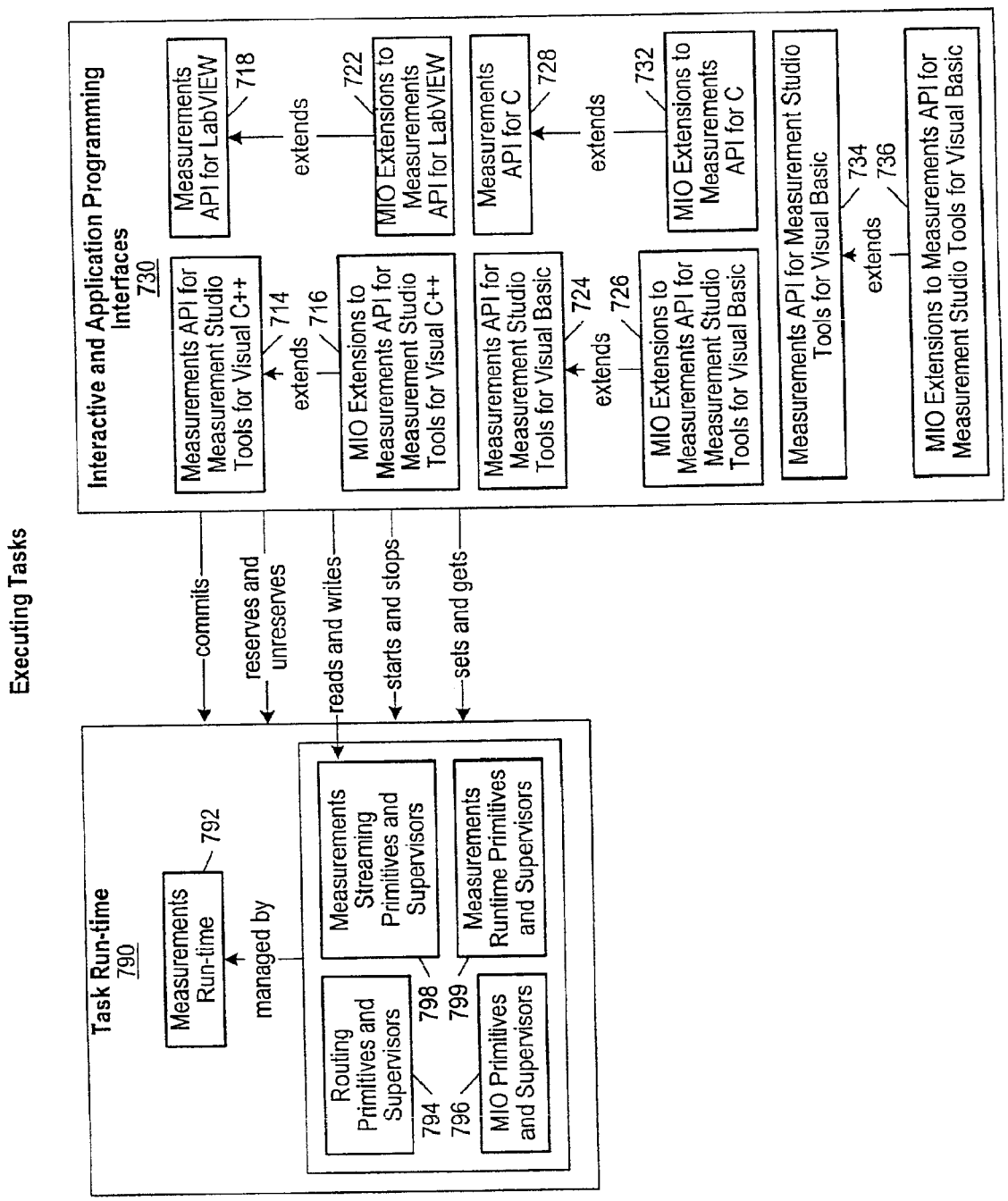
FIG. 7D is a block diagram of a system for executing tasks, according to one embodiment.

FIG. 7D—System for Executing Tasks

FIG. 7D is a block diagram of a system for executing measurement tasks. As FIG. 7D shows, the system may include the task run-time 790, described above with reference to FIG. 7C, as well as the interactive and application programming interfaces (IAPIs), described above with reference to FIG. 7A. As may be seen in FIG. 7D, in one embodiment, the IAPIs 730 may provide means for issuing start, stop, commit, reserve, unreserve, set, and get commands to the task run-time 790. The IAPIs 730 may also provide means for issuing reads and writes to the measurements streaming primitives and supervisors 798 as shown. Thus, the measurement task may be implemented by executing the task run-time 790 via various commands or calls via one or more of the IAPIs.

It should be noted that the task run-time 790, described above with reference to FIG. 7C, as well as the interactive and application programming interfaces (IAPIs), described above with reference to FIG. 7A correspond to a Reserved State 908, a Committed State 910, and a Running State 912 of the system, as described with reference to the state diagram of FIG. 9 below.

FIGS. 8A–D—Framework Software Package Diagrams

FIGS. 8A–D are software package diagrams of the components used to implement the present method, according to one embodiment. Each of the package diagrams in FIGS. 8A–D may correspond respectively to one of the functional static diagrams of FIGS. 7A–D. It should be noted that each component may be marked with a U, K, or UK, denoting whether the component is a user-mode, kernel-mode, or dual-mode component, respectively.

Figure 8A:
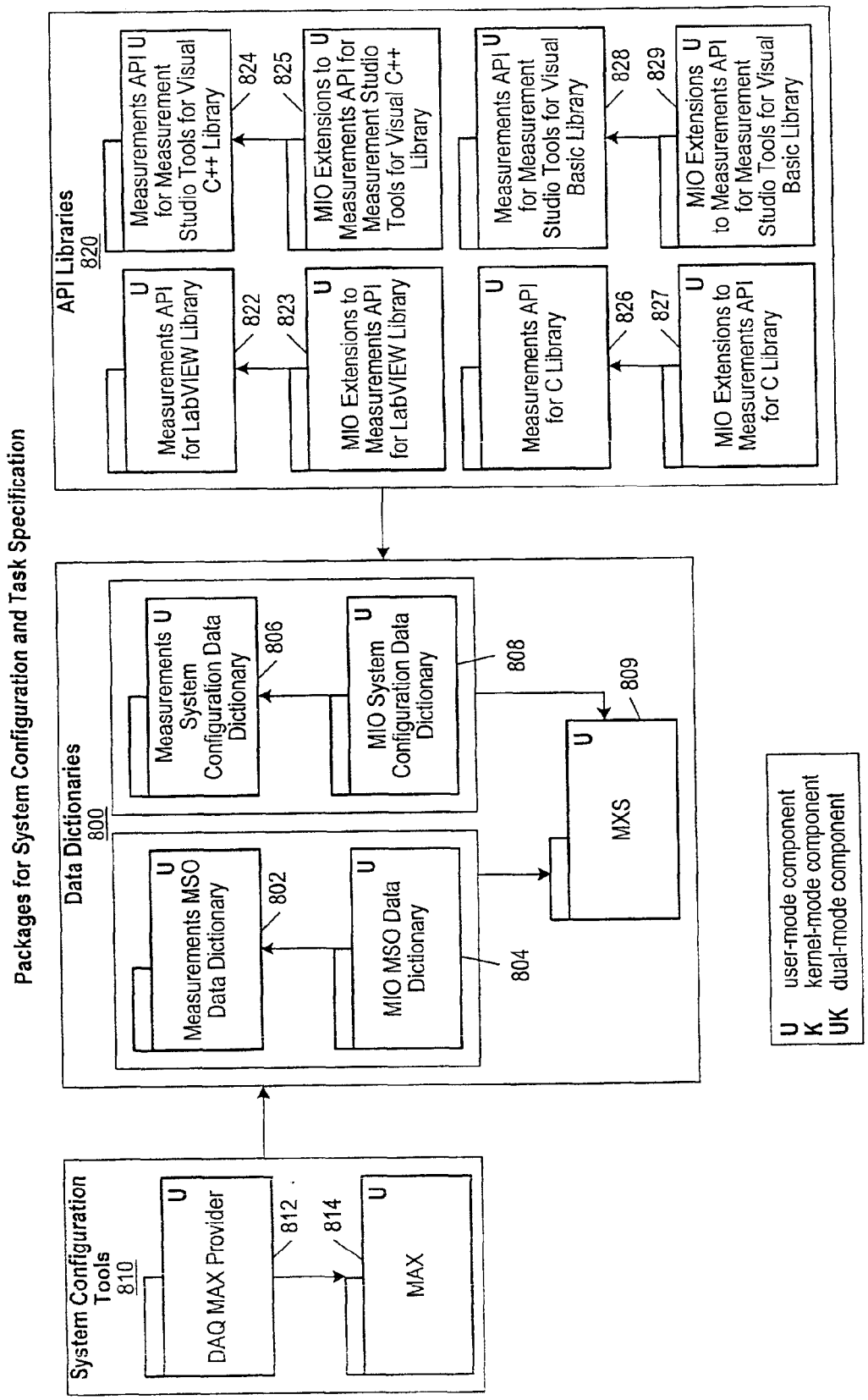
FIG. 8A is a block diagram of packages for system configuration and task specification, according to one embodiment.

FIG. 8A—Packages for System Configuration and Task Specification

FIG. 8A is a block diagram of packages for system configuration and task specification, according to one embodiment. As FIG. 8A shows, the packages for system configuration and task specification may include a system configuration tools package 810, corresponding to the system configuration tools 700 described above with reference to FIG. 7A, with corresponding component packages, namely a DAQ MAX provider package 812 and a MAX package 814. The system configuration and task specification packages also include a data dictionaries package 800 with component data dictionary packages corresponding to components of the task specification 740 and system configuration storage 710, also described above, as well as an API libraries package 820 with component packages corresponding to the interactive and application programming interfaces 730. Note that each component in these packages is a user-mode component.

As FIG. 8A shows, the data dictionaries package 800 may include a measurements MSO data dictionary package 802, an MIO MSO data dictionary package 804, a measurements system configuration data dictionary package 806, and an MIO system configuration data dictionary package 808, all of which may be stored in the MXS package 809. Each data dictionary may include information or meta-data describing the data related to measurements system configuration data, MIO system configuration data, measurements MSO data, and MIO MSO data.

As further shown in FIG. 8A, the API libraries package 820 may include a plurality of libraries which comprise the various APIs described above with reference to FIGS. 7A and 7D above. Specifically, the API libraries package 820 may include a measurements API for LabVIEW library package 822 and an MIO extensions to measurements API for LabVIEW library package 823, which may be operable to extend the measurements API for LabVIEW library package 822; a measurements API for C package 826 and MIO extensions to measurements API for C library package 827, which may be operable to extend the measurements API for C package 826; a measurements API for Measurement Studio Tools for Visual C++ library package 824 and MIO extensions to measurements API for Measurement Studio Tools for Visual C++ library package 825, which may be operable to extend the measurements API for Measurement Studio Tools for Visual C++ package 824; and a measurements API for Measurement Studio Tools for Visual Basic library package 828 and MIO extensions to measurements API for Measurement Studio Tools for Visual Basic library package 829, which may be operable to extend the measurements API for Measurement Studio Tools for Visual Basic library package 828. It should be noted that in other embodiments, other interfaces or API libraries may be included for other development environments and/or programming languages.

Figure 8B:
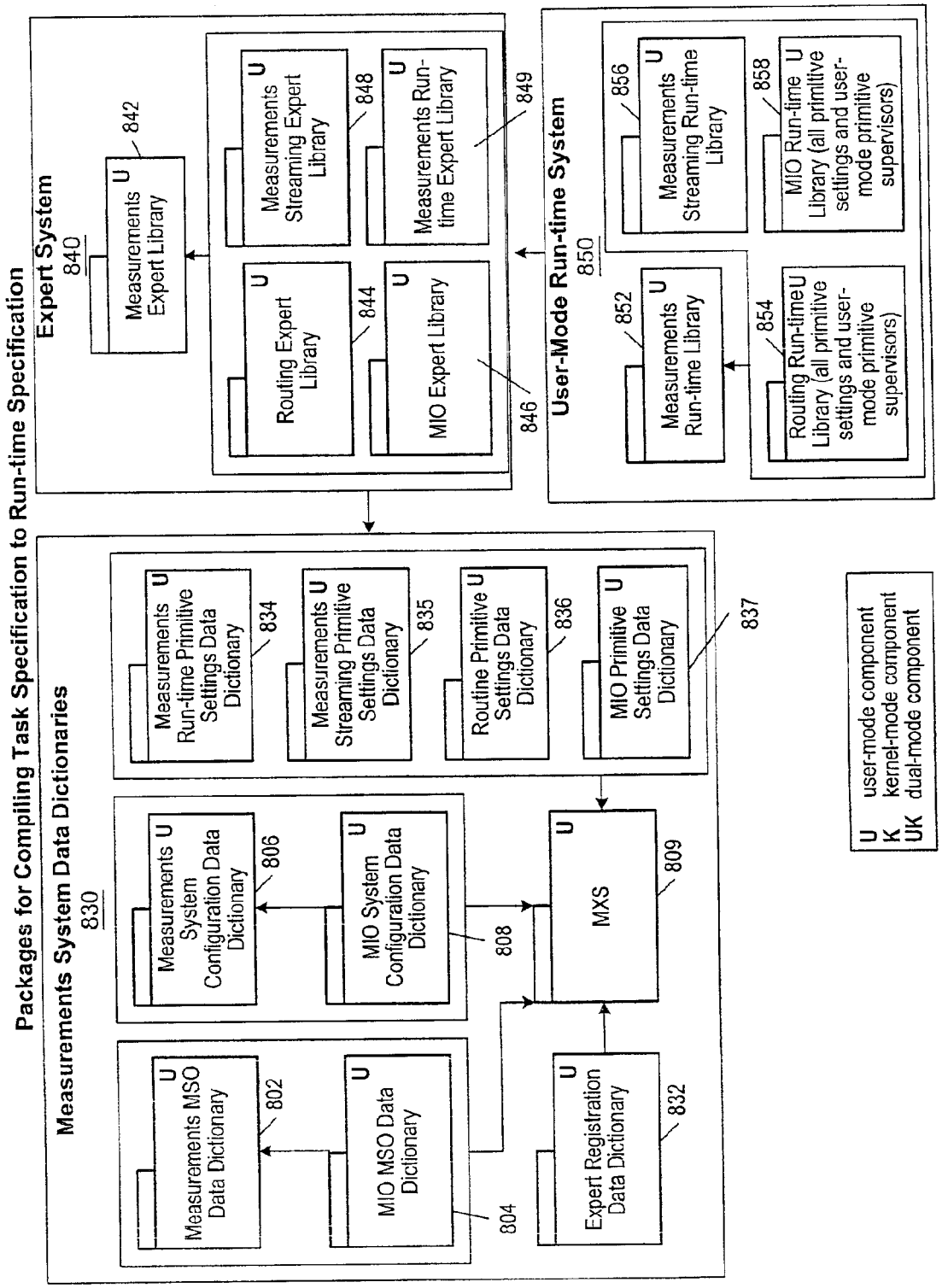
FIG. 8B is a block diagram of packages for compiling a task specification to a task run-time specification, according to one embodiment.

FIG. 8B—Packages for Compiling a Task Specification to a Task Run-Time Specification FIG. 8B is a block diagram of packages for compiling a task specification to a task run-time specification, according to one embodiment. As FIG. 8B shows, the packages for compiling a task specification to a task run-time specification may include a measurements system data dictionaries package 830, an expert system package 840, and a user-mode run-time system package 850. Note that all components of these packages are user-mode components, as indicated.

In one embodiment, the measurements system data dictionaries package 830 may include the components of the data dictionaries package 800 described above with reference to FIG. 8A, as well as an expert registration data dictionary package 832, a measurements run-time primitive settings data dictionary package 834, a measurements streaming primitive settings data dictionary package 835, a routine primitive settings data dictionary package 836, and an MIO primitive settings data dictionary package 837. As mentioned above, each data dictionary may contain information or meta-data describing the data related to a particular system component. In the preferred embodiment, all of the expert system data dictionaries are stored in the MXS package 809, as shown.

As FIG. 8B shows, the expert system package 840 may include library packages corresponding to the various experts described above with reference to FIG. 7B. Specifically, the expert system package 840 may include a measurements expert library package 842, a routing expert library package 844, an MIO expert library package 846, a measurements streaming expert library package 848, an a measurements run-time expert library package 849, as shown.

As also shown in FIG. 8B, the user-mode run-time system package 850 may include library packages corresponding respectively to each of the sets of primitives composed in the run-time package 790, the components of which are described above with reference to FIGS. 7C and 7D. Specifically, the user-mode run-time system package 850 may include a measurements run-time library package 852, a routing run-time library package 854 which may include all related primitive settings and user-mode primitive supervisors, a measurements streaming run-time library package 856, and an MIO run-time library package 858 which may include all related primitive settings packages and user-mode primitive supervisor packages.

Figure 8C:
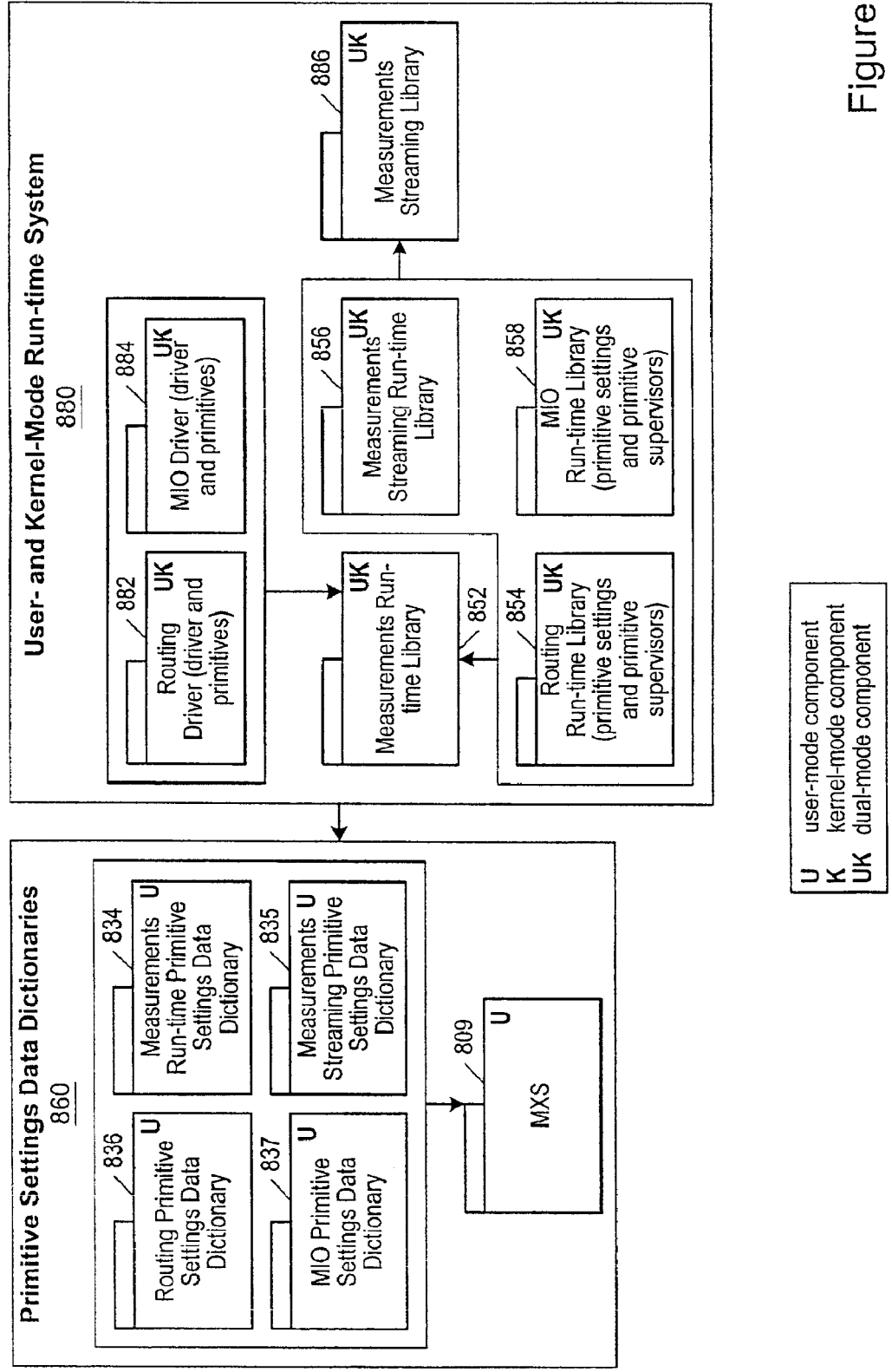
FIG. 8C is a block diagram of packages for building a task run-time from a task run-time specification, according to one embodiment.

FIG. 8C—Packages for Building a Task Run-Time from a Task Run-Time Specification FIG. 8C is a block diagram of packages for building a task run-time from a task run-time specification, according to one embodiment. As FIG. 8C shows, the packages for building a task run-time from a task run-time specification may include a primitive settings data dictionaries package 860, and a user- and kernel-mode run-time system package 880.

In one embodiment, the primitive settings data dictionaries package 860 may also include the primitive settings data dictionary packages described above with reference to the expert system data dictionaries package 830 of FIG. 8B. Specifically, the primitive settings data dictionaries package 860 may include the measurements run-time primitive settings data dictionary package 834, the measurements streaming primitive settings data dictionary package 835, the routine primitive settings data dictionary package 836, and the MIO primitive settings data dictionary package 837, all of which may be stored in the MXS 809. As mentioned before, each of the primitive settings library component packages may be a user-mode component, as indicated.

In one embodiment, the user- and kernel-mode run-time system package 880 may include the run-time library component packages of the user-mode run-time system package 850 described above with reference to FIG. 8B, specifically, the measurements run-time library package 852, the routing run-time library package 854 which may include related primitive settings packages and primitive supervisor packages, the measurements streaming run-time library package 856, and the MIO run-time library package 858 which may include all related primitive settings packages and primitive supervisor packages. The user- and kernel-mode run-time system package 880 may further include a measurements streaming library package 886, a routing driver (driver and primitives) package 882, and an MIO driver (driver and primitives) package 884. Note that the drivers and library component packages are all dual-mode component packages (UK), meaning that they may be used in either user-mode or kernel-mode.

Figure 8D:
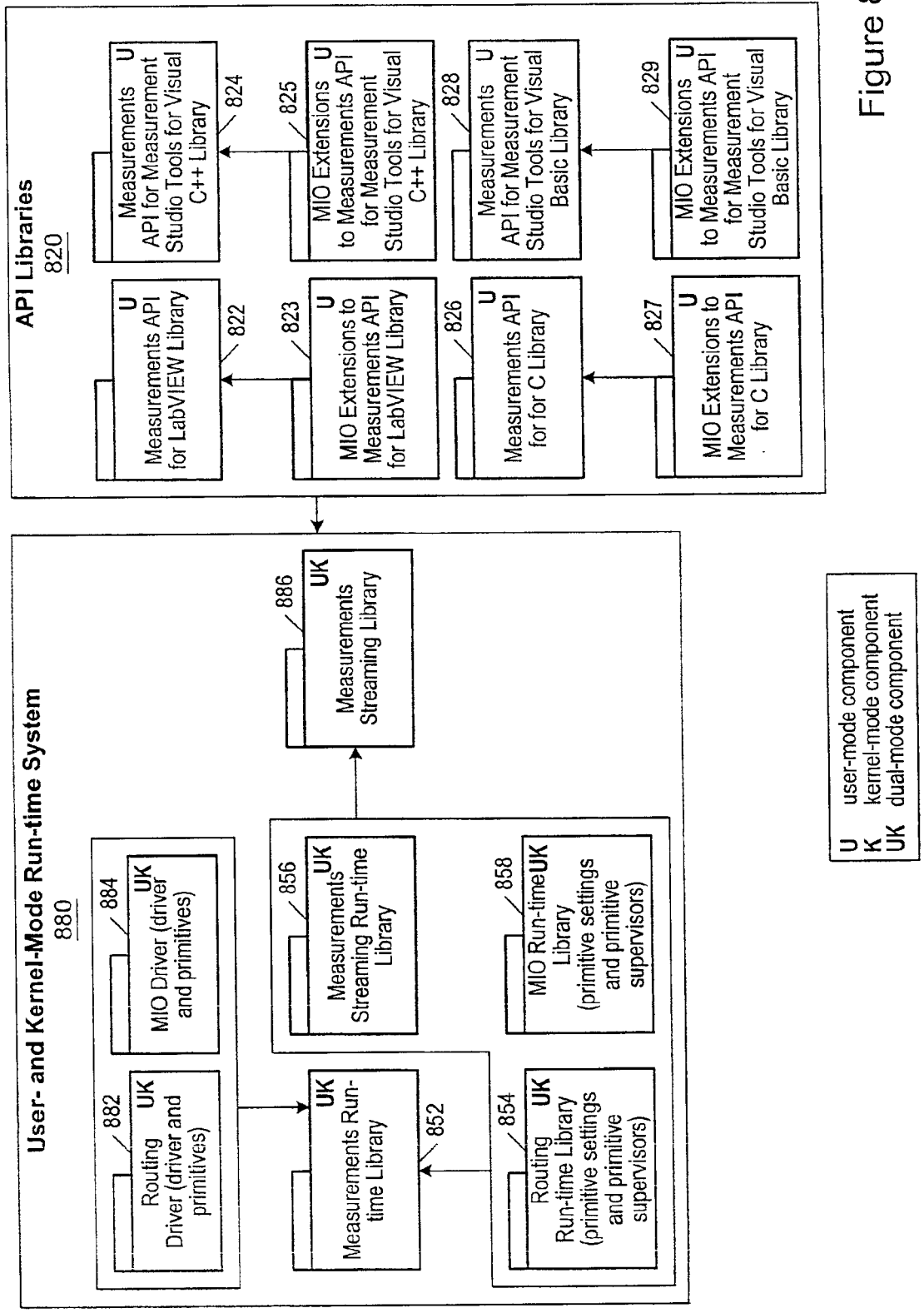
FIG. 8D is a block diagram of packages for executing a run-time, according to one embodiment.

FIG. 8D—Packages for Executing a Task Run-Time

FIG. 8D is a block diagram of packages for executing the task run-time, according to one embodiment. As FIG. 8D shows, the packages for executing the task run-time may include the user- and kernel-mode run-time system package 880, described above with reference to FIG. 8C, as well as the API libraries package 820, described above with reference to FIG. 8A. As FIG. 8D indicates, the various objects and functions comprised in the user- and kernel-mode run-time system package 880 may be accessed via the APIs comprised in the API libraries package 820, thereby facilitating the execution of the task run-time, and thus implementing the specified measurement task.

FIG. 9—State Diagram for Measurement Tasks

FIG. 9 is a state diagram for measurement tasks, according to one embodiment. During the specification, compilation, and execution of a measurement task, the task may occupy a sequence of specific, well-defined states, as shown in FIG. 9. As mentioned above, each of the illustrated states may correspond to particular static diagrams, as shown in FIGS. 7A–D.

As FIG. 9 shows, in one embodiment, the first state of the task after creation is the Unverified state 902, corresponding to the task specification 740 static diagram of FIG. 7A. In the Unverified state 902, all properties of the task may be set.

The Verified state 904 corresponds to the state of the task at the end of the compiling task specification to run-time specification static diagram of FIG. 7B. More specifically, in the Verified state 904, the task may be represented by the run-time specification 770 of FIG. 7B. As may be seen, the task enters the Verified state 904 as a result of verification of the measurement task specification 740 by the expert system 750. This verification may also be invoked indirectly by a get operation. In order to modify the properties of the task, a transition back to the Specified state 902 may be necessary.

The Constructed state 906 corresponds to the state of the task at the end of the building run-time from run-time specification static diagram of FIG. 7C, and results from the build process of the run-time builder 780. The Reserved state 908, Committed state 910, and Running state 912 correspond to the state of the task during the executing task static diagram of FIG. 7D. In the Running state 912, a subset of properties may be accessed by modifying the primitives directly (via set/get operations) while the measurement hardware is running. As mentioned above, the execution of the run-time 790 may be controlled through one or more of the APIs 730, such as via read, write, set, get, start, stop, commit, uncommit, reserve, and unreserve commands or function calls.

It should be noted that state transitions may occur implicitly. For example, if the start action is invoked when the task is in the Constructed state 906, the task may transition through the Reserved 908 and Committed 910 states implicitly when transitioning to the Running state 912. The implicit state transitions may also be symmetric. In this example, if the stop action is invoked, the task may transition through the Committed 910 and Reserved 908 states implicitly when transitioning back to the Constructed state 906.

FIGS. 10–13—Measurement Task Configuration Tool

As mentioned above, the measurement task specifier 730 may be implemented in a variety of forms, including an API, a wizard, or a measurement task configuration tool, among others. In a measurement task configuration tool embodiment, the measurement task specifier 730 may comprise a software program invocable by the user under a development environment. The measurement task configuration tool may comprise an interactive Graphical User Interface (GUI) which may provide an intuitive and powerful way for a user to specify a measurement task. FIGS. 10–13 illustrate various embodiments of the measurement task configuration tool, as described below.

Figure 10:
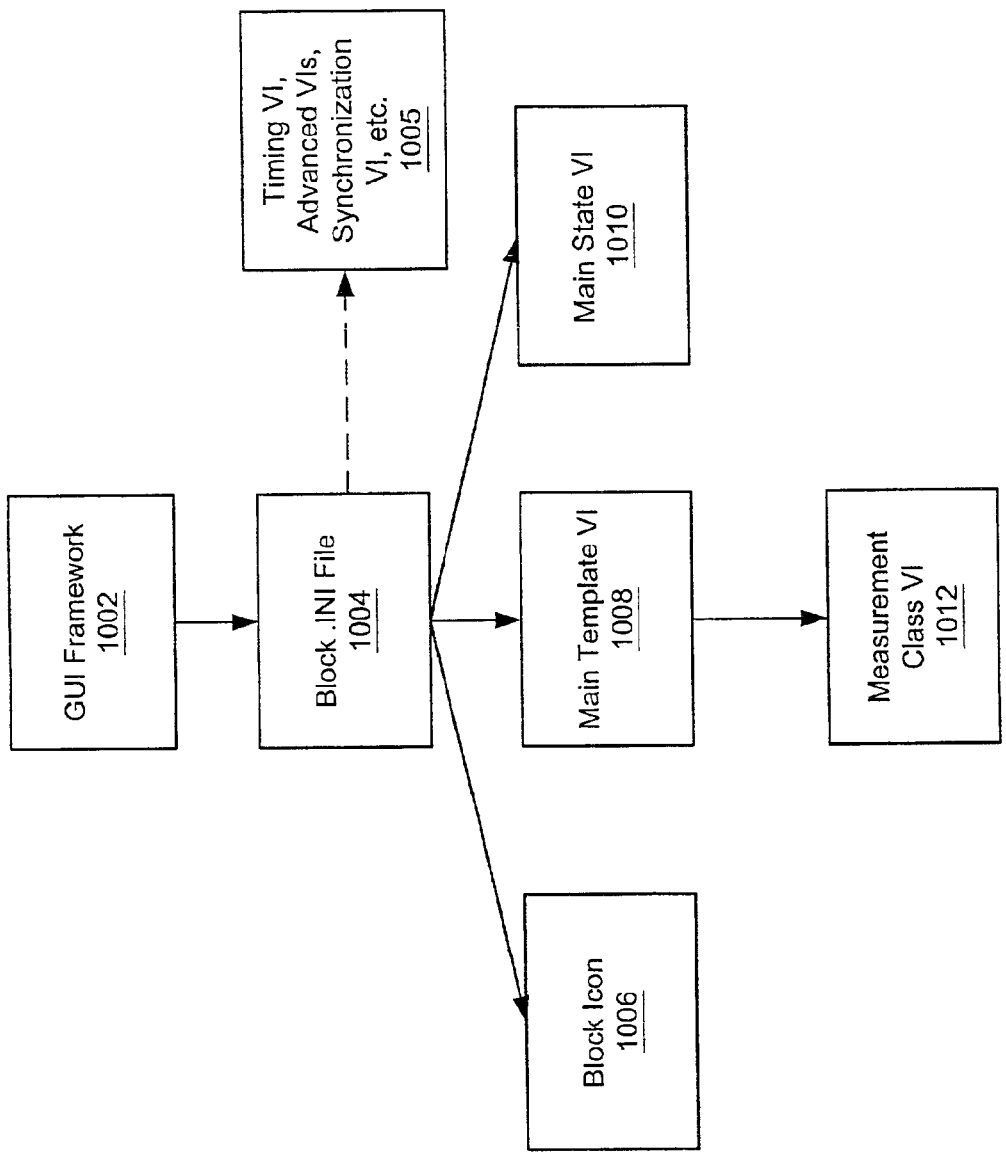
FIG. 10 illustrates a high level measurement task configuration tool architecture, according to one embodiment.

FIG. 10—Measurement Task Configuration Tool Architecture

In one embodiment, the measurement task configuration tool may be implemented in a graphical programming language, such as National Instruments' LabVIEW graphical programming environment. The GUI of the configuration tool may be a Virtual Instrument (VI) accessed by the user to specify and configure measurement tasks.

FIG. 10 is a block diagram of one embodiment of a configuration tool architecture. In one embodiment, the configuration tool may be hosted in a GUI Framework 1002, e.g., National Instruments Workshops framework, which may provide a high-level framework that multiple applications can plug into, providing common user experiences. In the preferred embodiment, the configuration tool addresses application configuration. The purpose is to present the user with the ability to configure exactly what their application does (i.e., voltage measurement, current measurement, digital generation, voltage generation, etc.), and then build a single task that encompasses all of this information. The task may then be referenced in any application development environment (ADE).

For example, in one embodiment, the configuration tool (hosted by the Workshops framework) may run stand-alone, launched directly from an ADE, or may be hosted in another application, such as National Instruments' MAX program.

In one embodiment, there may be two parts to the plug-in architecture: plugging-in to Workshops, and plugging-in to a configuration tool framework.

Workshop Plug-In Architecture

In one embodiment, the configuration tool may be written entirely in National Instruments' LabVIEW graphical programming language. Hosting a Virtual Instrument (VI) from the Workshops framework may utilize some or all of the following:

1) A Main State VI 1010 that maintains execution, which is preferably not visible to users.

2) A GUI VI through which a user may configure their task.

3) A Block .INI File 1004 specifying the directory paths of the VI's, block names, help file, etc. 1005.

4) A Block Icon 1006 for the GUI application.

Figure 11:
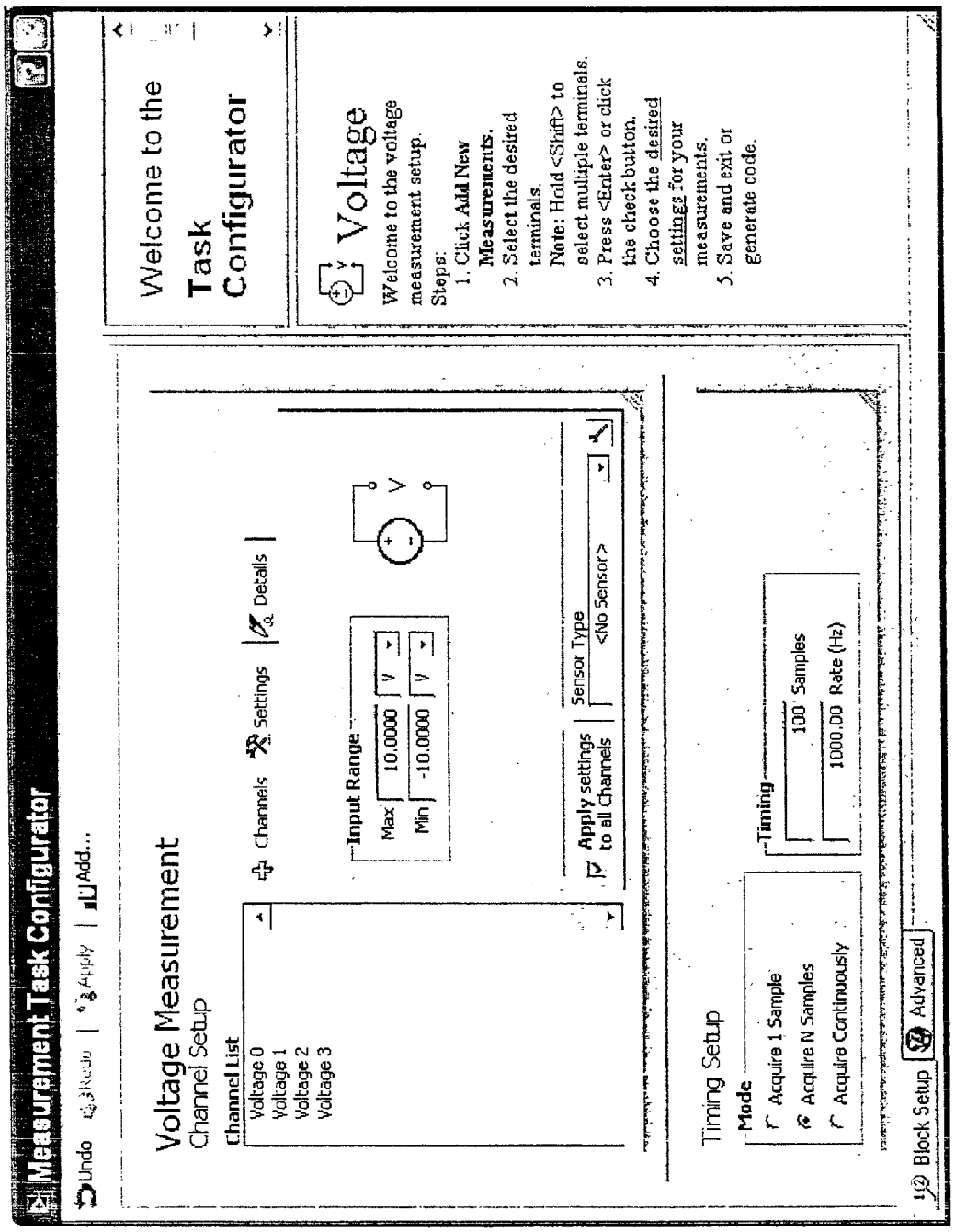
FIGS. 11–13 illustrate example measurement task configuration tool interface panels, according to one embodiment.

In one embodiment, each .INI file specification may automatically appear as a "block" in an "Add" popup palette of the workshops framework (FIG. 11a). Clicking on this block may launch a corresponding GUI VI and add an icon and text to a ring control, shown in FIGS. 11–12, as described below.

In one embodiment, the Workshops framework may support "Undo", "Redo", and full-state "Restore" commands by automatically copying appropriate controls from the GUI to the State VI, and then storing/restoring this data. A block VI may be programmed to respond to these events and freely exchange its data to/from the workshop in order to support these features.

Measurement Task Configuration Tool Plug-In Architecture

To maximize extensibility and development ease of use, and to minimize disk footprint, there may be a single Main Template VI 1008 that dynamically displays only the measurement type/phenomenon that is being configured. For example, if a user is configuring a voltage measurement, the VI may only display the configuration components necessary for a voltage measurement (See FIG. 11). Likewise, the user may add a temperature measurement, and with the exact same VI, configure a temperature measurement. This architecture may greatly shorten development time, since all measurement blocks may share a common interface. Thus, changes to the GUI may need only be made in one location.

In one embodiment, each measurement class component (the piece of the U1 that is specific to the measurement type being configured) may be a separate VI, referred to as a Measurement Class VI 1012 that may be dynamically loaded by the main GUI template. A "measurement class" ID may be passed to this VI by the Workshop, which tells it what measurement class component VI to load based on which button was selected from the popup palette. Each Measurement Class VI 1012 may be a small state-model VI used for processing events unique to its own front panel, and may have a number of built-in system events for communication to/from the Main Template VI 1008 for such operations as initialization and data processing. The remainder of events may be user-instantiated events which tell the VI how to act when a user changes a control on the front panel, for example.

FIG. 11—Measurement Task Configuration Tool Screen: Measurement Setup

FIG. 11 illustrates an example configuration tool measurement setup interface, according to one embodiment. More specifically, FIG. 11 shows a measurement setup interface for a voltage measurement from four terminals of a data acquisition device. As mentioned above, the primary panel, in this example titled "Voltage Measurement," may be the Main Template VI 1008, configured dynamically for voltage measurement configuration. In one embodiment, this VI may be operable to receive user input specifying one or more basic voltage measurements, including input ranges, sensors, and scaling, as shown. Various controls on the panel may also allow the user to add and remove channels, as well as add or copy previously named channels. As shown, in one embodiment, the panel may also include a list of currently configured channels of a given type, e.g., "Channel List". In one embodiment, the setup interface may include a Timing Setup panel which provides controls for configuring timing aspects of the specified measurement. For example, sampling parameters such as sample rate and number of samples may be specified. In one embodiment, a sample Mode control may allow the user to specify whether a single sample, a set number of samples, as specified by the number of samples parameters mentioned above, or continuous acquisition of samples, is to be taken for the measurement, as indicated in FIG. 11.

In one embodiment, the interface may further include tabbed controls for configuring other aspects of the measurement setup, such as "Channels", "Settings" (as shown selected in FIG. 11), and "Details", each of which is described below with reference to FIGS. 12B–D. Finally, in one embodiment, the interface may also include an "Advanced" configuration tab control, described below with reference to FIG. 13.

FIGS. 12A–D—Measurement Task Configuration Tool Screen: Measurement Blocks

Figure 12A:
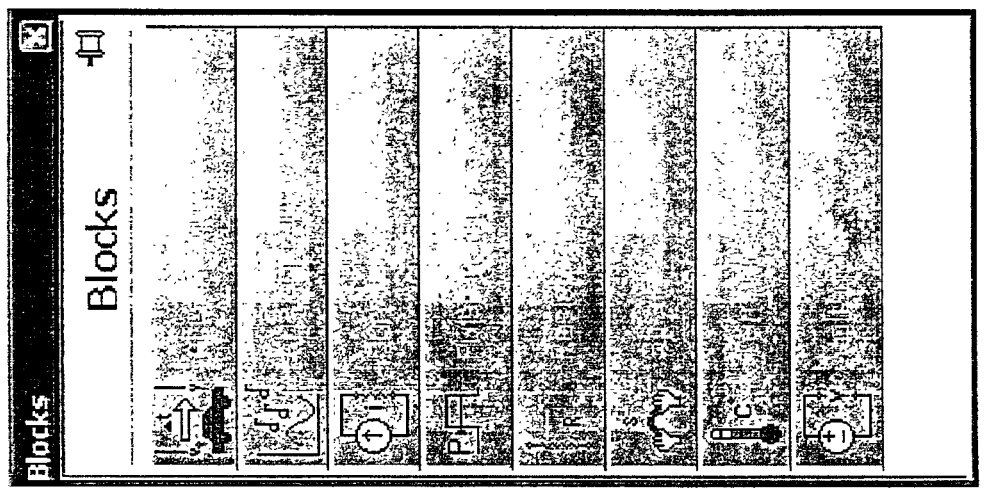

In one embodiment, the configuration tool interface may include an "Add" button (see FIG. 11) with corresponding popup palette indicating the various types of measurement the user may configure, such as voltage, temperature, resistance, frequency, and angular displacement, among others, as shown in FIG. 12A. In one embodiment, the user may select or click a particular block to activate the configuration panels for that type of measurement.

Figure 12B:
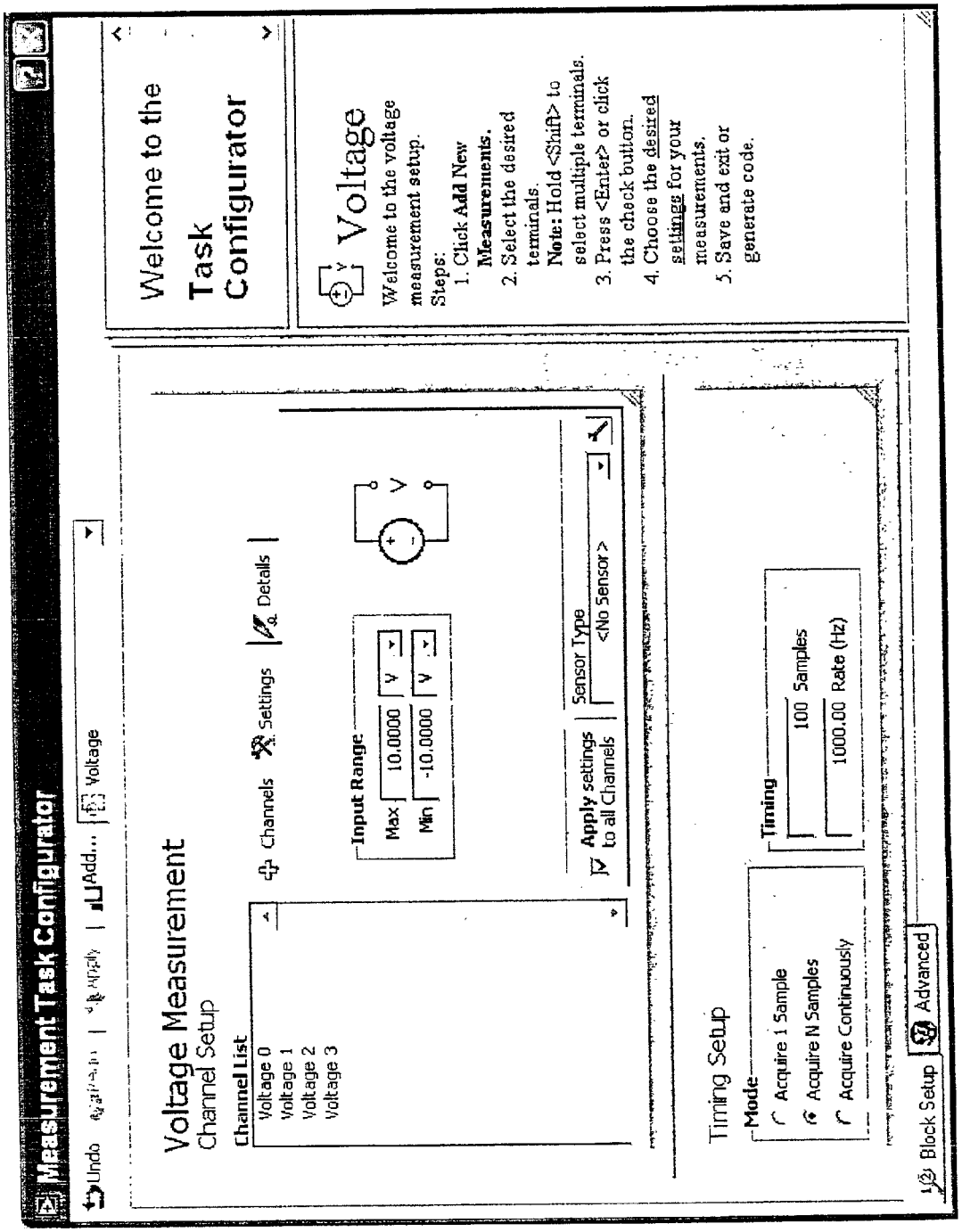

In one embodiment, the configuration tool interface may include a ring control, shown in FIG. 12B adjacent to the "Add . . . ". menu item. Each icon and text in the ring control represent a configured group of channels corresponding to one measurement type, such as voltage, temperature, frequency, etc. It should be noted that each time a measurement block is selected from the "Add" popup palette indicating a new measurement group, e.g., a group of voltage measurements, an icon and text may be added to the ring control. The channels in each measurement group may be subject to the specified parameters shown in the panel for that group, such as timing, triggering, etc. If a user specifies multiple voltage measurement groups, then the icon for that measurement type (block) may appear multiple times in the ring control. In one embodiment, when a user selects (clicks) an icon in the ring control, the configuration tool may present one or more panels corresponding to that measurement group, thereby allowing the user to quickly access any measurement group specification for review, revision, replication, or deletion.

FIG. 12B also illustrates an example of the tabbed Settings control, whereby the input range of the measurement may be set by specifying minimum and maximum values, as well as the units of the measurement.

Figure 12C:
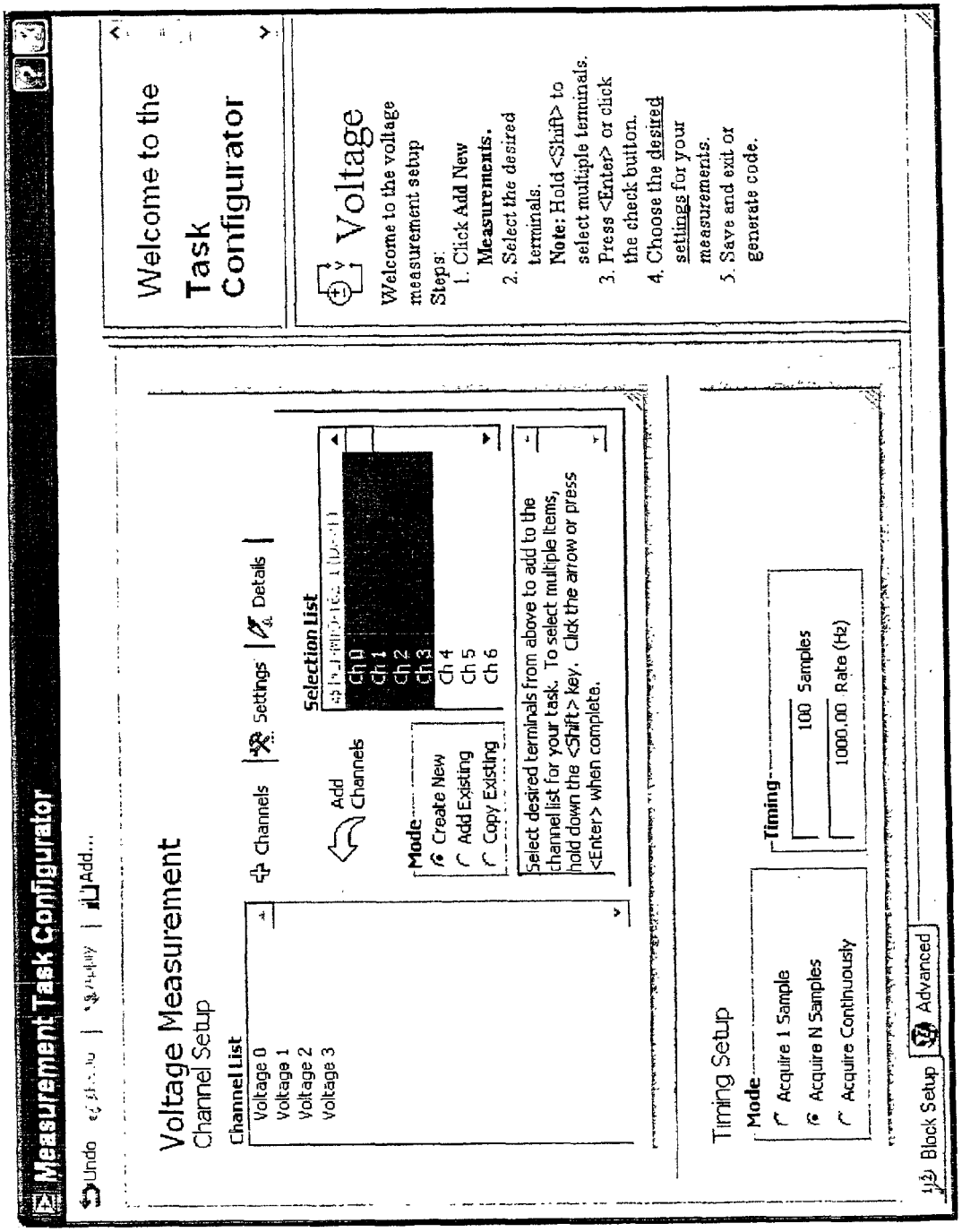

FIG. 12C illustrates an example of the tabbed Channels control. As FIG. 12C shows, the Channels control allows the user to create a new measurement channel, add an existing channel, and/or copy an existing channel for inclusion in the Channel List, via the Mode selection. In this example, a scrollable Selection List is also provided, allowing multiple terminals to be selected for addition to the channel list.

Figure 12D:
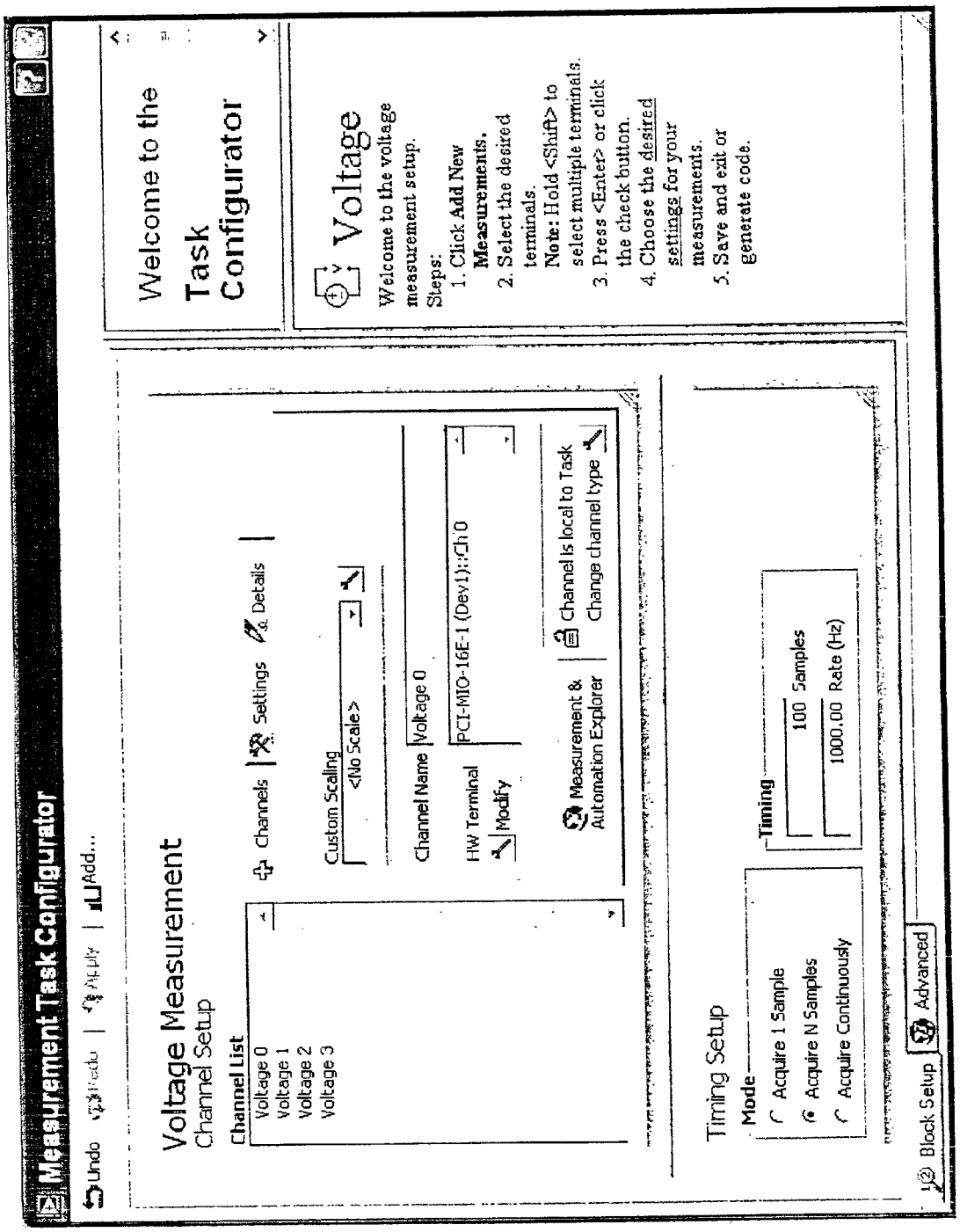

FIG. 12D illustrates an example of the tabbed Details control. In this example, a Custom Scaling control allows the user to specify a scaling operation to be performed on the measurement data. As FIG. 12D also shows, in one embodiment, the Details control may also include a modifiable Channel Name field, a hardware terminal indicator, which may allow the user to modify the associated terminal of the channel.

Adding a Block to the Measurement Task Configuration Tool

In one embodiment, when a developer wants to add a new block type that a user can click to configure something, there may be very little work that needs to be done, with little or no duplication of any prior work. For example, to add a CDMA type measurement to the configurator, a block referred to as "CDMA_Test" may be added to the configurator by the following steps:

1) Place a CDMA_Test (.INI format) file (e.g., Block .INI File 1004) in the appropriate Workshops directory, containing links to the appropriate VI's, icon file, and names, creating the block that a user can now click on from the "Add" popup palette.

2) Make a block icon (e.g., Block Icon 1006 comprising 1024 pixels) and place it in the \CDMA_Test directory. This icon will appear in the ring control when a CDMA_Test block is inserted.

3) Using a pre-configured template VI (e.g., 1008), add controls that a majority of users will need to configure a CDMA type measurement. Save this as CDMA_Test.vi and place it in the \CDMA_Test directory.

In addition to the Main Template VI 1008, the Workshop may also load a timing configuration VI, described below, as well as one or more advanced configuration VI's, described below with reference to FIGS. 11 and 12, as needed by the measurement block. All of these VIs may be specified in the .INI file. With the exception of the timing VI, which may be on the same front panel as the Main Template VI 1008, any other VI's may show up as separate tabs at the bottom of the window. In the preferred embodiment, a majority of users should be able to configure their application from a single page without having to navigate through multiple tabular pages. In other words, default values may be provided for parameters which would otherwise require use of the advanced or auxiliary VIs.

User Interaction Requirements

In one embodiment, the configuration tool may allow the user to easily configure almost any number of channels. Default names may be created wherever possible, so minimal user effort is required. In one embodiment, users may begin their configuration tool experience with an HTML help welcome screen in the main window, containing items such as "what is the measurement configuration tool?" and "where do I get started?", etc. From there the user may be instructed to tell the configuration tool about the desired application. The user may start by clicking the "Add" button and selecting one of the measurement/phenomenon type blocks from the popup palette. This then loads the corresponding components as outlined earlier. From here on, interactive help windows in the right-hand pane may guide the user through building the task. The first step may be to add channels to the task, by selecting the hardware terminals from which measurements are to be made in the "Selection List". This process may create channels for those hardware terminals and give them default names. Upon adding one or more channels to the Task, the user may be auto-advanced to the "Settings" tab for configuration of these channels.

From here the user may close the configuration tool, in which case the user may be prompted to accept the changes made, or cancel. Alternately, the user may continue, configuring measurement specific settings for their application, for example, using the Input Range and Sensors options shown in FIG. 11. In one embodiment, clicking the "Details" tab may allow the user to change the name of a channel or the HW terminal to which it's associated.

In one embodiment, below this main window is the timing configuration VI, shown in FIG. 11 titled "Timing Setup", through which the timing for this task may be configured. In one embodiment, the timing VI may allow the user to specify sampling parameters, such as number of samples and sample rate, among others. The timing parameters specified here may be common to all measurements in the list.

Figure 13:
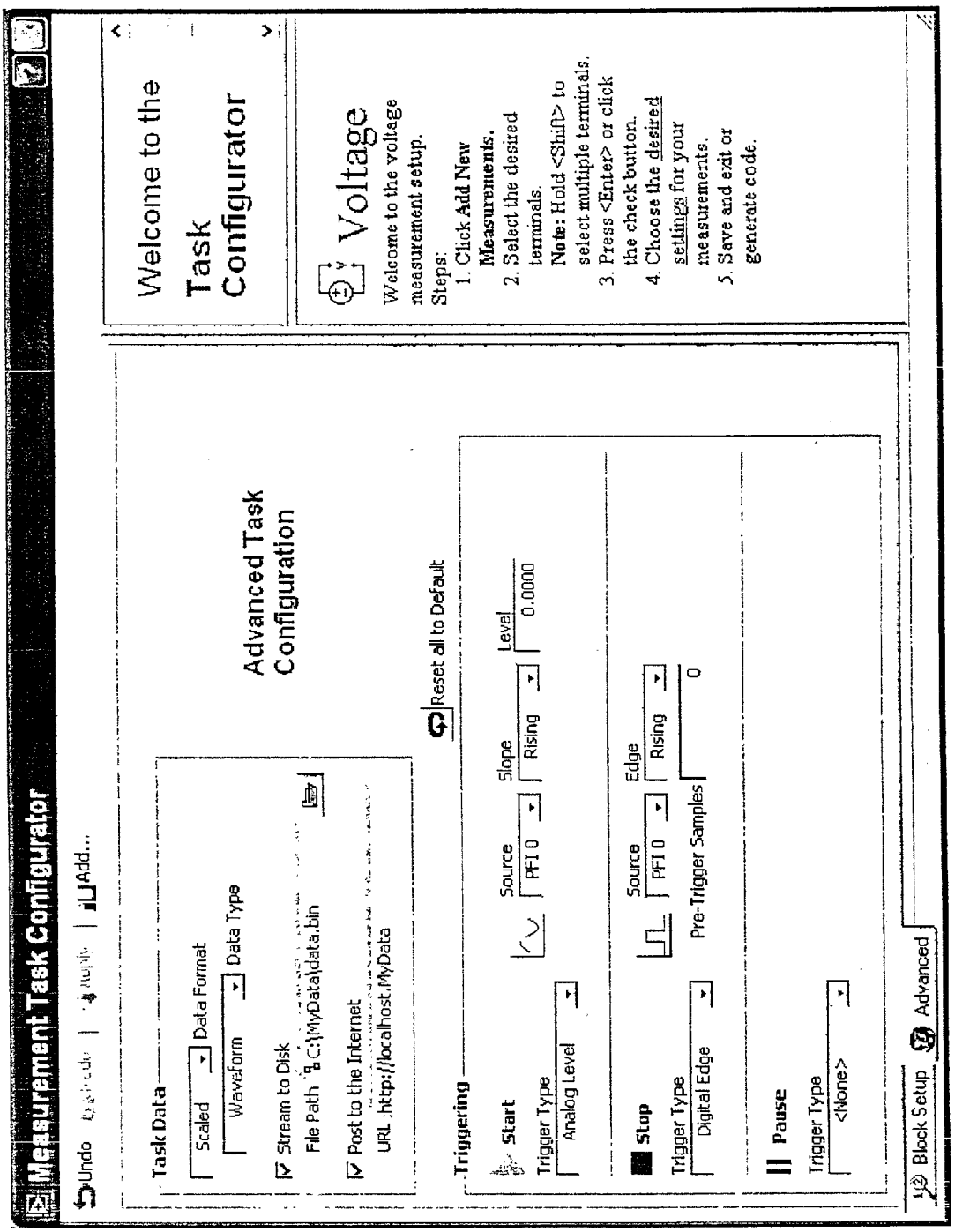

FIG. 13—Measurement Task Configuration Tool Screen: Advanced Configuration

As mentioned above, in addition to the two main views (measurement setup and timing configuration), each measurement group may have additional views that may be activated by tabs at the bottom of the display. These tabs may be tied to the current group of channels and may change when a different icon is selected in the ring control. In the case of voltage measurements, shown in FIG. 11, there may be an "Advanced Configuration" tab. Selecting the tab may activate an advanced configuration panel, as shown in FIG. 13. Here more advanced settings that apply to the current "Voltage" group may be configured. As FIG. 13 shows, such settings may include triggering, advanced timing, and measurement data operations, among others.

In one embodiment, a measurement data section may allow the user to specify return data type (scaled/binary), and logging to disk, among others. In another embodiment, the user may specify a URL (Universal Resource Location) to which measurement data may be posted.

In one embodiment, a measurement triggering section may allow the user to specify start, stop, and pause trigger operations, such as trigger type (e.g., analog/digital), trigger condition (e.g., rising edge), trigger source, and level.

The number of tabs and their content may be specified in the same .INI file for each measurement/generation block. An "Advanced Device" configuration tab may also be provided for those boards with extended functionality. This tab would preferably appear automatically when a terminal from one of these type boards is added to the task.

Code Generation

In one embodiment, users may have the ability to generate different levels of code, as well as code for different programming languages from the configuration tool. In one embodiment the configuration tool may be operable to detect from where (i.e., which ADE) it was launched, and to set a default ADE type indicating the type of code to generate.

In the preferred embodiment, there may be three levels of code generation:

1) a single icon or function whose activation causes the execution of the entire measurement application, 2) multiple intermediate icons or functions that use the task as defined and stored (e.g., in MAX), but perform operators on this task (e.g., Configure, Start, Read, and Clear), and 3) low-level code showing what would be required to build this code completely from scratch, having never run the configuration tool.

Exiting, Saving, and Persisting

In the preferred embodiment, a user is not prompted to save or name anything until they exit the configuration tool. Upon exiting, if a new task has been configured, then the user may be prompted to give the task a unique name. If the user was modifying an existing task, then the user may be prompted to save the changes made, or to discard them. The task and all measurements may then be persisted to storage (e.g., MXS) as MSOs ready for execution by any ADE based API.

ADE and Measurement Task Configuration Tool Interaction

In some ADEs, (e.g., LabVIEW™ and LabVIEW Express™), the configuration tool may be represented as a top-level, distinguishable icon in the Data Acquisition palette. When dropped on the diagram, the configuration tool may immediately launch, according to one embodiment. Double-clicking the icon later may launch and restore the configuration tool to its last saved state. In other ADEs, (e.g., Measurement Studio) the configuration tool may be launched from a menu item, or a function panel where the task is defined.

Thus, the task configuration tool interface may provide a simple means for the user to create and/or modify a specified measurement task. It is noted that the configuration tool and interface described herein is but one example of a measurement task specifier, and is not intended to limit the measurement task specifier to any particular form or implementation.

Expert System Embodiment #1

FIGS. 14–25 illustrate operation of the expert system 750 according to one embodiment. The expert system may be operable to generate a measurement program specification. In one embodiment, the expert system may include a first software program operable to analyze a received measurement task specification, a validation software program operable to validate the measurement task specification, and a generation software program operable to generate the measurement program specification for the measurement task. The measurement program specification may be useable in generating an executable measurement program.

In one embodiment, the measurement program specification may be a run-time specification, as described above. In one embodiment, the expert system 750 may include a plurality of measurement expert software programs, where the plurality of measurement expert software programs include the first software program, mentioned above.

Figure 14:
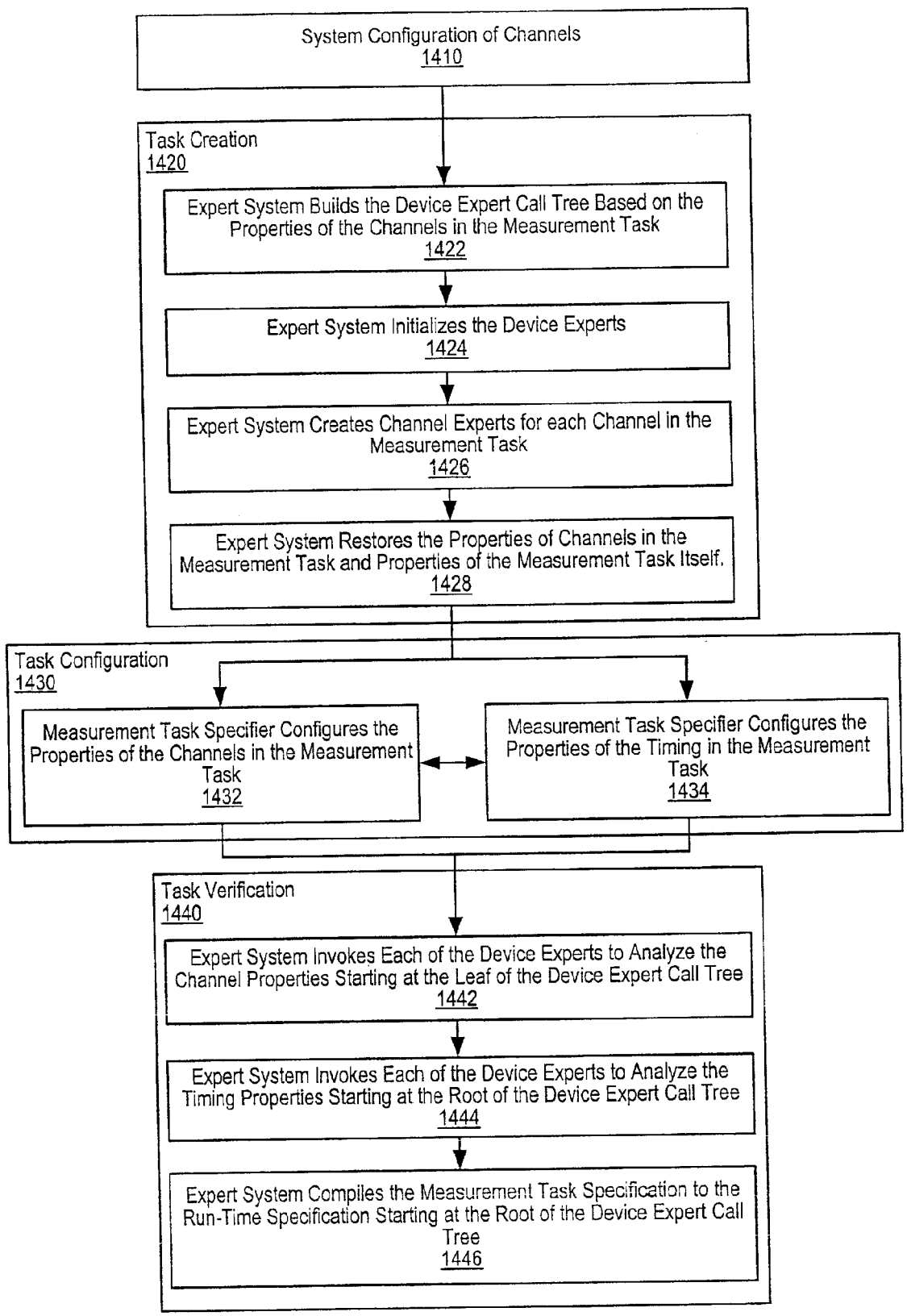
FIG. 14 is a flow diagram of a run-time specification generation process performed by the expert system, according to one embodiment.

FIG. 14—Generation of the Run-Time Specification with the Expert System

FIG. 14 is a flowchart diagram illustrating one embodiment of a method for creating a run-time specification from a received measurement task specification 740 as implemented by the expert system 750. The expert system 750 may operate in, or rely on, four phases: system configuration 1410, task creation 1420, task configuration 1430, and task verification 1440.

In one embodiment, the expert system may include a plurality of experts including device experts, channel experts, timing experts, reader/writer experts, control experts, and streaming experts, sensor experts, smart sensor experts, scaling experts, and system calibration experts, among others. As mentioned above, in general, an expert may be defined and used for any device or function. Each class of expert may be responsible for managing different aspects of the measurement task specification. In performing the above mentioned four phases, the expert system may be operable to create a device expert call tree of associated experts according to the configuration specified by the user (i.e., a user-specified measurement task configuration), manage the configuration of a measurement task specification by a measurement task specifier, and verify the measurement task specification and compile the measurement task specification into a run-time specification. Each of these steps is described in more detail below.

The system configuration phase 1410 may be performed or utilized by the expert system 750 whenever named channels are specified, either by a user via a system configuration tool 700, automatically at installation-time for a detected device, or programmatically by a user with an interactive or application programming interface 730. In one embodiment, a primary function of the system configuration phase 1410 is to perform system configuration of one or more channels for the measurement task, i.e., to configure named channels with fully qualified channel paths and channel MSO mementos.

Named channels may be specified by a user with a measurement task specifier or may be automatically specified by a system configuration tool based on the installed measurement devices. The configuration of these named channels may produce fully qualified channel paths and associated channel measurement specification object (MSO) mementos associated with these named channels.

In one embodiment, performing system configuration of channels may include configuring the one or more channels with fully qualified channel paths specifying one or more of a terminal configuration, an expert associated with the terminal configuration, and capabilities of the expert, and setting one or more attributes for the one or more channels based upon installed measurement devices. For example, fully qualified channel paths may comprise a series of expert configurations corresponding to the complete topography for a particular channel. Each expert configuration may specify one or more of a terminal configuration, the expert associated with that terminal configuration, and a reference to the capabilities of that expert, as well as any other appropriate parameters.

In one embodiment, channel MSO mementos may comprise serialized attributes of channel MSOs explicitly configured by a user through the measurement task specifier or by a system configuration tool based on the measurement devices installed in the system. Whenever a channel is added to a measurement task specification, the corresponding channel MSO mementos may be deserialized into the measurement task specification. This may allow users to configure default attributes for named channels that span all measurement tasks.

In one embodiment, the plurality of experts may comprise a plurality of device experts and a plurality of channel experts. Performing the task creation for the measurement task may include building the device expert call tree based on the channel configuration, where the device expert call tree comprises one or more of the plurality of device experts, and where the device expert call tree comprises one or more of the experts used to generate the run-time specification from the measurement task specification.

The task creation may also include initializing the one or more device experts with initialization information, where the initialization information for each device expert includes one or more of the device expert's parent and children in the device expert call tree, information indicating the state of the measurement task, and hardware capabilities of the device.

After the one or more device experts are initialized, one or more channel experts may be created for each of the one or more channels, where each device expert corresponds to at least a subset of the one or more channel experts, and where the subset of the one or more channel experts corresponds to the device expert.

Finally, the task creation may include restoring properties of the one or more channels and the measurement task specification from persistent storage.

Thus, in the task creation phase 1420, the expert system 750 may create the device expert call tree based on the fully qualified channel paths 1422, initialize the instances of the device experts 1424, create instances of the channel experts for each of the named channels in the measurement task 1426, and restore (set values from persistent storage) the properties of the channels based on the channel MSO mementos 1428, as shown.

Thus, in one embodiment, the first step in the creation of a collection of associated experts according to the user-specified configuration may be the construction of the device expert call tree 1422. The expert system 750 may begin the creation of the device expert call tree when the user initializes a new measurement task by providing a list of named channels. A device expert call tree may contain all the experts that will be used to compile a given measurement task specification into a run-time specification. The structure of the tree may determine the order in which the experts are called, as well as the interactions between the experts. The construction of a device expert call tree may be based on the fully qualified channel paths for each channel in the measurement task. Note that additional device experts, associated with channels that were not originally added to the measurement task, may be added after the construction of the device expert call tree. Thus, the expert system may create a device expert call tree of device experts according to the named channels that comprise the measurement task specification, i.e., according to the user-specified measurement task configuration.

In the preferred embodiment, the expert call tree is constructed in an in-order, top-down approach. In one embodiment, the general algorithm includes walking (traversing) the series of expert configurations for all of the channels simultaneously. At each point, a device expert instance may be created for each unique device expert identifier at that level in the fully qualified channel path. Note that if the expert identifier associated with the root entry of the fully qualified channel path is not the same for all named channels in the measurement task, than an expert will be inserted at the root of the expert call tree. This expert may then handle the synchronization between multiple measurement devices or multiple sub-systems on a single measurement device. Note that in the preferred embodiment, the device experts are instantiated while building the tree; they are only initialized when the device expert call tree is traversed for the first time.

After the device expert call tree is built, device experts for each node may be initialized with initialization information, as indicated in 1424. Initialization information may include the device expert's parent and children in the device expert call tree, a reference to an object that maintains the state of the measurement task, and the hardware capabilities of the device which may be stored in a persistent memory medium, e.g., MXS.

Each device expert may understand or be associated with a specific set of channel experts designed for that device. Once device experts have been created and initialized, the expert system may create one or more channel experts for each of the one or more channels, i.e., for each specified named channel, as indicated in 1426. The expert system may create channel experts by passing a fully qualified channel path to the leaf (terminal node in the tree structure) device expert in the call tree corresponding to the specific channel. Thus, each device expert may correspond to at least a subset of the one or more channel experts, and the (at least a) subset of the one or more channel experts may correspond to the device expert. When a device expert's create channel method is invoked, the device expert may first request that its parent device expert create a channel expert as well. The parent channel expert may be created using a version of the fully qualified channel path with the most derived terminal configuration truncated. This sequence may continue up the device expert call tree until all channel experts for a particular fully qualified channel path have been created. Each channel expert may retain a reference to the corresponding parent channel expert for use when the measurement task is configured.

As 1426 shows, after the expert system creates channel experts for each channel, the corresponding channel MSO mementos may be deserialized from named channels which may be stored in MXS. Said another way, the properties of the one or more channels and the measurement task specification may be restored from persistent storage. The expert system may then query channel experts for channel MSOs, and apply the channel MSO mementos to them. This allows users to configure default attributes for named channels that span all tasks.

In the task configuration phase 1430, the expert system 750 may manage the configuration of the measurement task specification. Configuration of the measurement task specification may include storage, verification, and coercion of attributes set through the measurement task specifier. Note that as used herein, the term "coercion" may refer to the expert system modifying a value of an attribute in order to make the value of that attribute valid. For example, a user may specify a sampling rate of 999 Hz. However, due to the hardware architecture of the measurement device, the measurement device may not be able to sample at a rate of 999 Hz. It may, for example, only support incremental values such as 950 Hz, 1000 Hz, 1050 Hz, etc. In this example, the expert system may coerce the sampling rate to 1000 Hz. The measurement task specifier 730 may configure the properties of channels of the measurement task specification 1432, as well as the timing properties of the measurement task specification 1434. In other words, performing task configuration for the measurement task may include configuring one or more properties of the one or more channels, and configuring one or more timing properties of the measurement task specification. The configuration of these properties may occur in any order. A customer may use the measurement task specifier to configure the measurement task specification, however, the expert system may store, verify, and coerce the attributes set through the measurement task specifier.

Thus, after the expert system creates and initializes the device expert call tree, the user may configure the measurement task specification through the use of a measurement task specifier. The measurement task specifier may rely upon the expert system to manage this configuration of the measurement task specification. The expert system may manage the configuration of the measurement task specification whenever attributes of the measurement task are specified or queried. The specification of the measurement task may occur in any order. The measurement task specification may be modified after the measurement task specification has been verified and compiled. When this occurs, the measurement task specification may be efficiently re-verified and recompiled. Also, the measurement task specification may be modified while the measurement task is executing. When this occurs, the expert system directly and immediately may modify the primitives in the run-time to reflect the modification to the measurement task specification. Configuration of the measurement task specification preferably entails setting various attributes of the MSOs in the measurement task specification.

Root device experts may contain objects implementing specific timing expert interfaces. The expert system may be able to query for these timing experts through an interface. In one embodiment, this query may be done only from the root of device expert tree, with device experts deferring requests to children experts if they are unable to satisfy them. Timing experts may be queried and configured whenever specific timing or triggering attributes are configured. Measurement task specifiers may be able to use specific timing interfaces to configure these attributes.

Channel experts may be configured whenever a measurement task specifier executes a set or get operation on a channel MSO. The first time a set or get is specified for a particular channel MSO, the measurement task specifier may query the appropriate leaf channel expert for that MSO. If a particular channel expert is unable to satisfy that query, the request may be deferred to the channel expert's parent. Sets and gets may then be performed directly on the MSO itself. The measurement task specifier may maintain a cache of any MSOs that have been queried or modified, and so subsequent sets and gets may not require querying the channel expert. The MSO cache may also maintain information about whether each MSO was modified or only queried. During the storage of a measurement task, the measurement task specifier may examine this cache and only store those MSOs actually modified by the customer. This strategy may enable a maximum amount of portability for tasks by not serializing MSO attributes which were only queried, i.e., which were not modified.

In one embodiment, performing task verification for the measurement task includes invoking one or more device experts to analyze one or more channel properties of the measurement task specification, invoking the one or more device experts to analyze one or more timing properties of the measurement task specification, and compiling the measurement task specification to the run-time specification.

Thus, in one embodiment, in the task verification phase 1440, the expert system 750 may verify and compile the measurement task specification into a run-time specification. The expert system 750 may first invoke each of the device experts in the device expert call tree to analyze the channel properties in the measurement task specification 1442. In the preferred embodiment, this invocation occurs in a post-order (bottom-up) fashion. In other words, the expert system 750 may invoke one or more of the plurality of device experts starting at a corresponding leaf of the device expert call tree.

The expert system 750 may then invoke each of the device experts in the call tree to analyze the timing properties in the measurement task specification 1444. In the preferred embodiment, this invocation occurs in a pre-order (top-down) fashion, i.e., the expert system 750 may invoke the one or more device experts starting at the root of the device expert call tree. Finally, the expert system 750 may invoke each of the device experts in the call tree to compile their associated portion of the measurement task specification into the run-time specification 1446. This invocation also preferably occurs in a pre-order (top-down fashion). Said another way, compiling the measurement task specification to the run-time specification may include invoking each of the device experts in the device expert call tree to compile an associated portion of the measurement task specification into the run-time specification starting at the root of the device expert call tree. A more detailed description of the task verification phase 1440 follows.

The expert system may verify the measurement task specification when, implicitly or explicitly, a measurement task specifier invokes a verify operation for a measurement task. In one embodiment, the verification and compilation of the measurement task specification may consist of three ordered steps, described below.

In one embodiment, the analyze channels step is the first step of the verification and compilation of the measurement task specification. In a post-order (bottom-up) traversal of the device expert call tree, all device experts may be instructed to analyze the properties of all contained channels. During this step, device experts may query channel MSOs from channel experts, analyze their attributes, and produce attributes of channel MSOs for corresponding parent channel experts. This is somewhat analogous to a function taking channel MSOs as inputs, performing some expert-specific transformation on the inputs, and generating channel MSOs as outputs.

In one embodiment, the second step of the verification and compilation of the measurement task specification is the analysis of timing properties. In a pre-order (top-down) traversal of the device expert call tree, all device experts may be instructed to analyze the properties of all contained timing. During this step, device experts may query timing MSOs from timing experts, analyze their attributes, and produce attributes of timing MSOs for corresponding children timing experts.

The final step of the verification and compilation of the measurement task specification is the compilation into the run-time specification, according to one embodiment. In a pre-order (top-down) traversal of the device expert call tree, some or all of the device experts may be instructed to compile. During this step, device experts may create primitive settings and add them to the run-time specification. Channel MSO attributes or negotiated ranges may also be resolved during this step. Additionally, stream building and signal routing may be executed at this step.

The names of the first two steps, analyze channels and analyze timing, are somewhat arbitrary. The importance of these two steps is that bottom-up and top-down traversals of the tree occur to allow attributes to be propagated through all the experts. Channel attributes generally describe an individual measurement or generation at the bottom leaves of the tree, which corresponds to where the user has connected his or her signal to the measurement system. Attributes, such as physical range, may be inspected and/or modified by each expert upwards along the channel data path so that each expert can be given derived settings. Hence, the name "Analyze Channels" is used. Timing attributes, on the other hand, generally describe timing for all the measurements in a single task. Attributes, such as rate, may be propagated downwards and derived into the specific settings of multiple devices. Hence, the name "Analyze Timing" is used. These direction generalizations are not strictly true, however. For instance, a scan list MSO can be involved in both the channel and timing analysis steps, acting as a bridge of sorts between the two expert classifications.

In one embodiment, the measurement system may use streaming experts to compile stream specifications in the task specification into stream primitive settings in the task run-time specification. The term "streaming" refers generally to data transport, e.g., reads and writes, but may also include data processing operations, such as filtering, splitting and combining of signals, and scaling, among others. Streaming experts may collaborate to transfer and process the data between its source(s) and destination(s). Examples of streaming experts may include an environment changer, format changer, linear scaler, splitter, polynomial scaling filter, pattern matching filter, buffer writer, kernel reader proxy and dispatcher, splitting writer, and combining reader, among others.

In one embodiment, the streaming experts may leverage a class library based on data pipes. This library allows different components in a measurement system to collaborate by providing a hierarchy of well-defined streaming primitives that can be extended and composed into highly specialized solutions. In one embodiment, the class library may leverage compiler-inlining optimizations to generate composites that are comparable in speed to hand-tailored assembly. Note that in one embodiment, the components of the class library may be operable to not only move data, but to analyze, transform, split, and/or combine data, as well.

As is well known in the art, there are two basic types of streams: readable and writeable, where data is obtained from a readable stream and data is provided to a writeable stream, respectively. In one embodiment, the system may include a well-defined interface to facilitate easy use of stream components by a user or customer.

In one embodiment, a user may modify the measurement task specification incrementally using the task specifier. The expert system may subsequently revalidate the task specification, making incremental changes to the run-time specification. In other words, the expert system may incrementally recompile the modified measurement task specification, thereby updating the run-time specification. Changes to the run-time specification may then be deployed incrementally to reconfigure the run-time. These changes may include adding new primitive settings, modifying existing primitive settings, and removing primitive settings, among others.

In one embodiment, the measurement system may be operable to reserve one or more resources according to the generated run-time specification. In one embodiment, the generated run-time specification may comprise a specification of the parameters of one or more measurement primitives corresponding to rudimentary measurement operations of the measurement task. The measurement system may then instantiate measurement primitives in the form of software objects which may be used to configure one or more measurement devices when the run-time is executed, according to the run-time specification. This may comprise setting the values of parameters or registers of the measurement devices (hardware and/or software) as appropriate to carry out the specified measurement task. The measurement system may thus generate the run-time by creating instances of the measurement primitives with the specified parameters. The run-time may then be executable to perform the specified measurement task.

Example: Acquire Voltage with an MIO and Two SCXI Modules in Two Chassis

One example that illustrates the phases of the expert system 750 is the measurement of two voltage phenomena on two channels with two SCXI modules in two SCXI chassis both connected to an MIO DAQ device.

Figure 15:
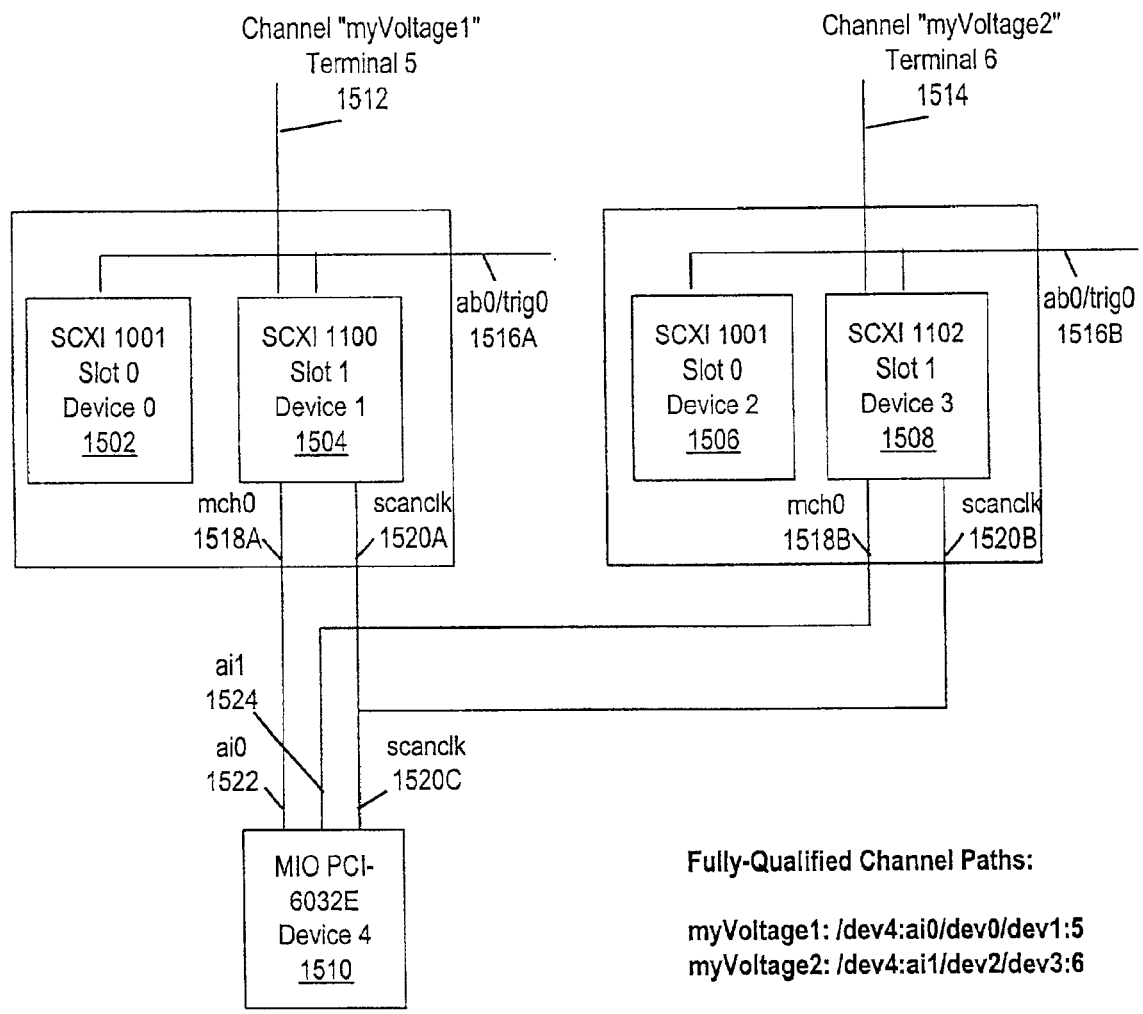
FIG. 15 is a topography diagram for a data acquisition task, according to one embodiment.

FIG. 15—Topography Diagram for Multi-Chassis Measurement Task

FIG. 15 is a topography diagram for the above example of measuring two voltage phenomena on two channels with two SCXI modules in two SCXI chassis both connected to a MIO DAQ device. Channel "myVoltage1" 1512 is defined to be terminal 5 of device 1, which is an SCXI 1100 module 1504 in slot 1 of the SCXI 1001 chassis 1502, identified as device 0. Device 4 1510, a PCI-6032E MIO DAQ device, is connected to the SCXI 1100 module 1504 by a cable connecting the ai0 terminal 1522 of device 4 1510 to the mch0 terminal 1518A of device 1 1504 and the scanclk terminal 1520C of device 4 1510 to the scanclk terminal 1520A of device 1 1504. The fully qualified channel path for channel "myVoltage1" 1512 is "/dev4:ai0/dev0/dev1:5". Channel "myVoltage2" 1514 is defined to be terminal 6 of device 3, which is an SCXI 1102 module 1508 in slot 1 of another SCXI 1001 chassis 1506, identified as device 2. Device 4 1510 is connected to the SCXI 1102 module 1508 by a cable connecting the ai1 terminal 1524 of device 4 1510 to the mch0 terminal 1518B of device 3 1508 and the scanclk terminal 1520C of device 4 1510 to the scanclk terminal 1520B of device 3. The fully qualified channel path for channel "myVoltage2" is "/dev4:ai1/dev2/dev3:6"

Figure 16:
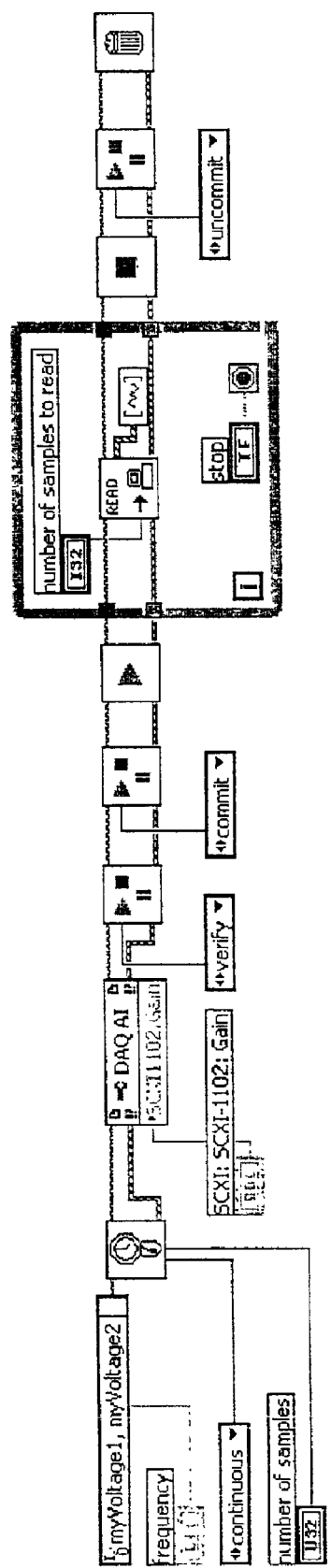
FIG. 16 is a LabVIEW VI for a data acquisition task, according to one embodiment.

FIG. 16—VI Diagram for Multi-Chassis Measurement Task

FIG. 16 is a LabVIEW VI diagram for the example of measuring voltage on two channels with two SCXI modules in two SCXI chassis both connected to a MIO DAQ device, according to one embodiment. The two channels, "myVoltage1" and "myVoltage2" are wired into the DAQ Timing VI. The diagram specifies the frequency at which to sample the channels, to acquire samples continuously, and the number of samples to store in memory at one time. Next in the diagram, the gain property for the channel on the SCXI-1102 module is configured with the DAQ AI Specific property node. The DAQ Task Control VI verifies the measurement task. Next, the DAQ Task Control VI commits the task. Then, the DAQ Start VI starts the measurement task. Inside a While Loop Structure, the DAQ Read VI reads the specified number of samples from the channels and displays the samples on a chart indicator. The DAQ Stop VI stops the measurement task. Then, the DAQ Task Control VI uncommits the task. Finally the task is disposed with the DAQ Clear VI. Note that the DAQ Task Control VIs are not required but are included to more clearly illustrate the various phases of the expert system 750. Note that in FIGS. 17–24 below, for each of the events or processes diagrammed the corresponding portion of the LabVIEW VI diagram is indicated.

FIG. 17—Block Diagram of Creating the Device Expert Call Tree

FIG. 17 is a block diagram that illustrates the creation of the device expert call tree. The creation of the device expert call tree is the first step in the task-creation phase of the expert system 750. The expert system 750 begins the task creation phase when the task is created. In the DAQ API for LabVIEW, tasks are created whenever a task name or channel list is wired into a VI accepting a task input.

In the example in FIG. 16, the task is created when the channels "myVoltage1" and "myVoltage2" are wired into the DAQ Timing VI. As illustrated in FIG. 17, the device expert call tree is constructed based on these channels' fully qualified channel paths. The root of these fully qualified channel paths both refer to dev4. Therefore, an instance of the device expert associated with dev4, the MIO PCI-6032E AI Device Expert 1702 is created at the root of the device expert call tree. The next level in the fully qualified channel paths refers to difference devices, dev0 and dev2. Therefore, two instances of device experts need to be inserted as children of the MIO PCI-6032E AI Device Expert 1702. Since the device expert associated with dev0 is a SCXI 1001 Device Expert, an instance of a SCXI 1001 Device Expert 1704B is created as a child of the MIO PCI-6032E AI Device Expert. Since the device expert associated with dev2 is also a SCXI 1001 Device Expert, another instance of a SCXI 1001 Device Expert 1704A is created as another child of the MIO PCI-6032E AI Device Expert 1702. The final level in the fully qualified channel path of channel "myVoltage1" refers to dev1. Therefore, an instance of the device expert associated with dev1, the SCXI 1100 Device Expert 1708 is created as a child of the SCXI 1001 Device Expert 1704B associated with channel "myVoltage1." The final level in the fully qualified channel path of channel "myVoltage2" refers to dev3. In a similar manner therefore, an instance of the device expert associated with dev3, the SCXI 1102 Device Expert 1706 is created as a child of the SCXI 1001 Device Expert 1704A associated with channel "myVoltage2."

FIG. 18—Block Diagram of Creating the Channel Experts

FIG. 18 is a block diagram that illustrates the creation of channel experts, according to one embodiment. The creation of the channel experts is the third step in the task-creation phase. In the example of FIG. 16, the channel experts are also created when the channels "myVoltage1" and "myVoltage2" are wired into the DAQ Timing VI. However, the channel experts are created after the device expert call tree is constructed and the device experts initialized. As illustrated in FIG. 18, the SCXI 1102 Device Expert's (1706) "createChannel" method is invoked by the expert system 750 and the fully-qualified channel path for the channel "myVoltage2" is passed. The SCXI 1102 Device Expert 1706 invokes the "createChannel" method of its parent, the SCXI 1001 Device Expert 1704A. In a similar fashion, the SCXI 1001 Device Expert 1704A invokes the "createChannel" of its parent, the MIO PCI-6032E AI Device Expert 1702. The MIO PCI-6032E AI Device Expert 1702 instantiates an MIO PCI-6032E AI Channel Expert 1802A and returns a reference to this channel expert to its child. The SCXI 1001 Device Expert 1704A then instantiates an SCXI 1001 Channel Expert 1804A and passes it the reference to its parent's channel expert. The SCXI 1001 Device Expert 1704A returns a reference to its channel expert to its child 1706. Finally, the SCXI 1102 Device Expert 1706 instantiates an SCXI 1102 Channel Expert 1806 and passes it the reference to its parent's channel expert 1804A. In this fashion, a tree of interlinked channel experts may be constructed. The same method may be employed to create the channel experts for the channel, "myVoltage1."

FIG. 19—Block Diagram of Deserializing the Measurement Specification Objects FIG. 19 is a block diagram of one embodiment of a method for deserializing the channel Measurement Specification Objects (MSOs). The restoration of the channel MSOs is the final step of the task-creation phase. In the example of FIG. 16, the MSOs are also deserialized when the channels "myVoltage1" and "myVoltage2" are wired into the DAQ Timing VI. However, the MSOs are deserialized after the previously described steps. As illustrated in FIG. 19, the expert system 750 invokes the "queryMSO" method of the SCXI 1102 Channel Expert 1806 to retrieve a reference to an instance of the Voltage Phenomenon MSO 1904A for channel "myVoltage2." The expert system 750 then passes this MSO an MSO memento of this MSO that was stored in a memory medium, e.g., MXS 712. The Voltage Phenomenon MSO 1904A retrieves its properties from the MSO memento. These properties may be the default properties for the channel or properties that the customer had previously specified. The same method may be used to deserialize Present Value Measurement MSO 1902A and Terminal Configuration MSO 1906A for the channel "myVoltage2" and Voltage Phenomenon MSO 1904B, Present Value Measurement MSO 1902B, and Terminal Configuration MSO 1906B for the channel "myVoltage1."

FIG. 20—Block Diagram of Configuring Timing Properties of the Measurement Task FIG. 20 is a block diagram of a process for configuring timing properties of the measurement task, according to one embodiment. The configuration of timing properties is one of the steps in the task-configuration phase. In the example of FIG. 16, timing properties of the measurement task are set when the DAQ Timing VI is invoked. As illustrated in FIG. 20, the expert system 750 may invoke a "queryTimingExpertInterface" of the MIO PCI-6032E AI Device Expert 1702 to retrieve a reference to its MIO PCI-6032E AI Timing Expert 2004. The expert system 750 may then query the timing expert 2004 for a Clock Event MSO 2002. The expert system 750 may set the properties of the Clock Event MSO 2002 based on the values of the controls wired to the DAQ Timing VI.

FIG. 21—Block Diagram of Configuring Channel Properties of the Measurement Task FIG. 21 is a block diagram that illustrates configuring channel properties of the measurement task. The configuration of channel properties is one of the steps in the task-configuration phase. In the example of FIG. 16, channel properties of the task may be set when the DAQ AI Specific property node is invoked. As illustrated in FIG. 21, the expert system 750 may invoke a "queryMSO" method of the SCXI 1102 Channel Expert 1806 in order to retrieve a reference to SCXI 1102 Constraints MSO 2102. The expert system 750 may then set the gain property of the SCXI 1002 Constraints MSO 2102 to a specified value.

FIG. 22—Block Diagram of the Analysis of Channel Properties

FIG. 22 is a block diagram that illustrates the analysis of channel properties of the measurement task, according to one embodiment. The analyze channels step is the first step of the task-verify phase. The expert system 750 may enter a sequenced task-verify phase whenever a measurement task specifier 730 requests a task verify operation. For example, in the DAQ API for LabVIEW, this could happen explicitly (by invoking the DAQ Task Control VI with the verify parameter), or implicitly via the Start VI. In the example of FIG. 16, the analyze-channels step may occur when the DAQ Task Control VI is invoked with the verify parameter. As illustrated in FIG. 22, the expert system 750 may invoke the "analyzeChannels" method on each of the device experts in the device expert call tree in a post-order (bottom-up) fashion. Based on the analysis of the properties of the channel MSOs for channel "myVoltage2," the device experts may query and set properties on other channel MSOs. For example, the SCXI Scan List MSO 2202A of the SCXI 1001 Device Expert 1704A may be queried and configured by the SCXI 1102 Device Expert 1706. Likewise, the Present Value Measurement MSO 1902C, Voltage Phenomenon MSO 1904C, and Terminal Configuration MSO 1906C of the MIO PCI-6032E AI Channel Expert 1802A may be queried and configured by the SCXI 1001 Device Expert 1704A. In a similar fashion, the Scan List MSO 2202C of the MIO PCI-6032 AI Device Expert 1702 may be queried and configured by the SCXI 1001 Device Expert 1704A. Similarly, the channel properties related to the "myVoltage1" channel may be set based on analysis of the properties of that channel's channel MSOs, as described above.

FIG. 23—Block Diagram of the Analysis of Timing Properties

FIG. 23 is a block diagram of the analysis of timing properties for the measurement task. The analysis of timing properties is the second step of the task-verification phase. In the example of FIG. 16, the analyze-timing step may also occur when the DAQ Task Control VI is invoked with the verify parameter. As shown in FIG. 23, the expert system 750 may invoke an "analyzeTiming" method on the MIO PCI-6032E AI Device Expert 1702, which is the device expert at the root of the device expert call tree. In this particular example, the analysis of the timing properties for the measurement task does not result in the need to query and configure timing properties of timing MSOs of device experts that are children of the MIO PCI-6032E AI Device Expert 1702. However, in other measurement applications or tasks, the analysis of the timing properties for the measurement task may result in the need to query and configure timing properties of the timing MSOs. Note that, as mentioned above, the analysis, querying, and configuration of timing properties may occur in a top-down manner, i.e., beginning at the root node (the MIO PCI-6032E AI Device Expert 1702), and progressing through the expert call tree to the leaf nodes.

FIG. 24A—Block Diagram of the Compilation of the Measurement Task Specification into the Run-Time Specification FIG. 24A is a block diagram illustrating the compilation of the measurement task specification into the run-time specification, according to one embodiment. In the example of FIG. 16, the compile step may also occur when the DAQ Task Control VI is invoked with the verify parameter. As FIG. 24A indicates, the expert system 750 may invoke a "compile" method on the MIO PCI-6032E AI Device Expert 1702, the device expert at the root of the device expert call tree. The MIO PCI-6032 AI Device Expert 1702 may compile all of its MSOs into primitive settings and add these primitive settings to the run-time specification. Next, the expert system 750 may invoke the "compile" method on a first instance of SCXI 1001 Device Expert 1704A. The SCXI 1001 Device Expert 1704A may compile all of its MSOs into primitive settings and add these primitive settings to the run-time specification. Following in a similar manner, the expert system 750 may continue to invoke the "compile" method on each of the device experts in the device expert call tree in a pre-order (top-down) fashion. Each device expert, in turn, may compile all of its MSOs into primitive settings and add these primitive settings to the run-time specification. FIG. 24A also indicates where in the block diagram of the graphical program the compile step occurs (indicated by the rectangle superimposed on the block diagram).

FIGS. 24B–24F—Further Steps of the Measurement Task

FIGS. 24B–24F illustrate the remaining steps in the implementation and execution of the specified measurement task, according to one embodiment. As may be seen, each step may be initiated by the expert system 750 invoking a method on the MIO PCI-6032E AI Device Expert 1702, the device expert at the root of the device expert call tree, similar to the compile invocation of FIG. 24A. In this embodiment, each invocation is made with the same function call, where the resulting functionality depends on the respective argument to the function. Each of the FIGS. 24B–24F also indicates where in the block diagram of the graphical program the related step occurs (indicated by the rectangle superimposed on the block diagram).

FIG. 24B illustrates the commit step, initiated by a function call, as shown. In this step, the expert system 750 queries the MIO PCI-6032E AI Device Expert 1702, the device expert at the root of the device expert call tree, for a list of primitive supervisors that should be invoked with a commit operation. The expert system 750 then uses the run-time to invoke commit operations on this list of primitive supervisors. The commit operation may include a primitive supervisor applying configuration settings to a particular primitive.

FIG. 24C illustrates the start step, initiated by a function call, as shown. In this step, the expert system 750 queries the MIO PCI-6032E AI Device Expert 1702 for a list of primitive supervisors that should be invoked with a start operation. The expert system 750 then uses the run-time to invoke start operations on this list of primitive supervisors. The start operation may include initiating a measurement or generation process on a primitive.

FIG. 24D illustrates the read step, initiated by a function call, as shown. In this step, the expert system 750 queries the MIO PCI-6032E AI Device Expert 1702 for a list of primitive supervisors that should be invoked with read operation. The expert system 750 then uses the run-time to invoke read operations on this list of primitive supervisors. Read operations may include retrieving one or more samples of data from a measurement primitive.

FIG. 24E illustrates the stop step, initiated by a function call, as shown. In this step, the expert system 750 queries the MIO PCI-6032E AI Device Expert 1702 for a list of primitive supervisors that should be invoked with a stop operation. The expert system 750 then uses the run-time to invoke stop operations on this list of primitive supervisors. Stop operation may include terminating a measurement or generation process on a primitive.

FIG. 24F illustrates the uncommit step, initiated by a function call, as shown. In this step, the expert system 750 queries the MIO PCI-6032E AI Device Expert 1702 for a list of primitive supervisors that should be invoked with an uncommit operation. The expert system 750 then uses the run-time to invoke uncommit operations on this list of primitive supervisors. Uncommit operations may include returning a primitive to a default state, if necessary and/or appropriate.

FIG. 25—Complete Block Diagram of Expert System

FIG. 25 is a complete block diagram containing all of the experts and MSOs illustrated in FIGS. 17–24, and described above.

Expert System Embodiment #2

FIGS. 26–38 illustrate operation of the expert system 750 according to another embodiment. In this embodiment, dynamic expert system methodologies are used to analyze the measurement task specification and dynamically design and/or configure an appropriate measurement system to implement the measurement task.

In one embodiment, the expert system may be operable to receive a measurement task specification specifying a measurement task, analyze the measurement task specification, and populate one or more candidate run-time specifications. The expert system may be further operable to calculate one or more metrics for each of the populated candidate run-time specifications, and select one of the populated candidate run-time specifications based on the calculated metrics to produce a run-time specification. The selected populated candidate run-time specification may comprise at least a portion of the run-time specification, where the run-time specification is useable to configure one or more measurement devices according to the run-time specification, and to generate a run-time which is executable to perform the measurement task using the configured one or more measurement devices. In one embodiment, the configured one or more measurement devices may be operable to respectively perform portions of the measurement task.

In one embodiment, the expert system may comprise a plurality of experts, where populating the one or more candidate run-time specifications includes the expert system selecting and invoking one or more of the plurality of experts to analyze the measurement task specification and populate the one or more candidate run-time specifications. The selected experts may each analyze the measurement task specification and populate a respective candidate run-time specification, thereby producing one or more further populated candidate run-time specifications, where each respective candidate run-time specification comprises a possible partial or complete solution for the measurement task. The expert system may then calculate one or more metrics for each of the populated candidate run-time specifications, and select one of the populated candidate run-time specifications based on the calculated metrics. In one embodiment, for each respective populated candidate run-time specification comprising a partial solution, each selected expert may be operable to generate a respective new measurement task specification comprising an unsolved portion of the measurement task specification.

In one embodiment, if the analysis by a respective expert indicates that the expert cannot populate at least a portion of the respective candidate run-time specification, the respective expert may indicate to the expert system that it did not populate the candidate run-time specification for the measurement task specification. If the analysis by a respective expert indicates that the expert is operable to populate the respective candidate run-time specification, the expert may populate the respective candidate run-time specification, and communicate the respective candidate run-time specification to the expert system. If the analysis by a respective expert indicates that the expert is operable to populate only a first portion of the respective candidate run-time specification corresponding to a first portion of the generated measurement task specification, the expert may populate the first portion of the respective candidate run-time specification, communicate the first portion of the respective candidate run-time specification to the expert system, and submit a second portion of the respective measurement task specification to the expert system as a new, second measurement task specification, for which a respective candidate run-time specification portion was not populated.

The expert system may thus be further operable to receive and analyze the second measurement task specification, in the manner described above. For example, the expert system may be further operable to select and invoke one or more other experts to analyze the second measurement task specification and populate one or more second candidate run-time specifications, thereby producing one or more populated second candidate run-time specifications, where each respective second candidate run-time specification comprises a possible partial or complete solution for the measurement task. The expert system may then calculate one or more metrics for each of the second candidate run-time specifications, and select one of the second candidate run-time specifications based on the calculated metrics, wherein the selected populated second candidate run-time specification comprises at least a second portion of said run-time specification of the measurement task. In one embodiment, for each respective populated second candidate run-time specification comprising a partial solution, the expert may generate a respective new third measurement task specification comprising an unsolved portion of the second measurement task specification.

The expert system may be further operable to iteratively perform the above process on unsolved portions of the measurement task (or sub-tasks) until either the entire measurement task has been solved, or until the expert system determines that a solution may not be found subject to the current system resources, i.e., until either a complete run-time specification is populated, or the expert system determines that population of the complete run-time specification is not possible. The expert system may then operate to select a run-time specification from the candidates based on user specified and/or system-specified metrics. Thus, in performing the iterative process, each of the one or more experts is operable to analyze at least one of the unsolved measurement sub-task specifications, populate at least one of the one or more respective candidate run-time specifications, thereby producing at least one populated respective candidate run-time specification, where each populated respective candidate run-time specification comprises a partial or complete solution for said at least one of the unsolved measurement sub-task specifications. Additionally, for each populated respective candidate run-time specification comprising a partial solution, each expert may generate a new, fourth respective measurement task specification, where the new, fourth respective measurement task specification comprises an unsolved portion of the unsolved measurement sub-task specification. In this manner, the expert system may recursively apply one or more experts to solve the measurement task specification and generate a complete solution in the form of a run-time specification, as described above.

In one embodiment, the system may further include a storage system which is operable to store an expert registry. The expert registry may include information correlating each expert with aspects of one or more respective measurement tasks, and selection of the one or more experts may be performed based on the expert registry.

As mentioned above, the plurality of experts may include one or more of device experts, channel experts, timing experts, reader/writer experts, control experts, and streaming experts, among others, where each expert is responsible for managing different aspects of the measurement task specification.

Figure 26:
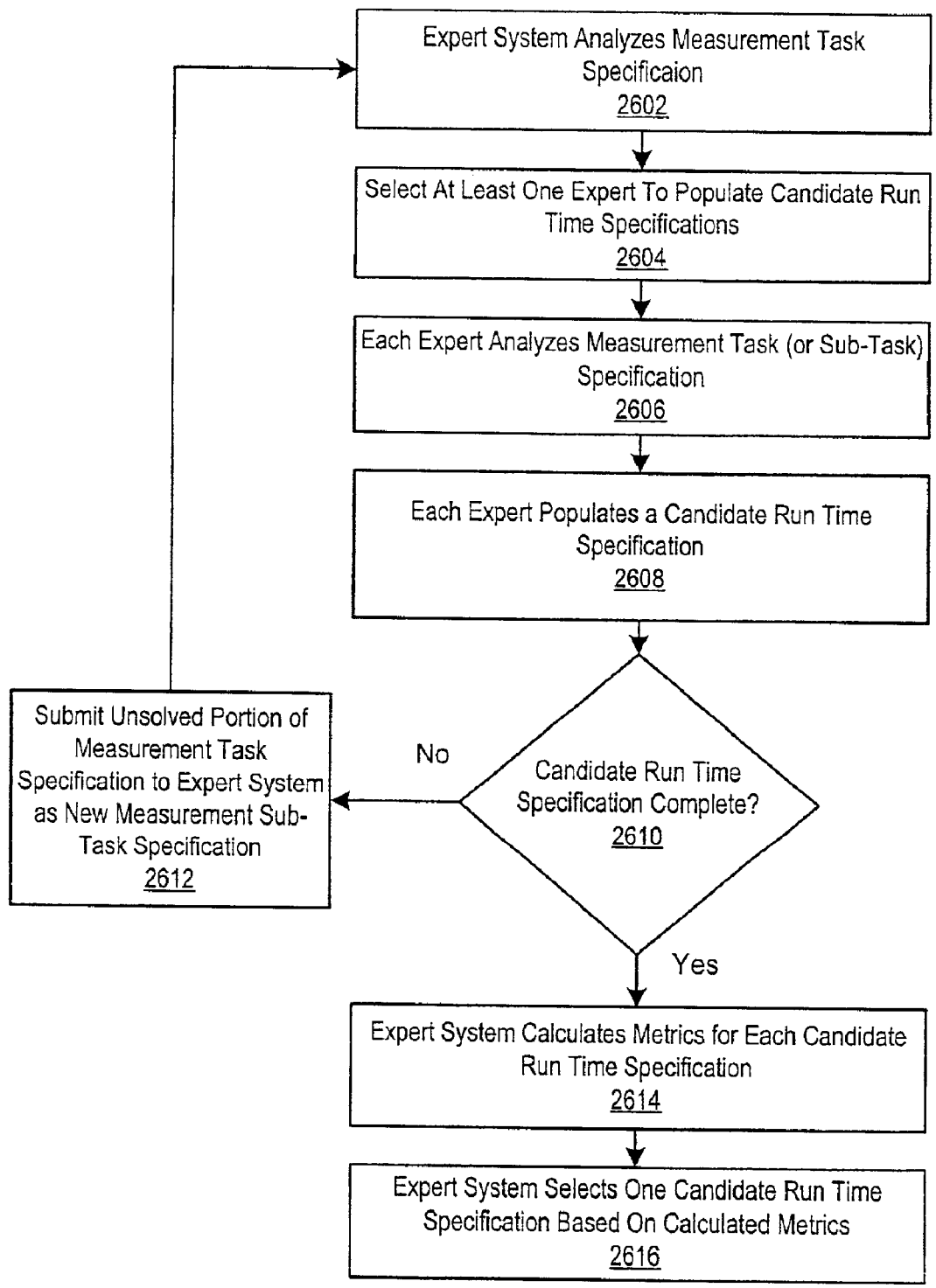
FIG. 26 flowcharts a run-time specification generation process performed by the expert system, according to one embodiment.

FIG. 26—Generation of the Run-Time Specification with the Expert System

FIG. 26 is a flowchart diagram illustrating one embodiment of a method for creating a run-time specification from a received measurement task specification 740 as implemented by the expert system 750. As FIG. 26 shows, in 2602, the expert system 750 may analyze the received measurement task specification 740 to determine specific measurement processes which may be implemented to accomplish the measurement task. In one embodiment, the measurement task specification 740 may be analyzed to determine various constituent sub-tasks of the measurement task. In one embodiment, the analysis performed by the expert system 750 may also include verifying or validating the measurement task specification 740. In other words, the expert system 750 may confirm that the specified measurement task may be performed by the available system components or resources.

In 2604, in response to the above-mentioned analysis, the expert system 750 may select one or more experts to populate candidate run-time specifications. As mentioned above, each of the one or more experts may be selected based upon properties of the measurement task specification. In one embodiment, there may be more than one way to implement the measurement task, in which case multiple experts may be selected to populate competing candidate run-time specifications, or, as described below, a given expert may populate multiple run-time specifications. In one embodiment, the overall measurement task may be divided into one or more constituent sub-tasks and parceled out to respective experts for population of the respective candidate run-time specifications, as described below.

In 2606 each of the one or more selected experts may analyze the measurement task (or measurement sub-task) specification. In one embodiment, each of the one or more selected experts may analyze the measurement task (or measurement sub-task) specification to verify that it is capable of "solving" the measurement task (or sub-task) problem, i.e., is capable of populating the run-time specification for that measurement task (or sub-task).

In 2608, each expert may populate one or more candidate run-time specifications in response to the analysis of 2606. In one embodiment, if the expert has determined from the analysis that only a portion of the measurement task (or sub-task) may be solved by that expert, then the expert may partially populate a solution for that task (or sub-task), i.e., may partially populate a candidate run-time specification corresponding to the solvable (by that expert) portion of the measure task (or sub-task). Previously, the run-time specification, which the expert is populating, may have been partially populated by another expert in a previous iteration of this method. As mentioned above, the candidate run-time specification may comprise software objects or data structures, such as C++ objects, which may specify the run-time parameters for software and/or hardware used to implement the measurement task.

In 2610, a determination may be made as to whether the generated candidate run-time specification is complete, i.e., whether the submitted measurement task (or sub-task) has been solved by the expert system 750. Said another way, the candidate run-time specification may be assessed for completeness.

As indicated in 2612, if the candidate run-time specification is determined to be incomplete, the unsolved portion of the measurement task specification 740 and the corresponding partially populated run-time specification may be submitted to the expert system 750 as a new measurement task problem. As FIG. 26 shows, the method may then proceed as described above with reference to 2602–2610 in an iterative fashion, until the candidate run-time specification is complete, i.e., until the submitted measurement task (or sub-task) has been solved, or until the solution fails, i.e., is determined to be unsolvable using the available resources. It should be noted that in some embodiments multiple iterations may be made by this method, decomposing the measurement task into sub tasks, one or more sub tasks into further sub tasks, and so on, such that multiple layers of experts collaborate to populate a set of candidate run-time specifications.

In 2614 the expert system 750, which may receive multiple competing candidate run-time specifications, may calculate one or more metrics for each candidate run-time specification. Examples of calculated metrics for a given candidate run-time specification may include cost, performance, resource use, or any other metric which quantifies a desirable (or undesirable) aspect of the solution. Thus, depending upon the user's preferences, each candidate solution may be assessed for desirability.

Finally, in 2616 the expert system 750 may select one candidate run-time specification based on the calculated one or more metrics and the user's preferences. In the preferred embodiment, the calculated metrics reflect the prioritization by the user of various aspects of the solutions, as mentioned above with reference to 2614 above. For example, if the user wishes to implement a solution optimized for performance, then the expert system 750 may be configured to select a candidate run-time specification which favors the performance metric, such that the solution is optimal with respect to performance. For example, an optimal solution may extremize (maximize or minimize) a particular performance metric, e.g., minimize execution time.

Thus, the method may provide a measurement task implementation which accommodates the user's priorities subject to the resource constraints of the system. In one embodiment, the expert system 750 may be invoked during the verify transition from the unverified to verified states, as illustrated in FIG. 9, above. Additionally, the expert system 750 may be invoked before a new task is started for the first time. Finally, the expert system 750 may be invoked whenever a customer makes major modifications to a task specification and then starts that task. Conversely, in one embodiment, the expert system 750 may not be invoked in the following circumstances: upon loading of persisted task and run-time specifications; when recent task specifications and run-time specifications have been transparently cached by application development environment APIs; upon deployment of a run-time on an embedded system; and when attributes of a task specification are changed during execution via attribute accessors provided by the system. Attribute accessors may thus circumvent the need to invoke the expert system 750 for each modification to an attribute. In one embodiment, at least a subset of task specification attributes may be modified while the associated hardware is running, e.g., changing the gain on an arbitrary waveform generator. In one embodiment, at least a subset of task specification attributes may be modified between a stop and a re-start, e.g., changing analog triggering conditions on an MIO device.

As mentioned above, the measurements expert system 750 may be operable to compile the task specification 740 to produce the run-time specification 770. As also mentioned above, the expert system 750 may include a dynamic collection of measurements experts. The expert system 750 may interpret a customer's measurement task and use the measurements experts to explore possible solutions and compile the specification for the run-time optimized for the customer's measurement task. In one embodiment, the expert system 750 may reside and function between the ADE (Application Development Environment) APIs and the run-time, or measurements driver. It should be noted that the run-time, or measurements driver, is actually built by other components of the system, e.g., the run-time builder.

As mentioned above with reference to Expert System Embodiment #1, in one embodiment, a user may modify the measurement task specification incrementally using the task specifier. The expert system may subsequently incrementally recompile the modified measurement task specification, thereby updating the run-time specification. Changes to the run-time specification may then be deployed incrementally to reconfigure the run-time. These changes may include adding new primitive settings, modifying existing primitive settings, and removing primitive settings, among others.

In another embodiment, the expert system may analyze incremental changes made to the measurement task specification and populate one or more run-time specification change lists with measurement primitive settings. These change-lists may then be used to update the run-time specification in accordance with the measurement primitive settings. For example, in order to deploy, modify, and destroy primitive supervisors, an expert responsible for configuring a task may create a run-time specification change list. The run-time specification change list enables efficient reconfiguration of a run-time, in that experts add only those primitive settings which need to be added, modified, or removed from the run-time based on any incremental changes made by the user or customer. The run-time builder efficiently updates the pre-existing run-time based on this run-time specification change list.

In one embodiment, the primary architectural concepts of the expert system 750 may include measurement specification objects (MSO), registration and matching, a decision tree, a two-phase process, and solution builders. Measurement specification objects may comprise atomic objects in the form of data structures or software classes which reflect the primary concepts and collaborations of the measurements domain, providing a protocol for communication of new or modified problems between measurements experts. The use of these objects by the expert system 750 may enable complex solutions to be broken down into simpler components in a consistent way. Said another way, the MSOs may describe the customer's measurement task in a device-independent manner, and may also be operable to describe device-specific aspects of the task. In one embodiment, the MSOs may decouple the measurements API from the expert system 750.

The expert system 750 may help measurements devices work together in several ways. Measurements experts that perform automatic routing may be provided, and may be leveraged by any other measurements experts. Streaming experts may be provided to build streams involving multiple sources and destinations. Control experts may enable sequencing and may be able to create bridges between operating environments. By binding all of these measurements experts together, the MSOs may provide a means of specifying problems to be solved by other measurements experts. Measurements experts may therefore be able to specify new device-generic problems without any explicit knowledge of the device-specific measurements experts that might solve them.

One example of an MSO corresponds to a measurement. In one embodiment, a measurement MSO may comprise a phenomenon (i.e., a detectable signal), a terminal configuration, a desired resolution, a name, and one or more constraints. The particular values of these fields may thus specify a particular measurement. Measurement specification objects may be linked together to form a measurement task specification.

In one embodiment, each measurements expert may provide a registration specifying characteristics of problems it may be able to solve. The expert system 750 may then use the registrations to match a current problem to one or more experts. Matching may reduce the number of measurements experts invoked for each problem by not invoking measurements experts that have no possibility of solving a given problem.

In one embodiment, measurements experts may specify which types of problems they might be able to solve by using one of a set of matching patterns specified in a library. The library may define a finite number of general matching patterns representing the most common classifications of problems measurements experts solve. The library may allow developers to specify specific sub-classes of MSOs and attribute values which measurements experts can work with. For example, the registration for an E-series digitizer expert might specify all present value measurements of voltage phenomena on a specific set of terminals.

In addition to determining which measurements experts to invoke for a given problem, matchers may provide measurements experts with direct references to relevant MSOs, dramatically reducing the amount of code which measurements expert developers must write to verify whether a problem can be solved.

Thus registration and matching may function as a filtering mechanism to reduce the number of experts invoked to solve a particular problem, thereby increasing the performance of the expert system 750. Another benefit of this approach is a reduction in redundant expert verification code. One example of a registration for an MIO AI digitizer expert may include the following information:

1) present value measurement(s);
2) voltage phenomenon; and
3) terminal is valid and on an MIO device.

Thus, the MIO AI digitizer expert may be useful in solving problems involving present value measurements of a voltage phenomenon from an MIO device. When the expert system 750 encounters such a problem, task, or sub-task, this expert may be selected to help populate the run-time specification.

Figure 27:
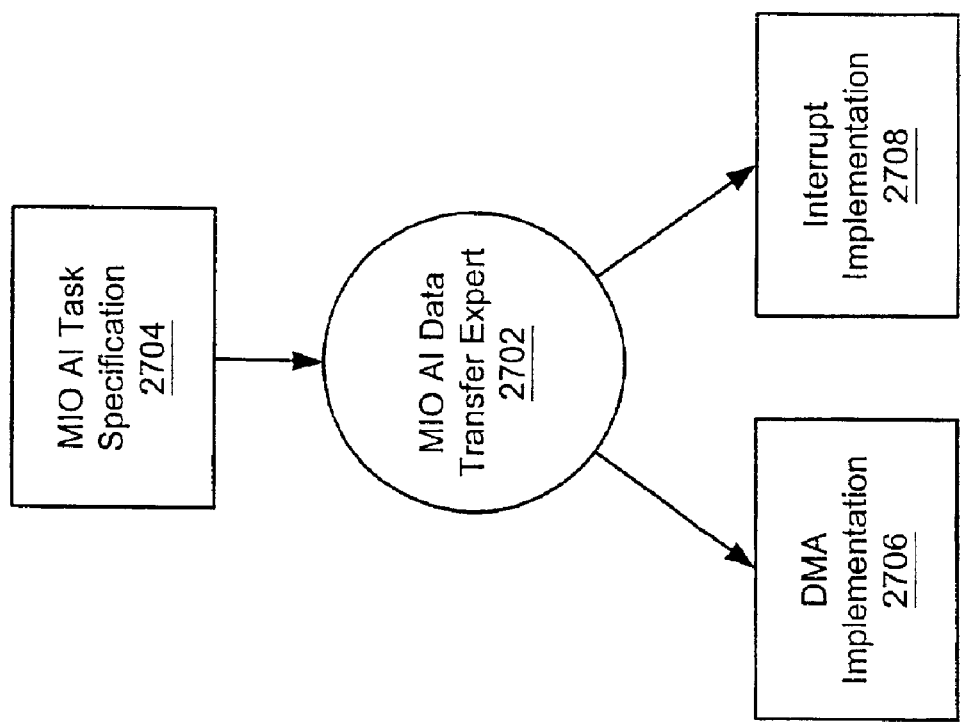
FIG. 27 illustrates a decision tree, according to one embodiment.

FIG. 27—Decision Tree

Selected experts may propose one or more decisions for how a particular problem can be solved. Each decision may comprise instructions for building one or more pieces of a final solution, as well as new sub-problems generated for other experts. When multiple decisions are provided by an expert, they may create a tree structure referred to as a decision tree, where each path from the root of the decision tree to a leaf (branch termination) may be considered one solution. The particular solution may be partial, complete, or a failed solution. FIG. 27 illustrates an example of a simple decision tree generated by an MIO AI data transfer expert, according to one embodiment. As FIG. 27 shows, the MIO AI data transfer expert 2702 may receive an MIO AI task specification 2704. The expert may propose more than one solution to the problem represented by the specification. In this example, the expert proposes both DMA (direct memory access) 2706 and interrupt-driven 2708 implementations for transferring data from an MIO device. It should be noted that more complex tree structures with multiple nodes and branches may also be generated. Note also that, because experts may be applied to sub-problems or sub-tasks, multiple decision trees (associated with the subtasks of a larger task) may be assembled into larger, more complex trees corresponding to the overall task or problem solution.

Size and growth of decision trees may be controlled by several mechanisms. Because measurements problems are specified using terminals tied to specific devices, the expert system 750 may attempt to solve each problem using only hardware explicitly specified by the customer. The expert system 750 may also attempt to identify sub-problems which are independent, eliminating the need for the decision tree to contain all permutations of these sub-problems. In order to further control the growth of the decision tree, the number of decisions proposed by each measurements expert may be limited. In other embodiment, advanced heuristics may be utilized for prioritization, which may enable the expert system 750 to handle larger decision trees, thereby increasing versatility and accuracy of solutions.

As mentioned above, in the preferred embodiment, a primary aspect of the expert system 750 is a two-phase approach to generation of the run-time specification. The two phases may comprise a solving phase, and a building phase. In the solving phase experts may be matched to problems, proposing new decisions and expanding the decision tree for a given problem, as described above. The expert system 750 may then select a solution from among the possible solutions represented by the decision tree. Once a solution has been selected by the expert system 750, then, in the building phase, solution builders for that solution may be invoked to assemble the run-time specification and finalize the task specification.

Experts may deploy any number of solution builders to each proposed decision. In one embodiment, solution builders for a particular solution may be executed only if that solution is selected by the expert system 750. Each solution builder may add to the run-time specification and/or finalize attributes in the task specification. In one respect, the use of the solution builders may be considered an optimization technique, in that the processing of the run-time specification may be performed only for the final solution. However, in another respect, the use of solution builders may be considered a necessity because it may not be possible to generate some portions of the run-time specification until the results of other experts are known.

One example of a solution builder is an MIO AI digitizer solution builder. In one embodiment, the MIO AI digitizer solution builder may be operable to add settings to the run-time specification for an MIO configuration FIFO, such as gain, polarity, channel, mode, dither, etc. The MIO AI digitizer solution builder may also be operable to set input limit attribute in the task specification.

Figure 28:
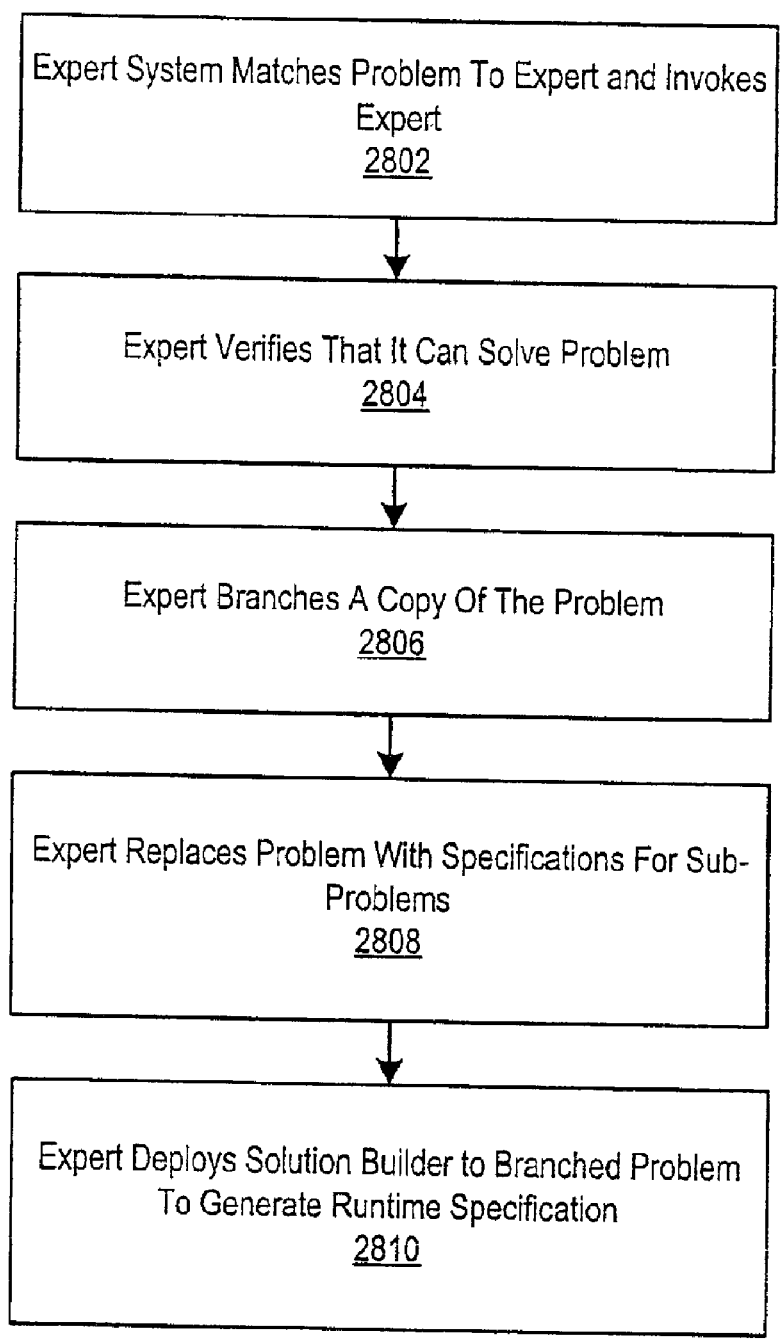
FIG. 28 flowcharts the processing of a measurement problem by the expert system, according to one embodiment.

FIG. 28—Expert Walk-Through: MIO AI Digitizer Expert

FIG. 28 flowcharts the processing of a measurement problem by the expert system 750, according to one embodiment. As one example of the use of a measurement expert, the expert system 750, upon analyzing a measurement task specification 740 specifying a present value measurement of a voltage phenomenon on an MIO AI terminal, may match the task to the MIO AI digitizer expert, thereby invoking the MIO AI digitizer expert, as indicated in 2802.

Once invoked, in 2804, the MIO AI digitizer expert may verify that it can solve the problem, e.g., may verify that the voltage phenomenon is within a valid range.

After the expert has verified that it may be able to solve the problem, then in 2806 the expert may branch a copy of the problem, also known as a decision (see the description of a decision tree above). As mentioned above, each decision may comprise instructions for building pieces of a final solution, as well as new sub-problems generated by other experts. A copy of the problem or decision may be used because other experts may also provide solutions to the same problem.

In 2808, the expert may replace the branched problem with specifications for sub-problems. In other words, the expert may decompose the problem into various sub-problems. These sub-problems may not only comprise a decomposition of the problem, but may also comprise alternative solutions paths for the problem, as illustrated by FIG. 27 above. Thus, the problem may be replaced by a combination of solution specifications (partial solutions) and sub-problem specifications, which then may be re-submitted to the expert system 750 for solution by other experts. For example, the MIO AI digitizer expert may replace the present value measurement of a voltage phenomenon on an MIO AI terminal specification with specifications for a timing sub-problem, a data transfer sub-problem, and a linear scaling streaming sub-problem.

Finally, in 2810, the expert may deploy a solution builder to the branched decision. As noted above, in one embodiment, the solution builder may not be deployed unless the decision is selected by the expert system 750. The deployed solution builder may assemble or add to the run-time specification and/or finalize attributes in the task specification.

In one embodiment, experts may be organized into sub-architectures, or groups of experts which are dependent upon each other and designed to collaborate to solve a specific type of problem. Sub-architectures may be loosely coupled to one another, facilitating re-use and flexibility. A problem may generally flow between sub-architectures as portions of the problem are solved. Said another way, particular portions of a problem may typically be solved by a sub-architecture of experts specializing in solving that type of problem (portion). Examples of sub-architectures may include routing experts, streaming experts, and device experts, among others.

Thus, the measurements expert system 750 may interpret a customer's specified measurements task, explore possible solutions, and compile a specification for a run-time optimized for the customer's measurement task. As noted above, in one embodiment, the run-time specification may be used by the run-time builder to build and link a run-time, which may then be executed to perform the specified measurement task, as described above.

FIGS. 29–37—Further Examples of Expert System Applications

FIGS. 29–37 illustrate various examples of problem solving using the expert system 750 described above, including "run-time" configuration scenarios, "out-of-the-box" configuration scenarios, and "point-of-sale" configuration scenarios. These examples are meant to be illustrative and are not intended to limit the domain or manner of use of the present invention.

Figure 29:
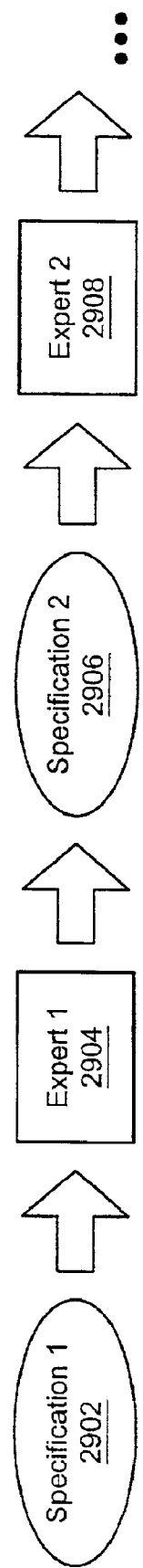
FIG. 29 is a flow diagram of a generic expert solution process, according to one embodiment.

FIG. 29—Generic Expert Flow Diagram

FIG. 29 is a flow diagram of a generic expert solution process, according to one embodiment. As FIG. 29 shows, a first specification 2902 may be submitted to a first expert 2904, in the manner described above with reference to FIGS. 26–28, according to one embodiment. The expert 2904 may analyze the specification 2902 and generate a partial solution in the form of a second specification 2906 comprising constituent sub-problems of the original specification 2902. The second specification 2906 may then be submitted to a second expert 2908, as shown, which may similarly analyze the second specification 2906 and generate a respective partial solution, an so on, until the solution is complete or fails. It should be noted that in one embodiment, there may be several experts applied to a given problem or sub-problem (specification). Thus, each expert may analyze a received specification, solve a portion of the specification, where the portion may range from 0% to 100%, then re-submit a new specification comprising the unsolved portion in the form of one or more sub-problems to the expert system 750 for further processing by other experts.

Figure 30:
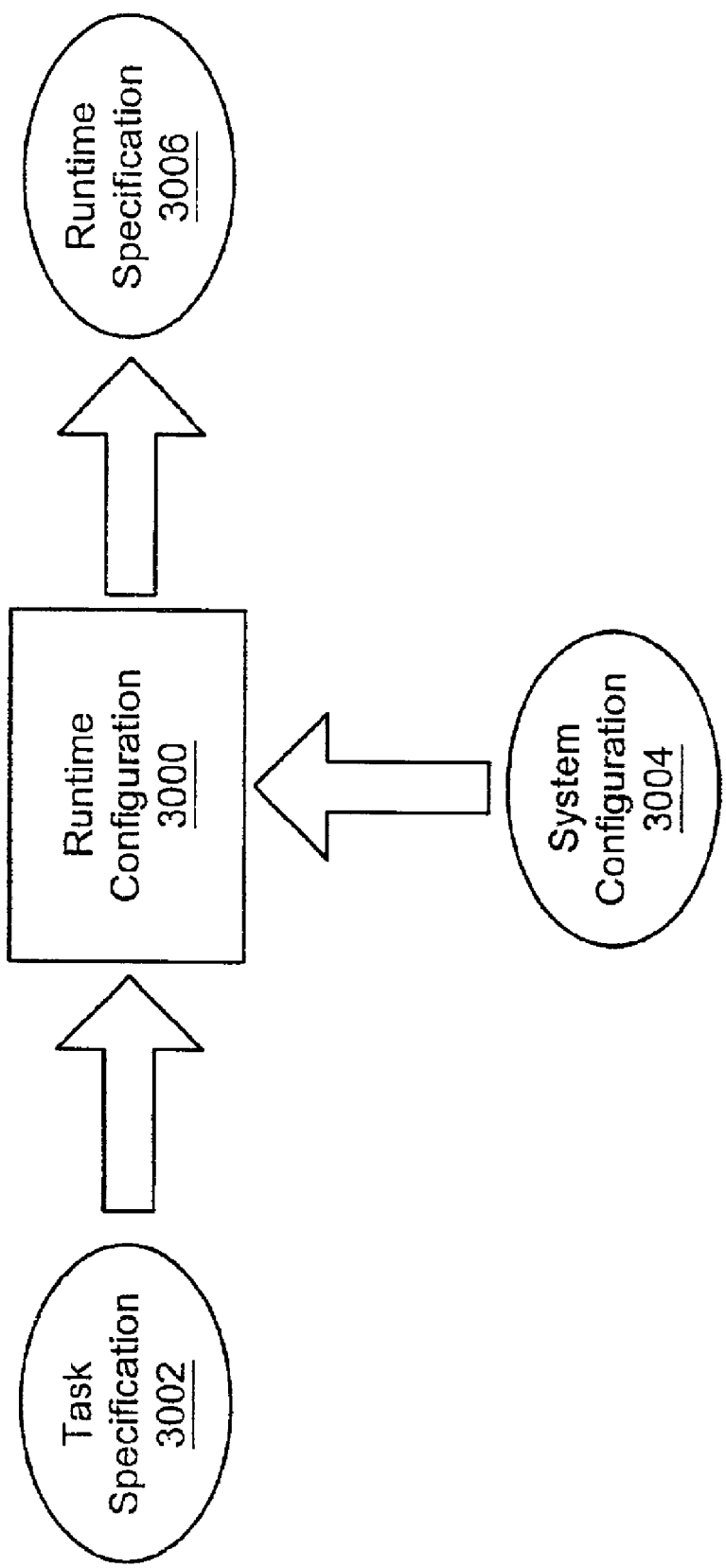
FIG. 30 is a block diagram of a run-time configuration process, according to one embodiment.

FIG. 30—Run-Time Configuration Diagram

FIG. 30 is a block diagram of a run-time configuration process 3000, according to one embodiment. The run-time configuration process relates to scenarios where the customer has already acquired and connected hardware for the measurement task. As FIG. 30 shows, inputs to the run-time configuration process 3000 may include task specification 3002 and system configuration 3004, described above. The output may comprise hardware and software settings in the form of the populated run-time specification 3006.

Example: Routing

One example of the use of the run-time configuration process involves a routing sub-problem as part of a larger measurement task. In this example, the presented problem includes routing an acquisition timebase signal on a first device (device 1) to an acquisition timebase signal on a second device (device 2) to synchronize the two devices for a 1 MHz acquisition.

The corresponding routing task specification may be summarized thus: connect terminal "device1/timebase_out" to "device2/timebase_in". Additional information in the specification may include the fact that the terminal "device1/timebase" is a single-ended TTL digital signal with a bandwidth of 1 MHz.

Figure 31:
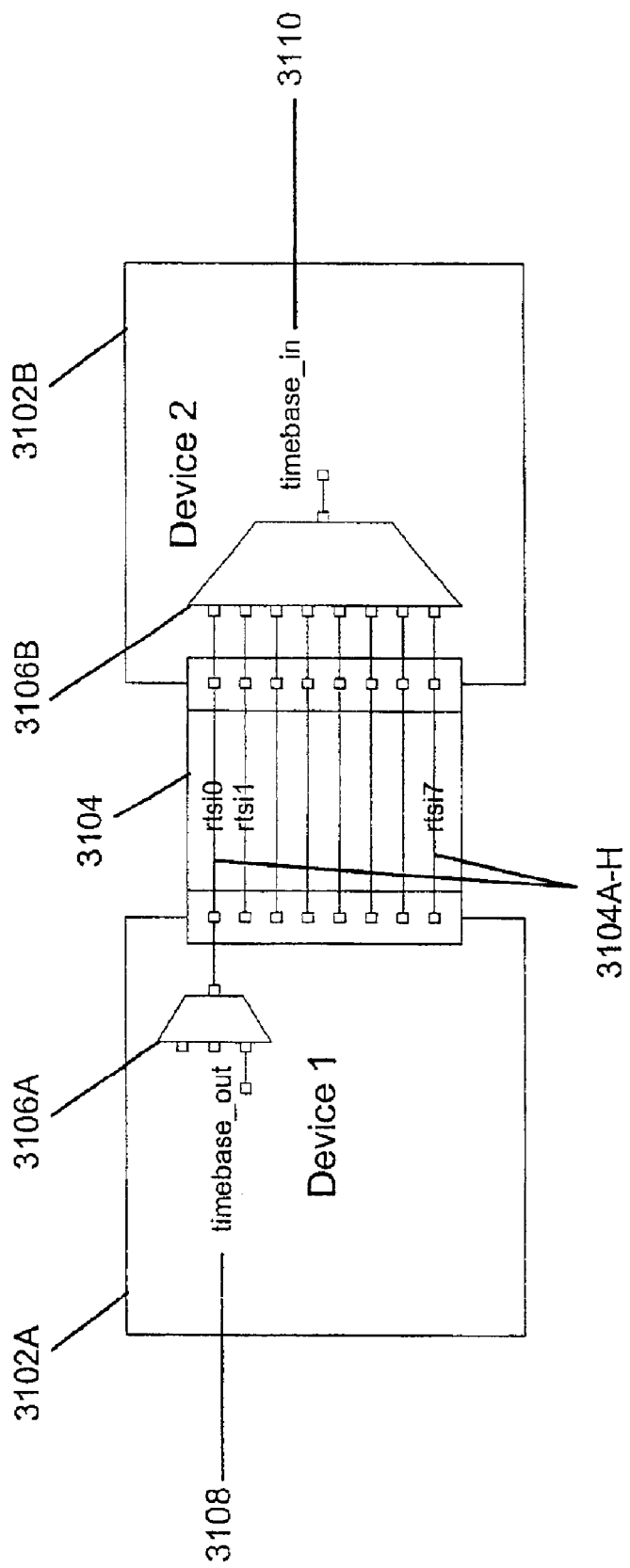
FIG. 31 is a topography diagram for a routing task, according to one embodiment.

FIG. 31—Topography Diagram for Routing Task

FIG. 31 is a topography diagram for the routing task described above. As FIG. 31 shows, device 1 3102A may be operable to communicate with device 2 3102B via a Real-Time System Integration Bus (RTSI) 3104, which may provide support for sending and receiving synchronization signals between devices. In this embodiment, the RTSI bus may comprise a plurality of RTSI lines, e.g., 8 lines designated RTSI0–RTSI7 3104A–H. In one embodiment, device1 3102A may be operable to send the timebase_out signal 3108 through MUX 3106A to the timebase_in 3110 of device2 3102B via line RTSI0 of the RTSI bus 3104, through MUX 3106B, as shown. In one embodiment, the system may include more than one RTSI bus, and so the RTSI bus 3104 shown may be designated as RTSIbus0, and a particular line on the bus, e.g., line 0, as RTSIbus0/RTSI0.

Figure 32:
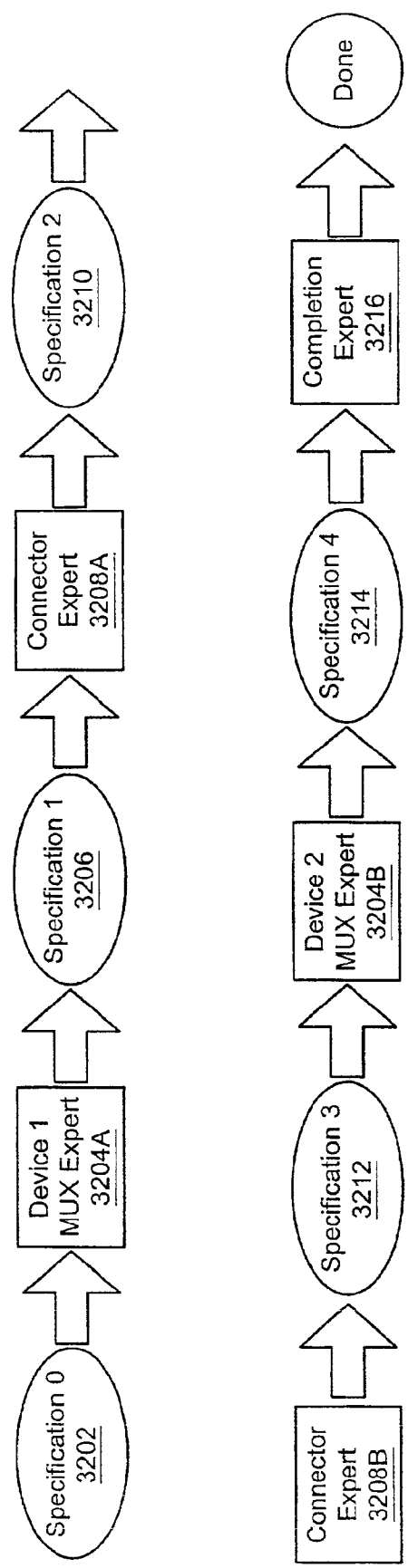
FIG. 32 illustrates solution steps for solving the routing task of FIG. 31, according to one embodiment.

FIG. 32—Solution Steps Diagram for Routing Task

FIG. 32 illustrates solution steps used by the system to solve the routing task specification described above, according to one embodiment. As FIG. 32 shows, the original submitted specification, denoted by Spec0 3202, may be submitted to a first measurements expert, such as a device 1 MUX expert 3204A (i.e., an expert responsible for the multiplexers of device 1). The device 1 MUX expert 3204A may analyze the Spec0 3202 and generate Spec1 3206 as a partial solution to the routing task. Note that Spec1 3206 may comprise a new sub-task specification for unsolved portions of Spec 0 3202. Spec1 3206 may in turn be submitted by the expert system 750 to a connector expert 3208A which may analyze Spec1 3206 and generate Spec2 3210, comprising a specification for unsolved portions of Spec1 3206. As further shown, Spec2 3210 may be submitted to a second connector expert 3208B which may analyze Spec2 3210 and generate Spec3 3212, comprising a specification for unsolved portions of Spec2 3210. Spec3 3212 may then be submitted to a device 2 MUX expert 3204B which may generate Spec4 3214. Spec4 3214 may be submitted to a completion expert 3216 which may be operable to finalize the generated solution to the measurement task.

In one embodiment, the solution steps may respectively specify the following routing operations:

1) to route from "device1/RTSI0" to "device2/timebase_in";

2) to route from "RTSIbus0/RTSI0" to "device2/timebase_in";

3) to route from "device2/RTSI0" to "device2/timebase_in"; and 4) to route from "device2/timebase_in" to "device2/timebase_in".

Note that (1) is a sub-problem generated by the first MUX expert 3204A from the original specification or problem, which was to route from device1/timebase_out to device2/timebase_in. Similarly, (2) is a sub-problem generated by the first connector expert 3208A in response to (1), (3) is a sub-problem generated by the second connector expert 3208B in response to (2), and (4) is a sub-problem generated by the second MUX expert 3204B in response to (3). Finally, (4) may be recognized by the completion expert 3216 as atomistic, meaning that no further decomposition is needed, and so the solution is complete.

The generated solution (run-time specification) resulting from the above process may comprise hardware and software settings which facilitate the implementation of the specified measurement task. In one embodiment, the hardware and software settings may specify the following actions:

1) reserve RTSI0 on the connected RTSI bus;

2) program device 1's multiplexers to route from the external timbase output terminal to RTSI0; and 3) program device 2's multiplexers to route from RTSI0 to the external timebase input terminal.

Thus, various routing experts, including multplexor (MUX) experts, intercomponent connector experts, bus experts, and a completion expert may collaborate to decompose the original problem (specification) and generate a plurality of partial solutions which together may comprise a solution to the measurement problem.

Example: Multi-Device Synchronization

Another example of the use of the run-time configuration process relates to acquiring synchronized analog voltage data from two devices, device 1 and device 2 at 1 MHz. The received task specification corresponding to this measurement task may specify continuous acquisition of two present value voltage measurements on differential terminal "device1/ai0" and differential terminal "device2/ai0" at a sample rate of 1 MHz, and, in one embodiment, may include additional information indicating that the user will generate software start and stop events.

Figure 33:
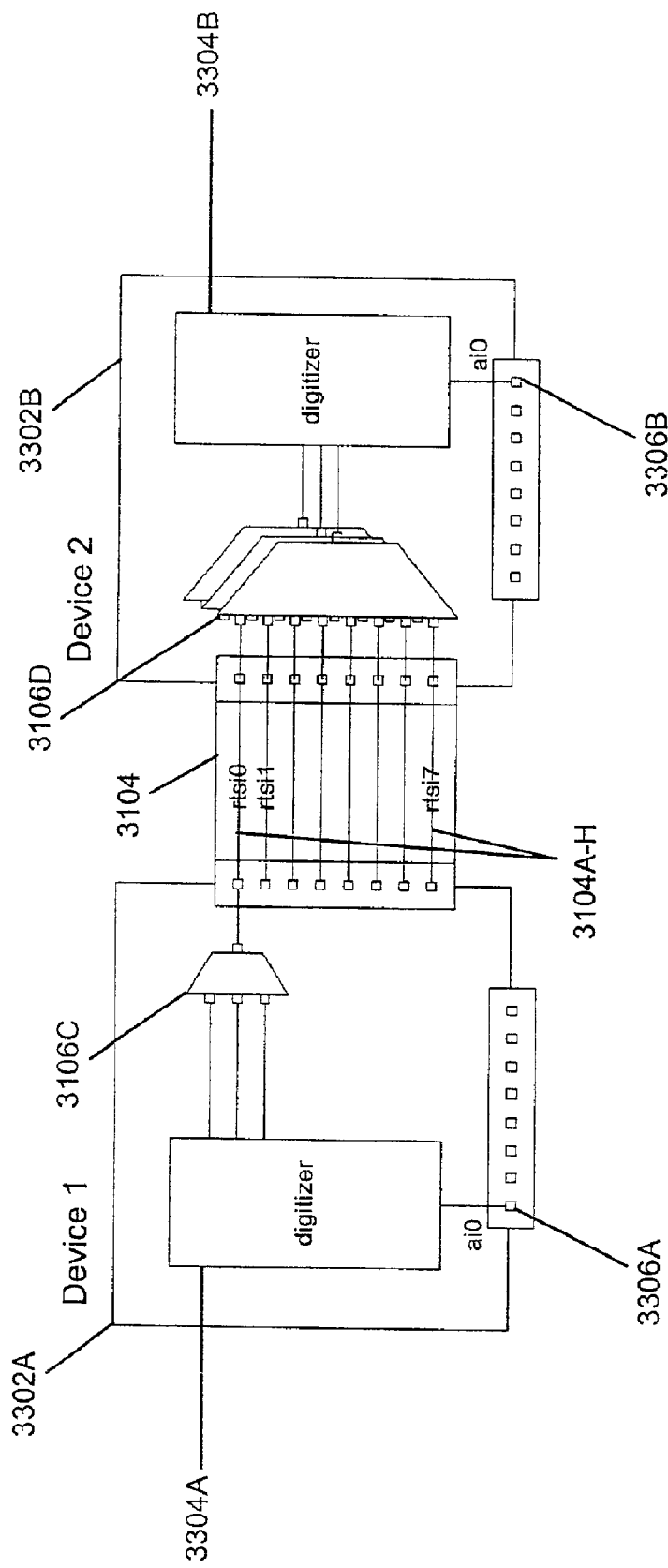
FIG. 33 is a topography diagram for a synchronization task, according to one embodiment.

FIG. 33—Topography Diagram for Synchronization Task

FIG. 33 is a topography diagram for the synchronization task mentioned above. As FIG. 33 shows, a device 1 3302A comprising a first digitizer 3304A coupled to a first analog input (AI) AI0 3306A may couple to a second device 3302B via an RTSI bus 3104, wherein device 2 3302B comprises a second digitizer 3304B coupled to a second analog input (AI) AI0 3306B. As shown, in one embodiment, the RTSI bus 3104 may comprise a plurality, e.g., 8, RTSI lines RTSI0–RTSI7 3104A–H. As FIG. 33 also shows, digitizer 3304A may be operable to receive analog input from AI0 3306A, and may be further operable to send start, stop, and sample control signals through RTSI0 3104A on the RTSI bus to device2 3302B. More specifically, the digitizer 3304B comprised in device2 3302B may be operable to receive the control signals and perform data acquisition from AI0 3306B accordingly.

Figure 34:
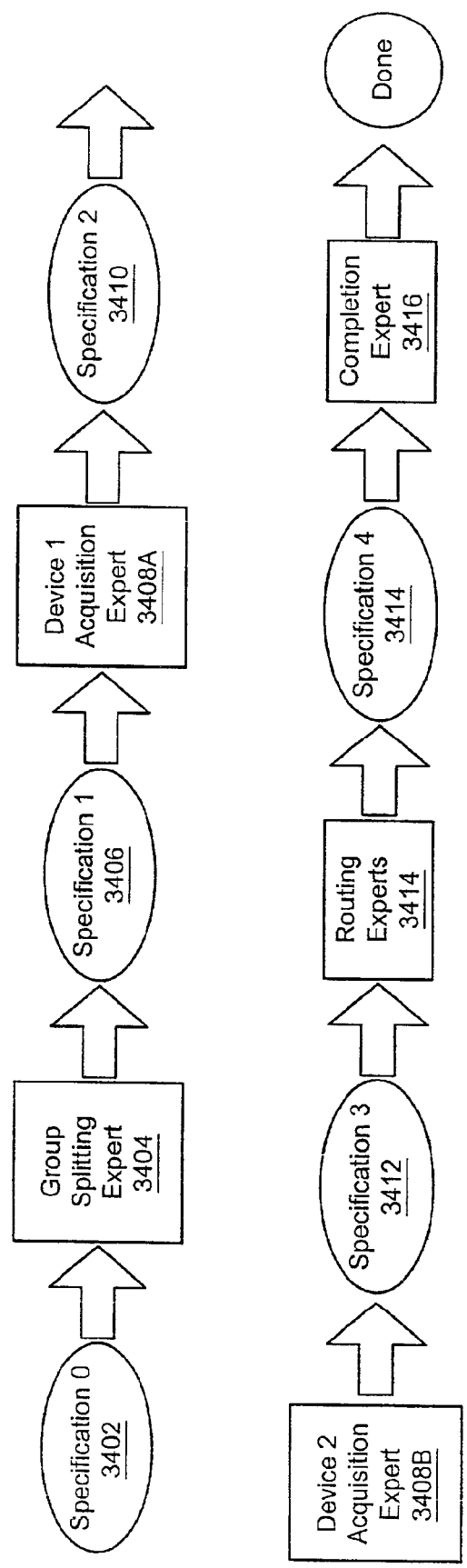
FIG. 34 illustrates solution steps for solving the synchronization task of FIG. 33, according to one embodiment.

FIG. 34—Solution Steps Diagram for Synchronization Task

FIG. 34 illustrates solution steps used by the system to solve the synchronization task specification described above, according to one embodiment. As FIG. 34 shows, the original submitted specification, denoted by Specification 0 3402, may be submitted to a first measurements expert, such as a group splitting expert 3404. The group splitting expert 3404 may analyze the Specification 0 3402 and generate Specification 1 3406 as a partial solution to the synchronization task. Note that Specification 1 3406 may comprise a new sub-task specification for unsolved portions of Specification 0 3402. Specification 1 3406 may in turn be submitted by the expert system 750 to a device 1 acquisition expert 3408A which may analyze Specification 1 3406 and generate Specification 2 3410, comprising a specification for unsolved portions of Specification 1 3406. As further shown, Specification 2 3410 may be submitted to a device 2 acquisition expert 3408B which may analyze Specification 2 3410 and generate Specification 3 3412, comprising a specification for unsolved portions of Specification 2 3410. Specification 3 3412 may then be submitted to one or more routing experts 3414 which may generate Specification 4 3416 comprising a specification for unsolved portions of Specification 3 3412. Completion expert 3418 may then analyze Specification 4 3416 and finalize a solution to the measurement task.

In one embodiment, the solution steps described above may operate to perform the following:

1) solve two groups of event specifications, one for each device (a master group and a slave group), with shared events between the two groups;

2) with the master group removed, solve 1 slave group, where the start, stop, and sample events are replaced with external trigger events generated by the master; and 3) solve three routing problems to route the external events from the master to the slave.

The generated solution (run-time specification) resulting from the above process may comprise hardware and software settings which facilitate the implementation of the specified synchronization task. In one embodiment, the hardware and software settings may specify the following actions:

1) reserve master and slave acquisition devices, and three RTSI lines;

2) program master to acquire a single channel, with software start and stop;

3) program master sample clock to 1 MHz;

4) program master to route acquisition start, stop, and sample signals to RTSI;

5) program slave to acquire a single channel and to receive start, stop, and sample signals from RTSI; and 6) when starting, arm slave before starting master (reverse this sequence when stopping).

Thus, various synchronization experts, including group splitting experts, device-specific acquisition experts, and device-specific timing experts, plus routing experts may collaborate to decompose the original problem (specification) and generate a plurality of partial solutions which together may comprise a solution to the measurement problem.

Example: Transparent Operation Of Accessories

Another example of the use of the run-time configuration process relates to transparent operation of accessories, e.g., acquisition of analog voltage data from all 32 channels of a switch using a scanning DMM (Digital Multi-Meter). The received task specification corresponding to this measurement task may specify continuous acquisition of two present value voltage measurements on differential terminals "device3/ai0:31" using "device1" as the measurement device, wherein "device 1" is a DMM, and "device3" is a scanning switch with 32 different channels.

Figure 35:
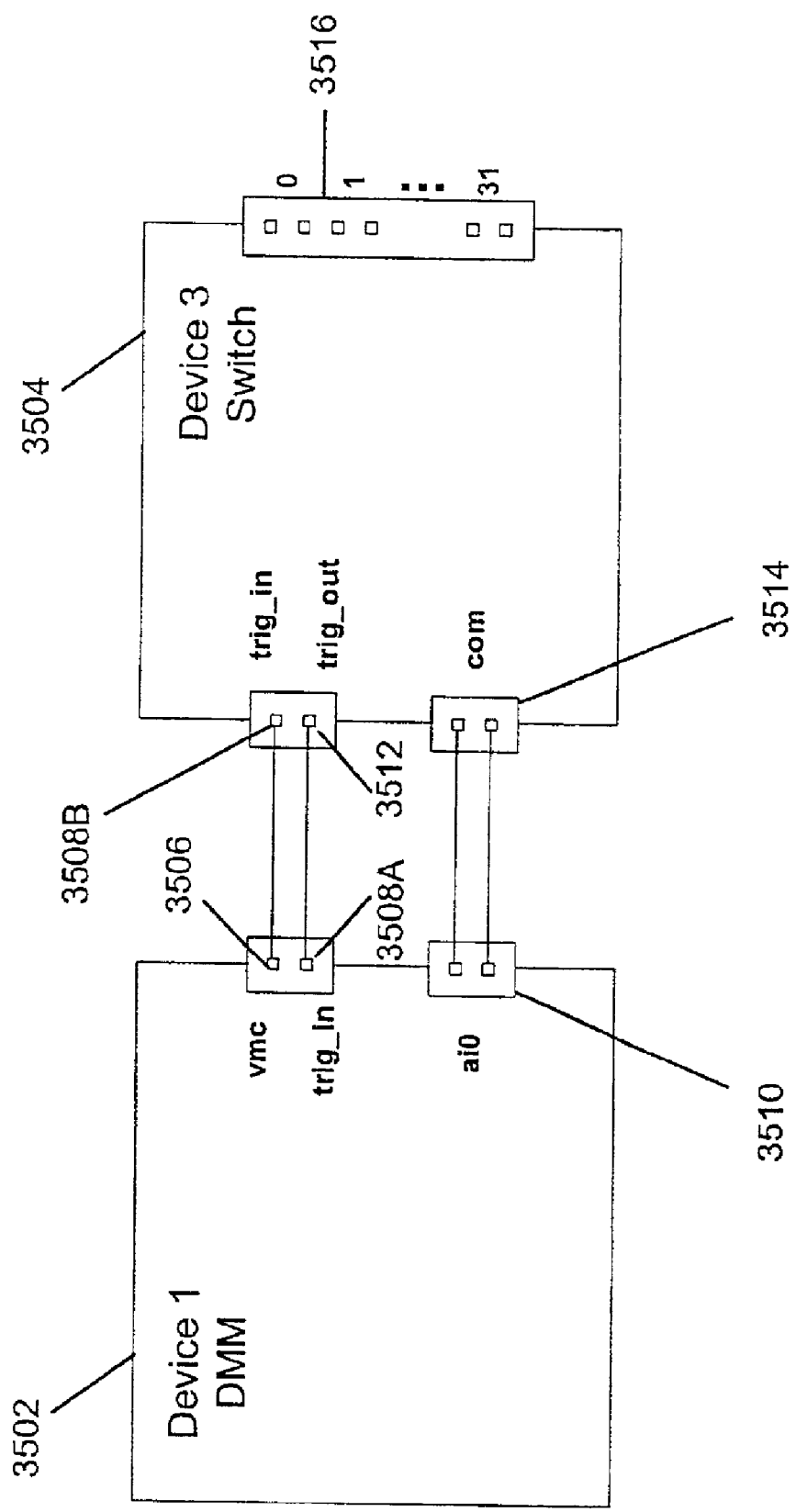
FIG. 35 is a topography diagram for a data acquisition task, according to one embodiment.

FIG. 35—Topography Diagram for Data Acquisition Task

FIG. 35 is a topography diagram for the data acquisition task mentioned above. As FIG. 35 shows, device 1 3502 (the DMM) may be coupled to device 3 3504 (the scanning switch). In one embodiment, the DMM 3502 may include connections for vmc_out 3506, trig_in 3508A, and an analog input AI0 3510. Note that the term "vmc" refers to "voltmeter complete", i.e., a signal indicating that a voltage measurement is complete. The scanning switch 3504 may include a trig_in 3508B coupled to the vmc_out 3506, a trig_out 3512 coupled to the trig_in 3508A, and corn connectors 3514 coupled to the AI0 3510, as shown. The scanning switch 3504 may also include a plurality of channels 0–31 3516 operable to present measurement data to the switch 3504. Note that the scanning switch 3504 may be operable to route signals from any of the channels to the corn connectors 3514 where the signals may be transmitted to the analog input AI0 3510.

Figure 36:
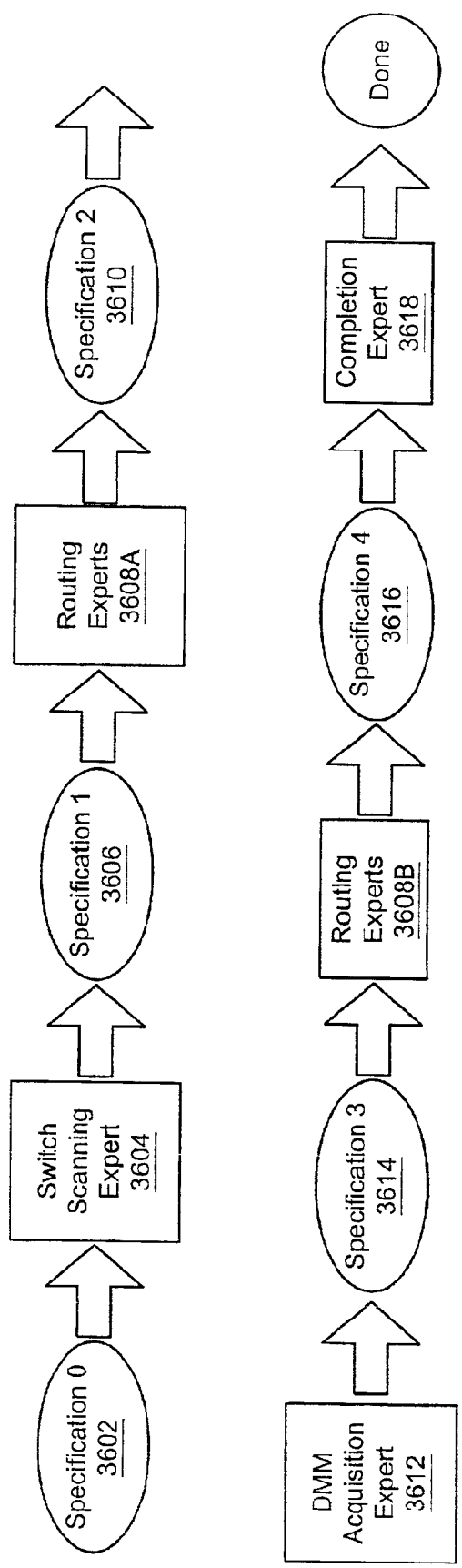
FIG. 36 illustrates solution steps for solving the data acquisition task of FIG. 35, according to one embodiment.

FIG. 36—Solution Steps Diagram for Data Acquisition Task

FIG. 36 illustrates solution steps used by the system to solve the data acquisition task specification described above, according to one embodiment. As FIG. 36 shows, the original submitted specification, denoted by Specification 0 3602, may be submitted to a first measurements expert, such as a switch scanning expert 3604. The switch scanning expert 3604 may analyze the Specification 0 3602 and generate Specification 1 3606 as a partial solution to the acquisition task. Note that Specification 1 3606 may comprise a new sub-task specification for unsolved portions of Specification 0 3602. Specification 1 3606 may in turn be submitted by the expert system 750 to one or more routing experts 3608A which may analyze Specification 1 3606 and generate Specification 2 3610, comprising a specification for unsolved portions of Specification 1 3606. As further shown, Specification 2 3610 may be submitted to a DMM acquisition expert 3612 which may analyze Specification 2 3610 and generate Specification 3 3614, comprising a specification for unsolved portions of Specification 2 3610. Specification 3 3614 may then be submitted to one or more routing experts 3608B which may analyze Specification 3 3614 and generate Specification 4 3616, comprising a specification for unsolved portions of Specification 3 3614. A completion expert 3618 may then analyze Specification 4 3616 and finalize a solution to the data acquisition task. It should be noted that routing experts 3608A and 3608B may or may not refer to the same routing experts.

The solution steps described above may operate to perform the following:

1) continuously acquire 32 present value voltage measurements all located on "device3/com" using "device1" as the measurement device, generating/receiving handshaking signals to/from "device3/trig_in" and "device3/trig_out";

2) same as (1), but measure on "device1/ AI0"; and 3) route from "device1/vmc_out" to "device1/trig_in" and from "device3/trig_out" to "device1/trig_in".

The generated solution (run-time specification) resulting from the above process may comprise hardware and software settings which facilitate the implementation of the specified data acquisition task. In one embodiment, the hardware and software settings may specify the following actions:

1) program a switch scanning FIFO (associated with the scanning switch 3504) to switch through channels 0 through 31 in sequence;

2) program the switch 3504 to advance on a trigger received on trig-in 3508B and to generate a signal on trig_out 3512 after each channel has switched; and 3) program the DMM 3502 to acquire 32 channels in a scan. The DMM 3502 should generate VMC on vmc_out 3506 and receive the scanner advanced trigger on trig_in 3508A.

In various embodiments, run-time configuration tasks may include many other measurement task solutions, including transparent operation of sensors, efficient distributed data streaming and run-time control, stream operations such as messaging and logging, scaling selection and optimization, pattern detection, analysis, and other measurement functions, as well as compiling a graphical diagram, such as a National Instruments LabVIEW diagram, for DAQ execution, among others.

Figure 37:
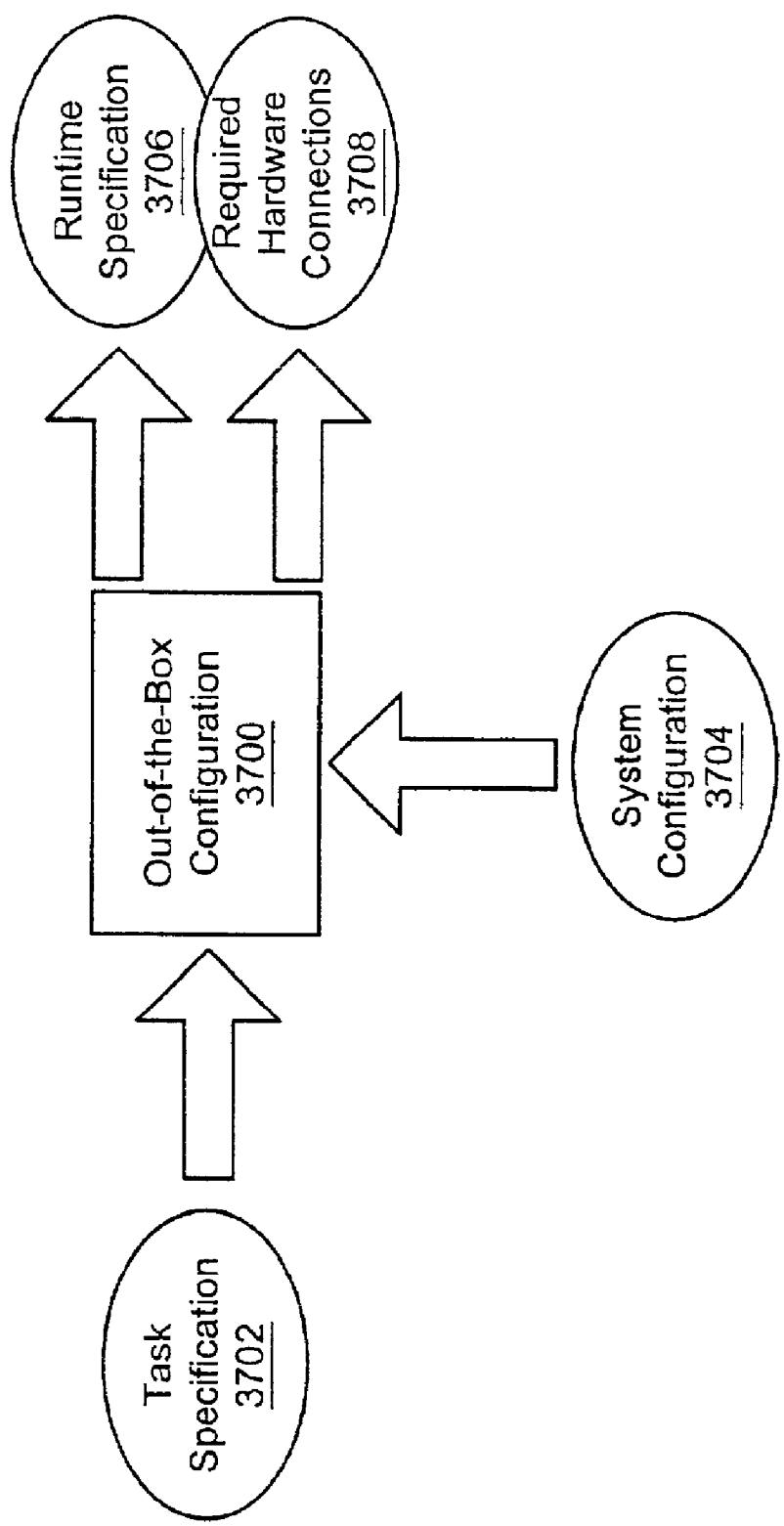
FIG. 37 is a block diagram of an out-of-the-box configuration process, according to one embodiment.

FIG. 37—Out-of-the-Box Configuration Diagram

FIG. 37 is a block diagram of an out-of-the-box configuration process 3700, according to one embodiment. Note that as used herein, the term "out-of-the-box configuration" refers to scenarios where the customer has already bought hardware for the measurement task, but has not configured or connected the hardware. As FIG. 37 shows, inputs to the out-of-the-box configuration process 3700 may include task specification 3702 and system configuration 3704, described above. The output may comprise hardware and software settings in the form of the generated run-time specification 3706, as well as required hardware connections 3708.

Example: Channel Selection

One example of an out-of-the-box configuration process relates to channel selection, i.e., choosing a device and terminal that can be used to take a measurement. In the preferred embodiment, the solution steps may proceed in a similar fashion to those presented in FIGS. 32, 34, and 36, described above, in that a series of experts may be utilized to solve a task specification to generate a run-time specification. In one embodiment, the task of channel selection may be solved by terminal selection experts and one or more run-time experts. For example, in one embodiment, a terminal selection expert may 1) match a group or sub-group within the task to available group expert registrations;

2) choose terminals specified in the group registration that are not currently in use; and 3) create a sub-problem that attempts to solve the group using the selected terminals.

In one embodiment, the system may provide a list of compatible channels to choose from. It should be noted that more expert registration information will typically facilitate a faster search.

Example: System Wizard

Another example of an out-of-the-box configuration process relates to a system wizard which may be operable to select terminals and connectors appropriate to a particular measurement task, according to one embodiment. In one embodiment, the experts invoked by the expert system 750 to solve this task may include terminal selection experts and connector selection experts, as well as various run-time configuration experts.

Figure 38:
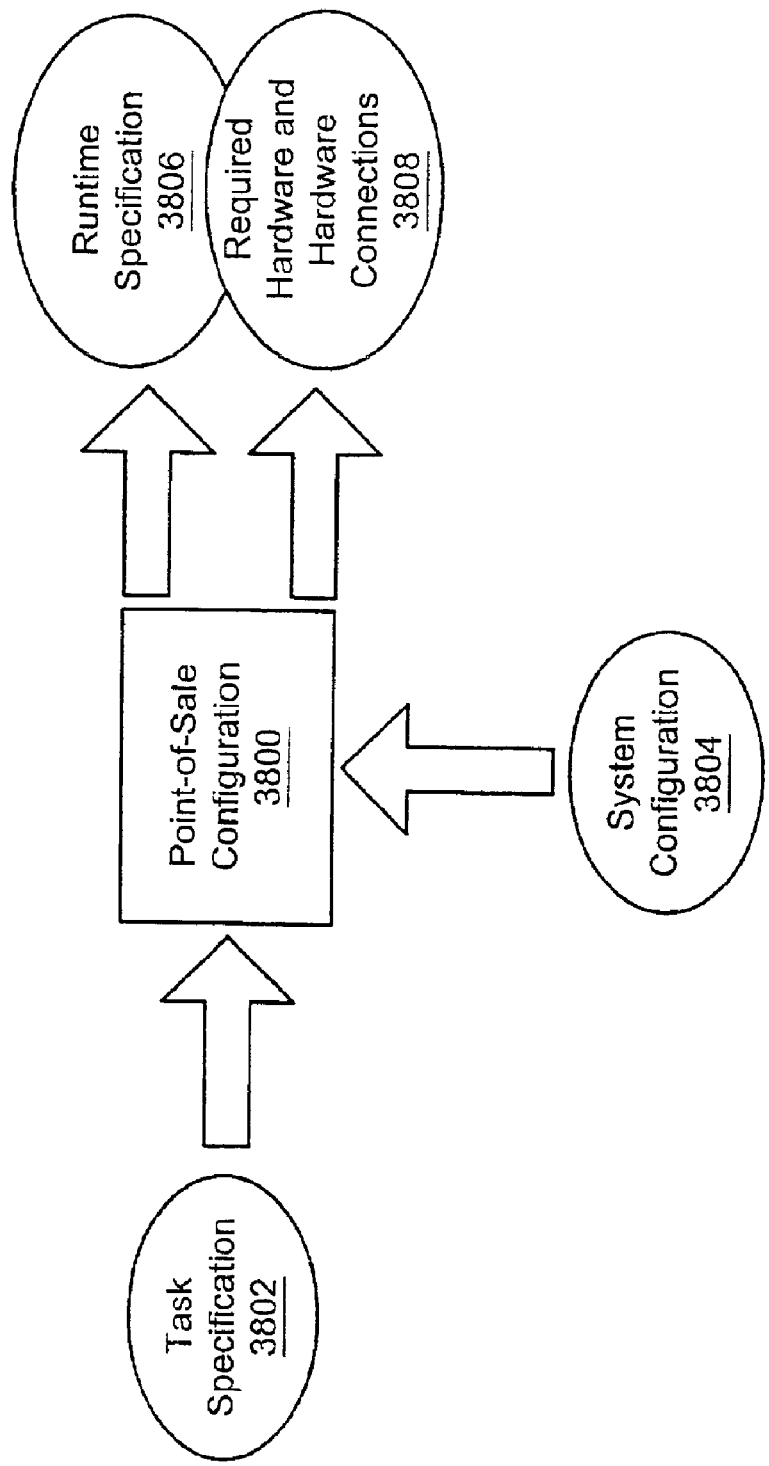
FIG. 38 is a block diagram of a point-of-sale configuration process, according to one embodiment.

FIG. 38—Point-of-Sale Configuration Diagram

FIG. 38 is a block diagram of a point-of-sale configuration process 3800, according to one embodiment. Note that, as used herein, the term "point-of-sale configuration" refers to scenarios where the customer has not acquired or connected hardware for the measurement task, i.e., the customer needs to know what hardware to buy and how to connect it to perform the desired measurement task. As FIG. 38 shows, inputs to the point-of-sale configuration process 3800 may include task specification 3802 and system configuration 3804, described above. The output may comprise hardware and software settings in the form of the generated run-time specification 3806, as well as required hardware and hardware connections 3808.

One example of a point-of-sale configuration system is a DAQ designer, such as National Instruments DAQ Designer system. In this embodiment of the invention, the system may be operable to select products and configure cables and connections for those products to perform a measurement task. For example, if many products are registered with the system, it may be problematic to select the appropriate suite of components to perform the measurement task. In one embodiment, the system may use prioritization and heuristics to direct a search for the components. In one embodiment, the search may be prioritized on desired throughput, acquisition latency, form-factor, and price, among other factors.

Example Solutions to Prior Art Issues

The following sections describe various solutions to a number of issues with some prior art systems, e.g., NI-DAQ 6.9, including performance issues, usability, and engineering efficiency.

Performance

As mentioned above, there are a number of performance related deficiencies in some prior art systems which are addressed by various embodiments of the present invention, described below.

State Model

One important omission of some prior art systems is that there is no state model for the system, resulting in uncoordinated resource management, e.g., resources may be reserved, programmed, and unreserved continuously due to the fact that current state information of the system is unavailable to system processes and components. For example, in an experiment involving one prior art measurement system, a Read One Scan task involved ten kernel transitions; calculating, verifying, and programming a scan list, timing, triggering, and dithering; calculating and verifying input limits multiple times; and checking accessories multiple times, for each read.

In contrast, in one embodiment of the present invention, a state model of the system may be defined and enforced, substantially eliminating unnecessary state transitions, and enabling customers to more finely control state transitions. For example, in one experiment, a single read task, e.g., an Acquire Single Voltage On Demand task, performed by one embodiment of the invention involved one kernel transition per read, and executed approximately twenty times faster than the prior art measurement system mentioned above.

Code Paths

Virtually any function or class-based software system involves program flow through layers of software, i.e., a code path. However, some prior art systems are designed for generality, and so for specific tasks, many layers are superfluous and inefficient. For example, in the prior art system mentioned above, a Read One Scan task involved hundreds of function calls in user-mode. Each traversal of a software boundary requires CPU cycles and stack operations, and so large numbers of these layers can degrade performance substantially.

In contrast, in one embodiment of the present invention, the system may construct code paths customized for the customer's task. For example, an Acquire Single Voltage On Demand task required less than ten function calls in user-mode for each read. Thus, by customizing code paths for the task at hand, improvements on the order of factors of ten may be achieved.

Threads and Polling

Some prior art measurement systems restrict program execution to a single thread, even when accessing different devices, e.g., simultaneous buffered analog input and single point digital output. Limiting execution to a single thread cannot only result in substantial inefficiencies, but can degrade functionality as well. For example, in a single-threaded measurement system, when a customer requests a data read on a device, the one thread continuously polls the device until the data is ready. This polling may, at times, completely consume the CPU resources (cycles), preventing other functions or tasks from being executed. For example, if the device is being polled in the kernel, the user interface may freeze because no CPU cycles are being allocated to the user interface.

In contrast, according to one embodiment of the invention, the measurement system may be multi-threaded, using asynchronous events instead of polling to manage processes and device accesses. In the above read example, the related thread may sleep until the data is available, at which time an event may be sent which awakens the thread. The use of multiple threads also allows other threads to perform processing while the measurement task, e.g., the read, is being performed. Thus, by utilizing multiple threads a plurality of tasks or sub-tasks may be performed simultaneously for greater efficiency and flexibility.

Example Virtual Instrument Diagrams

FIGS. 39A–45C described below illustrate various improvements of the present invention over some prior art systems. For illustrative purposes, Virtual Instruments (VIs) implemented in National Instruments LabVIEW™ graphical development environment are shown which use a variety of measurement devices, such as National Instruments E-SeriesT™ Data Acquisition (DAQ) devices, to implement various measurement tasks. It should be noted that these embodiments are for illustrative purposes only, and are not intended to limit the invention to any particular implementations or types of measurement devices.

Figure 39A:
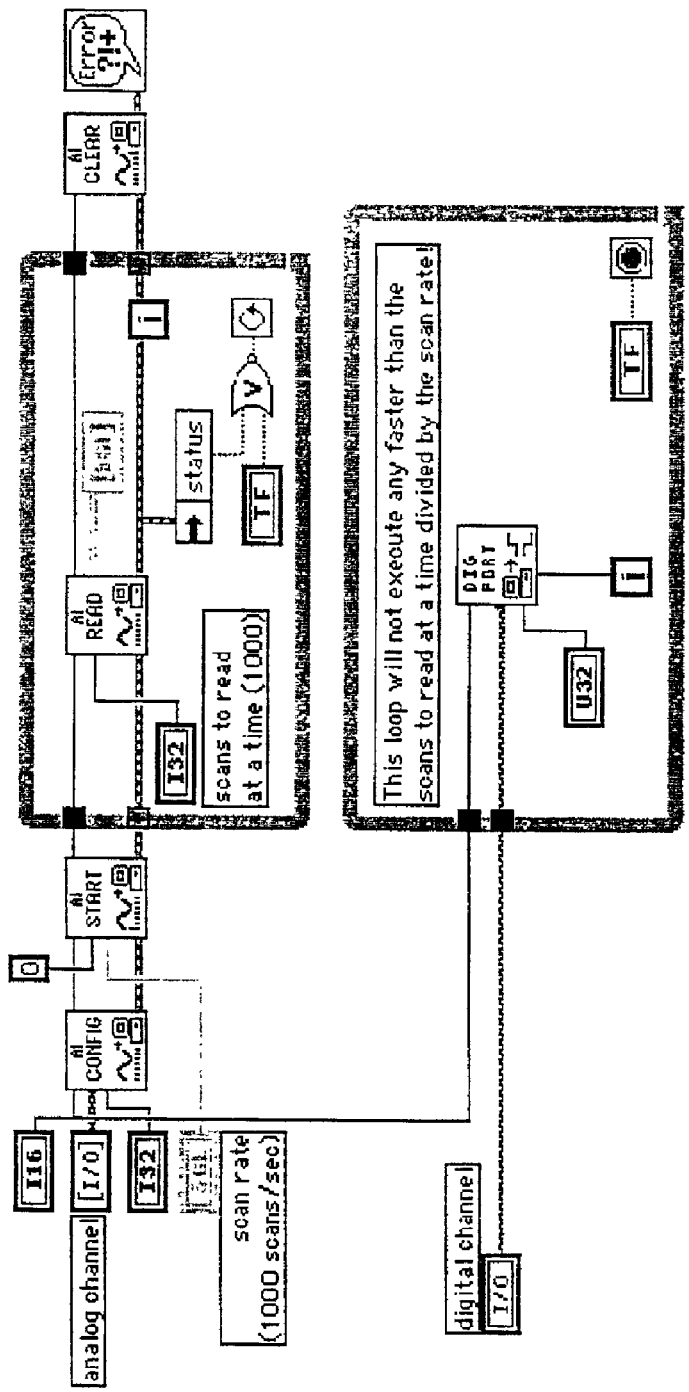
FIG. 39A illustrates a VI for simultaneous analog input and digital output with a single-threaded driver, according to the prior art.

FIG. 39A—Simultaneous Buffered Analog Input and Single-Point Digital Output with Single Threaded Driver (Prior Art)

FIG. 39A illustrates a VI implementing simultaneous buffered analog input and single-point digital output with a single-threaded driver, according to the prior art. In this system, multiple threads are not allowed to operate simultaneously, even if accessing different devices, thus, all VIs must run in the same thread. Thus, as shown in FIG. 39A, the single-point digital output loop performance is substantially limited by the buffered analog input process, in that the single point digital output loop will not execute any faster than the scans-to-read-at-a-time divided by the scan-rate, e.g., 1000 scans at a time/1000 scans per sec=1 sec), i.e., the digital loop speed is dependent upon the analog loop speed.

Figure 39B:
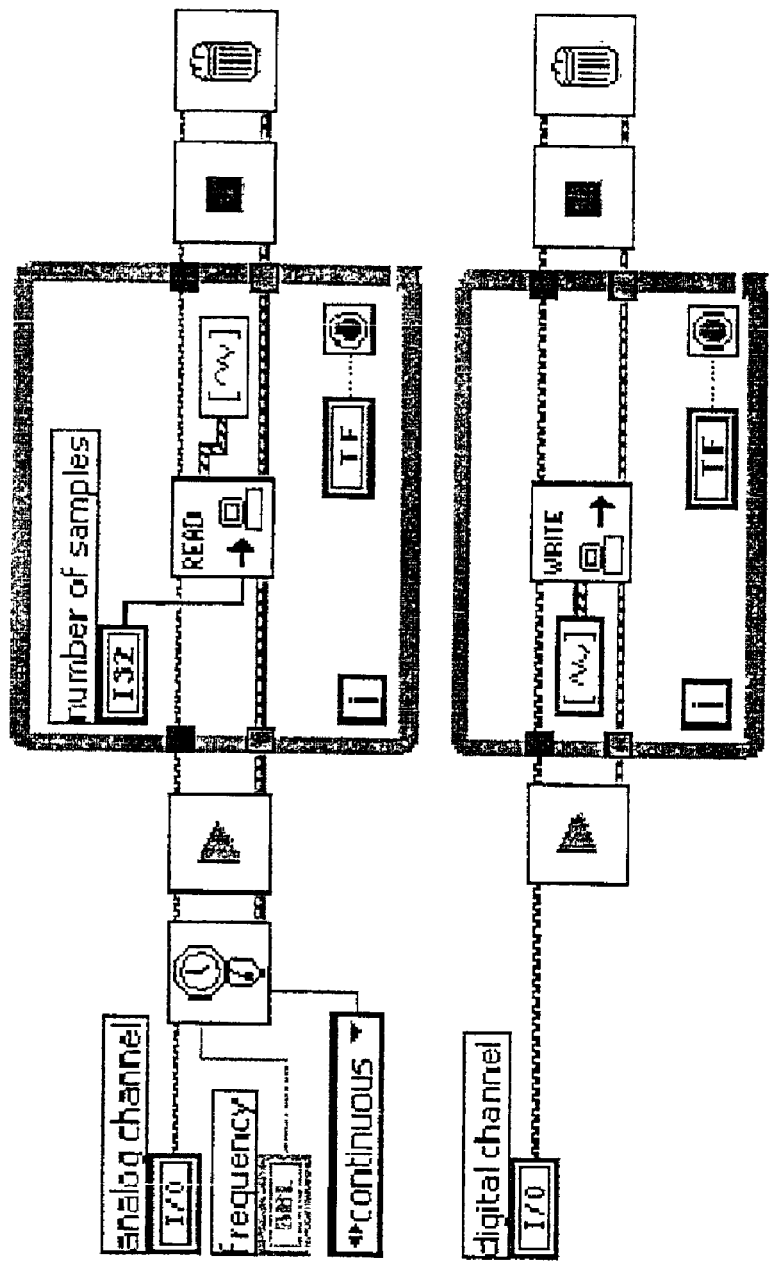
FIG. 39B illustrates a VI for simultaneous analog input and digital output with a multi-threaded driver, according to one embodiment.

FIG. 39B—Simultaneous Buffered Analog Input and Single-Point Digital Output with Multi-Threaded Driver FIG. 39B illustrates a VI implementing simultaneous buffered analog input and single-point digital output with a multi-threaded driver, according to one embodiment of the present invention. In contrast to the prior art system illustrated in FIG. 39A, the VI illustrated in FIG. 39B utilizes multiple threads of execution so that the analog input loop and the digital output loop execute simultaneously on different threads. In other words, the digital process loop executes independently of the analog input loop, which may substantially improve performance compared to the prior art system of FIG. 39A.

As shown, the VI of FIG. 39B includes various icons representing measurement task operations, including a "clock" icon which denotes timing specifications, and a "play" icon which denotes an execute function call. In one embodiment, execution of the play node (represented by the play icon) may invoke the expert system 750, resulting in generation of the run-time specification 770, as described above. In another embodiment, execution of the play node may further invoke the run-time builder 780, which may use the run-time specification 770 to generate the run-time 790, as described above.

Memory Footprint

One significant improvement of the present system over some prior art systems relates to the memory footprint, i.e., the amount of computer memory required to operate the system. Some prior art measurement systems always load software for all supported devices, using much more memory than would be required by the software actually used to perform a particular task. For example, in one prior art measurement system, a customer may specify use of a particular DAQ device, such as a National Instruments PXI-6070E DAQ device, but the system loads software, not only for the PXI-6070E DAQ device, but for the AT-DIO-32F and all other devices, as well. In contrast, in various embodiments, the present invention may only load software components when needed, and so, may avoid large memory footprints associated with loading extraneous software. In other words, because the present invention may only load software as it is needed, the operational memory footprint may be substantially smaller than some prior art systems.

Robustness in Exceptional Conditions

Some prior art measurement systems provide little or no support for abnormal process termination or unexpected device removal. For example, an abnormal process termination, or device removal or insertion, may cause the measurement system to crash or behave improperly. In contrast, various embodiments of the present invention define and enforce policies specifically for these conditions, substantially improving the customer's experience under these circumstances.

Distributed Measurements

Some prior art measurement systems often provide little or no support for distributed measurements wherein measurements are made with devices on other computers. For example, distributed measurements may be supported only at the level of the public API of the system, using one network protocol for all communications. In contrast, in one embodiment of the present invention, a framework may be provided for communicating and transferring data over IP-based networks, allowing both local and remote devices to be supported in the same task. Additionally, the system may support a variety of protocols, choosing the most efficient protocol for a given task or sub-task. For example, in one embodiment, one protocol, e.g., National Instruments NI-RPC, may be used for functional calls in a DAQ application, while Logos sockets may be used for data movement.

Embedded Devices

One problem with some prior art systems regarding embedded applications relates to monolithic architectures. These systems require that the entire system be installed on an embedded device, effectively requiring the embedded device to have the capabilities of a PC (personal computer). The size and expense of such solutions may make them infeasible for many applications. In contrast, in one embodiment of the present invention, clear functional boundaries may be defined which allow decoupling of software components, including the framework itself. Thus, the entire framework of the system is not required on an embedded device. In one embodiment, only the functions required by the embedded application may be installed on the device. This functional modularity may provide substantial savings in that cheaper processors and less memory may be required for a given application. Such reductions in hardware requirements may also make feasible devices which might not be possible otherwise, such as an Ethernet-based data acquisition device, for example.

Integration of Devices

In some prior art measurement systems, the use of multiple devices in a measurement task can be problematic due to a lack of integration. For example, in an application which utilizes a DMM and a switch, the customer may have to program the DMM and switch separately using two different APIs. In one embodiment of the present invention, this problem may be addressed by defining a protocol which allows software components to work together while remaining decoupled. For example, the customer may have the option to program the DMM and use the switch transparently.

Synchronization

Figure 40A:
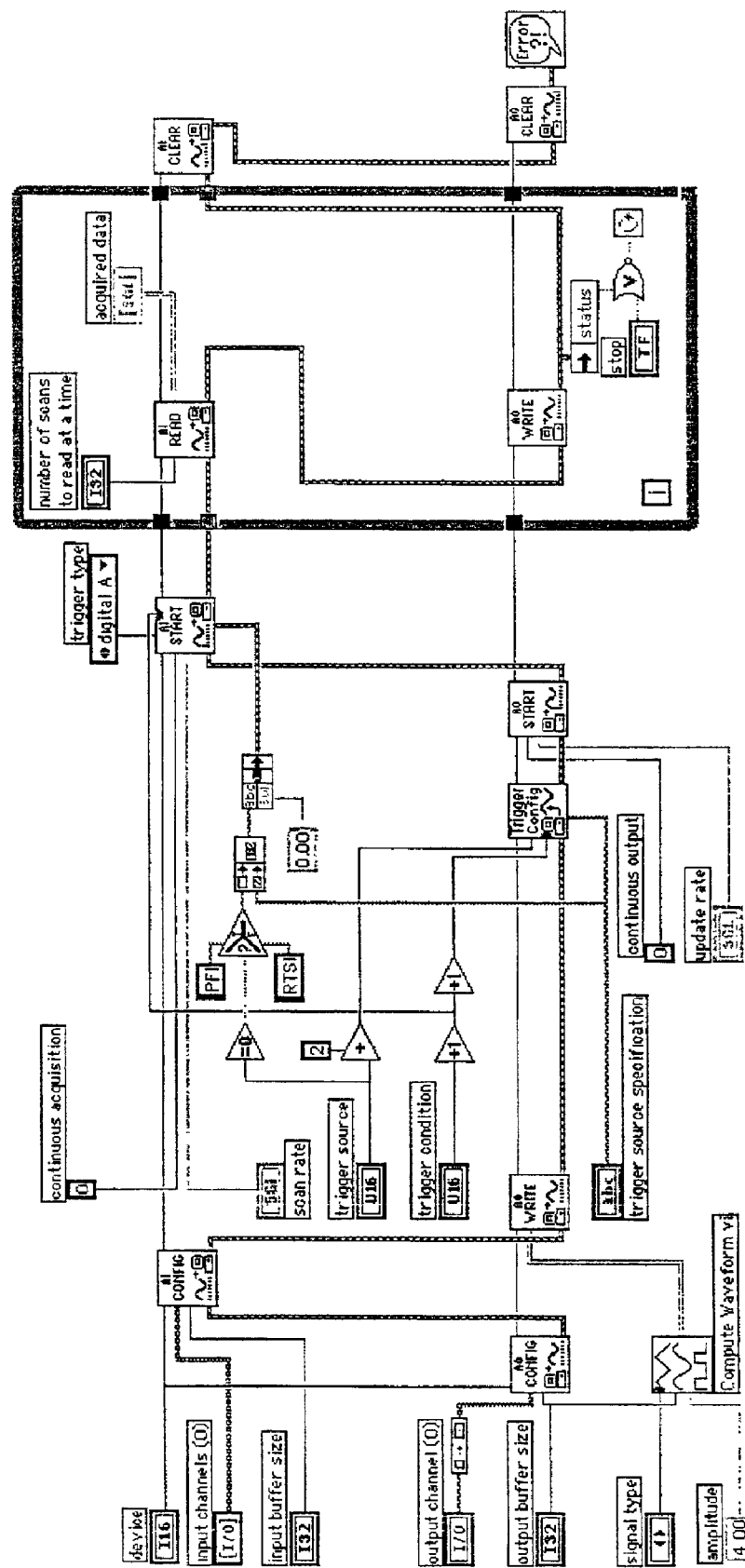
FIG. 40A illustrates a VI for simultaneous triggered buffered AI/AO, according to the prior art.

In some prior art measurement systems synchronization issues present difficulties which result in increased complexity of task implementations. For example, it may be difficult to synchronize sub-sections of a device, to synchronize homogeneous devices, or to synchronize between heterogeneous devices. FIGS. 40A–13A present example VIs which illustrate improved synchronization capabilities of the present invention as compared to prior art systems.

FIG. 40A—Simultaneous Triggered Buffered AI/AO (Prior Art)

FIG. 40A illustrates a VI implementing simultaneous triggered buffered AI/AO (analog input/analog output), according to the prior art. This VI is an example of synchronization between sub-sections of a device, e.g., an NI E-Series™ device. As FIG. 40A shows, the VI to synchronize the analog input (AI) and analog output (AO) subsections of a device is very complicated. The subsections have to be configured separately and then additional configuration is required in order to route the timing and triggering signals between the AI and AO subsections.

Figure 40B:
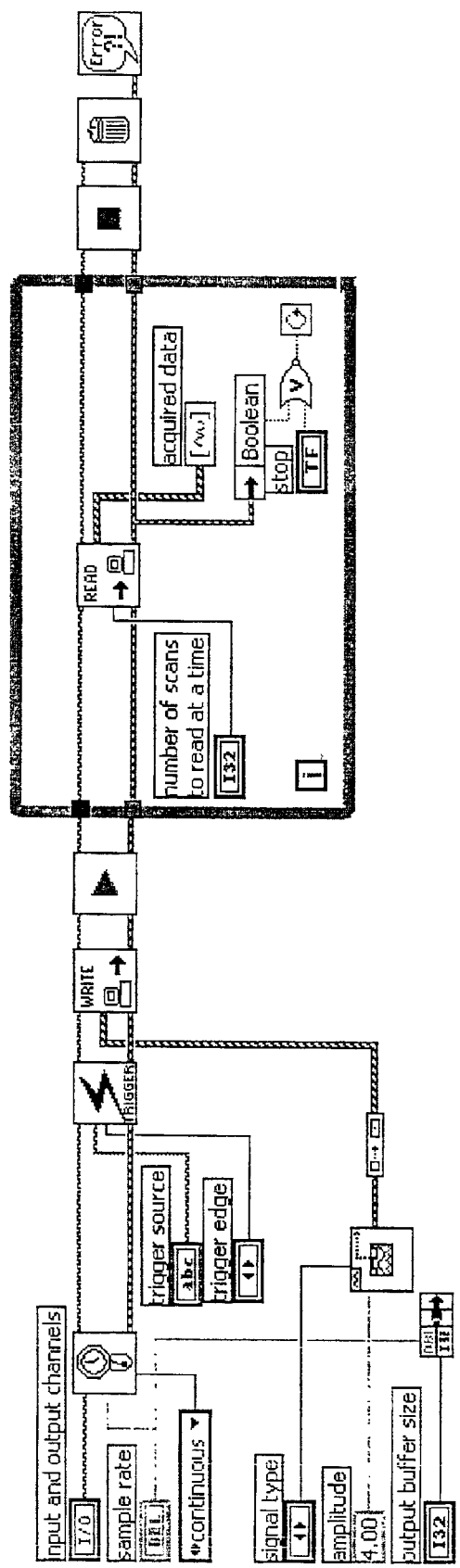
FIG. 40B illustrates a VI for simultaneous triggered buffered AI/AO, according to one embodiment.

FIG. 40B—Simultaneous Triggered Buffered AI/AO

FIG. 40B illustrates a VI implementing simultaneous triggered buffered AI/AO (analog input/analog output), according to one embodiment of the present invention. As FIG. 40B shows, the complexity of the configured system is significantly less than the prior art system presented in FIG. 40A above, due to the fact that the software components may use protocols to coordinate timing and triggering, automatically routing signals within a device. Therefore, the two subsections do not have to be independently configured as in the prior art system, but, rather, the timing and triggering configuration for both subsections may be configured at the same time.

Figure 41A:
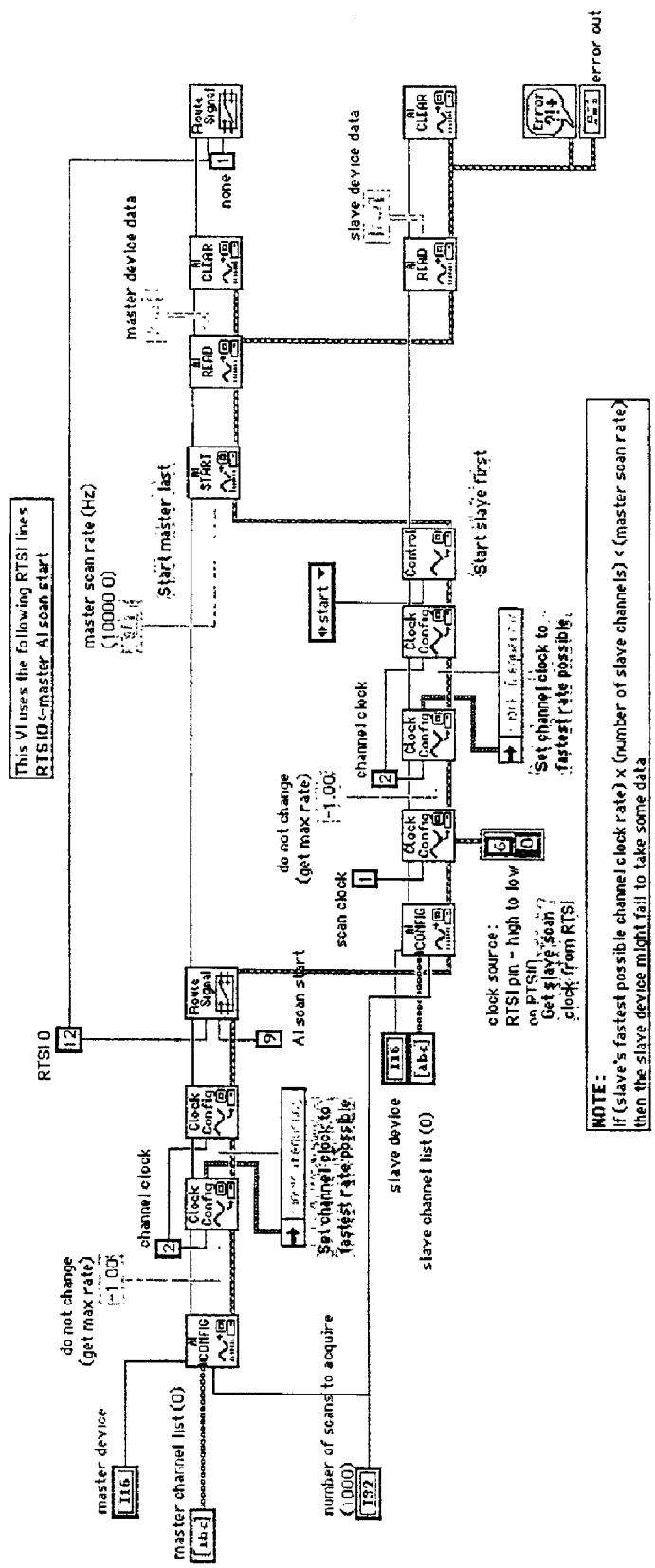
FIG. 41A illustrates a VI for sharing a scan clock across two E-Series devices, according to the prior art.

FIG. 41A—Sharing a Scan Clock across Two E-Series Devices (Prior Art)

FIG. 41A illustrates a VI in which a scan clock is shared across two NI E-Series™ devices, according to the prior art. This VI is an example of synchronization between homogeneous devices. As FIG. 41A shows, a master/slave synchronization model is used in which one device is the master and the other the slave. Much of the timing and triggering signals must be explicitly specified, which greatly increases the complexity of the VI.

Figure 41B:
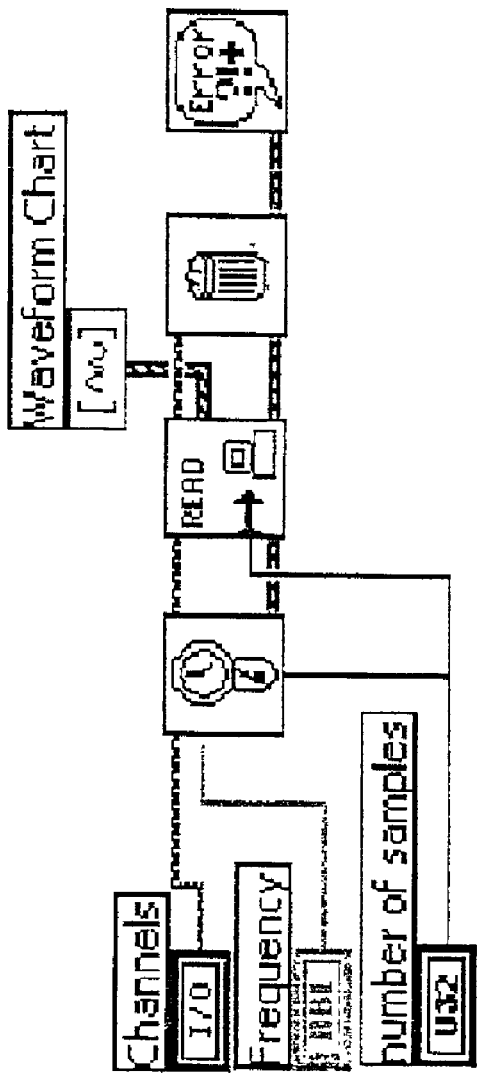
FIG. 41B illustrates a VI for sharing a scan clock across two E-Series devices, according to one embodiment.

FIG. 41B—Sharing a Scan Clock across Two E-Series Devices

FIG. 41B illustrates a VI sharing a scan clock across two NI E-Series™ devices, according to one embodiment of the present invention. As FIG. 41B shows, the complexity of the configured system is significantly less than the prior art system presented in FIG. 41A above, as almost all of the communication and synchronization may be handled automatically. In other words, the software components may automatically route signals over RTSI and the PXI back plane, as needed.

Figure 42:
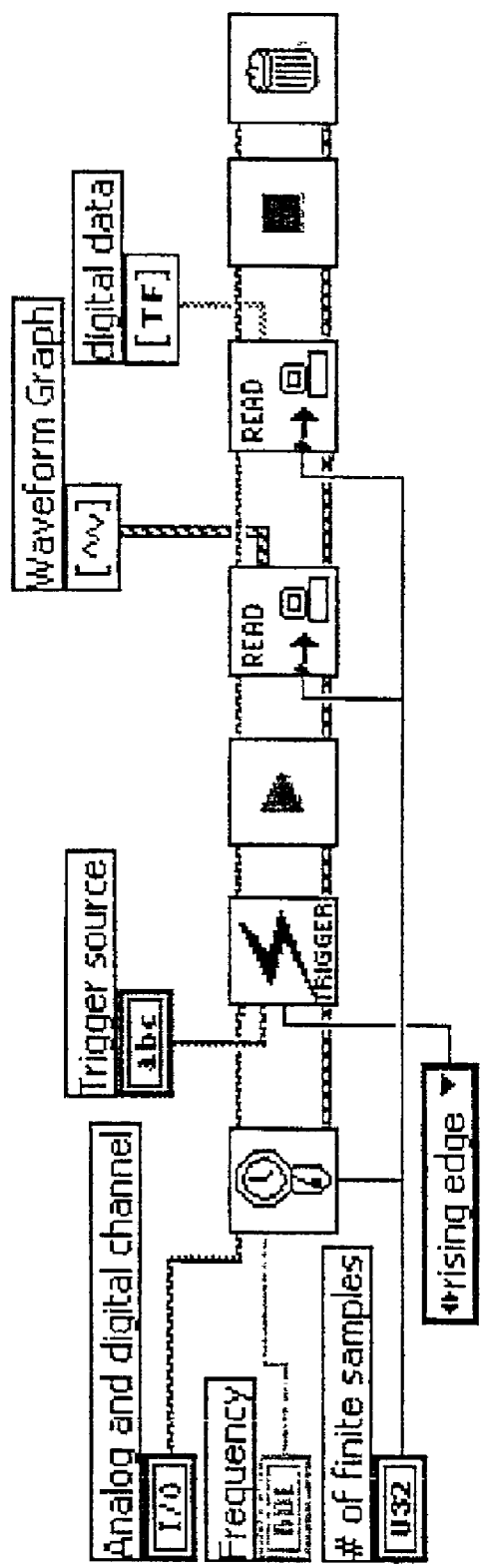
FIG. 42 illustrates a VI for buffered AI and DI sharing a clock and trigger, according to one embodiment.

FIG. 42—Buffered AI and DI with Shared Clock and Trigger

FIG. 42 illustrates a VI for buffered AI and DI with a shared clock and trigger, according to one embodiment of the present invention. As described above in reference to FIG. 41B, almost all of the communication and synchronization may be handled automatically, in that the software components may automatically route signals over RTSI and the PXI back plane, as required, as well as between subsections of a given device. The VI illustrated in FIG. 42 is much less complex than the VI that would be required to implement a buffered AI and DI with shared clock and trigger application in the prior art.

Configuration Clutter

One characteristic of graphical diagrams or text-based programs required by some prior art measurement systems is that they are typically cluttered with configuration VIs and (virtual) wiring or configuration functions. FIGS. 43A–D illustrate how the use of a Task Specifier or Measurement Task Configuration Tool may dramatically decrease this clutter.

Figure 43A:
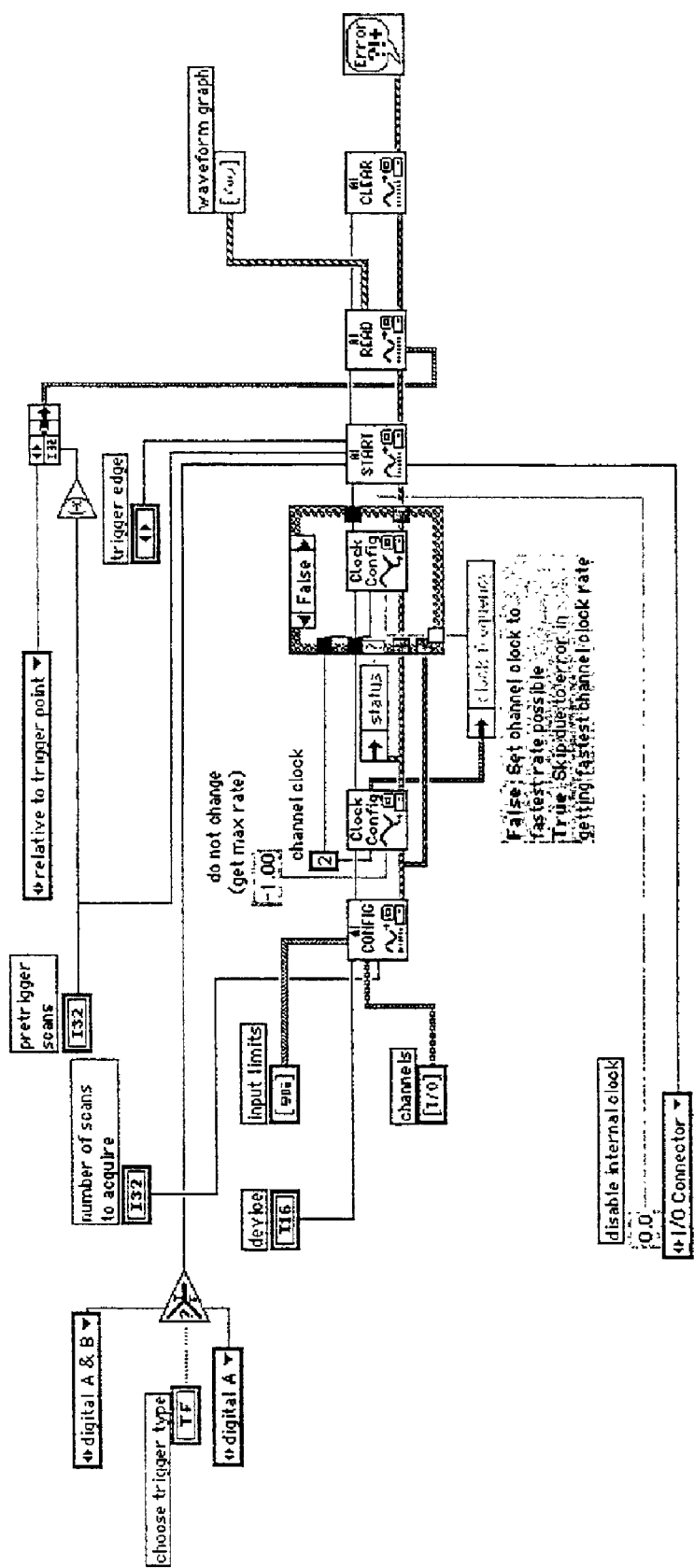
FIG. 43A illustrates a VI for acquisition of N scans with an external scan clock digital trigger, according to the prior art.

FIG. 43A—Acquisition of N Scans with External Scan Clock and Digital Trigger (Prior Art)

FIG. 43A illustrates a VI for acquisition of N scans with an external scan clock and digital trigger, according to the prior art. As FIG. 43A shows, there are a number of configuration sub-VIs scattered throughout the diagram, including clock configuration, trigger configuration, and analog input (AI) configuration. These configuration details add expense to the coding, debugging, and testing cycles, and may intimidate some customers.

Figure 43B:
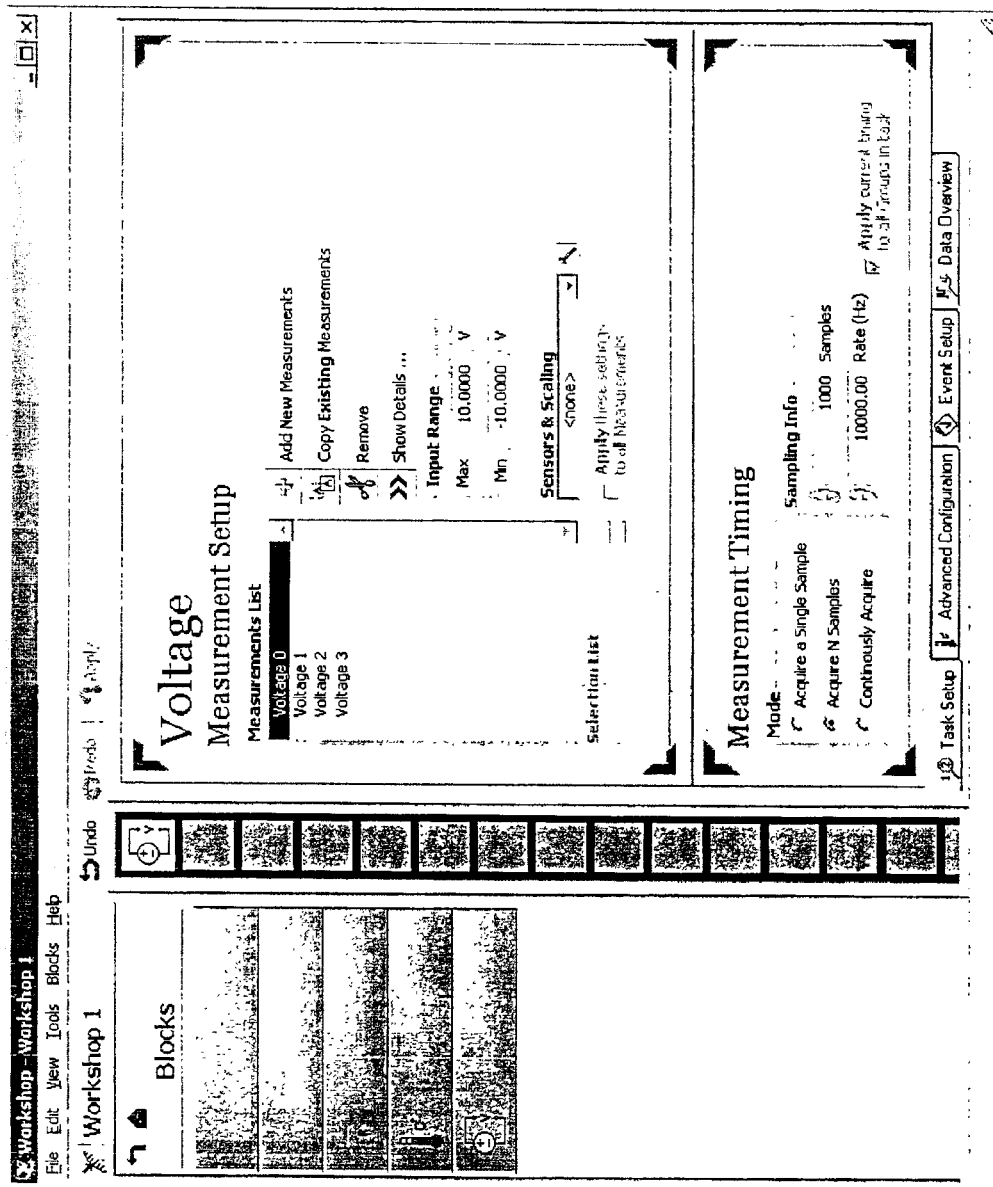
FIG. 43B illustrates a measurement setup interface for acquisition of N scans with an external scan clock digital trigger, according to one embodiment.

FIG. 43B—Measurement Task Configuration Tool Interface for Acquisition of N Scans with External Scan Clock and Digital Trigger FIG. 43B illustrates a measurement task configuration tool for the acquisition of N scans with an external scan clock and digital trigger, according to one embodiment of the present invention. As FIG. 43B shows, the customer may easily specify the types, number, and rate of measurements to make through a simple graphical interface. In one embodiment, the customer may also specify input ranges, scaling operations, and other measurement parameters. In a further embodiment, the customer may easily edit, copy, or otherwise manipulate a previously specified measurement task through the configuration tool.

Figure 43C:
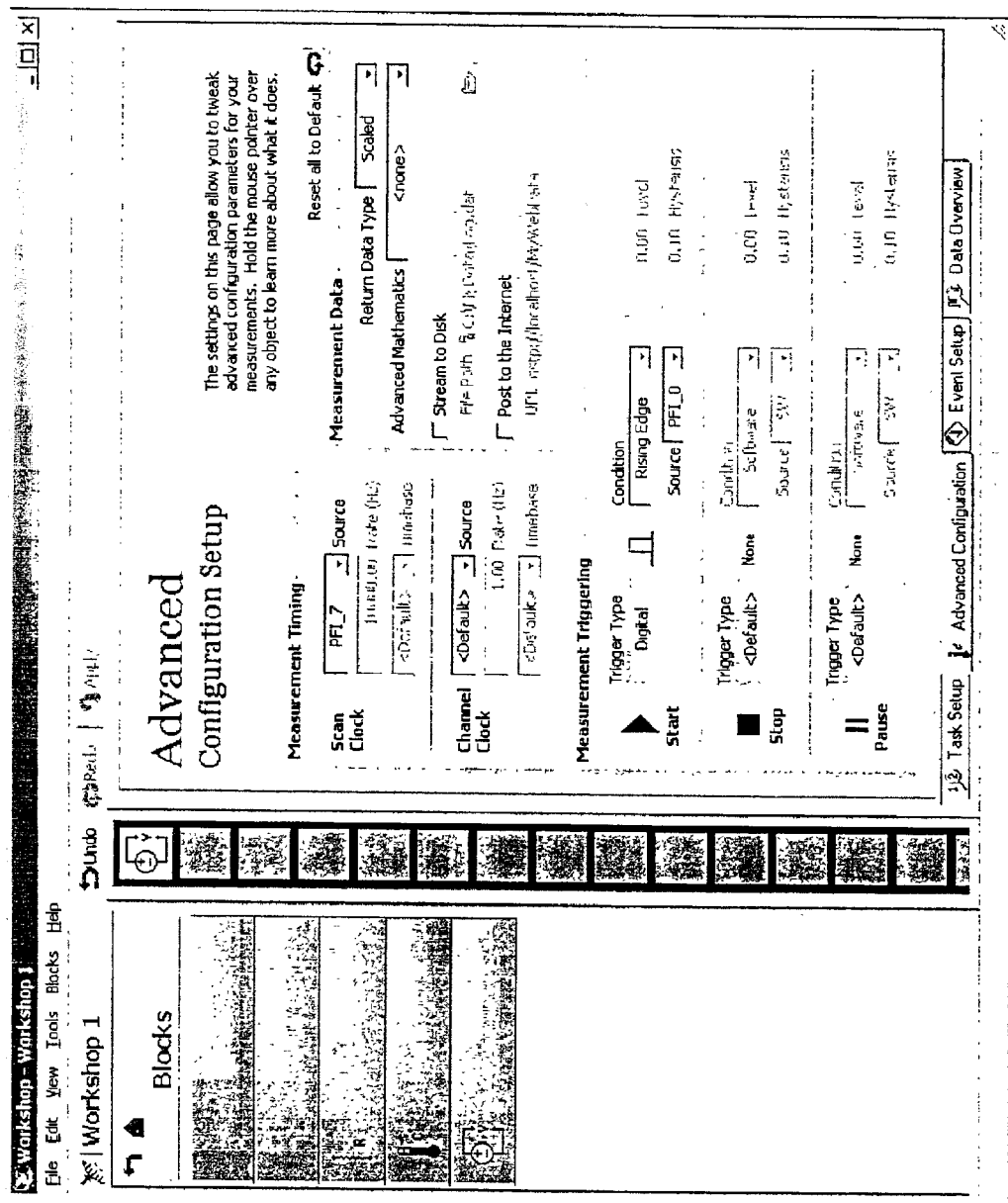
FIG. 43C illustrates an advanced configuration setup interface for acquisition of N scans with an external scan clock digital trigger, according to one embodiment.

FIG. 43C—Measurement Task Configuration Tool Interface for Acquisition of N Scans with External Scan Clock and Digital Trigger FIG. 43C illustrates one embodiment of a measurement task configuration tool interface which may be used to specify further details of the measurement task described above with reference to FIGS. 43A and 43B. As FIG. 43C shows, in one embodiment, measurement timing parameters may be set, such as scan and channel clock sources, as well as measurement trigger parameters, including start, stop, and pause trigger types and conditions. In one embodiment, the configuration tool may also allow the customer to select advanced mathematical operations to perform on the measured data. In a further embodiment, the configuration tool may allow the customer to specify where the measurement data streams are sent, e.g., to disk, or to the Internet in the form of posted data.

Figure 43D:
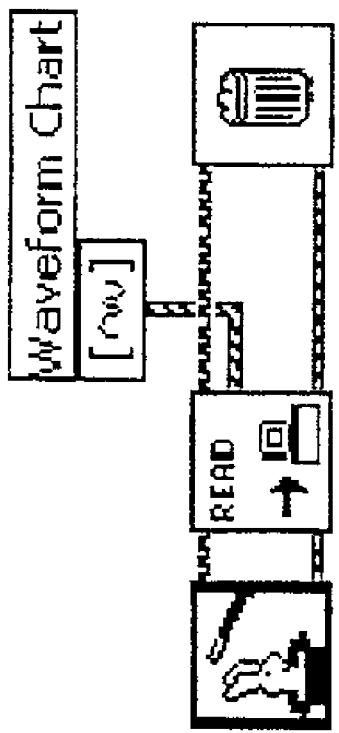
FIG. 43D illustrates a VI for acquisition of N scans with an external scan clock digital trigger, according to one embodiment.

FIG. 43D—Acquisition of N Scans with External Scan Clock and Digital Trigger

FIG. 43D illustrates a VI for acquisition of N scans with an external scan clock and digital trigger, according to one embodiment of the present invention. In one embodiment, the VI illustrated in FIG. 43D may be generated using the Measurement Task Configuration Tool described with reference to FIGS. 43B and 43C. As FIG. 43D shows, the specified VI is radically simpler than the prior art diagram of FIG. 43A. Benefits of such simplification may include reduction in expense of the code, debug, and test cycles of software development. Additionally, the removal of configuration clutter from the diagrams may encourage so-called "tinkerer" customers to more boldly explore and define measurement operations for a variety of applications.

Scalability of Applications across Hardware

Figure 44A:
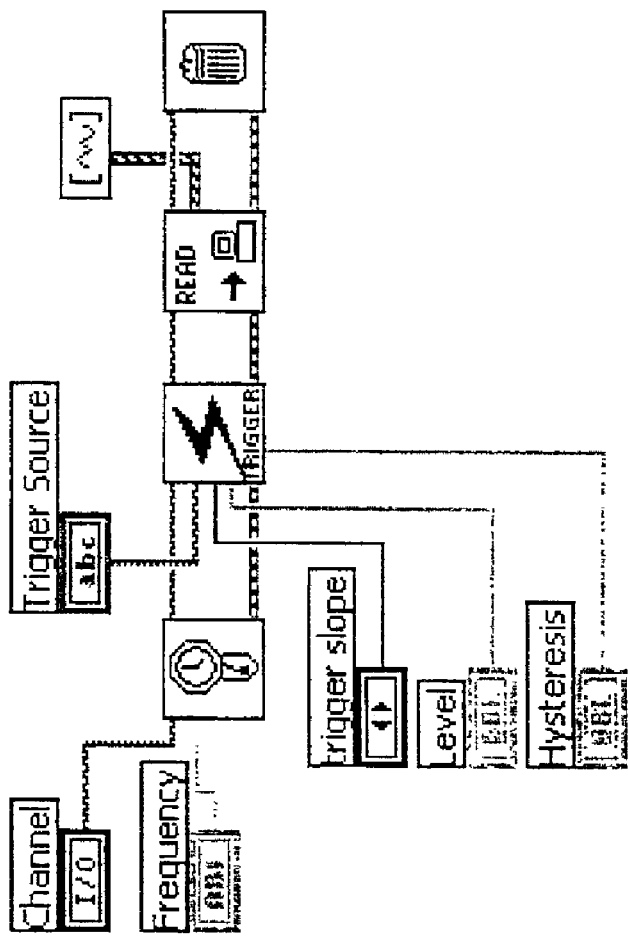
FIG. 44A illustrates a VI for triggered acquisition with an E-Series device, according to one embodiment.
Figure 44B:
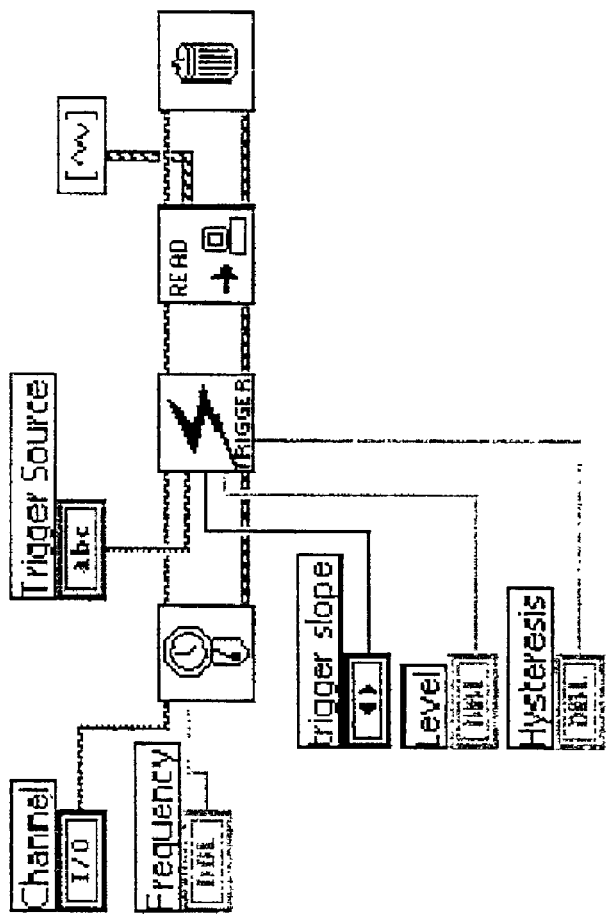
FIG. 44B illustrates a VI for triggered acquisition with a high speed digitizer, according to one embodiment.
Figure 44C:
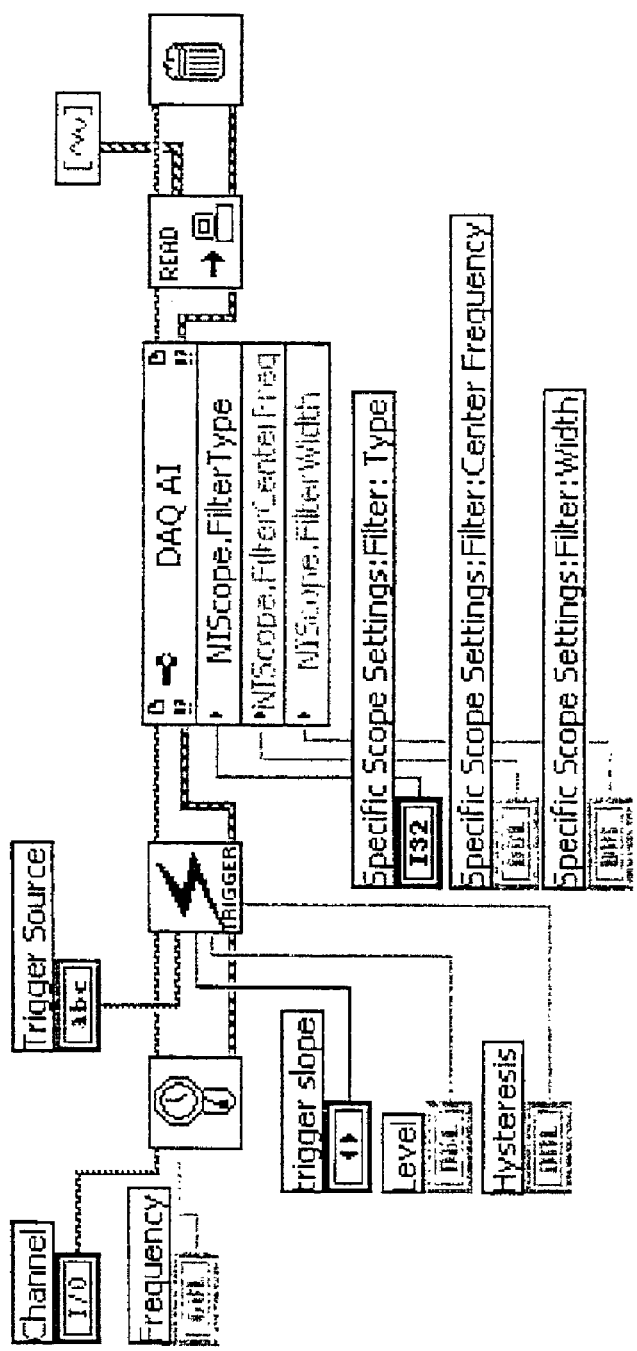
FIG. 44C illustrates a VI for triggered acquisition with a high speed digitizer with filtering, according to one embodiment.

In some prior art systems, when hardware in a measurement system is replaced with a more powerful device, the customer must rewrite the application, often having to learn a completely different API, such as, for example, when the customer replaces an NI E-Series™ device with a more powerful high-speed digitizer. According to one embodiment of the present invention, device-dependent portions of the API may be isolated, making a significantly larger portion of the API device independent, and thus minimizing the need for customers to develop with multiple APIs. FIGS. 44A–C, described below, illustrate VIs which perform a measurement task using three different hardware components.

FIG. 44A—Triggered Acquisition with E-Series Device

FIG. 44A illustrates a VI for triggered acquisition with an E-Series™ DAQ device. As FIG. 44A shows, the VI implements the task with minimal components, using a general API to minimize device dependencies in the implementation.

FIG. 44B—Triggered Acquisition with High Speed Digitizer

FIG. 44B illustrates a VI for triggered acquisition with a high-speed digitizer. As FIG. 44B shows, the VI is the same as that described above with reference to FIG. 44A, i.e., because the API is generic with respect to the E-Series™ device and the high-speed digitizer, no changes are required for the VI to implement the measurement task with the new device, i.e., the high-speed digitizer.

FIG. 44C—Triggered Acquisition with High Speed Digitizer with Filtering

FIG. 44C illustrates a VI for triggered acquisition with a high-speed digitizer with filtering. As FIG. 44B shows, the VI is the same as those presented above with reference to FIGS. 44A and 44B, but with the addition of a simple property node for configuring filter-related properties. In other words, the original VI does not have to be significantly modified to accommodate the new property node. Thus, the VIs presented in FIGS. 44A–C illustrate the utility and benefits of using device-independent APIs, including code reuse, design simplicity, and reduction of testing requirements.

API Layers

Some measurement system architectures include multiple software layers. It is sometimes the case in prior art systems that these layers are mutually exclusive, meaning that the APIs of each layer are not interoperable. This restriction may limit the customer's ability to use certain measurement modules in that modules or functionality implemented in different software layers may not be useable together. For example, a customer using an intermediate DAQ layer who wishes to use analog window triggering may find that if the analog window triggering feature is implemented in an advanced layer, part of the customer's application may have to be re-written. Additionally, the use of multiple APIs in a measurement system may result in features which are not accessible or available in some areas of the system. For example, in one prior art system (NI-DAQ 6.9) named channels, integrated SCXI, and RDA are implemented in the NI-DAQ LabVIEW layer and therefore are not accessible in the C programming language.

Figure 45A:
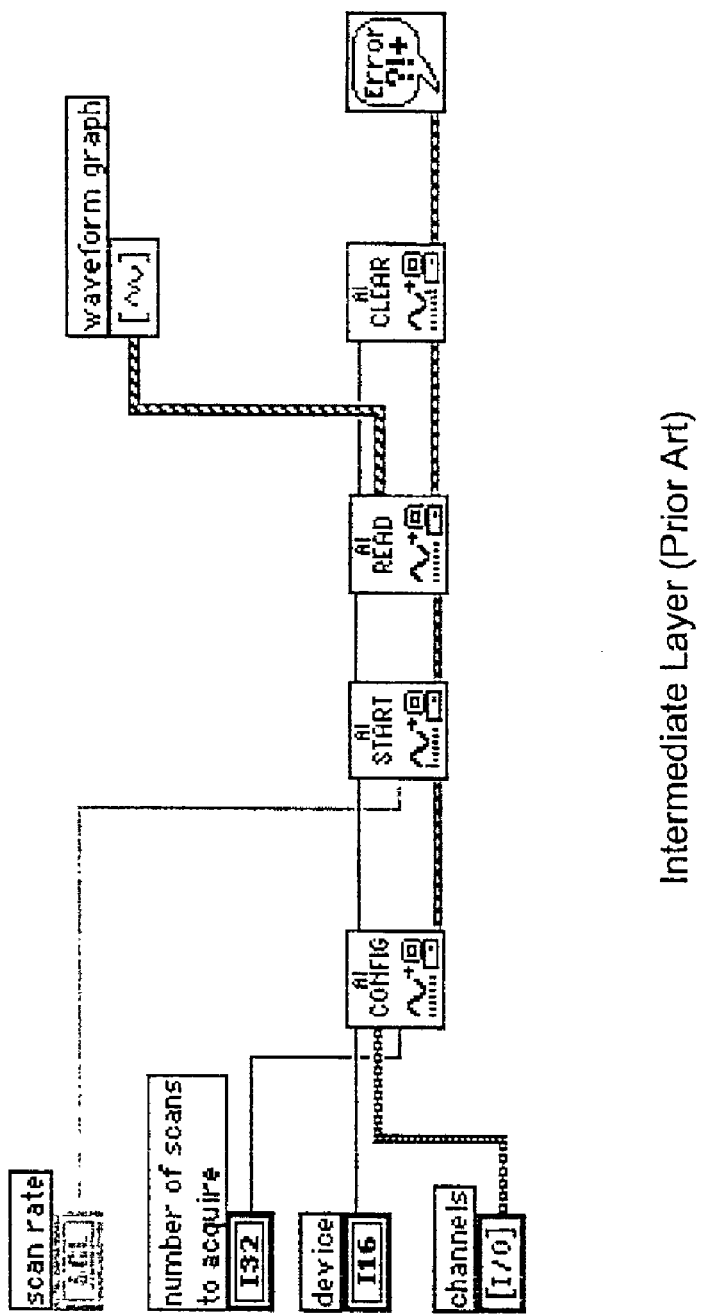
FIG. 45A illustrates a VI for an intermediate layer, according to the prior art.
Figure 45B:
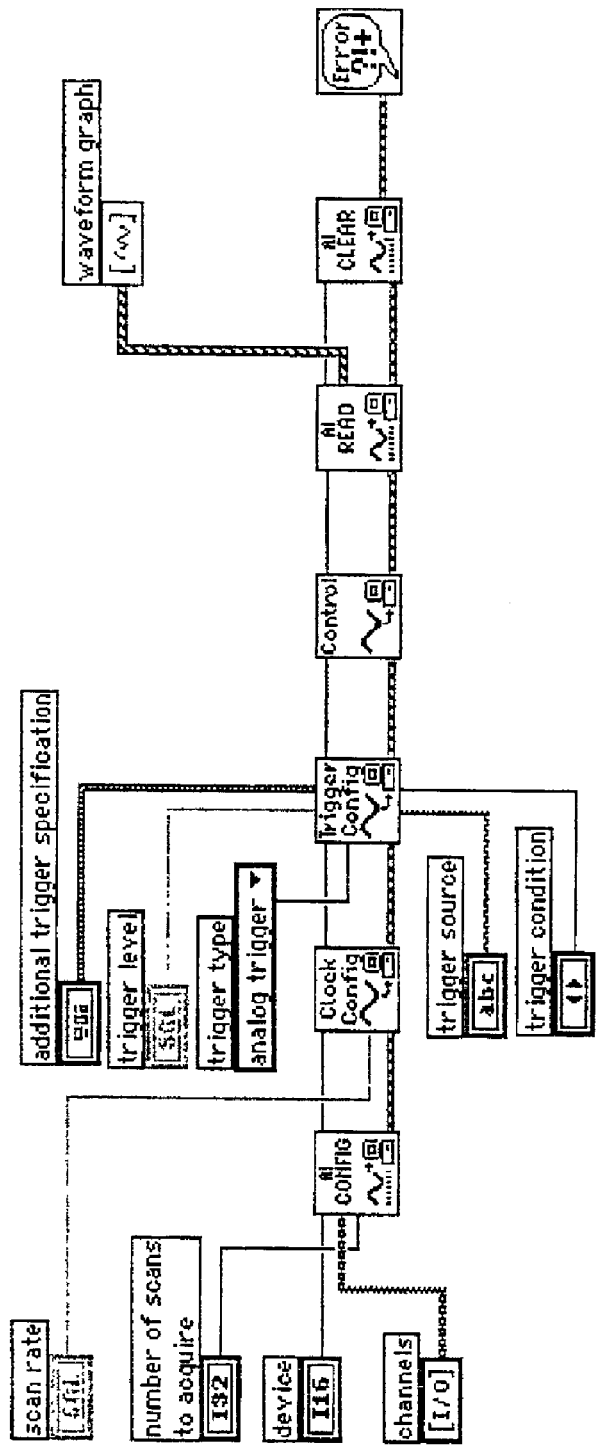
FIG. 45B illustrates a VI for analog window triggering, according to the prior art.
Figure 45C:
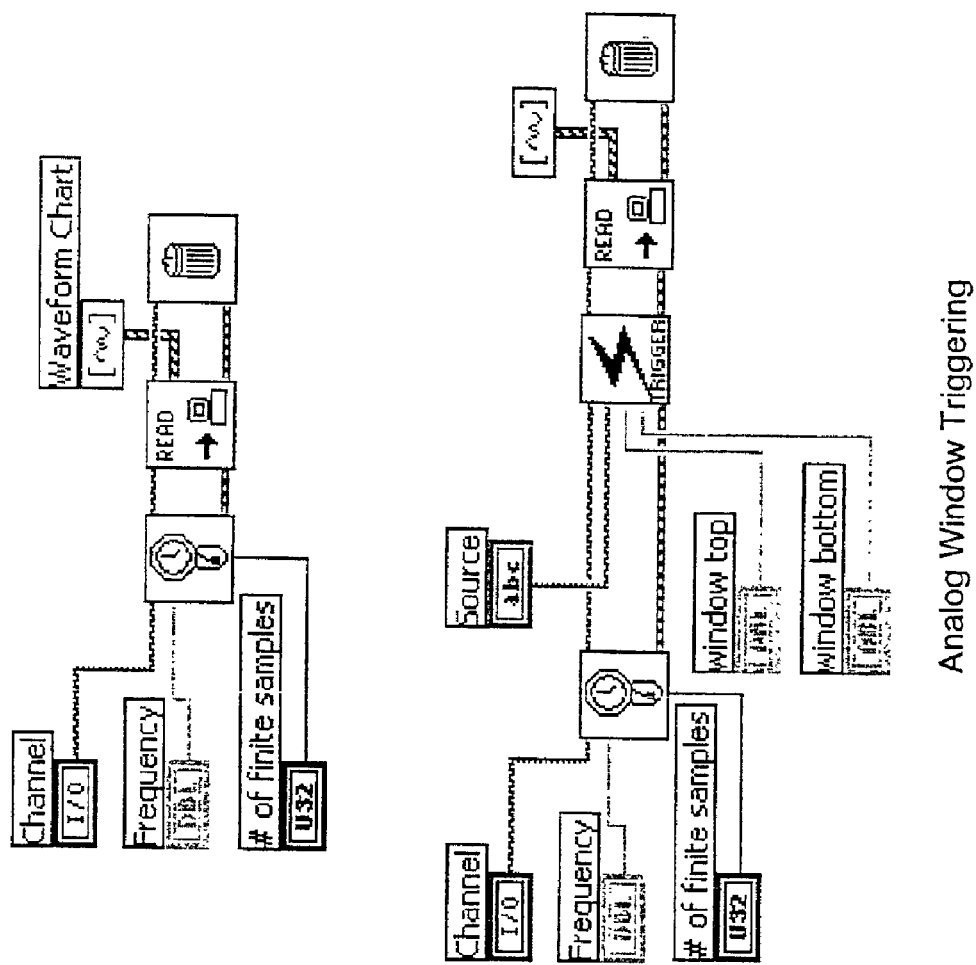
FIG. 45C illustrates a VI for analog window triggering, according to one embodiment.

In one embodiment of the present invention, portions of the APIs for the software layers may be interoperable. Additionally, the API may be decoupled from the software components that implement the features, allowing any customer to use most, if not all, of the system features. FIGS. 45A–C illustrate the need for and some benefits of interoperable software layers in a measurement system architecture.

FIG. 45A—Intermediate Layer (Prior Art)

FIG. 45A illustrates an intermediate layer VI, according to the prior art. As FIG. 45A shows, the VI includes basic analog scan capabilities. However, as may be seen below in reference to FIG. 45B, the addition of analog window triggering requires substantial re-design of the VI.

FIG. 45B—Changes for Analog Window Triggering (Prior Art)

FIG. 45B illustrates the intermediate layer VI of FIG. 45A with the addition of analog window triggering functionality, according to the prior art. As FIG. 45A shows, the VI of FIG. 45B requires removing the AI Start VI and adding a significant number of additional VIs to specify the triggering capability, roughly doubling the complexity of the VI of FIG. 45A.

FIG. 45C—Analog Window Triggering

FIG. 45C illustrates one embodiment of an intermediate layer VI (top) which is comparable in functionality to the prior art VI described above with reference to FIG. 45A. As FIG. 45C shows, not only is this intermediate layer VI simpler than the prior art VI, but accommodates the addition of analog window triggering functionality with great ease, as illustrated in the bottom VI. In particular, in this embodiment, analog window triggering capability may be provided simply by adding a VI to configure the trigger properties, as shown.

Comparison of the Two Embodiments of the Expert System

Two primary embodiments of the expert system are described above with reference to FIGS. 14–25 and FIGS. 26–38, respectively. The first embodiment, referred to as the "static" system, uses a pre-defined expert call tree to deterministically translate the measurement task specification into the run-time specification. In contrast, the second embodiment, referred to as the "dynamic" system, is considered to be an intelligent measurements expert system which is able to interpret a customer's measurements task specification, explore possible solution paths, and compile a solution which is substantially optimized for the customer's measurement system.

The two embodiments of the expert system both address many of the limitations of the prior art, including performance related issues such as the lack of a state model, inefficient code paths, inefficiency and unresponsiveness of reads, single-threaded driver, large memory footprint, lack of robustness in exceptional conditions, limited support for distributed measurements, and limited support for embedded devices, among others. However, there are differences between the two regarding the extent to which various of the issues are addressed, described below.

In general, the dynamic system facilitates more dynamic expert collaborations. These dynamic expert collaborations permit each expert to propose multiple, fine-grained partial solutions. These partial solutions may be combined and prioritized such that the most efficient code path may be utilized. However, the branching and prioritization sub-architectures may introduce significant complexities to the design and implementation of the system which may possibly outweigh the benefits gained by these more efficient code paths.

The static system generally results in a larger memory footprint than the dynamic system. In the static system, the appropriate experts and the expert library are almost always loaded when executing a measurement task. In the dynamic system, the experts and expert library may be unloaded once the task enters the verified state or doesn't need to be loaded at all if a persisted task has been instantiated. Thus, trade-offs may be required between high-performance reconfiguration, and features such as persisting the run-time specification and maintaining a strong distinction between configuration and execution.

Ease of use limitations typical of the prior art, such as poor usability, limited integration of devices, hard to synchronize devices, difficult manual routing, diagram cluttered with configuration, non-scalability of applications across hardware, incompatible API layers, inconsistent feature sets across different application development environments (ADE), inconsistent terminology, and limited support for sensors, among others, may also be addressed at different levels by the two embodiments.

The static system addresses almost all of these ease-of-use issues as well as the dynamic system. In fact, due to the de-emphasis of the distinction between configuration and execution, it may be argued that the static system enables even greater usability. In contrast, the dynamic system addresses the hard-to-synchronize-devices issue more thoroughly than the static system. The dynamic system contains general synchronization experts that support a variety of synchronization scenarios as opposed to the device-specific synchronization experts of the static system, as well as more synchronization use cases, such as stimulus-response use cases. Synchronization is thus more broadly supported by the dynamic system. The static system does not support synchronization to the same degree primarily for two reasons. First, there is a class of use cases that involve heterogeneous timing and triggering for which it is neither appropriate nor reasonable for a non-application-specific measurement architecture to satisfy. Second, since the static system has fewer dynamic interactions between experts, other synchronization applications may require experts with more explicit knowledge of the signals and devices involved to support automatic synchronization.

More generally, the dynamic system makes a strong distinction between configuration and execution of a measurement task. This distinction may require customers to realize that configuration and execution are substantially different and that the specification of properties when configuring a task is different from changing specified properties when executing a task. This distinction provides a very clean programming model. However, this model is different from that to which many users are accustomed. As a result, some users may feel that the static system (which doesn't make a strong distinction between configuration and execution) is more usable.

Engineering efficiency limitations characteristic of the prior art, such as poor engineering efficiency, monolithic architecture and releases, risks associated with addition of new features, and redundant software development between development groups, are addressed roughly equally in the two embodiments. These issues are addressed substantially by having a component-based architecture which provides flexibility for future growth and modification.

Beneficial Elements of the Static System which are not in the Dynamic System

In addition to the general differences between the two embodiments described above, there are a number of specific design aspects in which the static system has advantages over the dynamic system, described below.

Decision Tree

In the dynamic system there is a potential for performance problems as the number of nodes in the tree grows. While this may be mitigated to some extent by sequencing expert invocation and reducing the number of branches created by the streaming experts, performance problems may still result. For another example, the number of nodes in the decision tree may explode when trying to use branching to solve exponentially complex problems such as choosing timing protocols or resolving matrix switching. Since the relationships between experts in the static system are much more static, and branching is not permitted, the decision tree is pre-built, and thus avoids these problems of the dynamic system.

Error Propagation

In the dynamic system, with many dynamic collaborations between experts, it may be difficult for one expert to reinterpret an error message from another expert to an error message within its context. This reinterpretation may be necessary in order to provide the customer with understandable error messages. Since the relationships between experts in the static system are more static, this reinterpretation may be easier. Additionally, if a decision tree has many branches, all of which fail to find a solution, it may be difficult to prioritize these failed branches to determine which one is the closest to a solution and, therefore, the best failure from which to return an error message. Since the static system eliminates branching, it avoids this issue altogether.

Prioritization of Branches

Prioritizing multiple potential solutions based on default or customer-specified metrics may be difficult, yet very important if the best solutions are to be chosen by the expert system. Prioritization generally adds complexity to the architecture. Another important aspect of prioritization is ensuring that the prioritization heuristics produce consistent and deterministic solutions as the system is upgraded. These issues are avoided by the static system through the elimination of branching. In the static system, all prioritization decisions are made in a local context of a single expert. While the static system doesn't allow for branching or prioritization of solutions derived from customer-specified metrics, this local approach is itself a powerful technique.

Streaming and Control Experts

The static system sub-architectures that contain the streaming and control experts are higher performing and less complicated than the respective sub-architectures in the dynamic system. In the static system, these experts are not intermixed with the device experts. This separation allows these experts to model the operations that they need to perform in a manner that is more specific and more efficient for their particular operations. For example, the static system streaming expert doesn't leverage MSOs, but rather compiles the streaming portion of the run-time from a stream-specific representation. This representation, along with the separation from the device experts, enables the streaming experts to compile more efficient solutions than the dynamic system while remaining just as flexible as the dynamic system streaming experts. Additionally, the experts are more involved in the streaming and control aspects of the system.

Changing Properties On-The-Fly

The method in which properties are changed on-the-fly in the static system is much more efficient and appropriate than that of the dynamic system. The dynamic system facilitates changing of properties both when the task is and is not in the running state. The static system allows changing properties only when the task is in the running state. This has the advantage that most of the property changes are handled by a single code path through the experts as opposed to two different code paths, one in the experts and one in the code to change the primitive on-the-fly.

Run-Time Rebuilding

The static system run-time architecture enables the run-time to be partially rebuilt and updated. This is accomplished by enabling a subset of the run-time's primitives to transition through different states as required. The expert system can update, add, or remove primitive settings from a pre-existing run-time specification. The run-time builder may then examine the updated run-time specification and only the affected primitives through the required states. The static system thus greatly improves performance by allowing the run-time to be partially updated as opposed to completely destroying and rebuilding the run-time as in the dynamic system.

Beneficial Elements of the Dynamic system that are not in the Static System

There are a number of elements of the dynamic system that are not present in the static system. These elements are the foundation for a number of innovative features.

Associations between MSOs

In the dynamic system, the associations between MSOs are the primary method of specifying a task. The group MSOs and their associations define the timing and triggering for the task. Also, complex messaging from one event to another is modeled in a generic manner through MSO associations.

However, many associations are utilized in the static system. Most MSOs are categorized as either channel-related or timing-related. The responsibility for managing events and the messages they send resides within the timing experts. In the static system, many of the associations which in the dynamic system are between MSOs are managed by the associations within and between experts.

Generic Nature of Experts

The dynamic system does not significantly distinguish between different types of experts. From the perspective of the API implementation, all experts are treated identically. In the static system, there are a number of specialized expert interfaces (e.g., device, channel, timing, control, reader/writer, routing) of which the API implementation and the implementation of experts themselves are aware. The lack of the generic nature of experts in the static system reduces the flexibility of the system and increases the effort required to introduce new expert concepts.

Dynamic Matching of MSOs to Experts

In the dynamic system, the matching library may parse an MSO collection and determine, based on expert registrations, which experts should be invoked to solve the specified task. This dynamic matching enables complex streaming and routing problems to be solved in a generic manner and for non-device related experts to interoperate with device experts to solve problems. For example, the routing expert may route a specified generation through a number of multiplexers and to a specific counter. At this point, the expert registered with the counter may match and implement the specified generation. In the static system, the expert cannot register with the counter but must register with all external terminals that can be routed to the counter. This results in a fatter, less cohesive, single expert which handles counter-based measurements and generations as well as digital measurements and generations. Other examples include the ability to support advanced measurements (e.g., power-spectrum measurements).

The static system performs static matching based on the signal path described by the named channel. This approach allows the expert call tree to be determined when the named channel is created and, therefore, created when the task is instantiated. This approach, while less flexible, greatly improves performance.

Separation of Task Specification from Experts

In the dynamic system, the experts do not interact with the task specification while it is being specified. After the task is completely specified, the experts are passed the entire task specification. This has the advantage that the management of the task specification is completely encapsulated and only the interface is shared with the experts. This makes features such as persistence, versioning, and maintenance easier than in the static system where the MSOs are owned and managed by the individual experts. Another advantage is that this clear separation, both in terms of encapsulation as well as interactions, facilitates features such as client-server applications and simulation.

In the static system, there is some encapsulation. The API implementation only accesses the MSOs through their interfaces. Also, if the experts override the default behavior of the MSOs, they inherit from standard base classes which provide support for versioning, persistence, and storage. Finally, the static system enables experts to be more involved when the task is specified which may lead to improved performance since the experts can leverage specialized knowledge to optimize reconfiguration.

Distinction between Configuration and Execution

The dynamic system makes a strong distinction between the process of configuration and the process of execution. These two processes are treated as separate processes both in space and time. These two processes are implemented in separate applications and are invoked at different times. This model requires customers to completely specify their measurements tasks and then, later and repeatedly, execute these tasks according to the specification. This distinction between configuration and execution is the key to supporting various manifestations of expert knowledge without sacrificing performance. In other words, through compilation, a customer-defined driver may be compiled that can deliver unsurpassed performance during the execution phase while the intelligence, and the corresponding performance hit, occurs during the compilation phase after the configuration process has completed. This clear division of responsibility also makes supporting of distributed measurements, such as embedded measurement devices, much more straightforward.

In contrast, the static system blurs the distinction between configuration and execution. This increases the complexity of some aspects of the architecture in order to support the required level of performance for reconfiguration.

Classical Expert System

The dynamic system provides the foundation for a classical expert system to evolve over time. Some of the key benefits of a classical expert system are branching, prioritization, and the generic nature of experts. There are a number of additional features that may be implemented in the dynamic system. For example, the prioritization may be based upon customer-defined criteria that are used to weigh the possible solutions. Also, the generic nature of experts allows the tight integration of routing, synchronization, streaming, and control. This integration may avoid the N×N combinatorial explosion of possibilities encountered with multi-device synchronization experts in the new architecture. The dynamic system may evolve over time to satisfy the out-of-the-box configuration requirement in which the expert system determines which devices to use to implement the measurement task and how to connect the appropriate signals to these devices. A classical expert system provides the infrastructure to provide more detailed feedback and error reporting to customers which would lead them towards solving their problems.

While the static system comprises an expert system, in some ways the static expert system may be considered a "system of experts," in that, as mentioned above, prioritization issues are handled locally by each expert, branching is omitted, and the experts are not generic, but specialized for particular devices.

Evolution of the Static System

There are some aspects of the dynamic system that, if desired, may be incorporated into the static system. For example, support for the persistence of run-time specifications, finer-grained matching based on more than just terminals (e.g., advanced measurements, phenomenon, etc.), and range-typed properties in MSOs may be achievable with the static system. However, other aspects may not be readily implementable, such as integrating routing, streaming, and control experts with device-centric experts, branching, and, therefore, prioritization.

Thus, in one embodiment, the present system may provide greater flexibility, robustness, and increased functionality over some prior systems while simplifying the design, development, and testing of measurement task implementations. More specifically, by designing the system in a componential manner, as opposed to a monolithic architecture, time to market for new products and maintenance releases may be greatly reduced, due to the fact that individual software components are much easier to build, test, and debug than monolithic systems. Furthermore, because the present system is component-based and extensible, software components for specific devices may be released independently. The present system may define responsibilities of and communication between its constituent software components. This decoupled architecture may allow a new feature to be added in one place, then leveraged by all measurements devices. For example, software components, which may be shared by multiple development groups, may include data-transfer software, signal-routing software, event-messaging software, and resource-reservation software, among others. Other examples of reusability in the present system may include the expert system framework, routing experts, streaming experts, chip experts and topographies, and shared device experts.

In one embodiment, the customer may be required to specify which hardware product performs a given measurement; however, in other embodiments, customer-defined tasks need not specify which hardware to use, i.e., the system may use heuristics or other techniques to determine appropriate hardware for a given measurement task.

Thus, the systems and methods described above with reference to FIGS. 3–45C may provide an architecture and process whereby the user may easily and quickly specify and perform a measurement task, subject to available resources of the system. Additionally, in various embodiments, the present invention may provide a specific optimized solution to the specified measurement task, which accommodates a particular specification of the user, through the use of an expert system.

Glossary of Terms actuator—device used to convert from one phenomenon to another. Typically, the user will need to use an actuator to convert the phenomenon generated by a device to a more useful phenomenon.

application program—a software program which is executable to perform one or more functions, e.g., a software program that is executable to perform one or more specified measurement tasks.

attribute desirability—expressed by clients of the measurements expert system or measurements experts themselves. Specifies preferences (weighting) for the value of a specification attribute when there exists multiple possibilities.

branch—a proposal made by a measurements expert to extend a partial solution. Measurements experts may present several possibilities for extending one partial solution, effectively branching that partial solution into several independent partial solutions.

channel—hardware and software resources used to make a measurement or a generation. Hardware resources of a channel include I/O connector resources and internal resources such as filters, ADC, counters, and the like. Software resources of a channel include scaling, analysis, transfer, and the like. Experts may choose the optimal attribute settings for a channel based on the task specification.

compile—the act of the measurements expert system solving a problem, effectively transforming a measurement task specification into a complete run-time specification. The term "compile" also refers to converting a software program from source code into executable object code.

complete solution—a collection of decisions in which the measurement task specification has been fully solved by measurements experts.

completeness—a quantification of how close a measurement task specification is to being solved. The measurements expert system currently expresses this in the form of an estimate.

connection—a link between a two terminals. Physical manifestation of a connection could be a wire, trace, or infrared link.

constraints—associated Boolean expressions of a solution that must be satisfied for the solution to meet the designer's needs. Example constraints include an attribute expression where measurable attributes include: price, maximum latency, throughput, determinism, accuracy, precision, and mass. An example expression could be (price<$5000). Other constraints may be fixed hardware settings (i.e. jumpered settings), limited resources (memory, computational power, counters, terminals), fixed hardware connectivity or fixed phenomenon connectivity, or artificial user constraints (i.e. gain must be 1)

cost—a composite measurement of attribute desirability, complexity, and resource consumption achieved by a particular solution. The measurements expert system uses costs and estimates to prioritize solutions. When selecting complete solutions, the measurements expert system chooses those complete solutions with the least cost. When selecting partial solutions, the measurements expert system chooses those partial solutions with the least cost and the lowest estimate of work remaining. Also referred to as a metric.

data store—destination specified for samples from a measurement, or source of updates specified for a generation.

decision—encapsulates a single extension of a partial solution. Measurements experts create one or more decisions based on their inputs which may be a measurement task specification. These decisions are either branched or failed event—used to control the timing and triggering of a measurement, generation, or connection. Users indicate timing and triggering by associating events with measurements, generations, and connections through messages. Users register observers with events to receive notifications while the task is running. The source of the event is often a hardware resource, but may be a software program, as well. Events can also be associated with other events to construct more complex events.

failed solution—a partial solution terminated by a failed decision.

generation—production of a phenomenon, or a process which produces a phenomenon.

generation specification—a specification for the generation of a phenomenon, which might include the type of generation (waveform, sine wave, control function), and other attributes of the generation (amplitude, frequency, etc.)

independent—a specification is considered independent if it can be solved serially with any other specifications in a given measurement task specification.

measurement—the retrieval of one or more characteristics of a phenomenon in order to produce a useful sample of information. For example, measurements may be performed by instruments or other types of devices which acquire real world data. Measurements may be performed for the purposes of simulation, hardware in the loop testing, validation, test, instrumentation, and manufacturing assembly, among other purposes.

measurement device—a hardware or virtual device which is operable to perform a measurement on a phenomenon, a generation of a phenomenon, or a connection. Example measurement devices include any of the devices shown in FIGS. 1A and 1B.

measurement expert registry—a data structure correlating one or more experts with respective types of measurement tasks. The registry may be used by an expert system to select experts to populate run-time specifications for a given measurement task.

measurement expert system—a software program which may compile a measurement task specification into a run-time specification by selecting and invoking one or more experts.

measurement specification—a specification for the measurement of a phenomenon, which may include the type of measurement (e.g., present-value, frequency), other attributes of the measurement, and preferences of the measurement (e.g., accuracy, precision, throughput, latency).

measurement specification object (MSO)—the atomic objects used to describe concepts in the measurements domain. Measurement specification objects are associated to form a measurement task specification.

measurement task—a group of measurements, generations, and connections that share timing, synchronization, and control.

measurement task configuration tool—a software program which may be used to configure measurement tasks; this may be a general purpose development tool or a specific tool; a type of a measurement task specifier, below.

measurement task specification—a set of phenomena specifications, measurement specifications, generation specifications, timing specifications, and program specifications that comprise a measurement and automation application. A collection of one or more related specifications. Conceptually, the contents of a task specification represent one task which a customer would like to solve atomically. The measurements expert system uses measurements experts to compile a task specification into a populated run-time specification.

measurement task specifier—a program which accepts user input and may be used to produce a measurement task specification for a given measurement task; similar to a task configuration tool, below. An example measurement task specifier is a measurement task configuration tool which may be invoked from a graphical or text-based development environment. Other examples of a measurement task specifier include a measurement task wizard, and a measurement task API.

Specific examples of a measurement task specifier include LabVIEW, LabWindows/CVI, DiaDem, DasyLab, Visual Basic, Visual C++, Delphi, Mathwork's Simulink, Agilent Vee, SoftWire, and other similar programming development environments.

measurements expert—a type of expert designed to operate under arbitration of the Measurements Experts Library. The goal of a measurements expert is to compile a portion of a measurement task specification into a populated run-time specification.

partial solution—a collection of decisions for which no complete solution for the measurement task specification has yet been found.

phenomenon—a detectable signal. Users make measurements on phenomena, or generate them. Sensors and actuators convert from one phenomenon to another.

phenomenon specification—a characterization of a phenomenon in the real world, containing information about the type of the phenomenon (such as voltage, temperature, rotation speed, area luminosity, etc.), and characteristics of that phenomenon (such as range, bandwidth, shape, periodicity, etc.).

preferences—a formula that qualifies how well a solution meets a designer's needs. An example formula is f(mass), where f is the square of mass, such that less mass is a better solution. Another example is g(maximum latency, throughput) where g is a formula that calculates the throughput less 1000 times the maximum latency. In this case, a higher value for g is a better solution for the user (an identical concept is the "cost" function of a solution).

primitive—a single, cohesive object implementing a particular aspect of a measurement system. Primitive supervisors broker primitives. A run-time is composed of an aggregation of primitives.

primitive setting—a collection of properties associated with a particular primitive. Primitive settings are configured by measurements experts, and interpreted by primitive supervisors.

primitive supervisor—invoked by run-time builders, primitive supervisors interpret a specific primitive setting, using the contained properties to reserve an associated primitive.

reader—used to retrieve samples from a data source. Readers may be specific to the data source and the attributes will reflect this. For example, a buffer reader may have a parameter to indicate where in the buffer to retrieve data from.

resource—a single, reservable element of the total means available for performing measurements in a measurement system. Examples of resources include a hardware counter, a RTSI line, or a fixed amount of CPU cycles.

run-time—a collection or sequence of primitives in a specific environment implementing a measurement system. Run-times are built by run-time builders, and may be executed to perform a specific measurement task or operation. The term "run-time" may also refer to other forms of a software program that implement a measurement system.

run-time builder—a software program which may analyze a run-time specification, reserve one or more primitives according to the run-time specification, and configure one or more primitives according to the run-time specification. Interprets a particular run-time specification and builds a run-time. Primitive brokering is delegated to primitive supervisors. The term "run-time builder" may also refer to a software program which may analyze a run-time specification and configure other types of software entities, such as by configuring other types of software program(s) or data structures according to the run-time specification.

run-time specification—a set of parameters specifying hardware or software primitive configurations required for a specified measurement task. A collection of primitive settings populated by measurements experts. Run-time specifications are interpreted by run-time supervisors. The term "run-time specification" may also include a data structure or other representation of information that specifies a measurement task.

sensor—device used to convert from one phenomenon type to another. Typically, the user will need to use a sensor to convert the phenomenon to a type the device can sample. Example sensors include thermocouples, pressure transducers, cameras, etc.

solution—a complete solution, failed solution, or partial solution.

solution builder—a self-contained piece of expert logic ("expertise") used to perform post-processing on a complete or failed solution. Measurements experts attach solution builders to decisions at solution-time when a partial solution is expanded. Deployed solution builders are invoked when a complete or failed solution is selected by the measurements expert system.

specification attribute—a data member of a measurement specification object. Used to describe some characteristic of a particular object.

terminal—a physical location on a measurement device, cable, terminal block, accessory, or other measurement product where an phenomenon resides. For example, a terminal may be a connector on a terminal block, a pin on an ASIC, or the end of a thermocouple.

terminal configuration—a collection of terminals with a specified usage. Examples of terminal configurations are referenced single-ended, non-referenced single-ended, two-wire differential, and four-wire excitation.

timing specification—a specification for the timing of measurements, generations, and control functions in the systems. Timing can include specification of synchronized measurement and generation, timed sequences and constraints on the completion of tasks.

virtual measurement device—a device which is implemented as a software program, or at least a portion of which is implemented as a software program.

writer—used to write updates to a data store. Writers are generally specific to the data store and the attributes will reflect this. For example, a buffer writer may have a parameter to indicate where in the buffer to write data to.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A memory medium comprising program instructions implementing an expert system, wherein the expert system is operable to perform:

receiving a measurement task specification, wherein the measurement task specification specifies a measurement task;

analyzing the measurement task specification;

populating one or more candidate run-time specifications;

calculating one or more metrics for each of the populated candidate run-time specifications; and selecting one of the populated candidate run-time specifications based on the calculated metrics to produce a run-time specification, wherein the selected populated candidate run-time specification comprises at least a portion of said run-time specification;

wherein the run-time specification is useable to:

configure one or more measurement devices according to the run-time specification; and generate a run-time, wherein said run-time is executable to perform the measurement task.

2. The memory medium of claim 1, wherein said expert system comprises a plurality of experts; and wherein, in said populating the one or more candidate run-time specifications, the expert system is operable to select and invoke one or more of the plurality of experts to analyze the measurement task specification and populate the one or more candidate run-time specifications.

3. The memory medium of claim 2, wherein, in response to said invocation, each of the one or more experts is operable to:

analyze the measurement task specification;

populate at least one of the one or more candidate run-time specifications, thereby producing at least one respective populated candidate run-time specification, wherein each respective populated candidate run-time specification comprises one of a partial or complete solution for the measurement task; and for each respective populated candidate run-time specification comprising a partial solution, generate a respective new measurement task specification comprising an unsolved portion of the measurement task specification.

4. The memory medium of claim 2, wherein each of said one or more experts is operable to:
  analyze the measurement task specification; and
  if said analysis indicates that the expert is not operable to populate at least a portion of at least one of the one or more candidate run-time specifications, indicate to the expert system that the expert did not populate the one or more candidate run-time specifications for the measurement task specification.

5. The memory medium of claim 2, wherein each of said one or more experts is operable to:
  analyze the measurement task specification; and
  if said analysis indicates that the expert is operable to populate at least one of the one or more candidate run-time specifications,
    populate said at least one of the one or more candidate run-time specifications; and
    communicate said at least one of the one or more populated candidate run-time specifications to the expert system.

6. The memory medium of claim 2, wherein each of said one or more experts is operable to:
  analyze the measurement task specification; and
  if said analysis indicates that the expert is operable to populate only a first portion of at least one of the one or more candidate run-time specifications corresponding to a first portion of the measurement task specification,
    populate the first portion of said at least one of the one or more candidate run-time specifications;
    communicate the first portion of said at least one of the one or more candidate run-time specifications to the expert system; and
    submit a second portion of the measurement task specification to the expert system as a new, second measurement task specification, for which a respective candidate run-time specification portion was not populated.

7. The memory medium of claim 6, wherein the expert system is further operable to:
  receive said second measurement task specification;
  analyze the second measurement task specification;
  select and invoke one or more of the plurality of experts to analyze the second measurement task specification and populate one or more second candidate run-time specifications;
  calculate one or more metrics for each of the populated second candidate run-time specifications; and
  select one of the populated second candidate run-time specifications based on the calculated metrics;
  wherein the selected populated second candidate run-time specification comprises at least a second portion of said run-time specification of the measurement task.

8. The memory medium of claim 7, wherein, in response to said invocation, each of the one or more experts is operable to:
  analyze the second measurement task specification;
  populate at least one of the one or more second candidate run-time specifications, thereby producing at least one respective populated second candidate run-time specification, wherein each respective populated second candidate run-time specification comprises a partial or complete solution for the measurement task; and
  for each respective populated second candidate run-time specification comprising a partial solution, generate a respective new third measurement task specification comprising an unsolved portion of the second measurement task specification.

9. The memory medium of claim 8, wherein each said second portion of the measurement task specification comprises an unsolved measurement sub-task specification, wherein the expert system is further operable to perform an iterative process comprising:
  receiving unsolved measurement sub-task specifications;
  analyzing each unsolved measurement sub-task specification;
  selecting and invoking one or more other different experts of the plurality of experts to analyze each unsolved measurement sub-task specification and populate one or more respective candidate run-time specifications;
  calculating one or more metrics for each of the populated respective candidate run-time specifications; and
  select one of the populated respective candidate run-time specifications based on the calculated metrics;
  wherein the selected populated respective candidate run-time specification comprises at least a portion of said run-time specification of the measurement task; and
  wherein said iterative process is performed until either a complete run-time specification is populated, or the expert system determines that population of the complete run-time specification is not possible.

10. The memory medium of claim 9, wherein, in response to said invocation, each of the one or more experts is operable to:
  analyze at least one of the unsolved measurement sub-task specifications;
  populate at least one of the one or more respective candidate run-time specifications, thereby producing at least one populated respective candidate run-time specification, wherein each populated respective candidate run-time specification comprises a partial or complete solution for said at least one of the unsolved measurement sub-task specifications; and
  for each populated respective candidate run-time specification comprising a partial solution, generate a new, fourth respective measurement task specification, wherein the new, fourth respective measurement task specification comprises an unsolved portion of the unsolved measurement sub-task specification.

11. The memory medium of claim 2,
  wherein said memory medium is operable to store an expert registry, wherein said expert registry comprises information correlating each expert with one or more types of respective measurement tasks; and
  wherein said selecting one or more of the plurality of experts is performed based on the expert registry.

12. The memory medium of claim 1,
  wherein the memory medium is comprised in a computer-based measurement system; and
  wherein the computer-based measurement system includes the one or more measurement devices, wherein the configured one or more measurement devices are operable to respectively perform portions of the measurement task.

13. The memory medium of claim 12, wherein the memory medium contains further program instructions which are executable to:
  configure the one or more measurement devices according to the run-time specification; and generate a run-time, wherein said run-time is executable to perform the measurement task using the configured one or more measurement devices.

14. The memory medium of claim 1, wherein the expert system is further operable to validate the measurement task specification.

15. The memory medium of claim 1, wherein the measurement task comprises a plurality of measurement subtasks.

16. The memory medium of claim 1, wherein the measurement task comprises a complex measurement operation using a plurality of measurement devices.

17. The memory medium of claim 1, wherein at least one of the one or more measurement devices comprises a hardware measurement device.

18. The memory medium of claim 1, wherein at least one of the one or more measurement devices comprises a virtual measurement device.

19. The memory medium of claim 1, wherein the one or more metrics are specified by a user.

20. A method for performing a measurement task, the method comprising:
receiving a measurement task specification specifying a measurement task;
analyzing the measurement task specification, and generating one or more candidate run-time specifications for the measurement task in response to said analyzing;
calculating one or more metrics for each of the one or more candidate run-time specifications; and
selecting one of the one or more candidate run-time specifications based on the calculated metrics;
wherein the selected candidate run-time specification is useable to:
configure one or more measurement devices according to the selected run-time specification; and
generate a run-time, wherein said run-time is executable to perform the measurement task.

21. The method of claim 20, further comprising:
reserving one or more resources according to the selected run-time specification after said analyzing the selected run-time specification.

22. The method of claim 20, further comprising:
validating the measurement task specification in response to said analyzing the measurement task specification.

23. The method of claim 20, further comprising:
storing one or more of the measurement task specification, the selected run-time specification, and configuration information for the one or more measurement devices.

24. The method of claim 20, further comprising:
executing said run-time to perform the measurement task.

25. The method of claim 20, wherein said analyzing the measurement task specification and generating one or more candidate run-time specifications for the measurement task comprises an expert system performing:
analyzing the measurement task specification;
validating the measurement task specification; and
selecting and invoking one or more of a plurality of experts to analyze the measurement task specification and populate one or more candidate run-time specifications.

26. The memory medium of claim 25, further comprising each of the one or more experts performing:
analyzing the measurement task specification;
populating at least one of the one or more candidate run-time specifications, thereby producing at least one respective populated candidate run-time specification, wherein each respective populated candidate run-time specification comprises a partial or complete solution for the measurement task; and
for each respective populated candidate run-time specification comprising a partial solution, generate a respective new measurement task specification comprising an unsolved portion of the measurement task specification.

27. The method of claim 25, further comprising each of the one or more experts performing:
analyzing the measurement task specification; and
if said analyzing indicates that the expert is not operable to populate at least a portion of at least one of the one or more candidate run-time specifications, indicating to the expert system that the expert did not populate the one or more candidate run-time specifications for the measurement task specification.

28. The method of claim 25, further comprising each of the one or more experts performing:
analyzing the measurement task specification; and
if said analyzing indicates that the expert is operable to populate at least one of the one or more candidate run-time specifications,
populating said at least one of the one or more candidate run-time specifications; and
communicating said at least one of the one or more candidate run-time specifications to the expert system.

29. The method of claim 25, further comprising each of the one or more experts performing:
analyzing the measurement task specification; and
if said analyzing indicates that the expert is operable to populate only a first portion of at least one of the one or more candidate run-time specifications corresponding to a first portion of the measurement task specification,
populating the first portion of said at least one of the one or more candidate run-time specifications;
communicating the first portion of said at least one of the one or more candidate run-time specifications to the expert system; and
submitting a second portion of the measurement task specification to the expert system as a new, second measurement task specification, for which a respective candidate run-time specification portion was not populated.

30. The method of claim 29, further comprising the expert system performing:
receiving said second measurement task specification;
analyzing the second measurement task specification;
selecting and invoking one or more of the plurality of experts to analyze the second measurement task specification and populate one or more second candidate run-time specifications;
calculating one or more metrics for each of the populated second candidate run-time specifications; and
selecting one of the populated candidate run-time specifications based on the calculated metrics;
wherein the selected populated candidate run-time specification comprises at least a portion of said generated run-time specification of the measurement task.

31. The method of claim 30, further comprising each of the one or more experts, in response to said invocation, performing:
analyzing the second measurement task specification;

populating at least one of the one or more second candidate run-time specifications, thereby producing at least one respective populated second candidate run-time specification, wherein each respective populated second candidate run-time specification comprises a partial or complete solution for the measurement task; and for each respective populated second candidate run-time specification comprising a partial solution, generating a respective new, third measurement task specification comprising an unsolved portion of the second measurement task specification.

32. The method of claim 31, wherein each said second portion of the respective measurement task specification comprises an unsolved measurement sub-task specification, the method further comprising the expert system performing an iterative process comprising:

receiving unsolved measurement sub-task specifications;

analyzing each unsolved measurement sub-task specification;

selecting and invoking one or more other different experts of the plurality of experts to analyze each unsolved measurement sub-task specification and populate one or more respective candidate run-time specifications;

calculating one or more metrics for each of the populated respective candidate run-time specifications; and select one of the populated respective candidate run-time specifications based on the calculated metrics;

wherein the selected populated respective candidate run-time specification comprises at least a portion of said generated run-time specification of the measurement task;

wherein said iterative process is performed until either a complete run-time specification is populated, or the expert system determines that population of the complete run-time specification is not possible.

33. The method of claim 32, further comprising each of the one or more experts, in response to said invocation, performing:

analyzing at least one of the unsolved measurement sub-task specifications;

populating at least one of the one or more respective candidate run-time specifications, thereby producing at least one populated respective candidate run-time specification, wherein each populated respective candidate run-time specification comprises a partial or complete solution for said at least one of the unsolved measurement sub-task specifications; and for each populated respective candidate run-time specification comprising a partial solution, generating a new, fourth respective measurement task specification, wherein the new, fourth respective measurement task specification comprises an unsolved portion of the unsolved measurement sub-task specification.

34. The method of claim 25, further comprising:

storing an expert registry, wherein said expert registry comprises information correlating each expert with one or more respective types of measurement tasks; and wherein said selecting one or more of the plurality of experts is performed based on the expert registry.

35. The method of claim 20, wherein the measurement task comprises a plurality of measurement sub-tasks.

36. The method of claim 20, wherein the measurement task comprises a complex measurement operation using a plurality of measurement devices.

37. The method of claim 20, wherein at least one of the one or more measurement devices comprises a measurement hardware device.

38. The method of claim 20, wherein at least one of the one or more measurement devices comprises a virtual measurement device.

39. The method of claim 20, wherein the one or more metrics are specified by a user.

40. An expert system for generating a measurement program specification for a measurement task, comprising:

a first software program operable to analyze a received measurement task specification specifying the measurement task;

a validation software program operable to validate the measurement task specification; and a plurality of experts operable to generate the measurement program specification for the measurement task;

wherein the measurement program specification is useable to perform the measurement task.

41. The expert system of claim 40, wherein the measurement program specification comprises a run-time specification which is executable to perform the measurement task; and wherein the expert system is operable to:

select and invoke one or more of the plurality of experts to analyze the measurement task specification and populate one or more candidate run-time specifications;

calculate one or more metrics for each of the populated candidate run-time specifications; and select one of the populated candidate run-time specifications based on the calculated metrics;

wherein the selected populated candidate run-time specification comprises at least a portion of said run-time specification.

42. The expert system of claim 41, wherein, in response to said invocation, each of the one or more experts is operable to:

analyze the measurement task specification;

populate at least one of the one or more candidate run-time specifications, thereby producing at least one respective populated candidate run-time specification, wherein each respective populated candidate run-time specification comprises a partial or complete solution for the measurement task; and for each respective populated candidate run-time specification comprising a partial solution, generate a respective new measurement task specification comprising an unsolved portion of the measurement task specification.

43. The expert system of claim 42, wherein each of said one or more experts is operable to:

analyze the measurement task specification; and if said analysis indicates that the expert is not operable to populate at least a portion of at least one of the one or more candidate run-time specifications, indicate to the expert system that the expert did not populate the one or more candidate run-time specifications for the measurement task specification.

44. The expert system of claim 42, wherein each of said one or more experts is operable to:

analyze the measurement task specification; and if said analysis indicates that the expert is operable to populate at least one of the one or more candidate run-time specifications, populate said at least one of the one or more candidate run-time specifications; and communicate said at least one of the one or more populated candidate run-time specifications to the expert system.

45. The expert system of claim 42, wherein each of said one or more experts is operable to:
   analyze the measurement task specification; and
   if said analysis indicates that the expert is operable to populate only a first portion of the respective candidate run-time specification corresponding to a first portion of the measurement task specification,
      populate the first portion of the respective candidate run-time specification;
      communicate the first portion of the respective candidate run-time specification to the expert system; and
      submit a second portion of the respective measurement task specification to the expert system as a new, second measurement task specification, for which a respective candidate run-time specification portion was not populated.

46. The expert system of claim 45, wherein the expert system is further operable to:
   receive said second measurement task specification;
   analyze the second measurement task specification;
   select and invoke one or more of the plurality of experts to analyze the second measurement task specification and populate one or more second candidate run-time specifications;
   calculate one or more metrics for each of the populated second candidate run-time specifications; and
   select one of the populated candidate run-time specifications based on the calculated metrics;
   wherein the selected populated candidate run-time specification comprises at least a portion of said generated run-time specification of the measurement task.

47. The expert system of claim 46, wherein, in response to said invocation, each of the one or more experts is operable to:
   analyze the second measurement task specification;
   populate at least one of the one or more second candidate run-time specifications, thereby producing at least one respective populated second candidate run-time specification, wherein each respective populated second candidate run-time specification comprises a partial or complete solution for the measurement task; and
   for each respective populated second candidate run-time specification comprising a partial solution, generate a respective new, third measurement task specification comprising an unsolved portion of the second measurement task specification.

48. The expert system of claim 47, wherein each said second portion of the respective measurement task specification comprises an unsolved measurement sub-task specification, wherein the expert system is further operable to perform an iterative process comprising:
   receiving unsolved measurement sub-task specifications;
   analyzing each unsolved measurement sub-task specification;
   selecting and invoking one or more other different experts of the plurality of experts to analyze each unsolved measurement sub-task specification and populate one or more respective candidate run-time specifications;
   calculating one or more metrics for each of the populated respective candidate run-time specifications; and
   select one of the populated respective candidate run-time specifications based on the calculated metrics;
   wherein the selected populated respective candidate run-time specification comprises at least a portion of said run-time specification of the measurement task;
   wherein said iterative process is performed until either a complete run-time specification is populated, or the expert system determines that population of the complete run-time specification is not possible.

49. The expert system of claim 48, wherein, in response to said invocation, each of the one or more experts is operable to:
   analyze at least one of the unsolved measurement sub-task specifications;
   populate at least one of the one or more respective candidate run-time specifications, thereby producing at least one populated respective candidate run-time specification, wherein each populated respective candidate run-time specification comprises a partial or complete solution for said at least one of the unsolved measurement sub-task specifications; and
   for each populated respective candidate run-time specification comprising a partial solution, generate a new, fourth respective measurement task specification, wherein the new respective measurement task specification comprises an unsolved portion of the unsolved measurement sub-task specification.

50. The expert system of claim 41, further comprising:
   a storage system which is operable to store an expert registry, wherein said expert registry comprises information correlating each expert with one or more respective measurement tasks; and
   wherein said selecting one or more of the plurality of experts is performed based on the expert registry.

51. The expert system of claim 50, wherein at least one of the one or more measurement devices comprises a measurement hardware device.

52. The expert system of claim 50, wherein at least one of the one or more measurement devices comprises a virtual measurement device.

53. The expert system of claim 40,
   wherein the expert system is comprised in a computer-based measurement system; and
   wherein the computer-based measurement system includes one or more measurement devices, wherein the one or more measurement devices are operable to respectively perform portions of the measurement task.

* * * * *

UNITED STATES PATENT AND TRADEMARK OFFICE
CERTIFICATE OF CORRECTION

PATENT NO. : 6,944,606 B2
DATED : September 13, 2005
INVENTOR(S) : Schmit et al.

It is certified that error appears in the above-identified patent and that said Letters Patent is hereby corrected as shown below:

Column 80,
Lines 8-9, delete "a received measurement" and substitute -- a measurement --.

Signed and Sealed this

Twentieth Day of December, 2005

JON W. DUDAS
*Director of the United States Patent and Trademark Office*